US010554870B2

(12) United States Patent
Wexler et al.

(10) Patent No.: US 10,554,870 B2
(45) Date of Patent: Feb. 4, 2020

(54) WEARABLE APPARATUS AND METHODS FOR PROCESSING IMAGE DATA

(71) Applicant: ORCAM TECHNOLOGIES LTD., Jerusalem (IL)

(72) Inventors: Yonatan Wexler, Jerusalem (IL); Amnon Shashua, Mevaseret Zion (IL)

(73) Assignee: OrCam Technologies Ltd., Jerusalem (IL)

( * ) Notice: Subject to any disclaimer, the term of this patent is extended or adjusted under 35 U.S.C. 154(b) by 0 days.

(21) Appl. No.: 14/807,661

(22) Filed: Jul. 23, 2015

(65) Prior Publication Data

US 2016/0026853 A1 Jan. 28, 2016

Related U.S. Application Data

(60) Provisional application No. 62/027,936, filed on Jul. 23, 2014, provisional application No. 62/027,957, filed on Jul. 23, 2014.

(51) Int. Cl.
*G06K 9/00* (2006.01)
*H04N 5/225* (2006.01)
(Continued)

(52) U.S. Cl.
CPC ......... *H04N 5/2259* (2013.01); *G01S 3/7864* (2013.01); *G02B 27/0093* (2013.01);
(Continued)

(58) Field of Classification Search
CPC ......... G02B 27/0093; G06T 7/74; G06T 7/97; G06F 1/188; G06F 1/1686; G06F 3/0304;
(Continued)

(56) References Cited

U.S. PATENT DOCUMENTS

2005/0234774 A1* 10/2005 Dupree .................. G06Q 30/02 705/14.57
2010/0226535 A1* 9/2010 Kimchi .................. G06F 3/013 382/103

(Continued)

OTHER PUBLICATIONS

Decoding Mtn Dew, The Open Scroll Blog, http://theopenscroll.blogspot.com/2013/08/decoding-mtn-dew.html (Aug. 24, 2013).*

(Continued)

*Primary Examiner* — Andrew M Moyer
(74) *Attorney, Agent, or Firm* — Finnegan, Henderson, Farabow, Garrett & Dunner LLP

(57) ABSTRACT

A wearable apparatus and method are provided for processing images including product descriptors. In one implementation, a wearable apparatus for processing images including a product descriptor is provided. The wearable apparatus includes a wearable image sensor configured to capture a plurality of images from an environment of a user of the wearable apparatus. The wearable apparatus also includes at least one processing device programmed to analyze the plurality of images to identify one or more of the plurality of images that include an occurrence of the product descriptor. Based on analysis of the one or more identified images, the at least one processing device is also programmed to determine information related to the occurrence of the product descriptor. The at least one processing device is further configured to cause the information and an identifier of the product descriptor to be stored in a memory.

21 Claims, 103 Drawing Sheets

(51) Int. Cl.

| | |
|---|---|
| ***G06F 1/18*** | (2006.01) |
| ***G06F 16/532*** | (2019.01) |
| ***G06T 7/00*** | (2017.01) |
| ***G06T 7/73*** | (2017.01) |
| ***G06K 9/62*** | (2006.01) |
| ***G06F 1/16*** | (2006.01) |
| ***G06F 3/03*** | (2006.01) |
| ***G02B 27/00*** | (2006.01) |
| ***G02B 27/01*** | (2006.01) |
| ***G06F 3/01*** | (2006.01) |
| ***G06Q 30/02*** | (2012.01) |
| ***H04N 5/232*** | (2006.01) |
| ***H04N 7/18*** | (2006.01) |
| ***G06F 3/00*** | (2006.01) |
| ***G06F 3/038*** | (2013.01) |
| ***H04N 5/235*** | (2006.01) |
| ***G06T 7/20*** | (2017.01) |
| ***H04N 5/44*** | (2011.01) |
| ***G01S 3/786*** | (2006.01) |
| ***H04N 1/21*** | (2006.01) |
| ***G06F 16/53*** | (2019.01) |
| ***G06F 16/51*** | (2019.01) |

(52) U.S. Cl.

CPC ........... *G02B 27/017* (2013.01); *G06F 1/163* (2013.01); *G06F 1/1686* (2013.01); *G06F 1/18* (2013.01); *G06F 1/188* (2013.01); *G06F 3/005* (2013.01); *G06F 3/011* (2013.01); *G06F 3/012* (2013.01); *G06F 3/017* (2013.01); *G06F 3/0304* (2013.01); *G06F 3/038* (2013.01); *G06F 16/51* (2019.01); *G06F 16/53* (2019.01); *G06F 16/532* (2019.01); *G06K 9/00201* (2013.01); *G06K 9/00208* (2013.01); *G06K 9/00221* (2013.01); *G06K 9/00288* (2013.01); *G06K 9/00335* (2013.01); *G06K 9/00624* (2013.01); *G06K 9/00671* (2013.01); *G06K 9/00677* (2013.01); *G06K 9/00718* (2013.01); *G06K 9/6262* (2013.01); *G06Q 30/0246* (2013.01); *G06Q 30/0257* (2013.01); *G06Q 30/0267* (2013.01); *G06Q 30/0269* (2013.01); *G06T 7/20* (2013.01); *G06T 7/74* (2017.01); *G06T 7/97* (2017.01); *H04N 1/2112* (2013.01); *H04N 5/2251* (2013.01); *H04N 5/2252* (2013.01); *H04N 5/2254* (2013.01); *H04N 5/2257* (2013.01); *H04N 5/2258* (2013.01); *H04N 5/2353* (2013.01); *H04N 5/23206* (2013.01); *H04N 5/23216* (2013.01); *H04N 5/23219* (2013.01); *H04N 5/23229* (2013.01); *H04N 5/23245* (2013.01); *H04N 5/23258* (2013.01); *H04N 5/44* (2013.01); *H04N 7/183* (2013.01); *H04N 7/185* (2013.01); *G02B 2027/014* (2013.01); *G02B 2027/0138* (2013.01); *G02B 2027/0178* (2013.01); *G02B 2027/0187* (2013.01); *G06F 2203/011* (2013.01); *G06K 2209/21* (2013.01); *G06K 2209/25* (2013.01); *G06T 2207/10004* (2013.01); *G06T 2207/10016* (2013.01); *G06T 2207/30232* (2013.01)

(58) Field of Classification Search

CPC .... G06F 3/012; H04N 5/2254; H04N 5/2259; H04N 5/2257; H04N 5/23206; H04N 7/185; G06Q 30/0267; G06K 9/00671

USPC .......................................................... 382/103

See application file for complete search history.

(56) References Cited

U.S. PATENT DOCUMENTS

| | | | | |
|---|---|---|---|---|
| 2010/0328316 | A1* | 12/2010 | Stroila | G06K 9/00818 345/441 |
| 2012/0212593 | A1* | 8/2012 | Na'aman | G06K 9/00671 348/62 |
| 2014/0348384 | A1 | 11/2014 | Kolehmainen | |
| 2015/0049902 | A1 | 2/2015 | Moraleda et al. | |
| 2015/0170249 | A1* | 6/2015 | Cockcroft | G06Q 30/0627 705/26.63 |
| 2015/0379616 | A1* | 12/2015 | Cleveland | G06Q 30/0633 705/26.8 |
| 2016/0026868 | A1* | 1/2016 | Wexler | H04N 5/2257 382/103 |

OTHER PUBLICATIONS http://www.ebay.com/itm/Mountain-Dew-Do-the-Dew-Arrow-Metal-Sign-90s-Style-Kitchen-Decor-26-75-x-8-75-/141322959494.*

Communication relating to the results of the partial international search included in an Invitation to Pay Additional Fees dated Feb. 4, 2016, in corresponding international application No. PCT/IB2015/001809, filed Jul. 23, 2015 (8 pages).

International Search Report and Written Opinion dated Apr. 11, 2016 in corresponding International patent application No. PCT/IB2015/001809 (19 pages).

Office Action dated May 26, 2017, in U.S. Appl. No. 14/807,580 (34 pages).

Office Action dated Feb. 1, 2017, in U.S. Appl. No. 14/807,580 (30 pages).

* cited by examiner

4000

| | 4061 | 4062 | 4063 | 4064 | 4065 |
|---|---|---|---|---|---|
| | Identifier | Object | Location | Date | Time |
| 4001 | 1001 | Bag advertisement | 15 K Street, Washington, DC | 6/7/2015 | 3:00 p.m. |
| 4002 | 1002 | Logo "CC" | 15 K Street, Washington, DC | 6/7/2015 | 3:00 p.m. |
| | . . . | . . . | . . . | . . . | . . . |
| 4050 | 1050 | Logo "V" | GPS 38.9047° N, 77.0164° W | 6/15/2015 | 1:00 p.m. |

| | Gender (M/F) | Age | Weight | Height | Hair color | Eye color | ... | Postal code |
|---|---|---|---|---|---|---|---|---|
| User 100 | M | 31 | 160 | 6.1 | Black | Black | ... | 10000 |
| User 701 | M | 33 | 180 | 6.3 | Brown | Brown | | 10060 |
| User 702 | F | 28 | 110 | 5.7 | Blond | Blue | | 10001 |
| ... | ... | | ... | ... | | | | |
| User 703 | F | 27 | 110 | 5.8 | Red | Blue | | 10400 |

| | 7210 | 7211 | 7212 | 7213 | 7214 | 7215 | 7205 |
|---|---|---|---|---|---|---|---|
| | Image Identifier | Wearable Apparatus Identifier | Identified content | Location | Date | Time | User |
| 7241 | 1001 | W729E02P | ABC Soccer League | 15 K Street, Washington, DC | 6/7/2015 | 3:00 p.m. | 100 |
| 7242 | 1002 | | Z Soccer | 15 K Street, Washington, DC | 6/7/2015 | 3:01 p.m. | 100 |
| 7243 | 1003 | | X Soccer | 15 K Street, Washington, DC | 6/7/2015 | 3:02 p.m. | 100 |
| | ... | ... | ... | ... | ... | ... | |
| 7290 | 1050 | W739C08 | ABC Soccer League | GPS 38.9047° N, 77.0164° W | 6/7/2015 | 3:04 p.m. | 106 |

| | 8061 Identifier | 8062 Product Descriptor | 8063 Location | 8064 Context | 8065 Date & Time |
|---|---|---|---|---|---|
| 8001 | 1001 | Pizza advertisement | 15 K Street, Washington, DC | child looking at pizza advertisement posted in the window of food store | 6/7/2015 3:00 p.m. |
| 8002 | 1002 | Logo of "W" bottled water | 15 K Street, Washington, DC | Young woman holding bottled water (brand "W") outside subway station | 6/7/2015 3:00 p.m. |
| | ... | ... | ... | ... | ... |
| 8050 | 1050 | E Energy Drink | GPS 38.9047° N, 77.0164° W | E Energy Drink placed on table in soccer field | 6/15/2015 1:00 p.m. |

Fig. 80

WEARABLE APPARATUS AND METHODS FOR PROCESSING IMAGE DATA

CROSS REFERENCES TO RELATED APPLICATIONS

This application claims the benefit of priority of U.S. Provisional Patent Application No. 62/027,936, filed on Jul. 23, 2014, and U.S. Provisional Patent Application No. 62/027,957, filed on Jul. 23, 2014, all of which are incorporated herein by reference in their entirety

BACKGROUND

Technical Field

This disclosure generally relates to devices and methods for capturing and processing images from an environment of a user.

Background Information

Today, technological advancements make it possible for wearable devices to automatically capture images and store information that is associated with the captured images. Certain devices have been used to digitally record aspects and personal experiences of one's life in an exercise typically called "lifelogging." Some individuals log their life so they can retrieve moments from past activities, for example, social events, trips, etc. Lifelogging may also have significant benefits in other fields (e.g., business, fitness and healthcare, and social research). Lifelogging devices, while useful for tracking daily activities, may be improved with capability to enhance one's interaction in his environment with feedback and other advanced functionality based on the analysis of captured image data.

Even though users can capture images with their smartphones and some smartphone applications can process the captured images, smartphones may not be the best platform for serving as lifelogging apparatuses in view of their size and design. Lifelogging apparatuses should be small and light, so they can be easily worn. Moreover, with improvements in image capture devices, including wearable apparatuses, additional functionality may be provided to assist users in navigating in and around an environment. Therefore, there is a need for apparatuses and methods for automatically capturing and processing images in a manner that provides useful information to users of the apparatuses.

SUMMARY

Embodiments consistent with the present disclosure provide an apparatus and methods for automatically capturing and processing images from an environment of a user.

In accordance with a disclosed embodiment, an apparatus securable to an article of clothing is provided. The apparatus may include a capturing unit including at least one image sensor configured to capture images of an environment of a user, a power unit configured to house a power source, and a connector configured to connect the capturing unit and the power unit. The connector is configured to secure the apparatus to the article of clothing such that the capturing unit is positioned over an outer surface of the article of clothing and the powering unit is positioned under an inner surface of the article of clothing.

In accordance with another disclosed embodiment, an apparatus securable to an article of clothing may include a capturing unit including at least one image sensor configured to capture images of an environment of a user, and a power unit configured to house a power source associated with protective circuitry. The protective circuitry is remotely located with respect to the power unit, and a connector connects the capturing unit and the power unit.

In accordance with a disclosed embodiment, a wearable apparatus for capturing image data from a plurality of fields of view is provided. The wearable apparatus includes a plurality of image sensors for capturing image data of an environment of a user. Each of the image sensors is associated with a different field of view. The wearable apparatus includes an attachment mechanism configured to enable the image sensors to be worn by the user. The wearable apparatus also includes at least one processing device programmed to process image data captured by at least two of the image sensors to identify an object in the environment of the user. The at least one processing device is also programmed to identify a first image sensor from among the at least two image sensors. The first image sensor has a first optical axis closer to the object than a second optical axis of a second image sensor from among the at least two image sensors. After identifying the first image sensor, the at least one processing device is also programmed to process image data from the first image sensor using a first processing scheme, and process image data from the second image sensor using a second processing scheme.

In accordance with another disclosed embodiment, a method for capturing image data from a wearable device is provided. The method includes processing image data captured by at least two image sensors included in the wearable device to identify an object in an environment of the user. Each of the image sensors includes a different field of view. The method also includes identifying a first image sensor from among the at least two image sensors. The first image sensor has a first optical axis closer to the object than a second optical axis of a second image sensor from among the at least two image sensors. The method further includes after identifying the first image sensor, processing image data from the first image sensor using a first processing scheme, and processing image data from the second image sensor using a second processing scheme.

In accordance with yet another disclosed embodiment, a wearable apparatus for capturing image data from a plurality of fields of view is provided. The wearable apparatus includes a plurality of image sensors for capturing image data of an environment of a user. Each of the image sensors is associated with a different field of view. The wearable apparatus also includes an attachment mechanism configured to enable the image sensors to be worn by the user. The wearable apparatus further includes at least one processing device programmed to process image data captured by at least one of the image sensors to identify a chin of the user. The at least one processing device is also programmed to activate at least one additional image sensor to capture image data of a portion of the environment in front of the user based on the identification of the chin.

In accordance with a disclosed embodiment, a wearable apparatus for capturing image data is provided. The wearable apparatus includes at least one image sensor for capturing image data of an environment of a user, wherein a field of view of the image sensor includes at least a portion of a chin of the user. The wearable apparatus includes two or more microphones, and an attachment mechanism configured to enable the at least one image sensor and the two or more microphones to be worn by the user. The wearable apparatus includes at least one processing device programmed to capture at least one image using the at least one image sensor, identify the chin of the user in the at least one image to obtain a location of the chin of the user in the at least one image, and select at least one microphone from the two or more microphones based on the location of the chin of the user in the at least one image. The at least one processing device is also programmed to process input from the selected at least one microphone using a first processing scheme, and process input from at least one of the two or more microphones that are not selected using a second processing scheme.

In accordance with another disclosed embodiment, a wearable apparatus for capturing image data is provided. The wearable apparatus includes at least one image sensor for capturing image data of an environment of a user, and at least one microphone. The wearable apparatus includes an attachment mechanism configured to enable the at least one image sensor and the at least one microphone to be worn by the user. The wearable apparatus includes at least one processing device programmed to identify a direction of sound received by the at least one microphone, identify a portion of at least one image captured by the at least one image sensor based on the direction of the sound received by the at least one microphone, and process the identified portion of the at least one image.

In accordance with another disclosed embodiment, a wearable apparatus for capturing image data is provided. The wearable apparatus includes at least one image sensor for capturing image data of an environment of a user, wherein a field of view of the image sensor includes at least a portion of a chin of the user. The wearable apparatus includes an attachment mechanism configured to enable the at least one image sensor to be worn by the user. The wearable apparatus includes at least one processing device programmed to capture at least one image using the at least one image sensor, identify the chin of the user the in at least one image to obtain a location of the chin of the user in the at least one image, and identify a portion of the at least one image captured by the at least one image sensor based on the location of the chin of the user. The at least one processing device is also programmed to process the identified portion of the at least one image.

In accordance with another disclosed embodiment, a method is provided. The method includes processing at least one image captured using a wearable camera to identify a chin of a user in the at least one image to obtain a location of the chin of the user in the at least one image. The method also includes selecting at least one microphone from two or more microphones attached to the wearable camera based on the location of the chin of the user in the at least one image. The method also includes processing input from the selected at least one microphone using a first processing scheme, and processing input from at least one of the two or more microphones that are not selected using a second processing scheme.

In accordance with another disclosed embodiment, a method is provided. The method includes identifying a direction of sound received by at least one microphone attached to a wearable camera to obtain a sound direction, and capturing at least one image using a wearable camera. The method also includes identifying a portion of the at least one image based on the sound direction, and processing the identified portion of the at least one image.

In accordance with another disclosed embodiment, a method is provided. The method includes capturing at least one image using a wearable camera. The method also includes identifying a chin of a user in the at least one image to obtain a location of the chin of the user in the at least one image. The method also includes identifying a portion of the at least one image captured by the at least one image sensor based on the location of the chin of the user. The method further includes processing the identified portion of the at least one image.

In accordance with a disclosed embodiment, a wearable apparatus for selectively processing images is provided. The wearable apparatus includes an image sensor configured to capture a plurality of images from an environment of a user. The wearable apparatus also includes at least one processing device programmed to access at least one rule for classifying images. The at least one processing device is also programmed to classify, according to the at least one rule, at least a first subset of the plurality of images as key images and at least a second subset of the plurality images as auxiliary images. The at least one processing device is further programmed to delete at least some of the auxiliary images.

Consistent with another disclosed embodiment, a wearable apparatus for selectively processing images is provided. The wearable apparatus includes an image sensor configured to capture a plurality of images from an environment of a user. The wearable apparatus also includes at least one processing device programmed to access at least one rule for classifying images. The at least one processing device is also programmed to classify, according to the at least one rule, a plurality of images as key images. The at least one processing device is also programmed to identify, in at least one of the key images, a visual trigger associated with a private contextual situation. The at least one processing device is further programmed to delete the at least one of the key images that includes the visual trigger associated with the private contextual situation.

Consistent with yet another disclosed embodiment, a method for selectively processing images is provided. The method includes processing a plurality of images captured by at least one image sensor included in a wearable apparatus. The method also includes accessing at least one rule for classifying images. The method also includes classifying, according to the at least one rule, at least a first subset of the plurality of images as key images and at least a second subset of the plurality images as auxiliary images. The method further includes deleting at least some of the auxiliary images.

In accordance with a disclosed embodiment, a wearable apparatus for collecting information related to activities of a user is provided. The wearable apparatus includes an image sensor configured to capture a plurality of images from an environment of a user. The wearable apparatus includes a communications interface and at least one processing device. The at least one processing device is programmed to process the plurality of images to identify an activity occurring in the environment of the user. The at least one processing device is also programmed to associate the activity with an activity category. The at least one processing device is further programmed to cause transmission of at least the activity category to a remotely located computing device via the communications interface.

Consistent with another disclosed embodiment, a wearable apparatus for collecting information related to activities of a user is provided. The wearable apparatus includes an image sensor configured to capture a plurality of images from an environment of a user. The wearable apparatus also includes a communications interface and at least one processing device. The at least one processing device is programmed to process the plurality of images to identify an activity occurring in the environment of the user. The at least one processing device is also programmed to access profile information related to the user, and determine, based on the profile information, that images of the activity are to be included in a life log. The at least one processing device is also programmed to transmit at least one of the plurality of images of the activity to a remotely located computing device via the communications interface for inclusion in the life log.

Consistent with yet another disclosed embodiment, a method for collecting information related to activities of a user is provided. The method includes capturing, via an image sensor included in a wearable apparatus, a plurality of images from an environment a user of the wearable apparatus. The method also includes processing the plurality of images to identify an activity occurring in the environment of the user. The method also includes associating the activity with an activity category. The method further includes transmitting the activity category to a remotely located computing device.

In accordance with a disclosed embodiment, a wearable apparatus for storing information related to objects associated with a hand of a user is provided. The apparatus may comprise a wearable image sensor configured to capture a plurality of images from an environment of a user, and at least one processing device. The processor device may be programmed to process the plurality of images to detect the hand of the user in at least one of the plurality of images. Further, the processor device may be programmed to process the at least one image to detect an object that is associated with the hand of the user. Also, the processor device may be programmed to store information related to the object.

In accordance with another disclosed embodiment, a wearable apparatus for determining a last known location of an object is provided. The apparatus may comprise a wearable image sensor configured to capture a plurality of images from an environment of a user, and at least one processing device. The processor device may be programmed to process the plurality of images to detect an image showing an object of interest. Also, the processor device may be programmed to identify a location associated with the detected image and produce location information related to the location. The processor device may further be programmed to store, in a memory, the location information with information associated with the object of interest.

In accordance with yet another disclosed embodiment, a method for storing information related to objects associated with a hand of a user of a wearable device is provided. The method includes processing a plurality of images captured by a wearable image sensor included in the wearable device to detect the hand of the user in at least one of the plurality of images. The method further includes processing the at least one of the plurality of images to detect an object associated with the hand of the user. Also, the method includes storing information related to the object.

In accordance with a disclosed embodiment, a server is provided to determine a matching score related to users of wearable camera systems. The server includes a memory and at least one processing device associated with the server. The memory stores image data captured by the wearable camera systems. Each wearable camera system is configured to capture images from an environment of a corresponding user. The at least one processing device associated with the server is programmed to receive the image data from the wearable camera systems and determine a value of the matching score related to at least two users of the wearable camera systems. The value of the matching score is based on the image data captured by the wearable camera systems of the at least two users and indicates a level of exposure of the two users to similar visual details in their environments.

Consistent with another disclosed embodiment, a method is provided to determine a matching score related to users of wearable camera systems. The method includes receiving, by at least one processing device, image data captured by the wearable camera systems. Each wearable camera system is configured to capture images from an environment of a corresponding user. The method further includes determining, by the at least one processing device, a value of the matching score related to at least two users of the wearable camera systems. The value of the matching score is based on the image data captured by the wearable camera systems of the two users and indicates a level of exposure of the two users to similar visual details in their environments.

In accordance with a disclosed embodiment, a wearable apparatus for processing images including a product descriptor is provided. The wearable apparatus includes a wearable image sensor configured to capture a plurality of images from an environment of a user of the wearable apparatus. The wearable apparatus also includes at least one processing device programmed to analyze the plurality of images to identify one or more of the plurality of images that include an occurrence of the product descriptor. Based on analysis of the one or more identified images, the at least one processing device is also programmed to determine information related to the occurrence of the product descriptor. The at least one processing device is further configured to cause the information and an identifier of the product descriptor to be stored in a memory.

In accordance with another disclosed embodiment, a wearable apparatus for processing images including a product descriptor is provided. The wearable apparatus includes a wearable image sensor configured to capture a plurality of images from an environment of a user of the wearable apparatus. The wearable apparatus also includes at least one processing device programmed to analyze the plurality of images to identify one or more of the plurality of images that include an occurrence of the product descriptor. The at least one processing device is also programmed to identify, in one or more of the identified images, a graphic included in the product descriptor, and access a database of stored graphics. The at least one processing device is further programmed to compare the identified graphic to the stored graphics, and trigger execution of an action based on whether a match is found between the identified graphic and a stored graphic in the database.

In accordance with another disclosed embodiment, a method for processing images including a product descriptor is provided. The method includes capturing, via a wearable image sensor, a plurality of images from an environment of a user of a wearable device including the wearable image sensor. The method also includes analyzing the plurality of images to identify one or more of the plurality of images that include an occurrence of the product descriptor. The method also includes, based on the one or more identified images, determining information related to the occurrence of the product descriptor. The method further includes causing the information and an identifier of the product descriptor to be stored in a memory.

In accordance with yet another disclosed embodiment, a method for processing images including a product descriptor is provided. The method includes capturing, via a wearable image sensor, a plurality of images from an environment of a user of a wearable device including the wearable image sensor. The method also includes analyzing the plurality of images to identify one or more of the plurality of images that include an occurrence of the product descriptor. The method also includes identifying, in one or more of the identified images, a graphic included in the product descriptor. The method further includes accessing a database of stored graphics, comparing the identified graphic to the stored graphics, and triggering execution of an action based on whether a match is found between the identified graphic and a stored graphic in the database.

In accordance with a disclosed embodiment, a system for providing advertisements may include a memory storing executable instructions and at least one processing device programmed to execute the instructions. The at least one processing device may execute the instructions to receive, from a wearable camera system, data related to at least one characteristic identified in image data captured by the wearable camera system from an environment, select, based on the at least one characteristic, an advertisement, and transmit the advertisement to a device associated with a user of the wearable camera system.

In accordance with another disclosed embodiment, a system for providing advertisements may include a memory storing executable instructions and at least one processing device programmed to execute the instructions. The at least one processing device may execute the instructions to receive, from a wearable camera system, image data captured by the wearable camera system from an environment, analyze the image data to identify at least one characteristic of the environment, select, based on the at least one characteristic, an advertisement; and transmit the advertisement to a device associated with a user of the wearable camera system.

In accordance with still another disclosed embodiment, a system for providing advertisements may include a memory storing executable instructions and at least one processing device programmed to execute the instructions. The at least one processing device may execute the instructions to receive, from a wearable camera system, information indicative of at least one characteristic identified in image data captured by the wearable camera system from an environment, transmit at least a portion of the information indicative of the at least one characteristic to a plurality of advertisers, receive, from the plurality of advertisers, bids for providing one or more advertisements to the wearable camera system, select an advertisement based on one of bids, and send the advertisement to a device associated with a user of the wearable camera system.

In accordance with yet another disclosed embodiment, a system for providing advertisements may include a memory storing executable instructions and at least one processing device programmed to execute the instructions. The at least one processing device may execute the instructions to receive, from a wearable camera system, image data captured by the wearable camera system from an environment, analyze the image data to identify at least one characteristic, transmit information indicative of the at least one characteristic to a plurality of advertisers, receive, from the plurality of advertisers, bids for providing one or more advertisements to the wearable camera system, select an advertisement based on one of bids, and send the advertisement to a device associated with a user of the wearable camera system.

In accordance with another disclosed embodiment, a software product stored on a non-transitory computer readable medium may comprise data and computer readable implementable instructions for carrying out executable steps. Executable steps may include receiving, from a wearable camera system, data related to at least one characteristic identified in image data captured by the wearable camera system from an environment, selecting, based on the at least one characteristic, an advertisement, and transmitting the advertisement to a device associated with a user of the wearable camera system.

In accordance with another disclosed embodiment, a software product stored on a non-transitory computer readable medium may comprise data and computer readable implementable instructions for carrying out executable steps. The steps may include receiving, from a wearable camera system, information indicative of at least one characteristic identified in image data captured by the wearable camera system from an environment, receiving, from the plurality of advertisers, bids for providing one or more advertisements to the wearable camera system based on at least a portion of the information indicative of the at least one characteristic, selecting an advertisement based on at least one of bids, and sending the advertisement to a device associated with a user of the wearable camera system.

In accordance with a disclosed embodiment, a system is provided for analyzing advertisement effectiveness using information provided by a wearable camera system. The system may comprise a memory storing executable instructions, and at least one processing device programmed to execute the instructions. The processor device may be configured to receive, from the wearable camera system, information derived from image data captured by the wearable camera system related to one or more occurrences of an advertisement in an environment of a user of the wearable camera system. Further, the processor device may be configured to receive, from the wearable camera system, information derived from the image data captured by the wearable camera system related to one or more activities of the user. Also, the processor device may be configured to identify, based on the information related to the one or more occurrences of the advertisement and the information related to the one or more activities of the user, a product acquired by the user that is associated with the advertisement.

In accordance with another disclosed embodiment, a system is provided for analyzing advertisement effectiveness. The system may comprise a memory storing executable instructions, and at least one processing device programmed to execute the instructions. The processor device may be configured to receive, from a plurality of wearable camera systems, information related to one or more occurrences of an advertisement in environments of users of the wearable camera systems. The processor device may be further configured to receive, from the plurality of wearable camera systems, information associated with image data captured by the wearable camera systems. Additionally, the processor device may be configured to analyze the information to identify one or more of the users of the plurality of wearable camera systems who purchased a product included in the advertisement. The processor device may be configured to determine, based on the analysis, an effectiveness of the advertisement.

In accordance with yet another disclosed embodiment, a system is provided for analyzing advertisement effectiveness. The system may comprise a memory storing executable instructions, and at least one processing device programmed to execute the instructions. The processor device may be configured to receive, from a plurality of wearable camera systems, information related to one or more occurrences of an advertisement in environments of users of the wearable camera systems. The processor device may be configured to receive, from the plurality of wearable camera systems, information related to purchases made by the users of the wearable camera systems. Additionally, the processor device may be further configured to determine, based on the information related to the one or more occurrences of the advertisement and the information related to the purchases made by the users of the wearable camera systems, statistics on the users who viewed the advertisement and purchased a product associated with the advertisement.

In accordance with still another disclosed embodiment, a system is provided for analyzing advertisement effectiveness. The system may comprise a memory storing executable instructions, and at least one processing device programmed to execute the instructions. The processor device may be configured to receive, from a plurality of wearable camera systems, information related to one or more occurrences of an advertisement in environments of users of the wearable camera systems. The processor device may be further configured to determine, based on the information related to the one or more occurrences of the advertisement, statistics on the users who viewed the advertisement.

In accordance with another disclosed embodiment, a system is provided for analyzing advertisement effectiveness. The system may comprise a memory storing executable instructions, and at least one processing device programmed to execute the instructions. The processor device may be configured to receive, from a plurality of wearable camera systems, information related to purchases made by the users of the wearable camera systems. Additionally, the processor device may be further configured to determine, based on the information related to the purchases made by the users of the wearable camera systems, statistics on the users who purchased a product.

In accordance with still another disclosed embodiment, a software product stored on a non-transitory computer readable medium is provided. The software product may comprise data and computer implementable instructions for carrying out a method. The method comprises receiving, from the wearable camera system, information derived from image data captured by the wearable camera system related to one or more occurrences of an advertisement in an environment of a user of the wearable camera system. Further, the method comprises receiving, from the wearable camera system, information derived from the image data captured by the wearable camera system related to one or more activities of the user. Also, the method comprises identifying, based on the information related to the one or more occurrences of the advertisement and the information related to the one or more activities of the user, a product acquired by the user that is associated with the advertisement.

In accordance with still another disclosed embodiment, a software product stored on a non-transitory computer readable medium is provided. The software product may comprise data and computer implementable instructions for carrying out a method. The method comprises receiving, from a plurality of wearable camera systems, information related to one or more occurrences of an advertisement in environments of users of the wearable camera systems. The method also comprises receiving, from the plurality of wearable camera systems, information associated with image data captured by the wearable camera systems, and analyzing the information to identify one or more of the users of the plurality of wearable camera systems who purchased a product included in the advertisement. The method further comprises determining, based on the analysis, an effectiveness of the advertisement.

In accordance with yet another disclosed embodiment, a software product stored on a non-transitory computer readable medium is provided. The software product may comprise data and computer implementable instructions for carrying out a method. The method comprises receiving, from a plurality of wearable camera systems, information related to one or more occurrences of an advertisement in environments of users of the wearable camera systems. The method further comprises receiving, from the plurality of wearable camera systems, information related to purchases made by the users of the wearable camera systems. Additionally, the method comprises determining, based on the information related to the one or more occurrences of the advertisement and the information related to the purchases made by the users of the wearable camera systems, statistics on the users who viewed the advertisement and purchased a product associated with the advertisement.

In accordance with another disclosed embodiment, a software product stored on a non-transitory computer readable medium is provided. The software product may comprise data and computer implementable instructions for carrying out a method. The method comprises receiving, from a plurality of wearable camera systems, information related to one or more occurrences of an advertisement in environments of users of the wearable camera systems. The method further comprises determining, based on the information related to the one or more occurrences of the advertisement, statistics on the users who viewed the advertisement.

In accordance with still another disclosed embodiment, a software product stored on a non-transitory computer readable medium is provided. The software product may comprise data and computer implementable instructions for carrying out a method. The method comprises receiving, from a plurality of wearable camera systems, information related to purchases made by the users of the wearable camera systems. Additionally, the method further comprises determining, based on the information related to the purchases made by the users of the wearable camera systems, statistics on the users who purchased a product.

In accordance with a disclosed embodiment, a wearable apparatus is provided for selectively disregarding triggers originating from persons other than a user of the wearable apparatus. The wearable apparatus comprises a wearable image sensor configured to capture image data from an environment of the user of the wearable apparatus. The wearable apparatus also includes at least one processing device programmed to receive the captured image data and identify in the image data a trigger. The trigger is associated with at least one action to be performed by the wearable apparatus. The processing device is also programmed to determine, based on the image data, whether the trigger identified in the image data is associated with a person other than the user of the wearable apparatus, and forgo performance of the at least one action if the trigger identified in the image data is determined to be associated with a person other than the user of the wearable apparatus.

In accordance with another disclosed embodiment, a wearable apparatus is provided for disregarding triggers of persons other than a user of the wearable apparatus. The wearable apparatus includes a wearable image sensor configured to capture image data from an environment of the user of the wearable apparatus. The wearable apparatus also includes at least one processing device programmed to receive the captured image data and identify in the image data a hand-related trigger. The hand-related trigger is associated with at least one action to be performed by the wearable apparatus. The processing device is also programmed to determine, based on the image data, whether the hand-related trigger identified in the image data is associated with at least a portion of a hand belonging to a person other than the user of the wearable apparatus, and forgo performance of the at least one action if the hand-related trigger identified in the image data is determined to be associated with at least a portion of a hand belonging to a person other than the user of the wearable apparatus.

In accordance with another disclosed embodiment, a method is provided for selectively disregarding triggers originating from persons other than a user of a wearable apparatus. The method includes capturing, via a wearable image sensor of the wearable apparatus, image data from an environment of the user of the wearable apparatus. The method includes identifying in the image data a trigger. The trigger is associated with at least one action to be performed by the wearable apparatus. The method further includes determining, based on the image data, whether the trigger identified in the image data is associated with a person other than the user of the wearable apparatus, and forgoing performance of the at least one action if the trigger identified in the image data is determined to be associated with a person other than the user of the wearable apparatus.

In accordance with a disclosed embodiment, a wearable apparatus for storing information related to objects identified in an environment of a user includes a wearable image sensor configured to capture a plurality of images from the environment of the user and at least one processing device. The processing device may be programmed to process the plurality of images to detect an object entering a receptacle, process at least one of the plurality of images that includes the object to determine at least a type of the object, and based on the type of the object, generate information related to an action to be taken related to the object.

In accordance with another embodiment, a method for storing information related to objects identified in an environment of a user of a wearable apparatus is provided. The method may include capturing a plurality of images from the environment of the user by a wearable image sensor, processing, via at least one processing device, the plurality of images to detect an object entering a receptacle, determining, via the at least one processing device, at least a type of the object from at least one of the plurality of images that includes the object, and generating, based on the type of the object, information related to an action to be taken related to the object.

In accordance with another embodiment, a non-transitory computer readable medium storing instructions executable by at least one processing device is provided. The instructions may include instructions for capturing a plurality of images from the environment of a user by a wearable image sensor, processing the plurality of images to detect an object entering a receptacle, determining at least a type of the object from at least one of the plurality of images that includes the object, and generating information related to an action to be taken related to the object.

Consistent with other disclosed embodiments, non-transitory computer-readable storage media may store program instructions, which are executed by at least one processor and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 40 shows an example database table for storing information associated with key images.

FIG. 70 is an example database table for storing information associated with at least one user of a wearable camera system.

FIG. 72 is an example database table for storing information associated with at least one captured image.

FIG. 80 shows an example database table for storing the information and the identifier related to the occurrence of the product descriptor.

DETAILED DESCRIPTION

Figure 1:
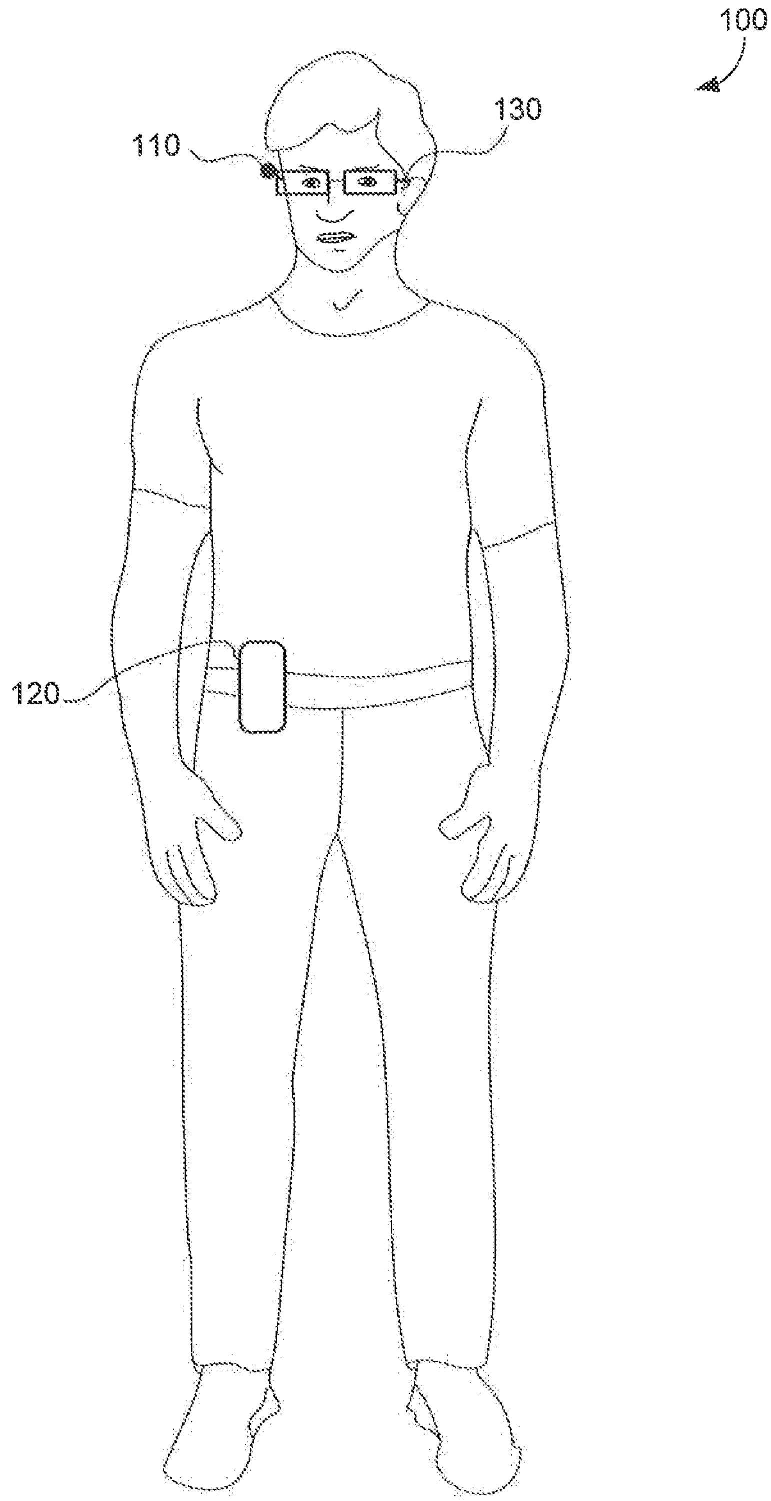
FIG. 1 is a schematic illustration of an example of a user wearing a wearable apparatus according to a disclosed embodiment.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

FIG. 1 illustrates a user 100 wearing an apparatus 110 that is physically connected (or integral) to glasses 130, consistent with the disclosed embodiments. Glasses 130 may be prescription glasses, magnifying glasses, non-prescription glasses, safety glasses, sunglasses, etc. Additionally, in some embodiments, glasses 130 may include parts of a frame and earpieces, nosepieces, etc., and one or more lenses. Thus, in some embodiments, glasses 130 may function primarily to support apparatus 110, and/or an augmented reality display device or other optical display device. In some embodiments, apparatus 110 may include an image sensor (not shown in FIG. 1) for capturing real-time image data of the field-of-view of user 100. The term "image data" includes any form of data retrieved from optical signals in the near-infrared, infrared, visible, and ultraviolet spectrums. The image data may include video clips and/or photographs.

In some embodiments, apparatus 110 may communicate wirelessly or via a wire with a computing device 120. In some embodiments, computing device 120 may include, for example, a smartphone, or a tablet, or a dedicated processing unit, which may be portable (e.g., can be carried in a pocket of user 100). Although shown in FIG. 1 as an external device, in some embodiments, computing device 120 may be provided as part of wearable apparatus 110 or glasses 130, whether integral thereto or mounted thereon. In some embodiments, computing device 120 may be included in an augmented reality display device or optical head mounted display provided integrally or mounted to glasses 130. In other embodiments, computing device 120 may be provided as part of another wearable or portable apparatus of user 100 including a wrist-strap, a multifunctional watch, a button, a clip-on, etc. And in other embodiments, computing device 120 may be provided as part of another system, such as an on-board automobile computing or navigation system. A person skilled in the art can appreciate that different types of computing devices and arrangements of devices may implement the functionality of the disclosed embodiments. Accordingly, in other implementations, computing device 120 may include a Personal Computer (PC), laptop, an Internet server, etc.

Figure 2:
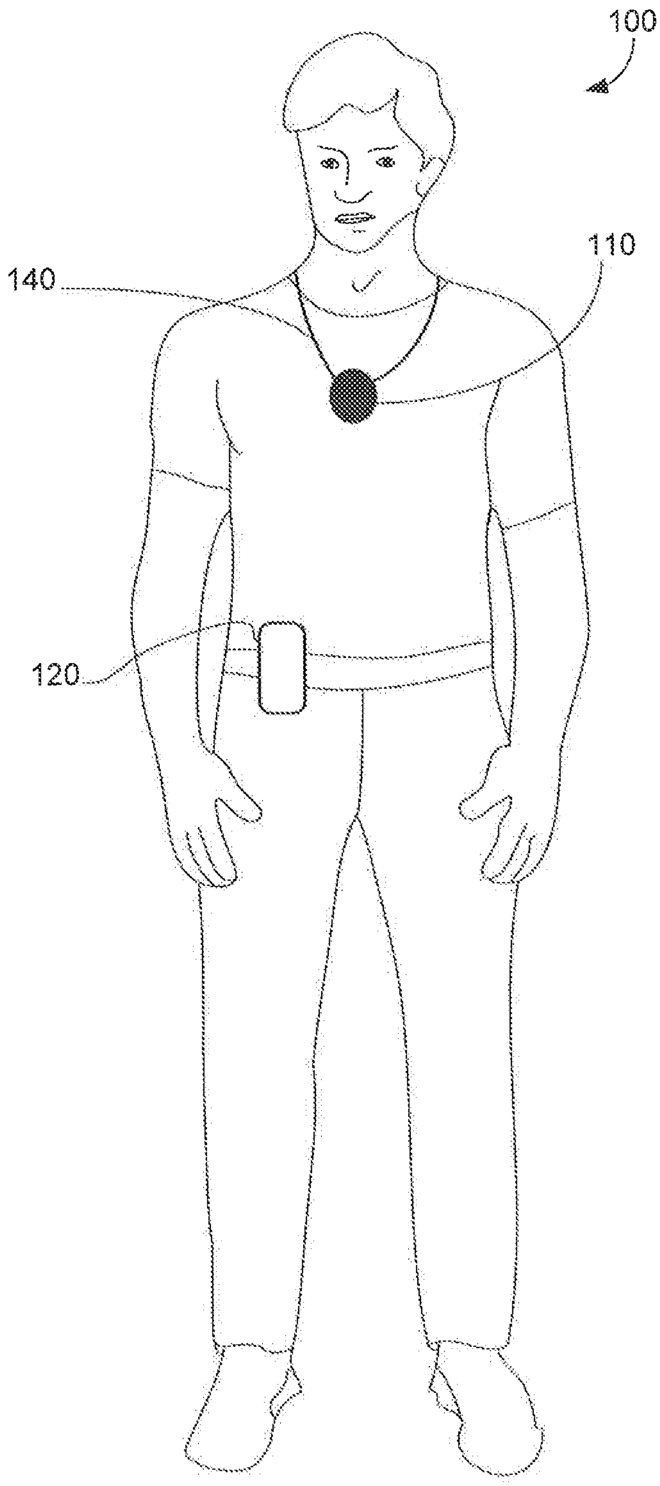
FIG. 2 is a schematic illustration of an example of the user wearing a wearable apparatus according to a disclosed embodiment.

FIG. 2 illustrates user 100 wearing apparatus 110 that is physically connected to a necklace 140, consistent with a disclosed embodiment. Such a configuration of apparatus 110 may be suitable for users that do not wear glasses some or all of the time. In this embodiment, user 100 can easily wear apparatus 110, and take it off.

Figure 3:
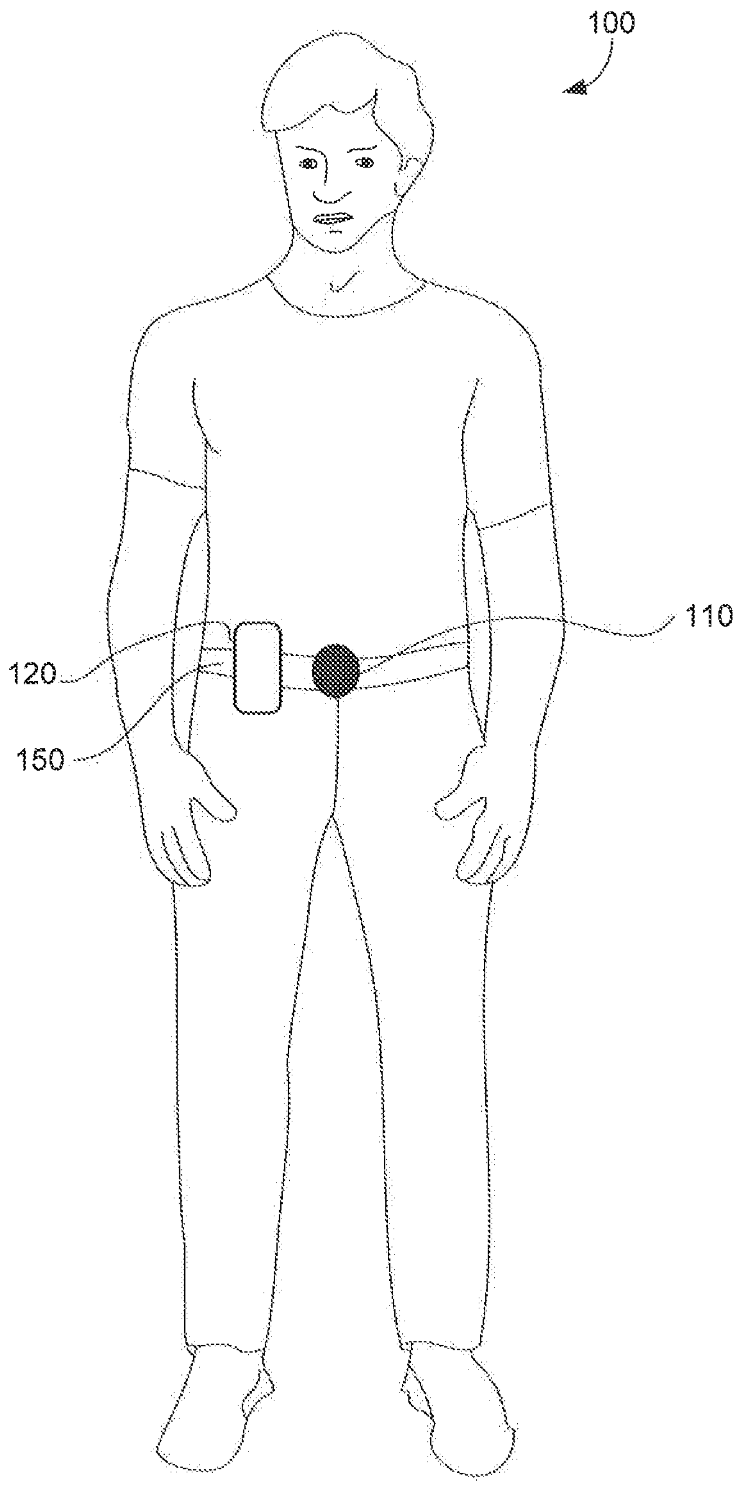
FIG. 3 is a schematic illustration of an example of the user wearing a wearable apparatus according to a disclosed embodiment.

FIG. 3 illustrates user 100 wearing apparatus 110 that is physically connected to a belt 150, consistent with a disclosed embodiment. Such a configuration of apparatus 110 may be designed as a belt buckle. Alternatively, apparatus 110 may include a clip for attaching to various clothing articles, such as belt 150, or a vest, a pocket, a collar, a cap or hat or other portion of a clothing article.

Figure 4:
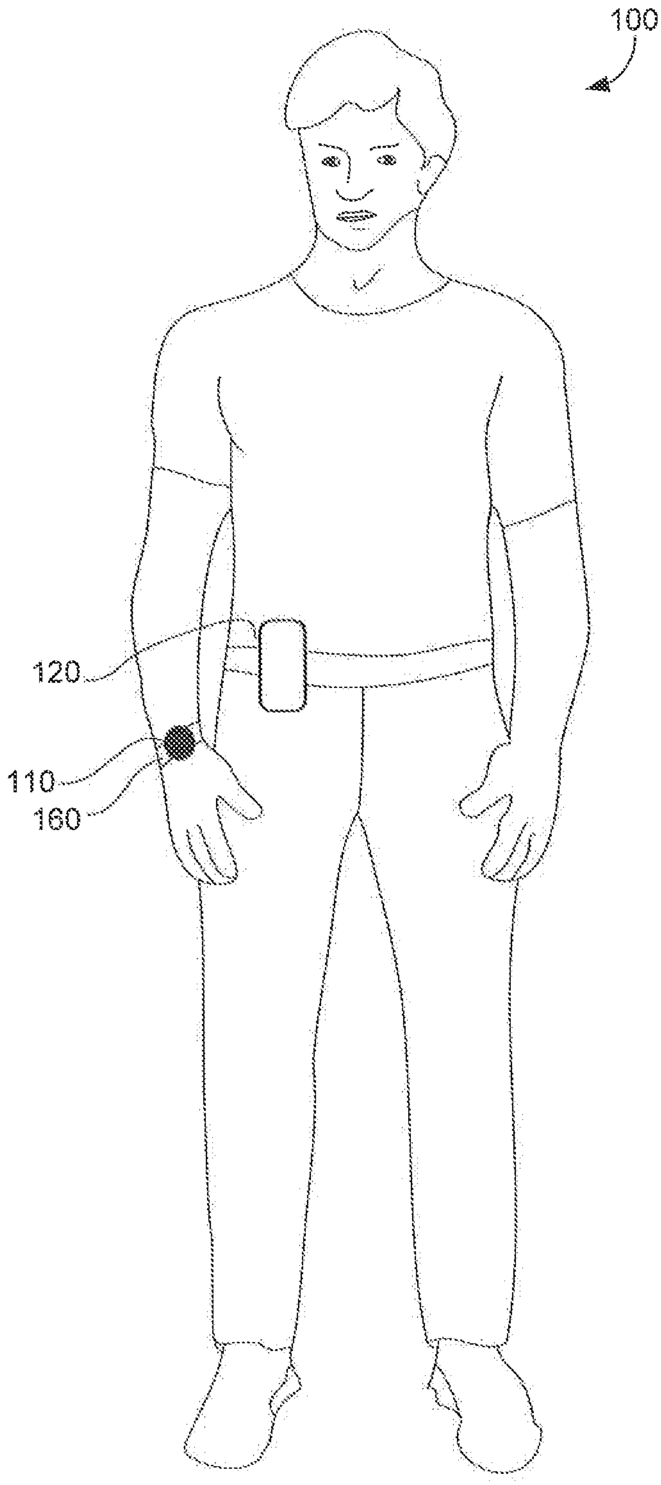
FIG. 4 is a schematic illustration of an example of the user wearing a wearable apparatus according to a disclosed embodiment.

FIG. 4 illustrates user 100 wearing apparatus 110 that is physically connected to a wrist strap 160, consistent with a disclosed embodiment. Although the aiming direction of apparatus 110, according to this embodiment, may not match the field-of-view of user 100, apparatus 110 may include the ability to identify a hand-related trigger based on the tracked eye movement of a user 100 indicating that user 100 is looking in the direction of the wrist strap 160. Wrist strap 160 may also include an accelerometer, a gyroscope, or other sensor for determining movement or orientation of a user's 100 hand for identifying a hand-related trigger.

Figure 5:
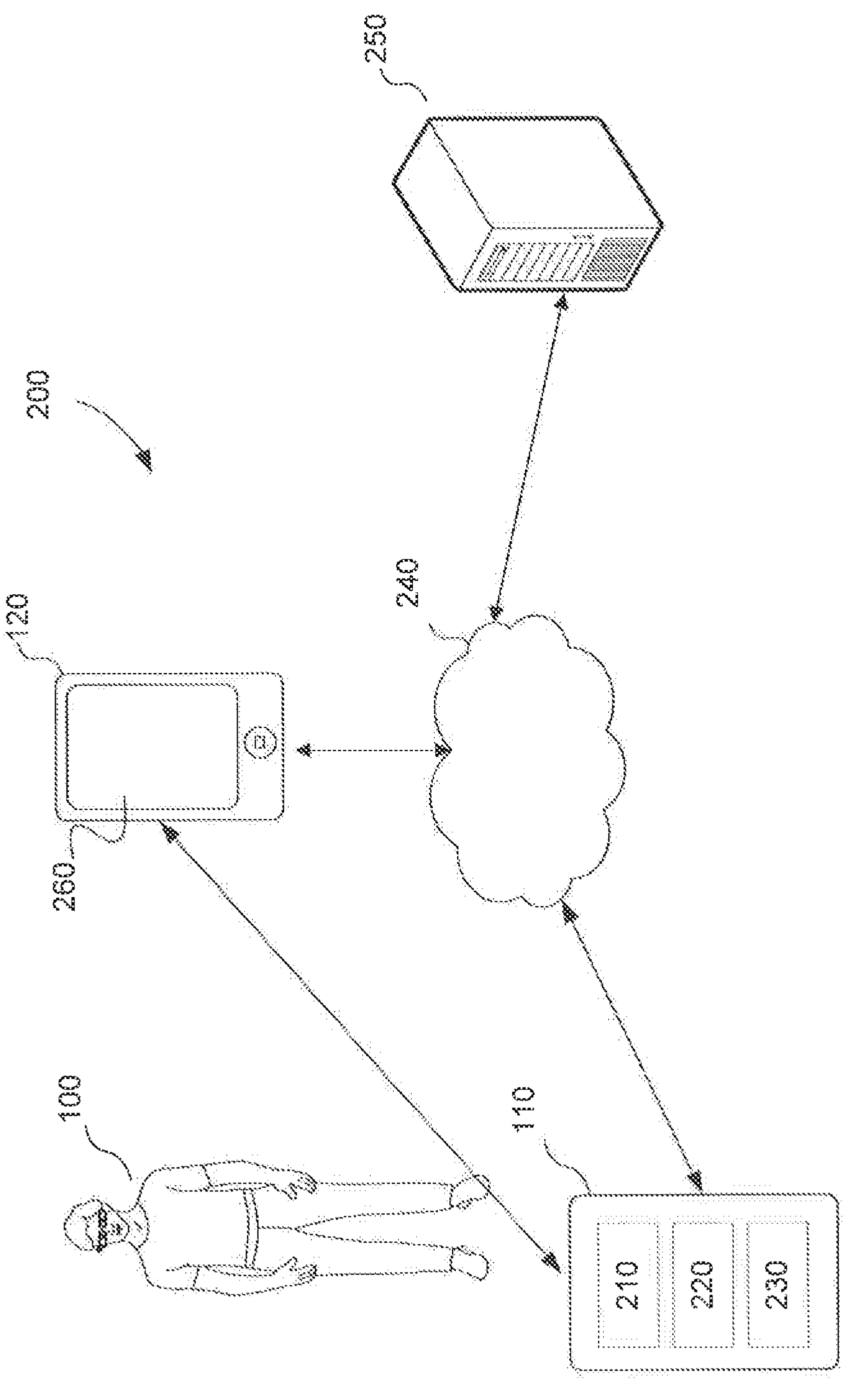
FIG. 5 is a schematic illustration of an example system consistent with the disclosed embodiments.

FIG. 5 is a schematic illustration of an exemplary system 200 including a wearable apparatus 110, worn by user 100, and an optional computing device 120 and/or a server 250 capable of communicating with apparatus 110 via a network 240, consistent with disclosed embodiments. In some embodiments, apparatus 110 may capture and analyze image data, identify a hand-related trigger present in the image data, and perform an action and/or provide feedback to a user 100, based at least in part on the identification of the hand-related trigger. In some embodiments, optional computing device 120 and/or server 250 may provide additional functionality to enhance interactions of user 100 with his or her environment, as described in greater detail below.

According to the disclosed embodiments, apparatus 110 may include an image sensor system 220 for capturing real-time image data of the field-of-view of user 100. In some embodiments, apparatus 110 may also include a processing unit 210 for controlling and performing the disclosed functionality of apparatus 110, such as to control the capture of image data, analyze the image data, and perform an action and/or output a feedback based on a hand-related trigger identified in the image data. According to the disclosed embodiments, a hand-related trigger may include a gesture performed by user 100 involving a portion of a hand of user 100. Further, consistent with some embodiments, a hand-related trigger may include a wrist-related trigger. Additionally, in some embodiments, apparatus 110 may include a feedback outputting unit 230 for producing an output of information to user 100.

As discussed above, apparatus 110 may include an image sensor 220 for capturing image data. The term "image sensor" refers to a device capable of detecting and converting optical signals in the near-infrared, infrared, visible, and ultraviolet spectrums into electrical signals. The electrical signals may be used to form an image or a video stream (i.e. image data) based on the detected signal. The term "image data" includes any form of data retrieved from optical signals in the near-infrared, infrared, visible, and ultraviolet spectrums. Examples of image sensors may include semiconductor charge-coupled devices (CCD), active pixel sensors in complementary metal-oxide-semiconductor (CMOS), or N-type metal-oxide-semiconductor (NMOS, Live MOS). In some cases, image sensor 220 may be part of a camera included in apparatus 110.

Apparatus 110 may also include a processor 210 for controlling image sensor 220 to capture image data and for analyzing the image data according to the disclosed embodiments. As discussed in further detail below with respect to FIG. 10, processor 210 may include a "processing device" for performing logic operations on one or more inputs of image data and other data according to stored or accessible software instructions providing desired functionality. In some embodiments, processor 210 may also control feedback outputting unit 230 to provide feedback to user 100 including information based on the analyzed image data and the stored software instructions. As the term is used herein, a "processing device" may access memory where executable instructions are stored or, in some embodiments, a "processing device" itself may include executable instructions (e.g., stored in memory included in the processing device).

In some embodiments, the information or feedback information provided to user 100 may include time information. The time information may include any information related to a current time of day and, as described further below, may be presented in any sensory perceptive manner. In some embodiments, time information may include a current time of day in a preconfigured format (e.g., 2:30 pm or 14:30). Time information may include the time in the user's current time zone (e.g., based on a determined location of user 100), as well as an indication of the time zone and/or a time of day in another desired location. In some embodiments, time information may include a number of hours or minutes relative to one or more predetermined times of day. For example, in some embodiments, time information may include an indication that three hours and fifteen minutes remain until a particular hour (e.g., until 6:00 pm), or some other predetermined time. Time information may also include a duration of time passed since the beginning of a particular activity, such as the start of a meeting or the start of a jog, or any other activity. In some embodiments, the activity may be determined based on analyzed image data. In other embodiments, time information may also include additional information related to a current time and one or more other routine, periodic, or scheduled events. For example, time information may include an indication of the number of minutes remaining until the next scheduled event, as may be determined from a calendar function or other information retrieved from computing device 120 or server 250, as discussed in further detail below.

Feedback outputting unit 230 may include one or more feedback systems for providing the output of information to user 100. In the disclosed embodiments, the audible or visual feedback may be provided via any type of connected audible or visual system or both. Feedback of information according to the disclosed embodiments may include audible feedback to user 100 (e.g., using a Bluetooth™ or other wired or wirelessly connected speaker, or a bone conduction headphone). Feedback outputting unit 230 of some embodiments may additionally or alternatively produce a visible output of information to user 100, for example, as part of an augmented reality display projected onto a lens of glasses 130 or provided via a separate heads up display in communication with apparatus 110, such as a display 260 provided as part of computing device 120, which may include an onboard automobile heads up display, an augmented reality device, a virtual reality device, a smartphone, PC, table, etc.

The term "computing device" refers to a device including a processing unit and having computing capabilities. Some examples of computing device 120 include a PC, laptop, tablet, or other computing systems such as an on-board computing system of an automobile, for example, each configured to communicate directly with apparatus 110 or server 250 over network 240. Another example of computing device 120 includes a smartphone having a display 260. In some embodiments, computing device 120 may be a computing system configured particularly for apparatus 110, and may be provided integral to apparatus 110 or tethered thereto. Apparatus 110 can also connect to computing device 120 over network 240 via any known wireless standard (e.g., Wi-Fi, Bluetooth®, etc.), as well as near-filed capacitive coupling, and other short range wireless techniques, or via a wired connection. In an embodiment in which computing device 120 is a smartphone, computing device 120 may have a dedicated application installed therein. For example, user 100 may view on display 260 data (e.g., images, video clips, extracted information, feedback information, etc.) that originate from or are triggered by apparatus 110. In addition, user 100 may select part of the data for storage in server 250.

Network 240 may be a shared, public, or private network, may encompass a wide area or local area, and may be implemented through any suitable combination of wired and/or wireless communication networks. Network 240 may further comprise an intranet or the Internet. In some embodiments, network 240 may include short range or near-field wireless communication systems for enabling communication between apparatus 110 and computing device 120 provided in close proximity to each other, such as on or near a user's person, for example. Apparatus 110 may establish a connection to network 240 autonomously, for example, using a wireless module (e.g., Wi-Fi, cellular). In some embodiments, apparatus 110 may use the wireless module when being connected to an external power source, to prolong battery life. Further, communication between apparatus 110 and server 250 may be accomplished through any suitable communication channels, such as, for example, a telephone network, an extranet, an intranet, the Internet, satellite communications, off-line communications, wireless communications, transponder communications, a local area network (LAN), a wide area network (WAN), and a virtual private network (VPN).

As shown in FIG. 5, apparatus 110 may transfer or receive data to/from server 250 via network 240. In the disclosed embodiments, the data being received from server 250 and/or computing device 120 may include numerous different types of information based on the analyzed image data, including information related to a commercial product, or a person's identity, an identified landmark, and any other information capable of being stored in or accessed by server 250. In some embodiments, data may be received and transferred via computing device 120. Server 250 and/or computing device 120 may retrieve information from different data sources (e.g., a user specific database or a user's social network account or other account, the Internet, and other managed or accessible databases) and provide information to apparatus 110 related to the analyzed image data and a recognized trigger according to the disclosed embodiments. In some embodiments, calendar-related information retrieved from the different data sources may be analyzed to provide certain time information or a time-based context for providing certain information based on the analyzed image data.

Figure 6:
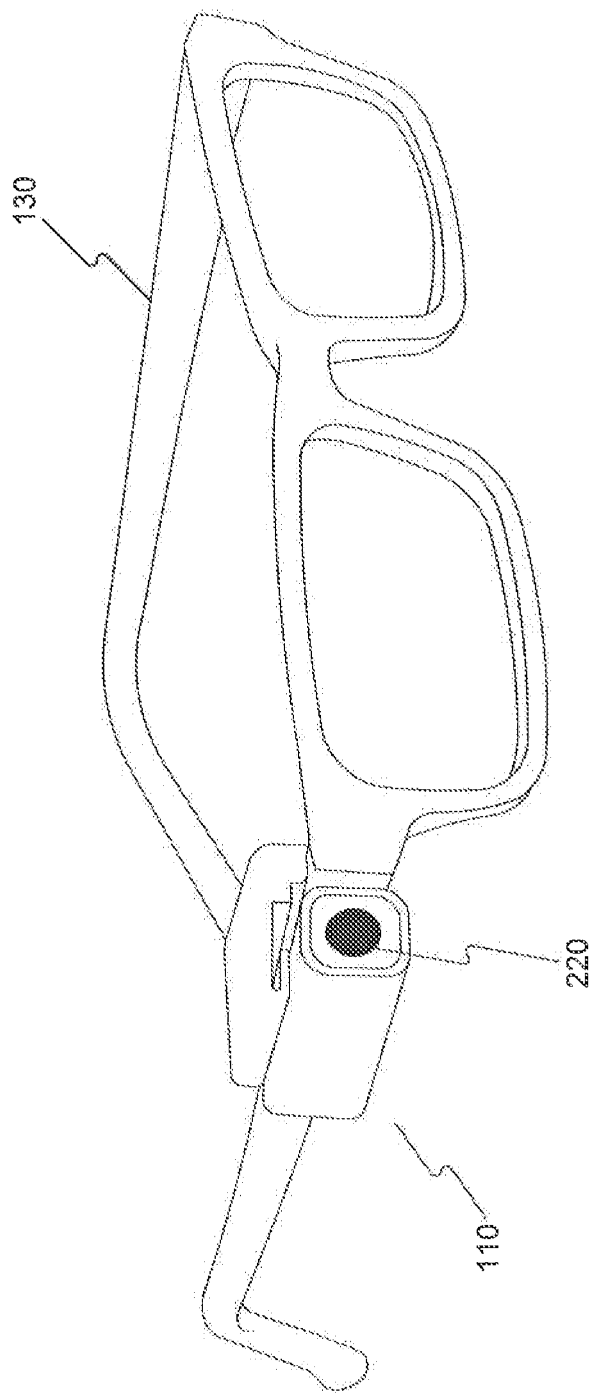
FIG. 6 is a schematic illustration of an example of the wearable apparatus shown in FIG. 1.

An example of wearable apparatus 110 incorporated with glasses 130 according to some embodiments (as discussed in connection with FIG. 1) is shown in greater detail in FIG. 6. In some embodiments, apparatus 110 may be associated with a structure (not shown in FIG. 6) that enables easy detaching and reattaching of apparatus 110 to glasses 130. In some embodiments, when apparatus 110 attaches to glasses 130, image sensor 220 acquires a set aiming direction without the need for directional calibration. The set aiming direction of image sensor 220 may substantially coincide with the field-of-view of user 100. For example, a camera associated with image sensor 220 may be installed within apparatus 110 in a predetermined angle in a position facing slightly downwards (e.g., 5-15 degrees from the horizon). Accordingly, the set aiming direction of image sensor 220 may substantially match the field-of-view of user 100.

Figure 7:
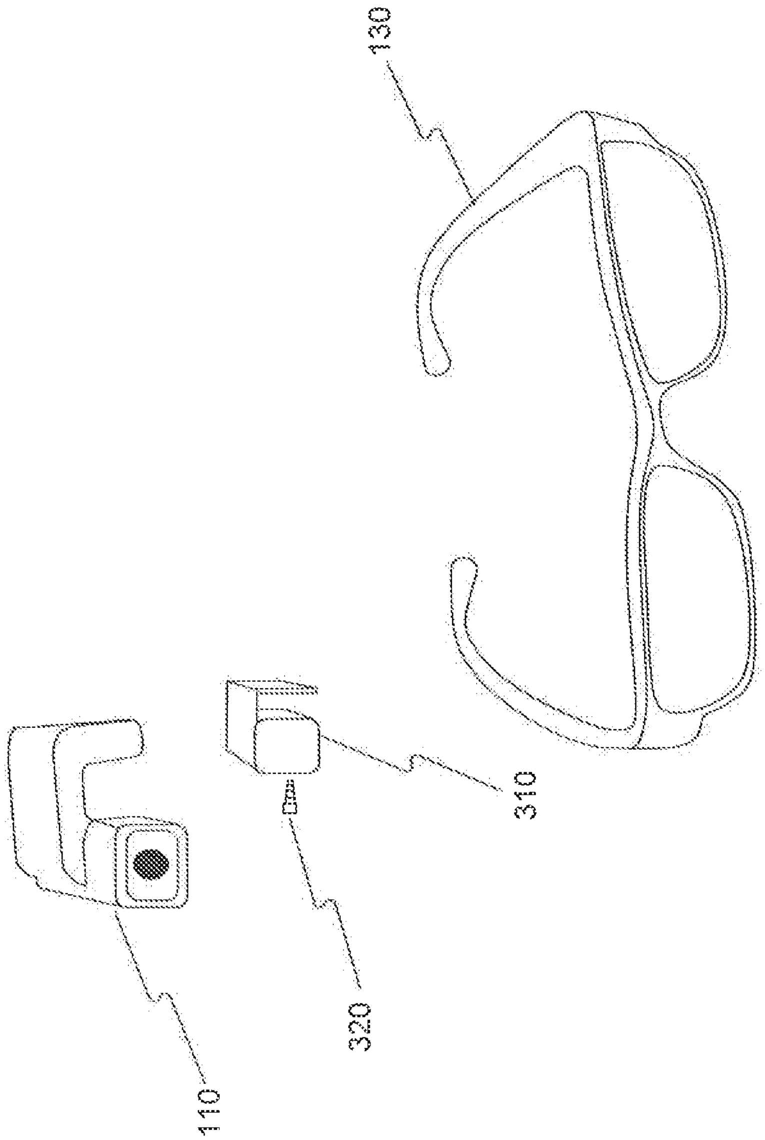
FIG. 7 is an exploded view of the example of the wearable apparatus shown in FIG. 6.

FIG. 7 is an exploded view of the components of the embodiment discussed regarding FIG. 6. Attaching apparatus 110 to glasses 130 may take place in the following way. Initially, a support 310 may be mounted on glasses 130 using a screw 320, in the side of support 310. Then, apparatus 110 may be clipped on support 310 such that it is aligned with the field-of-view of user 100. The term "support" includes any device or structure that enables detaching and reattaching of a device including a camera to a pair of glasses or to another object (e.g., a helmet). Support 310 may be made from plastic (e.g., polycarbonate), metal (e.g., aluminum), or a combination of plastic and metal (e.g., carbon fiber graphite). Support 310 may be mounted on any kind of glasses (e.g., eyeglasses, sunglasses, 3D glasses, safety glasses, etc.) using screws, bolts, snaps, or any fastening means used in the art.

In some embodiments, support 310 may include a quick release mechanism for disengaging and reengaging apparatus 110. For example, support 310 and apparatus 110 may include magnetic elements. As an alternative example, support 310 may include a male latch member and apparatus 110 may include a female receptacle. In other embodiments, support 310 can be an integral part of a pair of glasses, or sold separately and installed by an optometrist. For example, support 310 may be configured for mounting on the arms of glasses 130 near the frame front, but before the hinge. Alternatively, support 310 may be configured for mounting on the bridge of glasses 130.

In some embodiments, apparatus 110 may be provided as part of a glasses frame 130, with or without lenses. Additionally, in some embodiments, apparatus 110 may be configured to provide an augmented reality display projected onto a lens of glasses 130 (if provided), or alternatively, may include a display for projecting time information, for example, according to the disclosed embodiments. Apparatus 110 may include the additional display or alternatively, may be in communication with a separately provided display system that may or may not be attached to glasses 130.

Figure 8:
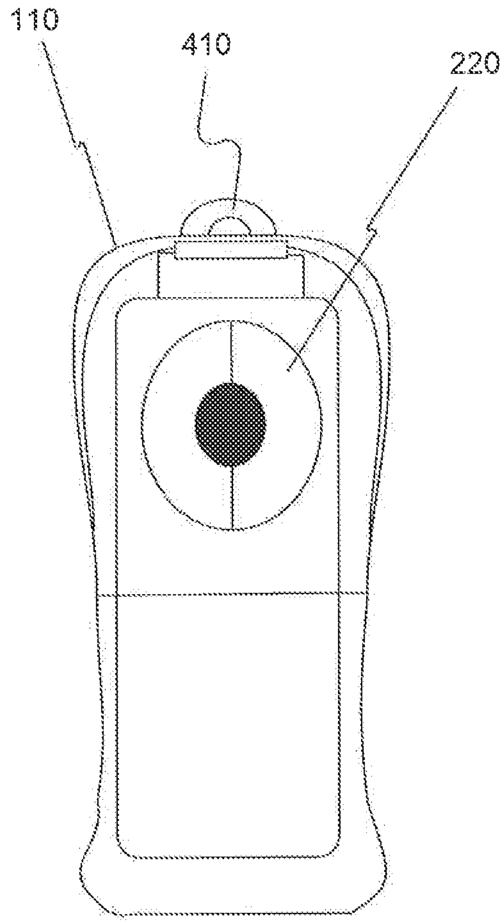
FIG. 8 is a schematic illustration of an example of the wearable apparatus shown in FIG. 2 from a first viewpoint.

In some embodiments, apparatus 110 may be implemented in a form other than wearable glasses, as described above with respect to FIGS. 2-4, for example. FIG. 8 is a schematic illustration of an example of an additional embodiment of apparatus 110 from a first viewpoint. The viewpoint shown in FIG. 8 is from the front of apparatus 110. Apparatus 110 includes an image sensor 220, a clip (not shown), a function button (not shown) and a hanging ring 410 for attaching apparatus 110 to, for example, necklace 140, as shown in FIG. 2. When apparatus 110 hangs on necklace 140, the aiming direction of image sensor 220 may not fully coincide with the field-of-view of user 100, but the aiming direction would still correlate with the field-of-view of user 100.

Figure 9:
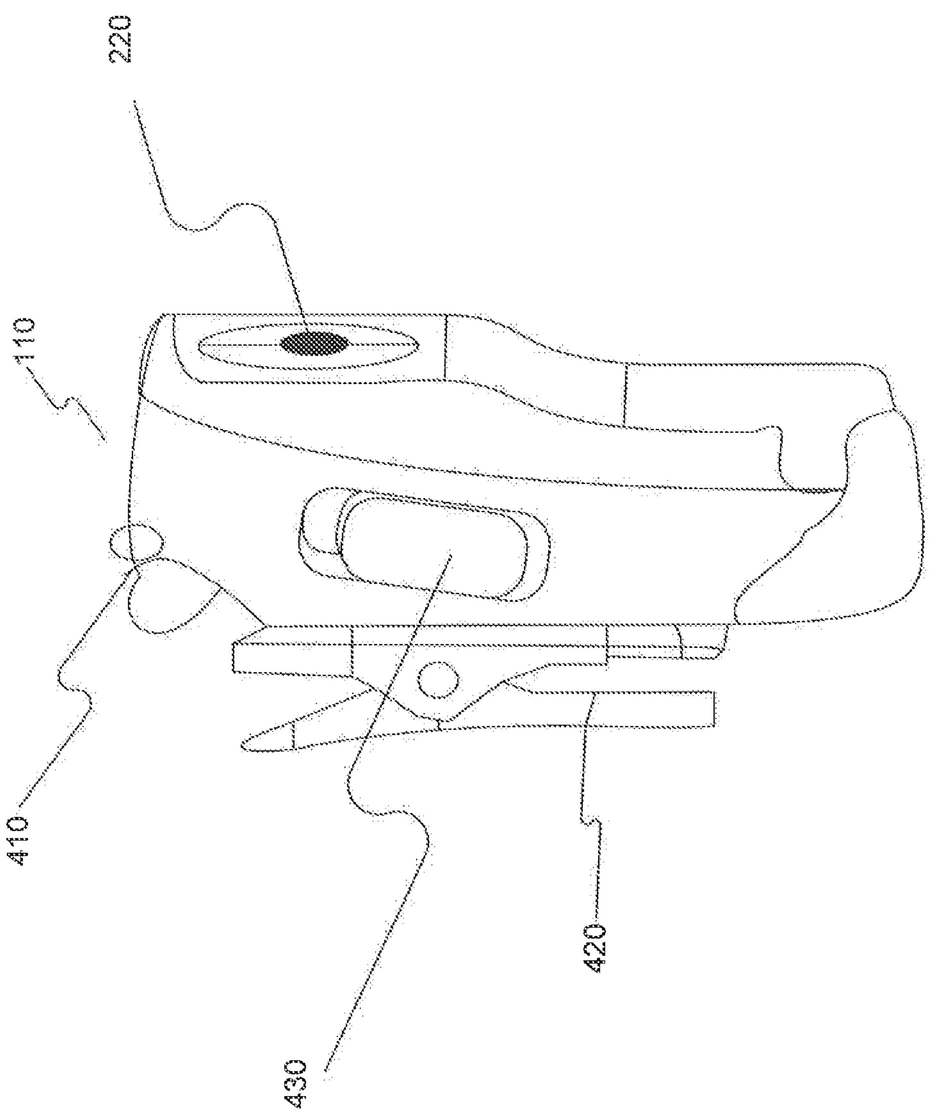
FIG. 9 is a schematic illustration of the example of the wearable apparatus shown in FIG. 2 from a second viewpoint.

FIG. 9 is a schematic illustration of the example of a second embodiment of apparatus 110, from a second viewpoint. The viewpoint shown in FIG. 9 is from a side orientation of apparatus 110. In addition to hanging ring 410, as shown in FIG. 9, apparatus 110 may further include a clip 420. User 100 can use clip 420 to attach apparatus 110 to a shirt or belt 150, as illustrated in FIG. 3. Clip 420 may provide an easy mechanism for disengaging and reengaging apparatus 110 from different articles of clothing. In other embodiments, apparatus 110 may include a female receptacle for connecting with a male latch of a car mount or universal stand.

In some embodiments, apparatus 110 includes a function button 430 for enabling user 100 to provide input to apparatus 110. Function button 430 may accept different types of tactile input (e.g., a tap, a click, a double-click, a long press, a right-to-left slide, a left-to-right slide). In some embodiments, each type of input may be associated with a different action. For example, a tap may be associated with the function of taking a picture, while a right-to-left slide may be associated with the function of recording a video.

The example embodiments discussed above with respect to FIGS. 6, 7, 8, and 9 are not limiting. In some embodiments, apparatus 110 may be implemented in any suitable configuration for performing the disclosed methods. For example, referring back to FIG. 5, the disclosed embodiments may implement an apparatus 110 according to any configuration including an image sensor 220 and a processor unit 210 to perform image analysis and for communicating with a feedback unit 230.

Figure 10:
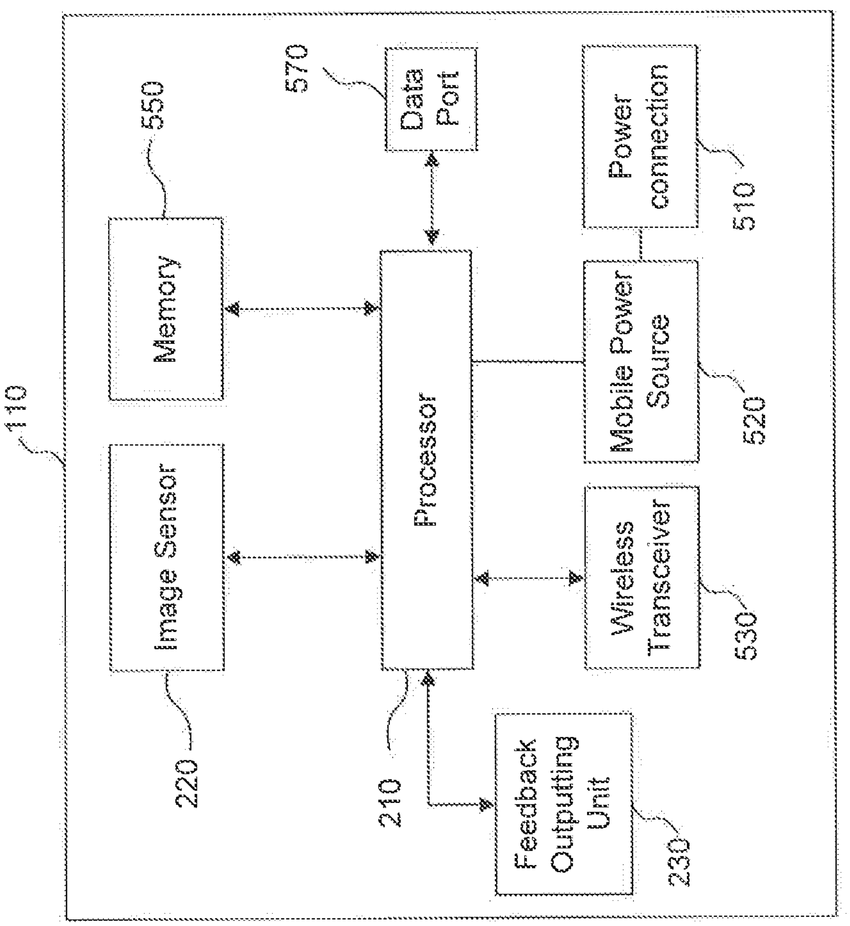
FIG. 10 is a block diagram illustrating an example of the components of a wearable apparatus according to a first embodiment.

FIG. 10 is a block diagram illustrating the components of apparatus 110 according to an example embodiment. As shown in FIG. 10, and as similarly discussed above, apparatus 110 includes an image sensor 220, a memory 550, a processor 210, a feedback outputting unit 230, a wireless transceiver 530, and a mobile power source 520. In other embodiments, apparatus 110 may also include buttons, other sensors such as a microphone, and inertial measurements devices such as accelerometers, gyroscopes, magnetometers, temperature sensors, color sensors, light sensors, etc. Apparatus 110 may further include a data port 570 and a power connection 510 with suitable interfaces for connecting with an external power source or an external device (not shown).

Processor 210, depicted in FIG. 10, may include any suitable processing device. The term "processing device" includes any physical device having an electric circuit that performs a logic operation on input or inputs. For example, processing device may include one or more integrated circuits, microchips, microcontrollers, microprocessors, all or part of a central processing unit (CPU), graphics processing unit (GPU), digital signal processor (DSP), field-programmable gate array (FPGA), or other circuits suitable for executing instructions or performing logic operations. The instructions executed by the processing device may, for example, be pre-loaded into a memory integrated with or embedded into the processing device or may be stored in a separate memory (e.g., memory 550). Memory 550 may comprise a Random Access Memory (RAM), a Read-Only Memory (ROM), a hard disk, an optical disk, a magnetic medium, a flash memory, other permanent, fixed, or volatile memory, or any other mechanism capable of storing instructions.

Although, in the embodiment illustrated in FIG. 10, apparatus 110 includes one processing device (e.g., processor 210), apparatus 110 may include more than one processing device. Each processing device may have a similar construction, or the processing devices may be of differing constructions that are electrically connected or disconnected from each other. For example, the processing devices may be separate circuits or integrated in a single circuit. When more than one processing device is used, the processing devices may be configured to operate independently or collaboratively. The processing devices may be coupled electrically, magnetically, optically, acoustically, mechanically or by other means that permit them to interact.

In some embodiments, processor 210 may process a plurality of images captured from the environment of user 100 to determine different parameters related to capturing subsequent images. For example, processor 210 can determine, based on information derived from captured image data, a value for at least one of the following: an image resolution, a compression ratio, a cropping parameter, frame rate, a focus point, an exposure time, an aperture size, and a light sensitivity. The determined value may be used in capturing at least one subsequent image. Additionally, processor 210 can detect images including at least one hand-related trigger in the environment of the user and perform an action and/or provide an output of information to a user via feedback outputting unit 230.

In another embodiment, processor 210 can change the aiming direction of image sensor 220. For example, when apparatus 110 is attached with clip 420, the aiming direction of image sensor 220 may not coincide with the field-of-view of user 100. Processor 210 may recognize certain situations from the analyzed image data and adjust the aiming direction of image sensor 220 to capture relevant image data. For example, in one embodiment, processor 210 may detect an interaction with another individual and sense that the individual is not fully in view, because image sensor 220 is tilted down. Responsive thereto, processor 210 may adjust the aiming direction of image sensor 220 to capture image data of the individual. Other scenarios are also contemplated where processor 210 may recognize the need to adjust an aiming direction of image sensor 220.

In some embodiments, processor 210 may communicate data to feedback-outputting unit 230, which may include any device configured to provide information to a user 100. Feedback outputting unit 230 may be provided as part of apparatus 110 (as shown) or may be provided external to apparatus 110 and communicatively coupled thereto. Feedback-outputting unit 230 may be configured to output visual or nonvisual feedback based on signals received from processor 210, such as when processor 210 recognizes a hand-related trigger in the analyzed image data.

The term “feedback” refers to any output or information provided in response to processing at least one image in an environment. In some embodiments, as similarly described above, feedback may include an audible or visible indication of time information, detected text or numerals, the value of currency, a branded product, a person’s identity, the identity of a landmark or other environmental situation or condition including the street names at an intersection or the color of a traffic light, etc., as well as other information associated with each of these. For example, in some embodiments, feedback may include additional information regarding the amount of currency still needed to complete a transaction, information regarding the identified person, historical information or times and prices of admission etc. of a detected landmark etc. In some embodiments, feedback may include an audible tone, a tactile response, and/or information previously recorded by user 100. Feedback-outputting unit 230 may comprise appropriate components for outputting acoustical and tactile feedback. For example, feedback-outputting unit 230 may comprise audio headphones, a hearing aid type device, a speaker, a bone conduction headphone, interfaces that provide tactile cues, vibrotactile stimulators, etc. In some embodiments, processor 210 may communicate signals with an external feedback outputting unit 230 via a wireless transceiver 530, a wired connection, or some other communication interface. In some embodiments, feedback outputting unit 230 may also include any suitable display device for visually displaying information to user 100.

As shown in FIG. 10, apparatus 110 includes memory 550. Memory 550 may include one or more sets of instructions accessible to processor 210 to perform the disclosed methods, including instructions for recognizing a hand-related trigger in the image data. In some embodiments memory 550 may store image data (e.g., images, videos) captured from the environment of user 100. In addition, memory 550 may store information specific to user 100, such as image representations of known individuals, favorite products, personal items, and calendar or appointment information, etc. In some embodiments, processor 210 may determine, for example, which type of image data to store based on available storage space in memory 550. In another embodiment, processor 210 may extract information from the image data stored in memory 550.

As further shown in FIG. 10, apparatus 110 includes mobile power source 520. The term “mobile power source” includes any device capable of providing electrical power, which can be easily carried by hand (e.g., mobile power source 520 may weigh less than a pound). The mobility of the power source enables user 100 to use apparatus 110 in a variety of situations. In some embodiments, mobile power source 520 may include one or more batteries (e.g., nickel-cadmium batteries, nickel-metal hydride batteries, and lithium-ion batteries) or any other type of electrical power supply. In other embodiments, mobile power source 520 may be rechargeable and contained within a casing that holds apparatus 110. In yet other embodiments, mobile power source 520 may include one or more energy harvesting devices for converting ambient energy into electrical energy (e.g., portable solar power units, human vibration units, etc.).

Mobile power source 510 may power one or more wireless transceivers (e.g., wireless transceiver 530 in FIG. 10). The term “wireless transceiver” refers to any device configured to exchange transmissions over an air interface by use of radio frequency, infrared frequency, magnetic field, or electric field. Wireless transceiver 530 may use any known standard to transmit and/or receive data (e.g., Wi-Fi, Bluetooth®, Bluetooth Smart, 802.15.4, or ZigBee). In some embodiments, wireless transceiver 530 may transmit data (e.g., raw image data, processed image data, extracted information) from apparatus 110 to computing device 120 and/or server 250. Wireless transceiver 530 may also receive data from computing device 120 and/or server 205. In other embodiments, wireless transceiver 530 may transmit data and instructions to an external feedback outputting unit 230.

Figure 11:
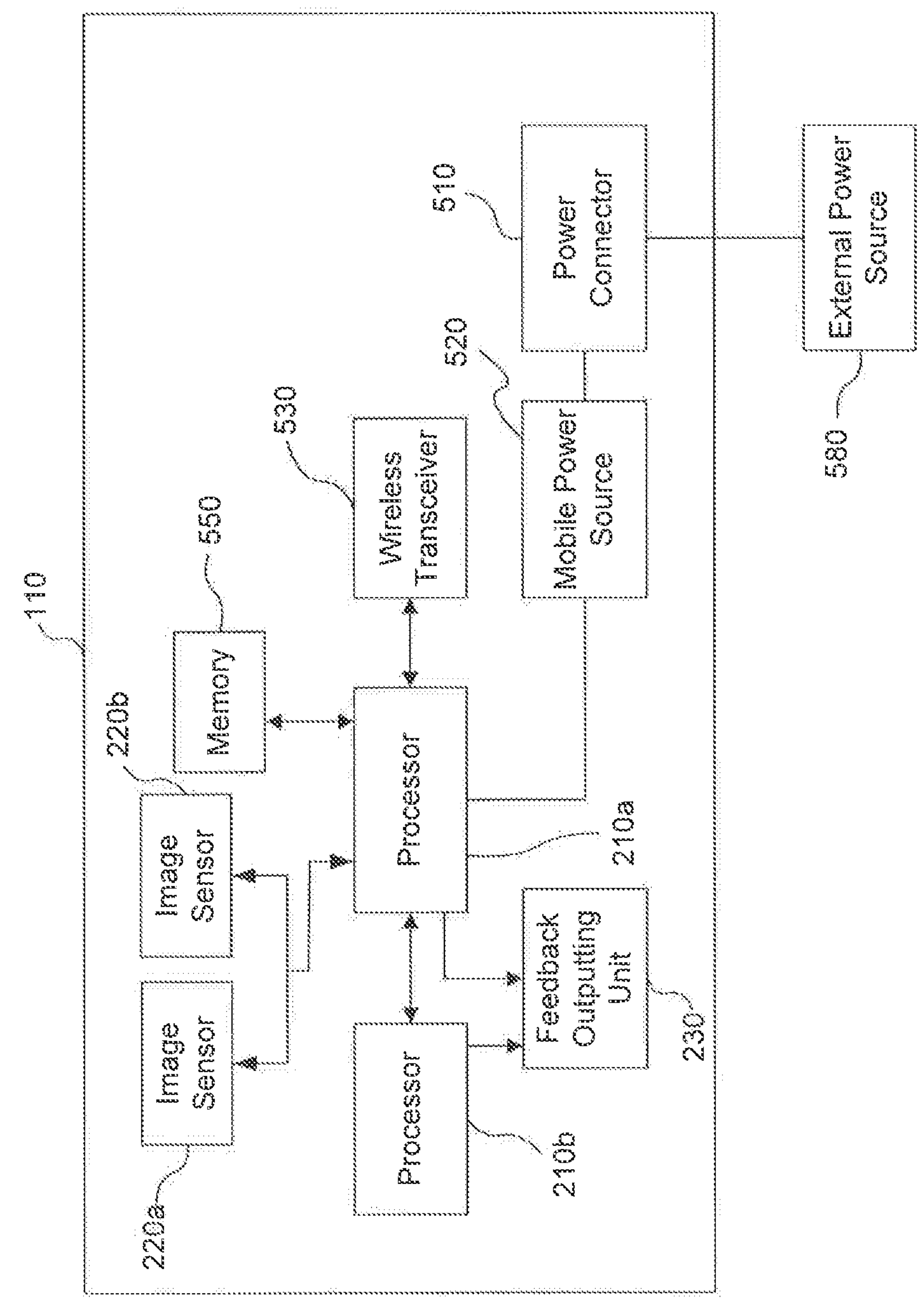
FIG. 11 is a block diagram illustrating an example of the components of a wearable apparatus according to a second embodiment.

FIG. 11 is a block diagram illustrating the components of apparatus 110 according to another example embodiment. In some embodiments, apparatus 110 includes a first image sensor **220*a*, a second image sensor 220*b*, a memory 550, a first processor 210*a*, a second processor 210*b*, a feedback outputting unit 230, a wireless transceiver 530, a mobile power source 520, and a power connector 510. In the arrangement shown in FIG. 11, each of the image sensors may provide images in a different image resolution, or face a different direction. Alternatively, each image sensor may be associated with a different camera (e.g., a wide angle camera, a narrow angle camera, an IR camera, etc.). In some embodiments, apparatus 110 can select which image sensor to use based on various factors. For example, processor 210*a* may determine, based on available storage space in memory 550**, to capture subsequent images in a certain resolution.

Apparatus 110 may operate in a first processing-mode and in a second processing-mode, such that the first processing-mode may consume less power than the second processing-mode. For example, in the first processing-mode, apparatus 110 may capture images and process the captured images to make real-time decisions based on an identifying hand-related trigger, for example. In the second processing-mode, apparatus 110 may extract information from stored images in memory 550 and delete images from memory 550. In some embodiments, mobile power source 520 may provide more than fifteen hours of processing in the first processing-mode and about three hours of processing in the second processing-mode. Accordingly, different processing-modes may allow mobile power source 520 to produce sufficient power for powering apparatus 110 for various time periods (e.g., more than two hours, more than four hours, more than ten hours, etc.).

In some embodiments, apparatus 110 may use first processor **210*a* in the first processing-mode when powered by mobile power source 520, and second processor 210*b* in the second processing-mode when powered by external power source 580 that is connectable via power connector 510. In other embodiments, apparatus 110 may determine, based on predefined conditions, which processors or which processing modes to use. Apparatus 110 may operate in the second processing-mode even when apparatus 110 is not powered by external power source 580. For example, apparatus 110 may determine that it should operate in the second processing-mode when apparatus 110 is not powered by external power source 580, if the available storage space in memory 550** for storing new image data is lower than a predefined threshold.

Although one wireless transceiver is depicted in FIG. 11, apparatus 110 may include more than one wireless transceiver (e.g., two wireless transceivers). In an arrangement with more than one wireless transceiver, each of the wireless transceivers may use a different standard to transmit and/or receive data. In some embodiments, a first wireless transceiver may communicate with server 250 or computing device 120 using a cellular standard (e.g., LTE or GSM), and a second wireless transceiver may communicate with server 250 or computing device 120 using a short-range standard (e.g., Wi-Fi or Bluetooth®). In some embodiments, apparatus 110 may use the first wireless transceiver when the wearable apparatus is powered by a mobile power source included in the wearable apparatus, and use the second wireless transceiver when the wearable apparatus is powered by an external power source.

Figure 12:
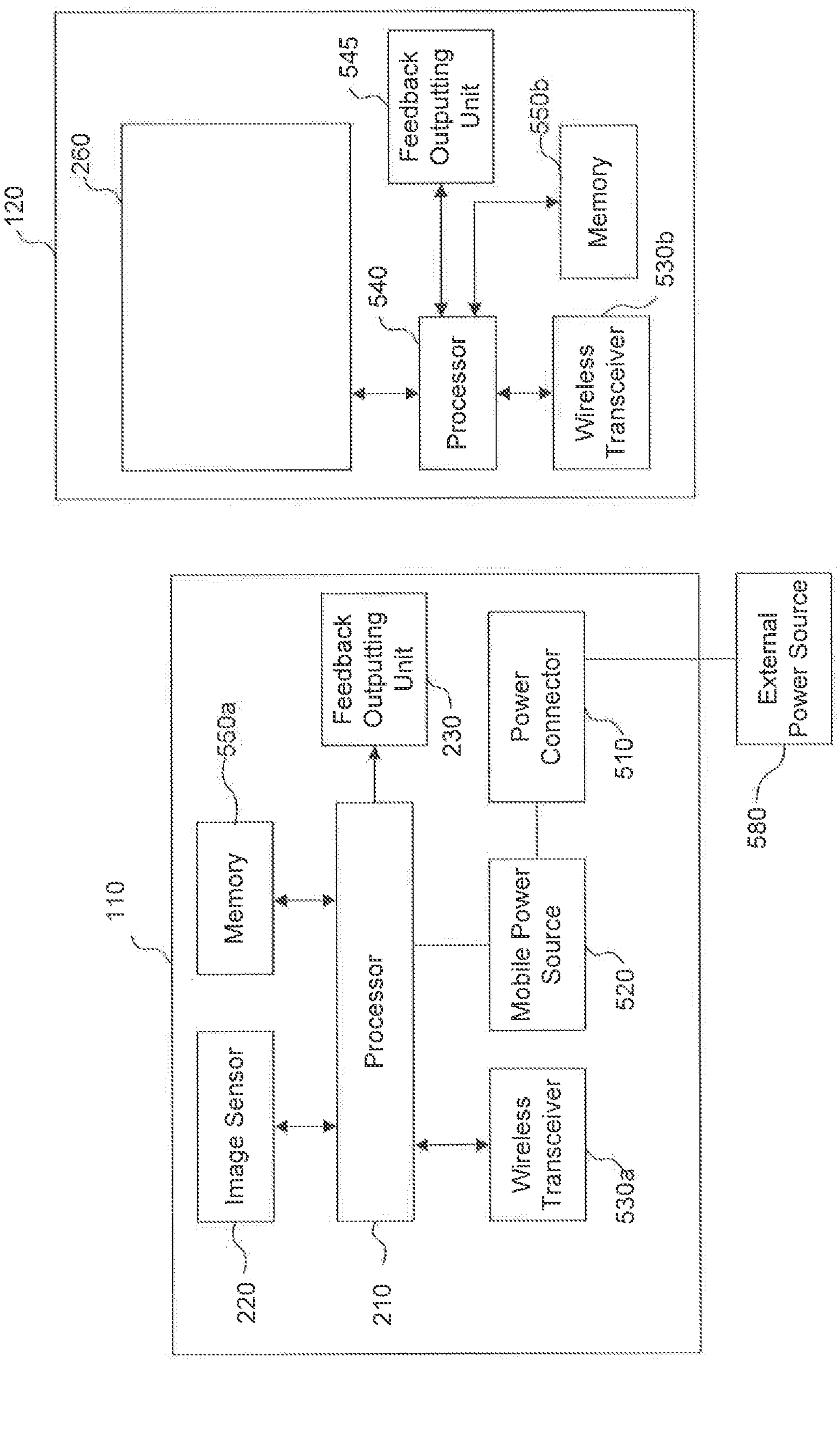
FIG. 12 is a block diagram illustrating an example of the components of a wearable apparatus according to a third embodiment.

FIG. 12 is a block diagram illustrating the components of apparatus 110 according to another example embodiment including computing device 120. In this embodiment, apparatus 110 includes an image sensor 220, a memory 550*a*, a first processor 210, a feedback-outputting unit 230, a wireless transceiver 530*a*, a mobile power source 520, and a power connector 510. As further shown in FIG. 12, computing device 120 includes a processor 540, a feedback-outputting unit 545, a memory 550*b*, a wireless transceiver 530*b*, and a display 260. One example of computing device 120 is a smartphone or tablet having a dedicated application installed therein. In other embodiments, computing device 120 may include any configuration such as an on-board automobile computing system, a PC, a laptop, and any other system consistent with the disclosed embodiments. In this example, user 100 may view feedback output in response to identification of a hand-related trigger on display 260. Additionally, user 100 may view other data (e.g., images, video clips, object information, schedule information, extracted information, etc.) on display 260. In addition, user 100 may communicate with server 250 via computing device 120.

In some embodiments, processor 210 and processor 540 are configured to extract information from captured image data. The term "extracting information" includes any process by which information associated with objects, individuals, locations, events, etc., is identified in the captured image data by any means known to those of ordinary skill in the art. In some embodiments, apparatus 110 may use the extracted information to send feedback or other real-time indications to feedback outputting unit 230 or to computing device 120. In some embodiments, processor 210 may identify in the image data the individual standing in front of user 100, and send computing device 120 the name of the individual and the last time user 100 met the individual. In another embodiment, processor 210 may identify in the image data, one or more visible triggers, including a hand-related trigger, and determine whether the trigger is associated with a person other than the user of the wearable apparatus to selectively determine whether to perform an action associated with the trigger. One such action may be to provide a feedback to user 100 via feedback-outputting unit 230 provided as part of (or in communication with) apparatus 110 or via a feedback unit 545 provided as part of computing device 120. For example, feedback-outputting unit 545 may be in communication with display 260 to cause the display 260 to visibly output information. In some embodiments, processor 210 may identify in the image data a hand-related trigger and send computing device 120 an indication of the trigger. Processor 540 may then process the received trigger information and provide an output via feedback outputting unit 545 or display 260 based on the hand-related trigger. In other embodiments, processor 540 may determine a hand-related trigger and provide suitable feedback similar to the above, based on image data received from apparatus 110. In some embodiments, processor 540 may provide instructions or other information, such as environmental information to apparatus 110 based on an identified hand-related trigger.

In some embodiments, processor 210 may identify other environmental information in the analyzed images, such as an individual standing in front user 100, and send computing device 120 information related to the analyzed information such as the name of the individual and the last time user 100 met the individual. In a different embodiment, processor 540 may extract statistical information from captured image data and forward the statistical information to server 250. For example, certain information regarding the types of items a user purchases, or the frequency a user patronizes a particular merchant, etc. may be determined by processor 540. Based on this information, server 250 may send computing device 120 coupons and discounts associated with the user's preferences.

When apparatus 110 is connected or wirelessly connected to computing device 120, apparatus 110 may transmit at least part of the image data stored in memory 550*a* for storage in memory 550*b*. In some embodiments, after computing device 120 confirms that transferring the part of image data was successful, processor 540 may delete the part of the image data. The term "delete" means that the image is marked as 'deleted' and other image data may be stored instead of it, but does not necessarily mean that the image data was physically removed from the memory.

As will be appreciated by a person skilled in the art having the benefit of this disclosure, numerous variations and/or modifications may be made to the disclosed embodiments. Not all components are essential for the operation of apparatus 110. Any component may be located in any appropriate apparatus and the components may be rearranged into a variety of configurations while providing the functionality of the disclosed embodiments. Therefore, the foregoing configurations are examples and, regardless of the configurations discussed above, apparatus 110 can capture, store, and process images.

Further, the foregoing and following description refers to storing and/or processing images or image data. In the embodiments disclosed herein, the stored and/or processed images or image data may comprise a representation of one or more images captured by image sensor 220. As the term is used herein, a "representation" of an image (or image data) may include an entire image or a portion of an image. A representation of an image (or image data) may have the same resolution or a lower resolution as the image (or image data), and/or a representation of an image (or image data) may be altered in some respect (e.g., be compressed, have a lower resolution, have one or more colors that are altered, etc.).

For example, apparatus 110 may capture an image and store a representation of the image that is compressed as a .JPG file. As another example, apparatus 110 may capture an image in color, but store a black-and-white representation of the color image. As yet another example, apparatus 110 may capture an image and store a different representation of the image (e.g., a portion of the image). For example, apparatus 110 may store a portion of an image that includes a face of a person who appears in the image, but that does not substantially include the environment surrounding the person. Similarly, apparatus 110 may, for example, store a portion of an image that includes a product that appears in the image, but does not substantially include the environment surrounding the product. As yet another example, apparatus 110 may store a representation of an image at a reduced resolution (i.e., at a resolution that is of a lower value than that of the captured image). Storing representations of images may allow apparatus 110 to save storage space in memory 550. Furthermore, processing representations of images may allow apparatus 110 to improve processing efficiency and/or help to preserve battery life.

In addition to the above, in some embodiments, any one of apparatus 110 or computing device 120, via processor 210 or 540, may further process the captured image data to provide additional functionality to recognize objects and/or gestures and/or other information in the captured image data. In some embodiments, actions may be taken based on the identified objects, gestures, or other information. In some embodiments, processor 210 or 540 may identify in the image data, one or more visible triggers, including a hand-related trigger, and determine whether the trigger is associated with a person other than the user to determine whether to perform an action associated with the trigger.

Some embodiments of the present disclosure may include an apparatus securable to an article of clothing of a user. Such an apparatus may include two portions, connectable by a connector. A capturing unit may be designed to be worn on the outside of a user's clothing, and may include an image sensor for capturing images of a user's environment. The capturing unit may be connected to or connectable to a power unit, which may be configured to house a power source and a processing device. The capturing unit may be a small device including a camera or other device for capturing images. The capturing unit may be designed to be inconspicuous and unobtrusive, and may be configured to communicate with a power unit concealed by a user's clothing. The power unit may include bulkier aspects of the system, such as transceiver antennas, at least one battery, a processing device, etc. In some embodiments, communication between the capturing unit and the power unit may be provided by a data cable included in the connector, while in other embodiments, communication may be wirelessly achieved between the capturing unit and the power unit. Some embodiments may permit alteration of the orientation of an image sensor of the capture unit, for example to better capture images of interest.

Figure 13:
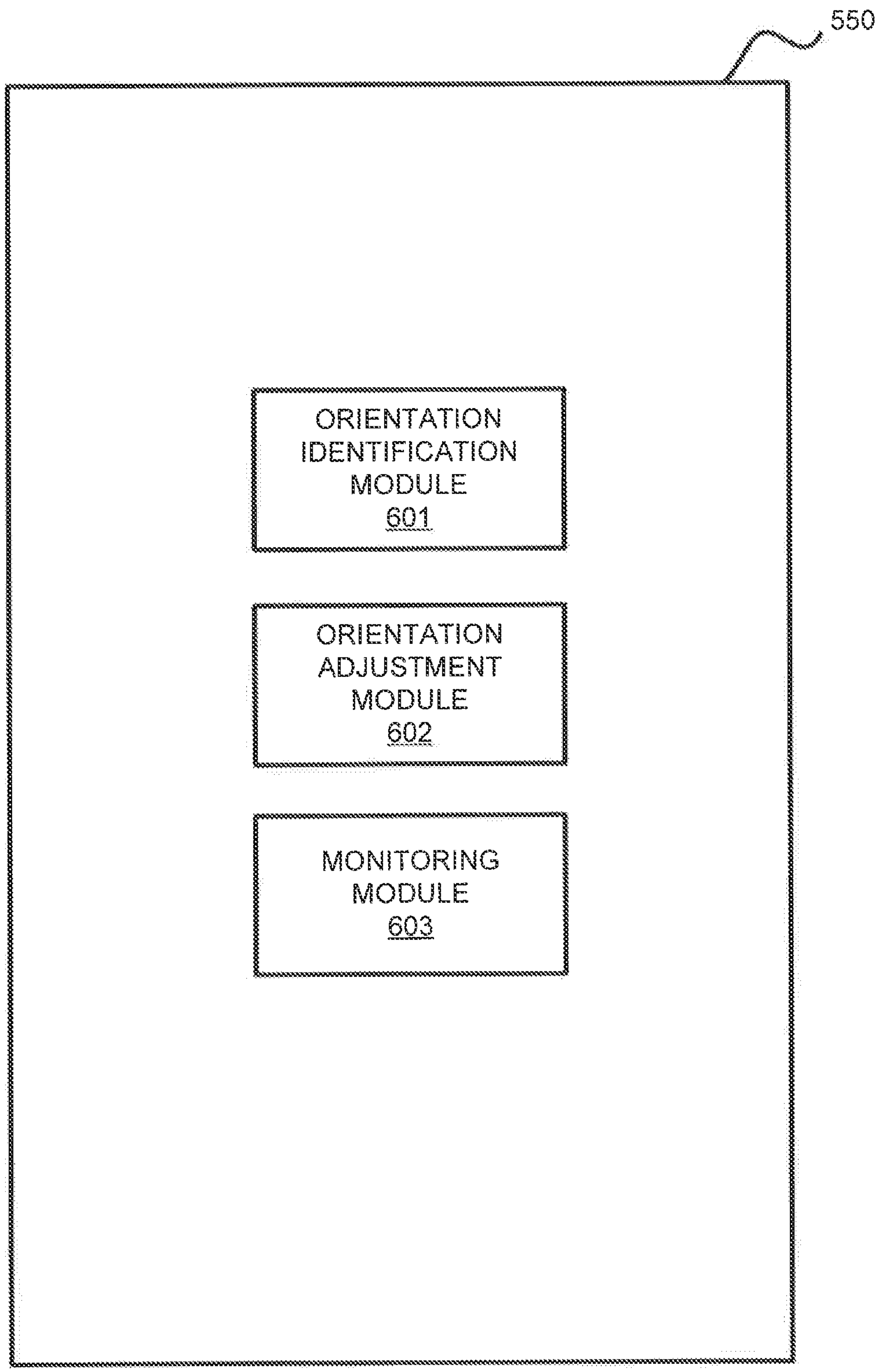
FIG. 13 illustrates an exemplary embodiment of a memory containing software modules consistent with the present disclosure.

FIG. 13 illustrates an exemplary embodiment of a memory containing software modules consistent with the present disclosure. Included in memory 550 are orientation identification module 601, orientation adjustment module 602, and motion tracking module 603. Modules 601, 602, 603 may contain software instructions for execution by at least one processing device, e.g., processor 210, included with a wearable apparatus. Orientation identification module 601, orientation adjustment module 602, and motion tracking module 603 may cooperate to provide orientation adjustment for a capturing unit incorporated into wireless apparatus 110.

Figure 14:
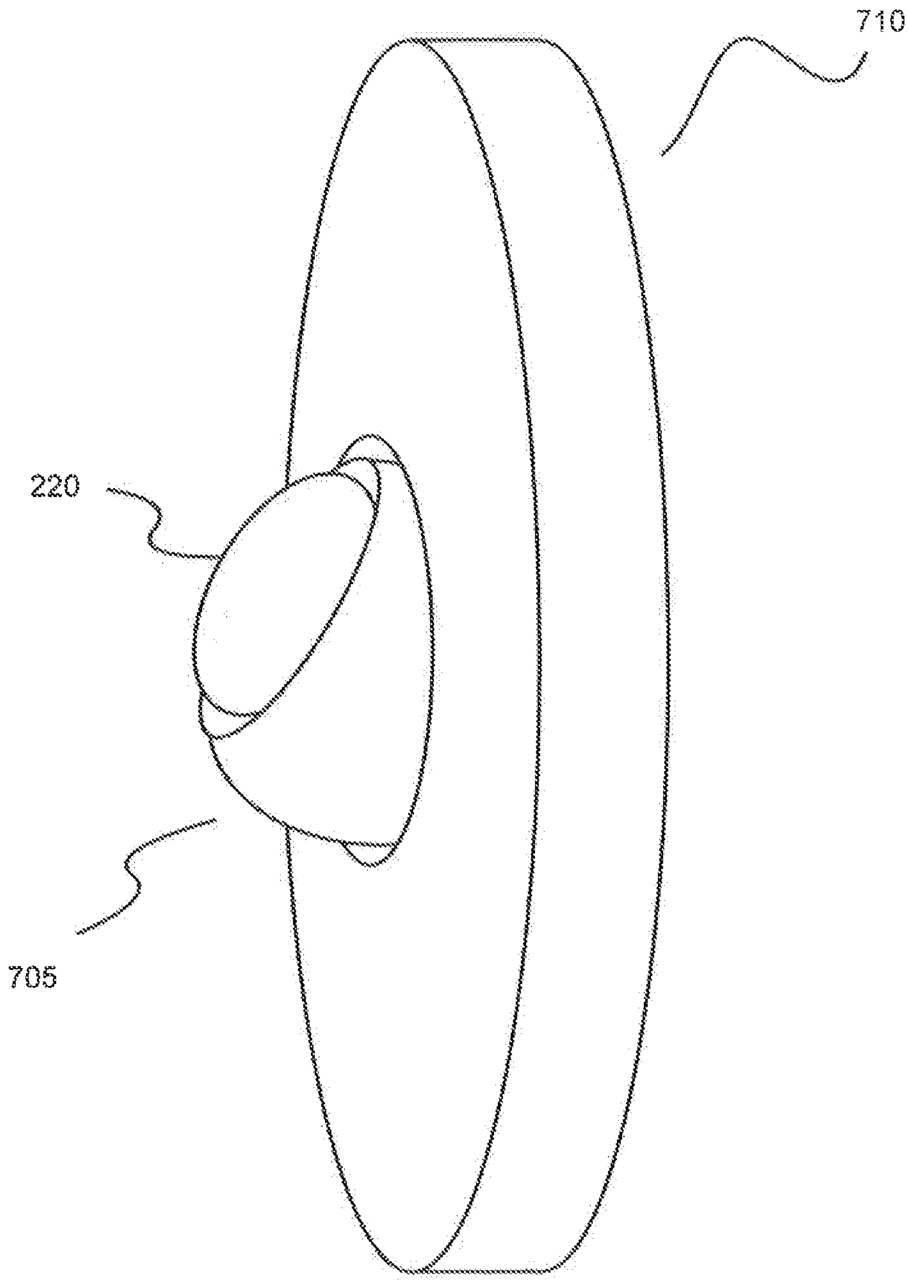
FIG. 14 is a schematic illustration of an embodiment of a wearable apparatus including an orientable image capture unit

FIG. 14 illustrates an exemplary capturing unit 710 including an orientation adjustment unit 705. Orientation adjustment unit 705 may be configured to permit the adjustment of image sensor 220. As illustrated in FIG. 14, orientation adjustment unit 705 may include an eye-ball type adjustment mechanism. In alternative embodiments, orientation adjustment unit 705 may include gimbals, adjustable stalks, pivotable mounts, and any other suitable unit for adjusting an orientation of image sensor 220.

Image sensor 220 may be configured to be movable with the head of user 100 in such a manner that an aiming direction of image sensor 220 substantially coincides with a field of view of user 100. For example, as described above, a camera associated with image sensor 220 may be installed within capturing unit 710 at a predetermined angle in a position facing slightly upwards or downwards, depending on an intended location of capturing unit 710. Accordingly, the set aiming direction of image sensor 220 may match the field-of-view of user 100. In some embodiments, processor 210 may change the orientation of image sensor 220 using image data provided from image sensor 220. For example, processor 210 may recognize that a user is reading a book and determine that the aiming direction of image sensor 220 is offset from the text. That is, because the words in the beginning of each line of text are not fully in view, processor 210 may determine that image sensor 220 is tilted in the wrong direction. Responsive thereto, processor 210 may adjust the aiming direction of image sensor 220.

Orientation identification module 601 may be configured to identify an orientation of an image sensor 220 of capturing unit 710. An orientation of an image sensor 220 may be identified, for example, by analysis of images captured by image sensor 220 of capturing unit 710, by tilt or attitude sensing devices within capturing unit 710, and by measuring a relative direction of orientation adjustment unit 705 with respect to the remainder of capturing unit 710.

Orientation adjustment module 602 may be configured to adjust an orientation of image sensor 220 of capturing unit 710. As discussed above, image sensor 220 may be mounted on an orientation adjustment unit 705 configured for movement. Orientation adjustment unit 705 may be configured for rotational and/or lateral movement in response to commands from orientation adjustment module 602. In some embodiments orientation adjustment unit 705 may be adjust an orientation of image sensor 220 via motors, electromagnets, permanent magnets, and/or any suitable combination thereof.

In some embodiments, monitoring module 603 may be provided for continuous monitoring. Such continuous monitoring may include tracking a movement of at least a portion of an object included in one or more images captured by the image sensor. For example, in one embodiment, apparatus 110 may track an object as long as the object remains substantially within the field-of-view of image sensor 220. In additional embodiments, monitoring module 603 may engage orientation adjustment module 602 to instruct orientation adjustment unit 705 to continually orient image sensor 220 towards an object of interest. For example, in one embodiment, monitoring module 603 may cause image sensor 220 to adjust an orientation to ensure that a certain designated object, for example, the face of a particular person, remains within the field-of view of image sensor 220, even as that designated object moves about. In another embodiment, monitoring module 603 may continuously monitor an area of interest included in one or more images captured by the image sensor. For example, a user may be occupied by a certain task, for example, typing on a laptop, while image sensor 220 remains oriented in a particular direction and continuously monitors a portion of each image from a series of images to detect a trigger or other event. For example, image sensor 210 may be oriented towards a piece of laboratory equipment and monitoring module 603 may be configured to monitor a status light on the laboratory equipment for a change in status, while the user's attention is otherwise occupied.

In some embodiments consistent with the present disclosure, capturing unit 710 may include a plurality of image sensors 220. The plurality of image sensors 220 may each be configured to capture different image data. For example, when a plurality of image sensors 220 are provided, the image sensors 220 may capture images having different resolutions, may capture wider or narrower fields of view, and may have different levels of magnification. Image sensors 220 may be provided with varying lenses to permit these different configurations. In some embodiments, a plurality of image sensors 220 may include image sensors 220 having different orientations. Thus, each of the plurality of image sensors 220 may be pointed in a different direction to capture different images. The fields of view of image sensors 220 may be overlapping in some embodiments. The plurality of image sensors 220 may each be configured for orientation adjustment, for example, by being paired with an image adjustment unit 705. In some embodiments, monitoring module 603, or another module associated with memory 550, may be configured to individually adjust the orientations of the plurality of image sensors 220 as well as to turn each of the plurality of image sensors 220 on or off as may be required. In some embodiments, monitoring an object or person captured by an image sensor 220 may include tracking movement of the object across the fields of view of the plurality of image sensors 220.

Embodiments consistent with the present disclosure may include connectors configured to connect a capturing unit and a power unit of a wearable apparatus. Capturing units consistent with the present disclosure may include least one image sensor configured to capture images of an environment of a user. Power units consistent with the present disclosure may be configured to house a power source and/or at least one processing device. Connectors consistent with the present disclosure may be configured to connect the capturing unit and the power unit, and may be configured to secure the apparatus to an article of clothing such that the capturing unit is positioned over an outer surface of the article of clothing and the power unit is positioned under an inner surface of the article of clothing. Exemplary embodiments of capturing units, connectors, and power units consistent with the disclosure are discussed in further detail with respect to FIGS. 15-21.

Figure 15:
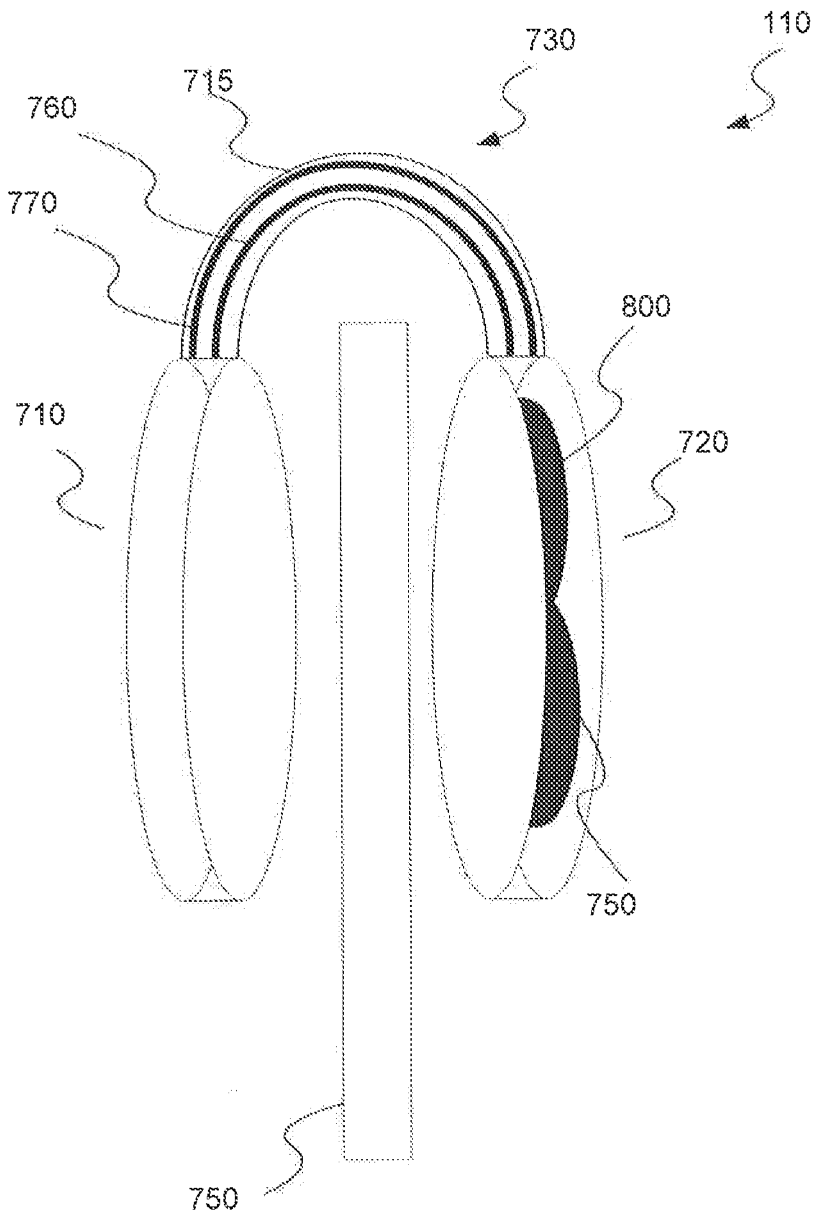
FIG. 15 is a schematic illustration of an embodiment of a wearable apparatus securable to an article of clothing consistent with the present disclosure.

FIG. 15 is a schematic illustration of an embodiment of wearable apparatus 110 securable to an article of clothing consistent with the present disclosure. As illustrated in FIG. 15, capturing unit 710 and power unit 720 may be connected by a connector 730 such that capturing unit 710 is positioned on one side of an article of clothing 750 and power unit 720 is positioned on the opposite side of the clothing 750. In some embodiments, capturing unit 710 may positioned over an outer surface of the article of clothing 750 and power unit 720 may be located under an inner surface of the article of clothing 750. The power unit 720 may be configured to be placed against the skin of a user.

Capturing unit 710 may include an image sensor 220 and an orientation adjustment unit 705 (as illustrated in FIG. 14). Power unit 720 may include power source 520 and processor 210. Power unit 720 may further include any combination of elements previously discussed that may be a part of wearable apparatus 110, including, but not limited to, wireless transceiver 530, feedback outputting unit 230, memory 550, and data port 570.

Connector 730 may include a clip 715 or other mechanical connection designed to clip or attach capturing unit 710 and power unit 720 to an article of clothing 750 as illustrated in FIG. 15. As illustrated, clip 715 may connect to each of capturing unit 710 and power unit 720 at a perimeter thereof, and may wrap around an edge of the article of clothing 750 to affix the capturing unit 710 and power unit 720 in place. Connector 730 may further include a power cable 760 and a data cable 770. Power cable 760 may be capable of conveying power from power source 520 to image sensor 220 of capturing unit 710. Power cable 760 may also be configured to provide power to any other elements of capturing unit 710, e.g., orientation adjustment unit 705. Data cable 770 may be capable of conveying captured image data from image sensor 220 in capturing unit 710 to processor 800 in the power unit 720. Data cable 770 may be further capable of conveying additional data between capturing unit 710 and processor 800, e.g., control instructions for orientation adjustment unit 705.

Figure 16:
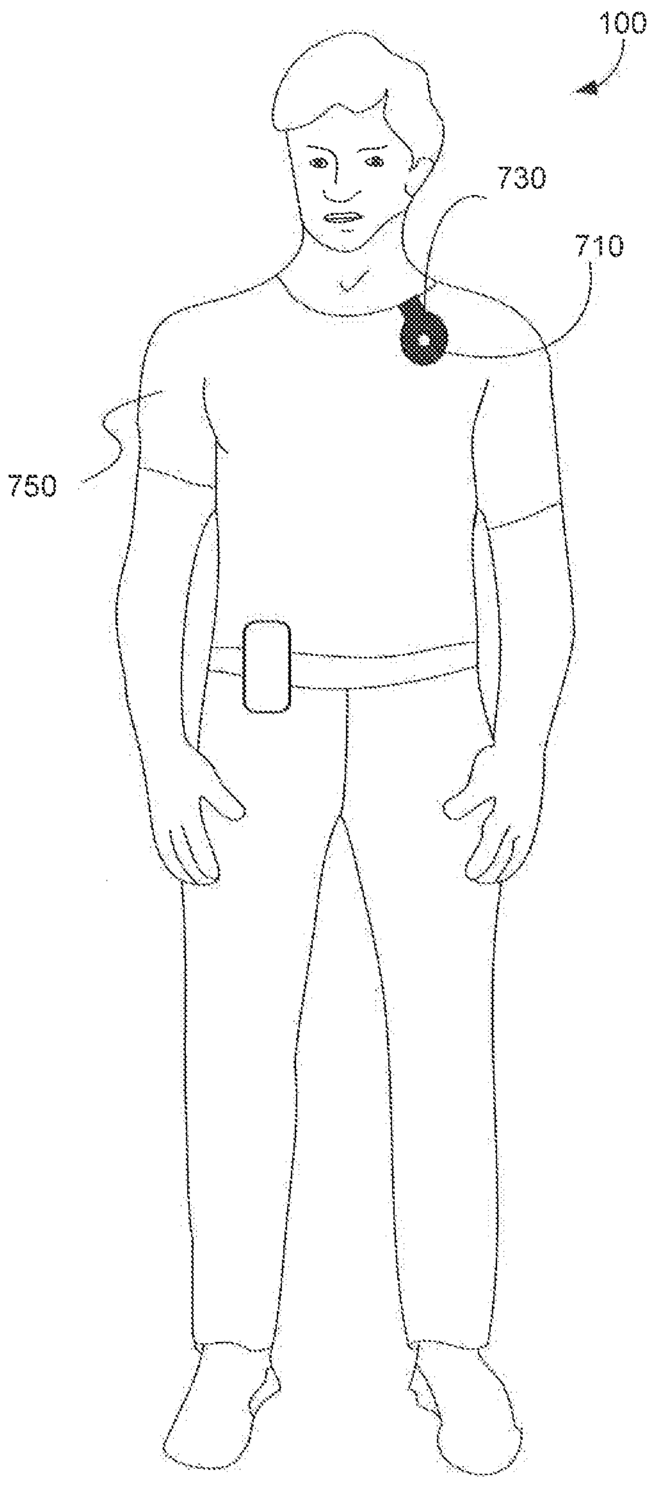
FIG. 16 is a schematic illustration of a user wearing a wearable apparatus consistent with an embodiment of the present disclosure.

FIG. 16 is a schematic illustration of a user 100 wearing a wearable apparatus 110 consistent with an embodiment of the present disclosure. As illustrated in FIG. 16, capturing unit 710 is located on an exterior surface of the clothing 750 of user 100. Capturing unit 710 is connected to power unit 720 (not seen in this illustration) via connector 730, which wraps around an edge of clothing 750.

Figure 17:
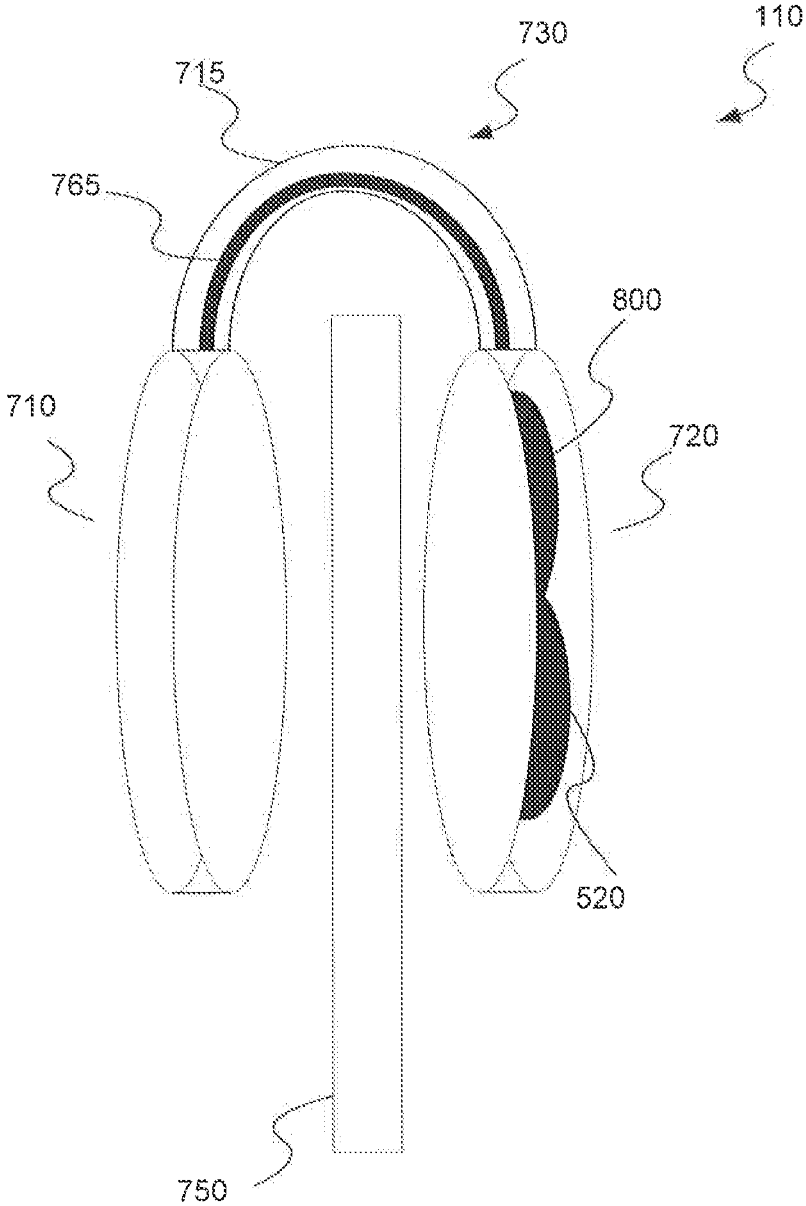
FIG. 17 is a schematic illustration of an embodiment of a wearable apparatus securable to an article of clothing consistent with the present disclosure.

In some embodiments, connector 730 may include a flexible printed circuit board (PCB). FIG. 17 illustrates an exemplary embodiment wherein connector 730 includes a flexible printed circuit board 765. Flexible printed circuit board 765 may include data connections and power connections between capturing unit 710 and power unit 720. Thus, in some embodiments, flexible printed circuit board 765 may serve to replace power cable 760 and data cable 770. In alternative embodiments, flexible printed circuit board 765 may be included in addition to at least one of power cable 760 and data cable 770. In various embodiments discussed herein, flexible printed circuit board 765 may be substituted for, or included in addition to, power cable 760 and data cable 770.

Figure 18:
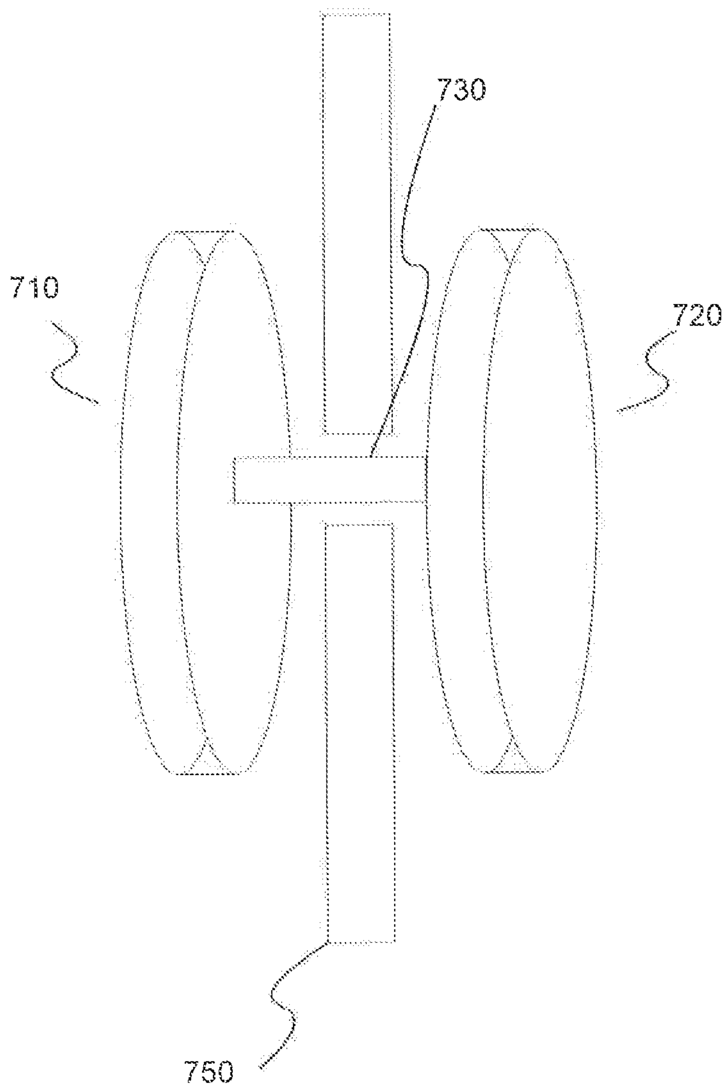
FIG. 18 is a schematic illustration of an embodiment of a wearable apparatus securable to an article of clothing consistent with the present disclosure.

FIG. 18 is a schematic illustration of another embodiment of a wearable apparatus securable to an article of clothing consistent with the present disclosure. As illustrated in FIG. 18, connector 730 may be centrally located with respect to capturing unit 710 and power unit 720. Central location of connector 730 may facilitate affixing apparatus 110 to clothing 750 through a hole in clothing 750 such as, for example, a button-hole in an existing article of clothing 750 or a specialty hole in an article of clothing 750 designed to accommodate wearable apparatus 110.

Figure 19:
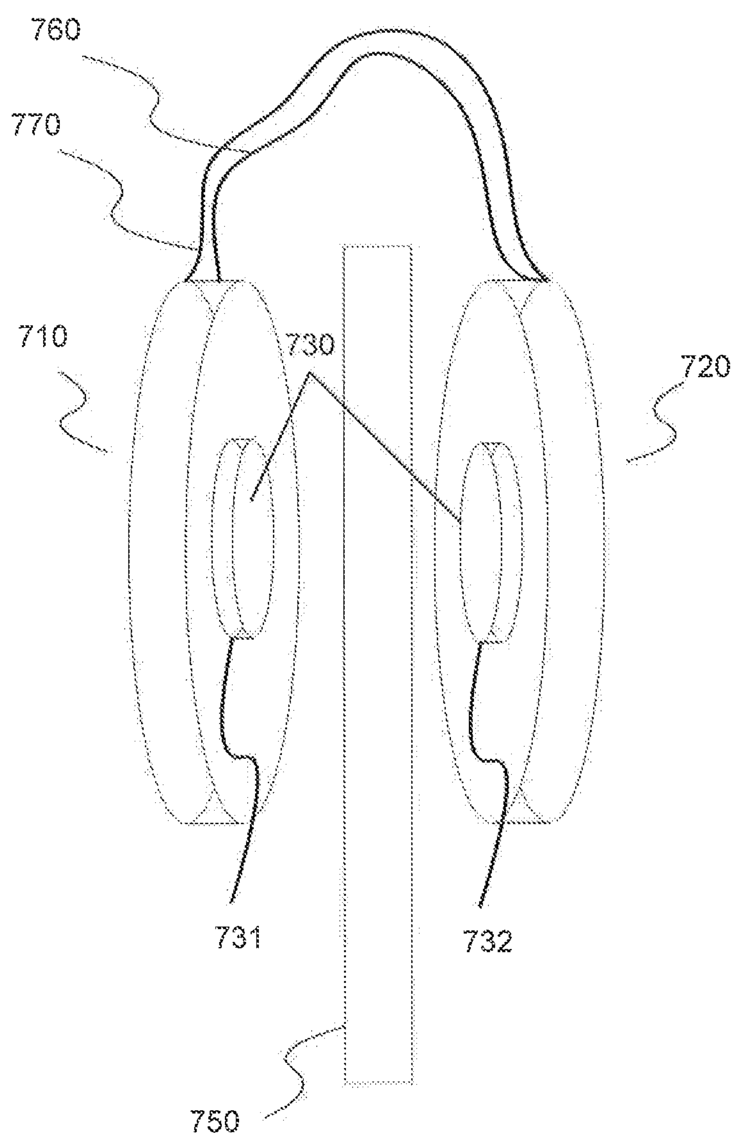
FIG. 19 is a schematic illustration of an embodiment of a wearable apparatus securable to an article of clothing consistent with the present disclosure.

FIG. 19 is a schematic illustration of still another embodiment of wearable apparatus 110 securable to an article of clothing. As illustrated in FIG. 19, connector 730 may include a first magnet 731 and a second magnet 732. First magnet 731 and second magnet 732 may secure capturing unit 710 to power unit 720 with the article of clothing positioned between first magnet 731 and second magnet 732. In embodiments including first magnet 731 and second magnet 732, power cable 760 and data cable 770 may also be included. In these embodiments, power cable 760 and data cable 770 may be of any length, and may provide a flexible power and data connection between capturing unit 710 and power unit 720. Embodiments including first magnet 731 and second magnet 732 may further include a flexible PCB 765 connection in addition to or instead of power cable 760 and/or data cable 770.

Figure 20:
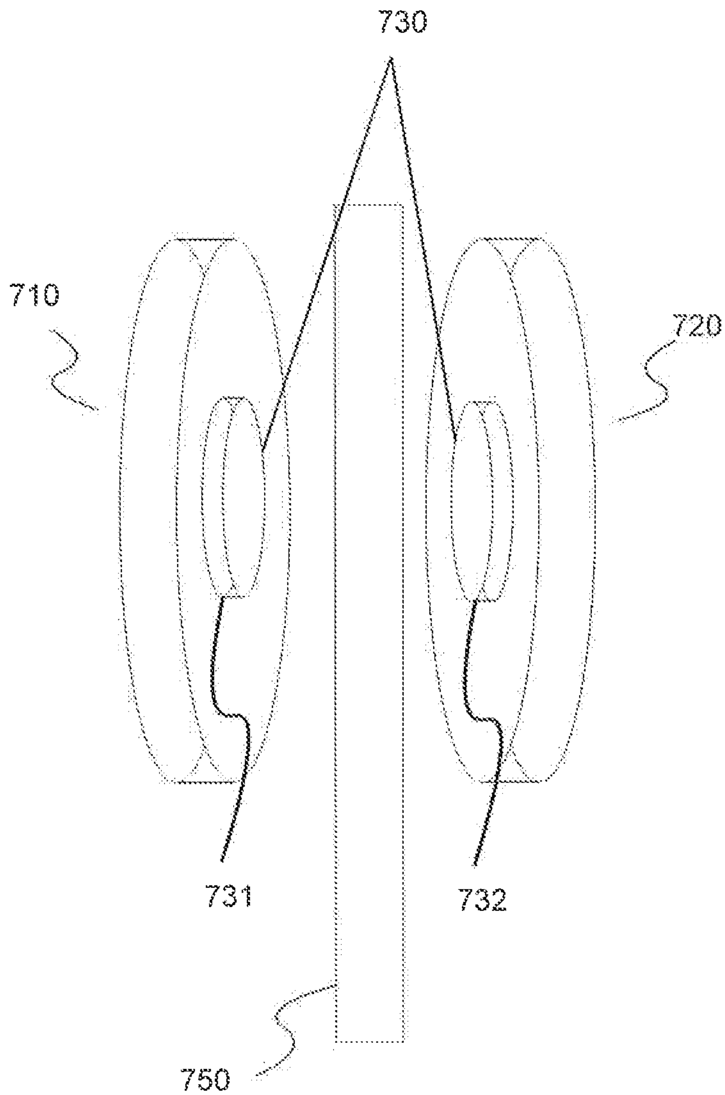
FIG. 20 is a schematic illustration of an embodiment of a wearable apparatus securable to an article of clothing consistent with the present disclosure.

FIG. 20 is a schematic illustration of yet another embodiment of a wearable apparatus 110 securable to an article of clothing. FIG. 20 illustrates an embodiment wherein power and data may be wirelessly transferred between capturing unit 710 and power unit 720. As illustrated in FIG. 20, first magnet 731 and second magnet 732 may be provided as connector 730 to secure capturing unit 710 and power unit 720 to an article of clothing 750. Power and/or data may be transferred between capturing unit 710 and power unit 720 via any suitable wireless technology, for example, magnetic and/or capacitive coupling, near field communication technologies, radiofrequency transfer, and any other wireless technology suitable for transferring data and/or power across short distances.

Figure 21:
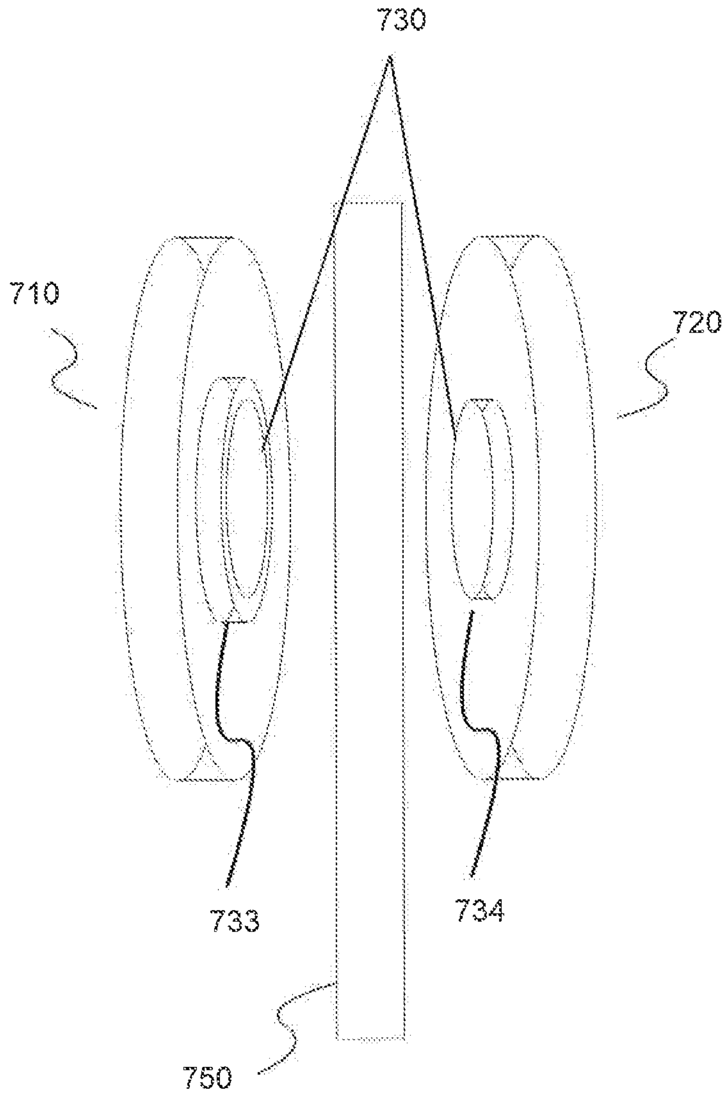
FIG. 21 is a schematic illustration of an embodiment of a wearable apparatus securable to an article of clothing consistent with the present disclosure.

FIG. 21 illustrates still another embodiment of wearable apparatus 110 securable to an article of clothing 750 of a user. As illustrated in FIG. 21, connector 730 may include features designed for a contact fit. For example, capturing unit 710 may include a ring 733 with a hollow center having a diameter slightly larger than a disk-shaped protrusion 734 located on power unit 720. When pressed together with fabric of an article of clothing 750 between them, disk-shaped protrusion 734 may fit tightly inside ring 733, securing capturing unit 710 to power unit 720. FIG. 21 illustrates an embodiment that does not include any cabling or other physical connection between capturing unit 710 and power unit 720. In this embodiment, capturing unit 710 and power unit 720 may transfer power and data wirelessly. In alternative embodiments, capturing unit 710 and power unit 720 may transfer power and data via at least one of cable 760, data cable 770, and flexible printed circuit board 765.

Figure 22:
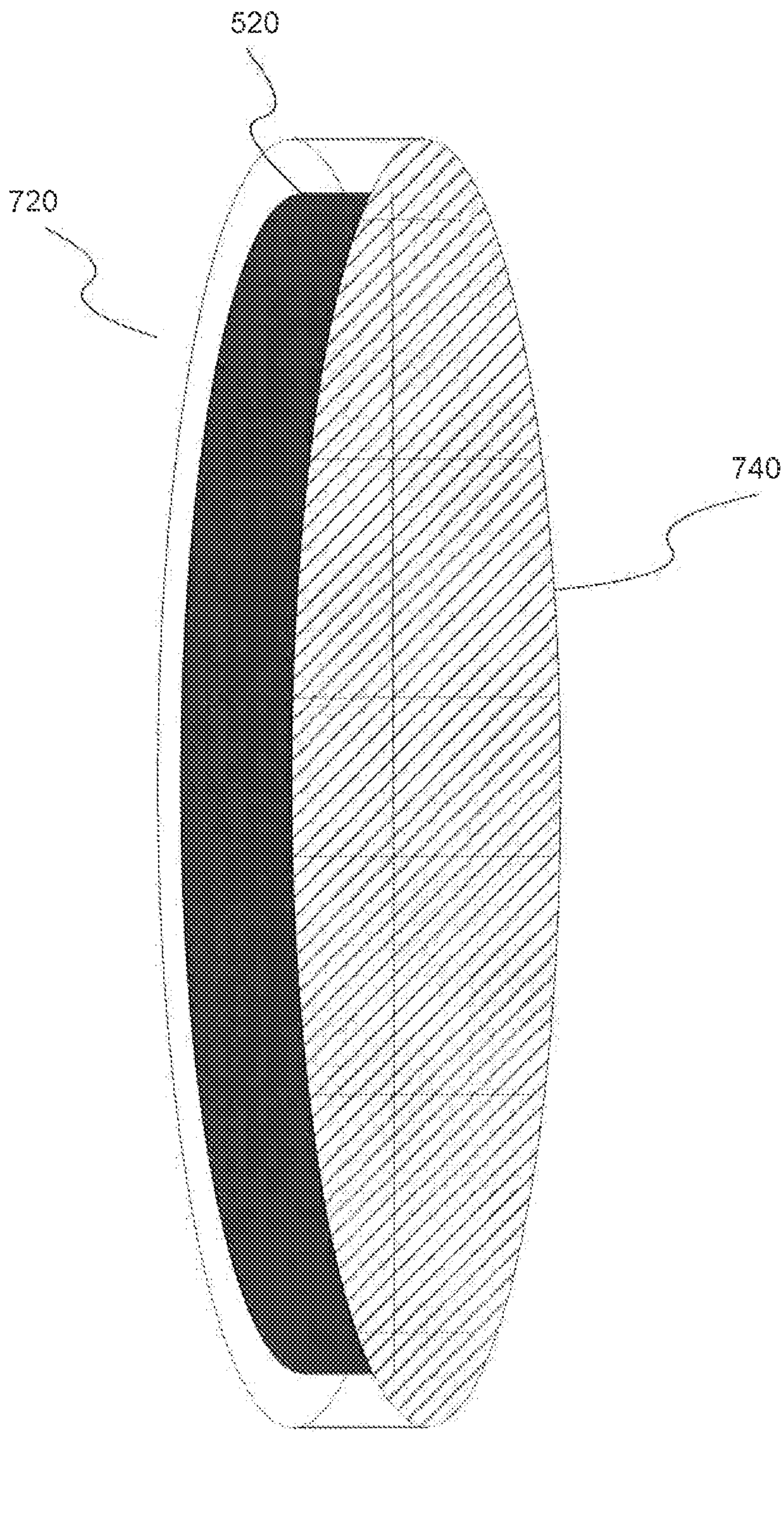
FIG. 22 is a schematic illustration of an embodiment of a wearable apparatus power unit including a power source.

FIG. 22 illustrates another aspect of power unit 720 consistent with embodiments described herein. Power unit 720 may be configured to be positioned directly against the user's skin. To facilitate such positioning, power unit 720 may further include at least one surface coated with a biocompatible material 740. Biocompatible materials 740 may include materials that will not negatively react with the skin of the user when worn against the skin for extended periods of time. Such materials may include, for example, silicone, PTFE, kapton, polyimide, titanium, nitinol, platinum, and others. Also as illustrated in FIG. 22, power unit 720 may be sized such that an inner volume of the power unit is substantially filled by power source 520. That is, in some embodiments, the inner volume of power unit 720 may be such that the volume does not accommodate any additional components except for power source 520.

Figure 23:
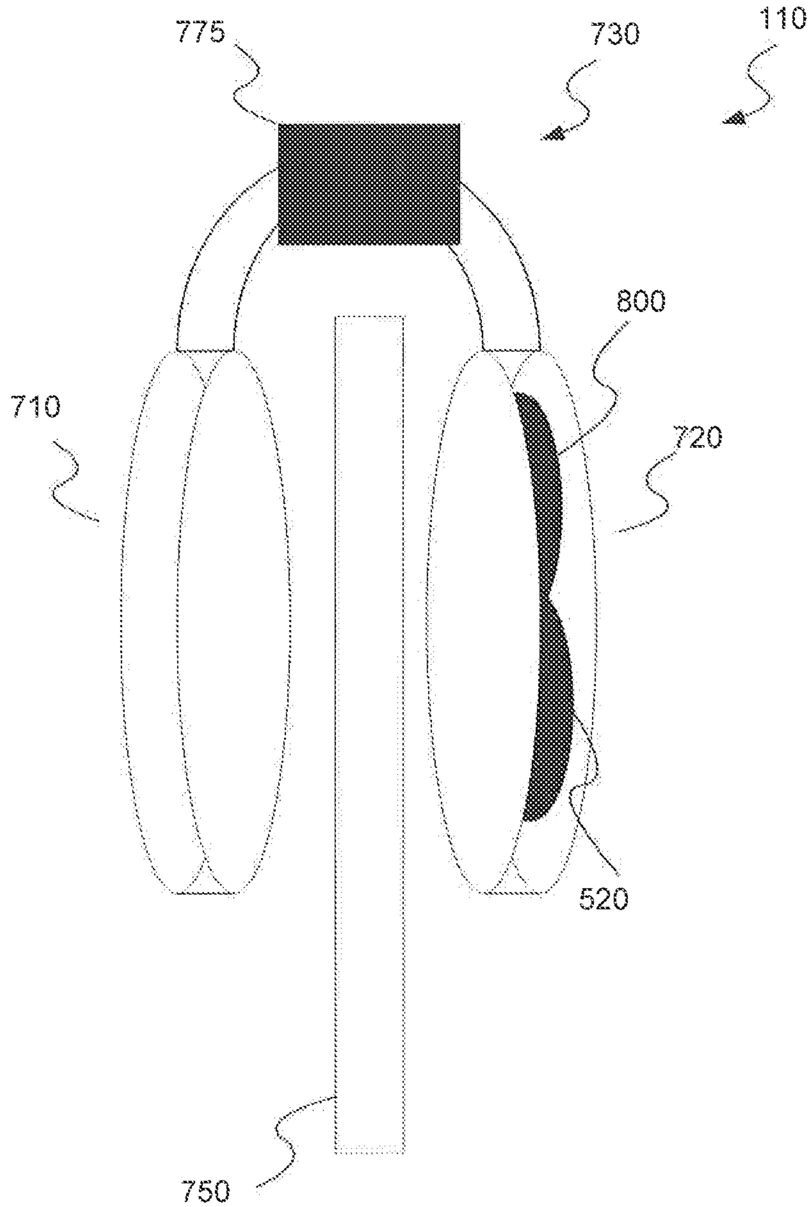
FIG. 23 is a schematic illustration of an exemplary embodiment of a wearable apparatus including protective circuitry.

In further embodiments, an apparatus securable to an article of clothing may further include protective circuitry associated with power source 520 housed in in power unit 720. FIG. 23 illustrates an exemplary embodiment including protective circuitry 775. As illustrated in FIG. 23, protective circuitry 775 may be located remotely with respect to power unit 720. In alternative embodiments, protective circuitry 775 may also be located in capturing unit 710, on flexible printed circuit board 765, or in power unit 720.

Protective circuitry 775 may be configured to protect image sensor 220 and/or other elements of capturing unit 710 from potentially dangerous currents and/or voltages produced by power source 520. Protective circuitry 775 may include passive components such as capacitors, resistors, diodes, inductors, etc., to provide protection to elements of capturing unit 710. In some embodiments, protective circuitry 775 may also include active components, such as transistors, to provide protection to elements of capturing unit 710. For example, in some embodiments, protective circuitry 775 may comprise one or more resistors serving as fuses. Each fuse may comprise a wire or strip that melts (thereby braking a connection between circuitry of image capturing unit 710 and circuitry of power unit 720) when current flowing through the fuse exceeds a predetermined limit (e.g., 500 milliamps, 900 milliamps, 1 amp, 1.1 amps, 2 amp, 2.1 amps, 3 amps, etc.) Any or all of the previously described embodiments may incorporate protective circuitry 775.

Wearable apparatus 110 may be configured to capture image data of an environment of user 100 using a plurality of image sensors, with each of the image sensors associated with a field of view. The image sensors may be included in one or a plurality of cameras. Each of the plurality of image sensors may be associated with an optical axis. Two or more optical axes associated with two or more image sensors may be oriented in different directions, in a fixed or adjustable manner, to cover different fields of view and/or overlapping fields of view. Some or all of the plurality of image sensors may be selectively activated, e.g., by at least one processing device, to capture image data of the environment of user 100. The at least one processing device may include at least one of processors 210, 210*a*, 210*b*, and 540. The selected image sensors may have a combined field of view that includes a targeted object or a targeted environment. Image data captured by different image sensors may be combined, by the processing device, to generate image data having a higher resolution than the individual resolution of any one of the image sensors.

In some embodiments, the image sensors may be low resolution image sensors, which may capture low resolution image data (e.g., image data having a low resolution of 0.5 Megapixels, 1.0 Megapixels, 1.5 Megapixels, etc.). A low resolution and a high resolution may be defined based on resolutions used in digital cameras that are available in present market. For example, in the market at the time of this invention, 0.5 Megapixels, 1.0 Megapixels, 1.5 Megapixels, 3.0 Megapixels may be considered low resolutions. 5.0 Megapixels, 7.0 Megapixels, 10 Megapixels, 20 Megapixels may be considered high resolutions. In addition, the definition of low and high resolutions may change as the imaging technology evolves. For example, five years from the filing of this application, the digital imaging technology may have advanced. 10 Megapixels may be considered a low resolution by then. Furthermore, the definition of low and high resolutions may depend on implementations. For example, in some implementations of wearable apparatus 110, 3.0 Megapixels may be considered a high resolution. In some implementations, 5.0 Megapixels may be considered a low resolution.

In some embodiments, the resolutions of the image sensors may be adjustable within a range from low to high (e.g., from 1.0 Megapixels to 5 Megapixels). When desired, the image sensors may be adjusted to a low resolution (e.g., 1.5 Megapixels), such that the captured image data has a low resolution. The low resolution image data may be combined to generate higher resolution image data (e.g., 3.0 Megapixels). A higher resolution is relative, and may not fall within the definition of high resolution. In some embodiments, the image sensors may be adjusted to have a high resolution (e.g., 5.0 Megapixels), such that the captured image data has the high resolution. High resolution image data captured by different image sensors may still be combined by the processing device to generate image data having an even higher resolution. By capturing low resolution image data and combining the captured data to generate higher resolution image data, the storage space needed to store captured image data may be reduced. In addition, when image sensors of low resolution are used, a cost of the materials associated with wearable apparatus 110 may be reduced. Further, due to the ability to combine low resolution image data to generate higher resolution image data, the imaging quality of wearable apparatus 110 is not compromised.

When at least one image sensor captures a visual trigger, two or more image sensors may be selectively activated, reoriented, or actuated to operate simultaneously. For example, one image sensor may be actively capturing image data of an environment of user 100, while other image sensors may be in an "idle" state to save energy. In the "idle" state, the image sensors may be turned off or not supplied with power, such that the sensors are not capturing image data. In some embodiments, in the idle state, the sensors may be capturing image data at a minimum resolution, or may be capturing image data but not transmitting the image data to a data storage device for storage, such that the processing device are not processing the captured image data. When the processing device identifies a visual trigger from the captured image data from the active image sensor, the processing device may selectively activate one or more images sensors from their "idle" state such that the one or more image sensors may operate together or simultaneously with the already active image sensor to capture image data of the visual trigger, or to capture image data of objects or environment associated with the visual trigger. By having two or more image sensors operating simultaneously to capture image data of the same target object or environment, more details regarding the visual trigger, or the objects or environment associated with the visual trigger, may be captured.

Wearable apparatus 110 may include energy devices configured to provide power to wearable apparatus 110 and save energy costs associated with operating wearable apparatus 110. For example, wearable apparatus 110 may include at least one solar cell configured to convert the solar energy into electrical energy, which may be used to power some components of wearable apparatus 110, such as the image sensors. Using solar cells to provide at least a portion of the energy needed to operate wearable apparatus 110 may help reduce the costs associated with operating wearable apparatus 110, and prolong the standby and operation time of wearable apparatus 110.

In some embodiments, wearable apparatus 110 may be associated with a body power harvesting device, such as one converting the body motion or mechanical energy into electrical energy. The converted electrical energy may be used to power certain components of wearable apparatus 110, such as the image sensors. This may reduce the energy cost associated with operating wearable apparatus 110 and prolong the standby and operation time of wearable apparatus 110.

In some embodiments, wearable apparatus 110 may include a directional microphone configured to detect or receive sounds (e.g., a sound wave) such as, for example, a voice. The processing device may analyze the detected sound and identify a direction of the sound wave received by the microphone. Based on the direction of the detected sound wave, the processing device may selectively activate one or more image sensors to capture image data of an object or an environment in the identified direction. The microphone may be selectively activated to detect a sound and transmit the detected voice to a data storage device for storage. In some embodiments, the selective activation of the microphone may be based on detecting movement of a chin of user 100 from two or more images captured by the image sensors.

At least one processing device may be programmed to process the captured image data to identify an object in the environment. When a first image sensor is identified as having captured image data of the object, the processing device may be programmed to process image data from the first image sensor using a first processing scheme. The first processing scheme may include continuing to process the image data received from the at least first image sensor. When a second image sensor is identified as having not captured image data of the object, the processing device may be programmed to process image data from the second image sensor using a second processing scheme. The second processing scheme may include discontinuing processing the image data received from the second image sensor. In some embodiments, the processing device may be further programmed to resume processing image data captured from the second image sensor after a predetermined time period has elapsed. In some embodiments, the processing device may be further programmed to discontinue processing image data from the first image sensor when the object is no longer in the field of view of the first image sensor. In some embodiments, the processing device may be further programmed to cause the second image sensor to discontinue capturing image data for at least a portion of a time period during which image data from the first image sensor is being processed.

At least one processing device may be programmed to process the captured image data to identify an object in the environment. The processing device may be programmed to process image data from at least a first image sensor using a first processing scheme when the first image sensor is identified as having captured image data of the object. The processing device may be programmed to process image data from at least a second image sensor using a second processing scheme when the second image sensor is identified as having not captured image data of the object.

Figure 24:
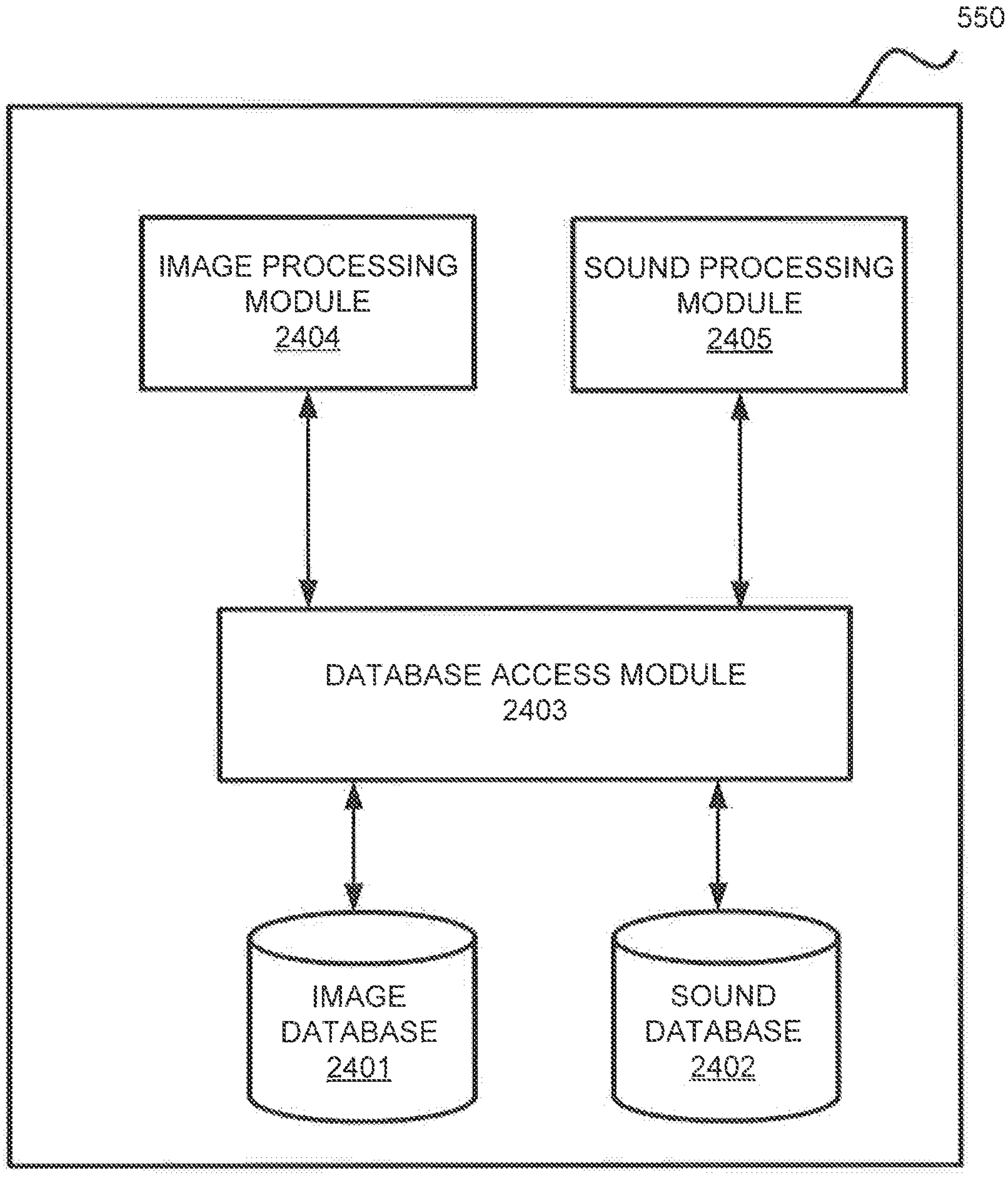
FIG. 24 is a diagram illustrating an example memory storing a plurality of modules according to a disclosed embodiment.

FIG. 24 is a block diagram illustrating a memory (e.g., memory 550, 550*a*, and/or 550*b*) according to the disclosed embodiments. The memory may include one or more modules, or sets of instructions, for performing methods consistent with the disclosed embodiments. For example, the memory may include instructions for at least one processing device to analyze images captured by the image sensors and/or voice detected by the microphone. In some embodiments, the processing device may be included in wearable apparatus 110. For example, the processing device may be processor 210, 210*a*, and/or 210*b* shown in FIGS. 10 and 11. The processing device may process the image data captured by the image sensors in near real time, as the image data are being captured by the image sensors. In some embodiments, the processing device may be a processor that is separately located from wearable apparatus 110. The processing device may be a processor that is remotely connected with wearable apparatus 110 through network 240, which may be a wired or wireless network, or through any other connectivity means, such as Bluetooth, near field communication (NFC), etc. For example, the processing device may include processor 540 included in computing device 120, which may be connected with wearable apparatus 110 through a wired or wireless connection, such as through a cable, Bluetooth, WiFi, infrared, or near field communication (NFC). In some embodiments, the processing device may be a processor included in server 250, which may be wirelessly connected with wearable apparatus 110 through network 240. In some embodiments, the processing device may be a cloud computing processor remotely and wirelessly connected with wearable apparatus 110 through network 240. Wearable apparatus 110 may transmit captured image data to the processing device in near real time, and the processing device may process the captured image data and provide results of processing to wearable apparatus 110 in near real time.

In the example shown in FIG. 24, memory 550 comprises an image database 2401, a sound database 2402, a database access module 2403, an image processing module 2404, and a voice processing module 2405, for performing the functionality of the disclosed methods. Additional or fewer databases and/or modules may be included in memory 550. The modules and databases shown in FIG. 24 are by example only, and a processor in the disclosed embodiments may operate according to any suitable process.

In the embodiment shown in FIG. 24, memory 550 is configured to store an image database 2401. Image database 2401 may be configured to store various images, such as images captured by an image sensor (e.g., image sensor 220, 220*a*, and/or 220*b*). Image database 2401 may also be configured to store data other than image data, such as textual data, audio data, video data, etc. Alternatively or additionally, memory 550 may include a sound database 2402 configured to store audio data, such as sound or voice data.

As shown in FIG. 24, memory 550 is also configured to store a database access module 2403. The processing device may execute instructions associated with database access module 2403 to access image database 2401 and sound database 2402, for example, to retrieve previously stored image data captured by the image sensor for analysis. In some embodiments, the processing device may execute instructions associated with database access module 2403 to retrieve previously stored sound data (e.g., a voice) that may be received by a microphone. The processing device may also execute instructions associated with database access module 2403 to store image data into image database 2401 and store sound data into sound database 2402.

In the embodiment shown in FIG. 24, memory 550 is configured to store an image processing module 2404. The processing device may execute instructions associated with image processing module 2404 to perform various analyses and processes of image data captured by the image sensor to identify an object. Based on whether the object is identified in image data captured by a first image sensor or a second image sensor, the processing device may execute instructions associated with image processing module 2404 to determine whether to continue processing image data received from the first image sensor, or continue processing image data received from the second image sensor.

In the embodiment shown in FIG. 24, memory 550 is configured to store a sound processing module 2405. The processing device may execute instructions associated with sound processing module 2405 to perform various analyses and processes of audio data, such as those recorded by a microphone. The processing device may execute instructions associated with sound processing module 2405 to determine a direction associated with a sound. For example, the processing device may estimate an angle of the sound traveling toward user 100 relative to a horizontal direction 2710 shown in FIG. 27, or an optical axis 2522 of image sensor 2512 shown in FIG. 25, which may align with the horizontal direction 2710 when the sound is detected. The direction information about the sound data may be used by sound processing module 2405 and/or image processing module 2404 to select one or more image sensors for capturing image data of an object or environment in the determined direction.

Figure 25:
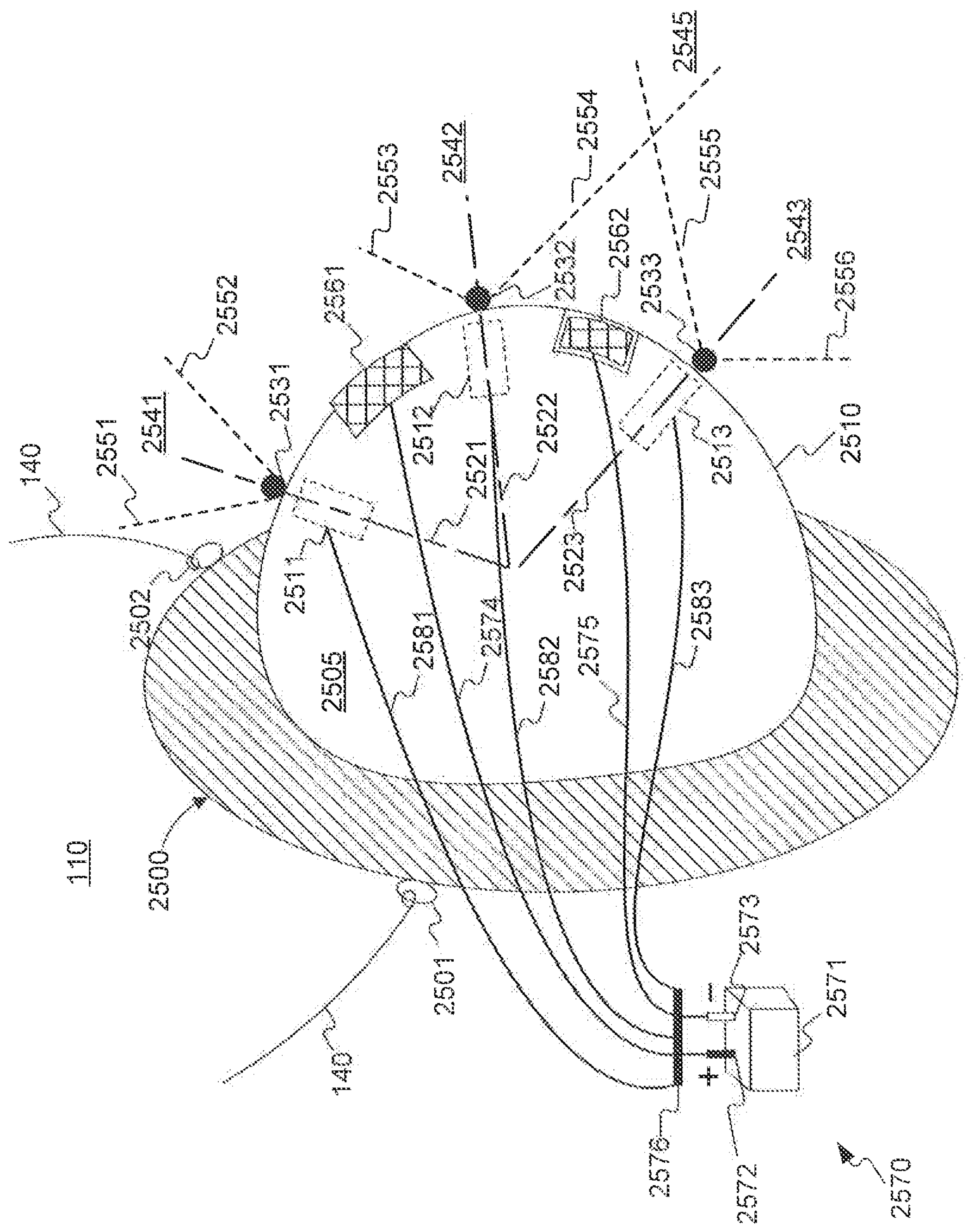
FIG. 25 is a schematic illustration of perspective view of an example wearable apparatus having a plurality of image sensors for capturing image data according to a disclosed embodiment.

FIG. 25 is a schematic illustration of a perspective view of an example wearable apparatus 110 having a plurality of image sensors for capturing and processing image data of an environment of user 100, consistent with the disclosed embodiments. Wearable apparatus 110 may be worn by user 100 in various ways through an attachment mechanism. The attachment mechanism may include any suitable means. For example, as shown in FIG. 2, wearable apparatus 110 may be carried on necklace 140 worn by user 100. As shown in FIG. 6, wearable apparatus 110 may be attached to eye glasses 130 through support 310 and screw 320. As shown in FIG. 8, wearable apparatus 110 may include a hanging ring 410 for attaching to, for example, necklace 140. As shown in FIG. 9, wearable apparatus 110 may include a clip 420 for attaching to the belt or cloth of user 100. FIG. 25 shows that wearable apparatus 110 may include a base 2500 to which necklace 140 may be attached through two fastening devices 2501 and 2502 (or through a hanging ring similar to hanging ring 410 disclosed in FIG. 8). In some embodiments, wearable apparatus 110 may be worn on a user's head (e.g., clipped to a cap, hat, or helmet worn by user 100) or a user's arm (e.g., secured via an arm band, a magnetic coupler, or any other suitable means).

Wearable apparatus 110 may include an image capturing unit 2505 (or a capturing unit 2505) mounted on base 2500. Any suitable mounting means, such as glue, screws, bolts and nuts, clamping, etc., may be used for mounting capturing unit 2505 onto base 2500. Image capturing unit 2505 may include a housing 2510 having a semi-sphere, half sphere, or sphere shape. Housing 2510 may include other three-dimensional shapes, such as cubic shape, cylindrical shape, etc.

Wearable apparatus 110 may include a plurality of image sensors. The plurality of image sensors may include any suitable number of image sensors, such as two, three, four, etc. In some embodiments, the plurality of image sensors may be included in one camera. In some embodiments, the plurality of image sensors may be included in a plurality of cameras, with each image sensor included in each camera. In the example shown in FIG. 25, image capturing unit 2505 includes three image sensors 2511, 2512, and 2513. More or less image sensors may be included. Image sensors 2511, 2512, and 2513 may be included within housing 2510, and may or may not be visible from outside housing 2510 depending on the transparency of the material of housing 2510.

Each of image sensors 2511, 2512, and 2513 may be similar to image sensors 220, 220*a*, and 220*b* discussed above and depicted in, e.g., FIGS. 5, 10, and 11. Each of image sensors 2511, 2512, and 2513 may be associated with an optical axis 2521, 2522, and 2523, respectively. Two or more optical axes may be oriented in different directions. For example, optical axis 2522 may be oriented in a substantially horizontal direction (e.g., a direction that is roughly or substantially perpendicular to the chest of user 100). Optical axis 2521 may be oriented in a direction that is about, e.g., 45° to 60° from the optical axis 2522 pointing upward, and optical axis 2523 may be oriented in a direction that is about, e.g., 45° to 60° from the optical axis 2522 pointing downward. Two or more optical axes may be divergent. For example, optical axis 2521 and optical axis 2523 are divergent (e.g., they point outward away from housing 2510 and do not overlap outside of housing 2510). An angle between two or more optical axes may be greater than about 20°. For example, the angle between optical axis 2521 and optical axis 2522 is about e.g., 45° to 60°. The angle between optical axis 2521 and optical axis 2522 may be less than about 90°, for example, about 45° to 60°.

In some embodiments, more than three image sensors (and hence more than three lenses) may be included in wearable apparatus 110. For example, wearable apparatus 110 may include five, ten, or fifteen image sensors. The image sensors and the associated lenses may be distributed at different locations such that the associated lenses point to different directions around the sphere or semi-sphere shape housing 2510. Any suitable distribution patterns may be used for disposing the image sensors and lenses, such that the fields of view of the image sensors cover a desired space and directions. The image sensors and lenses may be distributed such that when wearable apparatus 110 is worn by user 100, there is at least one image sensor whose optical axis may be placed substantially in the horizontal direction. As user 100 moves, the orientations of the lenses (e.g., orientations of the optical axes of the image sensors) may change. In some embodiments, one or more optical axes of the image sensors may point toward the horizontal direction.

Each of image sensors 2511, 2512, and 2513 may be associated with at least one lens 2531, 2532, and 2533, respectively. Lenses 2531, 2532, and 2533 may be at least partially disposed on the outer surface of housing 2510. Although shown as being disposed on the same curve line of housing 2510, lenses 2531, 2532, and 2533 may be disposed at any other locations on housing 2510. Each of image sensors 2511, 2512, and 2513 may be associated with a field of view 2541, 2542, and 2543, respectively. The field of view 2541 is schematically shown in FIG. 25 as defined by dashed lines 2551 and 2552, field of view 2542 is schematically shown in FIG. 25 as defined by dashed lines 2553 and 2554, and field of view 2543 is schematically shown in FIG. 25 as defined by dashed lines 2555 and 2556. The fields of views 2541, 2542, and 2543 are different from one another. Some of the fields of view 2541, 2542, and 2543 overlap, and some do not overlap. For example, fields of view 2542 and 2543 overlap at a zone 2545. A combined angle of the fields of view 2541, 2542, and 2543 may be more than 100°. As schematically illustrated in FIG. 25, the angle formed by the dashed lines 2551 and 2556 may be more than 120°, for example, near 180°.

In some embodiments, the orientation (i.e., direction) of each of the optical axes 2521, 2522, and 2523 may be fixed or adjustable. For example, one or more electric motors (not shown) may be associated with image sensors 2511, 2512, and 2513, and may drive a suitable adjustment mechanism (not shown) included in each of image sensors 2511, 2512, and 2513 to adjust the orientation of optical axes 2521, 2522, and 2523. The motor and adjustment mechanism may be any suitable devices known in the art. All or some of the optical axes 2521, 2522, and 2523 may be adjustable. When the orientations of optical axes 2521, 2522, and 2523 are adjusted, the fields of view 2541, 2542, and 2543 may also be adjusted. The adjustment of the orientations of optical axes 2521, 2522, and 2523 may be limited to be within a certain degree, such as ±5° from the initial orientations of optical axes 2521, 2522, and 2523.

Image sensors 2511, 2512, and 2513 may have the same or different resolution. In some embodiments, some or all of image sensors 2511, 2512, and 2513 may have a low resolution. Using low resolution image sensors may reduce the overall cost of wearable apparatus 110. When image sensors 2511, 2512, and 2513 have low resolutions, the low resolution image data captured by image sensors may be combined or aggregated to produce image data having a higher resolution than the individual resolution of any of image sensors 2511, 2512, and 2513. The processing device may be programmed to combine the low resolution image data to produce the higher resolution image data. In some embodiments, image sensors 2511, 2512, and 2513 are each configured to provide an image resolution less than about 1.5 Megapixels, less than 3 Megapixels, less than 5 Megapixels, less than 10 Megapixels, less than 15 Megapixels, and/or less than 20 Megapixels. In some embodiments, the 1.5 Megapixels and 3 Megapixels may be considered low resolutions and others may be considered high resolutions.

Wearable apparatus 110 may include at least one solar cell configured to provide power to at least one of image sensors 2511, 2512, and 2513. As shown in FIG. 25, wearable apparatus 110 may include two solar cells 2561 and 2562. Solar cells 2561 and 2562 may be configured to convert the solar energy into electrical energy, and provide the electrical energy to power one or more components of wearable apparatus 110, such as image sensors 2511, 2512, and 2513. Additional or fewer solar cells may be included. In some embodiments, the solar cells 2561 and 2562 may provide power to at least one of the image sensors 2511, 2512, and 2513 to power, e.g., the electronic circuit and/or the electrical motor configured for adjusting the orientations of the image sensors 2511, 2512, and 2513.

Solar cells 2561 and 2562 may be included in capturing unit 2505 that includes image sensors 2511, 2512, and 2513. As shown in FIG. 25, solar cells 2561 and 2562 may be interspersed between lenses 2531, 2532, and 2533. Although not shown, solar cells 2561 and 2562 may be disposed at other locations on the outer surface of housing 2510, such as locations that are not between lenses 2531, 2532, and 2533.

Wearable apparatus 110 may include a power unit 2570 electrically connected with solar cells 2561 and 2562. In some embodiments, power unit 2570 may be incorporated within base 2500 or housing 2510. In some embodiments, as shown in FIG. 25, power unit 2570 may be provided separately from base 2500 or housing 2510 and be electrically connected with other components of wearable apparatus 110. For example, power unit 2570 may be clipped to the belt of user 100. Power unit 2570 may include a battery 2571 configured for storing at least some energy generated by solar cells 2561 and 2562. Solar cells 2561 and 2562 may be electrically connected with a positive terminal 2572 and a negative terminal 2573 of battery 2571 through connection lines 2574, 2575, and a power control line 2576.

Solar cells 2561 and 2562 included in wearable apparatus 110 may provide at least some energy to power some components of wearable apparatus 110, such as image sensors 2511, 2512, and 2513. Power unit 2570 may be electrically connected with image sensors 2511, 2512, and 2513 through wires 2581, 2582, 2583, and power control line 2576 to supply power to image sensors 2511, 2512, and 2513. Using solar cells to supply at least a portion of the energy needed to power components of wearable apparatus 110 may reduce the cost associated with operating wearable apparatus 110, and may prolong the standby and operation time of wearable apparatus 110. Power unit 2570 may include a separate battery configured to provide additional energy for the operation of wearable apparatus 110.

Figure 26:
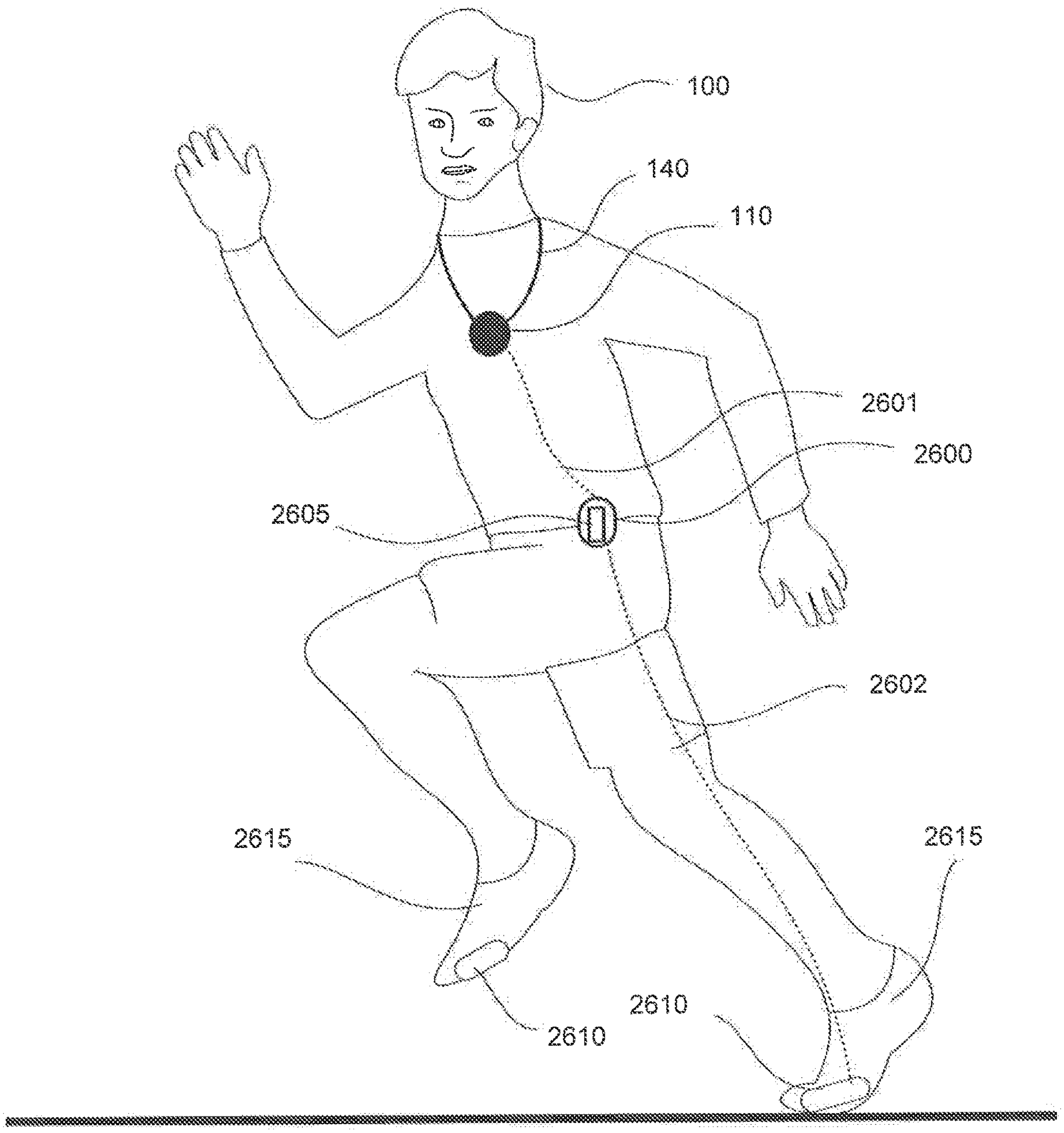
FIG. 26 is a schematic illustration of an example of the user wearing a wearable apparatus according to a disclosed embodiment.

FIG. 26 is a schematic illustration of an example of user 100 wearing wearable apparatus 110 according to certain disclosed embodiments. In this example, wearable apparatus 110 may include a power unit 2600 including an energy storage device 2605 (e.g., a battery, a capacitor, etc.) configured to store energy derived from movements of user 100. In some embodiments, power unit 2600 may be incorporated within housing 2510 or base 2500. In some embodiments, as shown in FIG. 26, power unit 2600 may be provided separately from housing 2510 or base 2500 and may be electrically connected with other components, such as image sensors 2511, 2512, and 2513 of wearable apparatus through one or more wires 2601.

User 100 may carry a body power harvesting device 2610 configured to convert body motion power into electrical energy. Body power harvesting device 2610 may be electrically connected with power unit 2600 through one or more wires 2602. Wires 2601 and 2602 may be at least partially incorporated with the clothes user 100 is wearing. When user 100 is walking, running, or jumping, the feet of user 100 may impact the ground with shoes 2615 and the impact may generate energy. In some embodiments, body power harvesting device 2610 and wearable apparatus 110 may be included together in a housing (e.g., included inside a shared physical casing).

An example body power harvesting device 2610 may include a piezoelectric device incorporated within or at the bottoms of shoes 2615 wont by user 100. The piezoelectric device may be configured to convert mechanical energy generated by the impact between the ground and shoes 2615 when user 100 is walking, running, or jumping, into electrical energy. The piezoelectric device includes piezoelectric materials that convert mechanical energy into electrical energy when the materials are bent and/or compressed.

Body power harvesting device 2610 may supply converted electrical energy to energy storage device 2605 for storage. The stored electrical energy may be used to power certain components of wearable apparatus 110, such as image sensors 2511, 2512, and 2513. Harvesting a portion of the body motion power into electric power and use that for powering certain components of wearable apparatus 110 may reduce the energy cost associated with operating wearable apparatus 110 and may prolong the standby and operation time of wearable apparatus 110. In some embodiments, other body power harvesting devices, such as one that converts body heat energy into electrical energy may also be included in or otherwise associated with wearable apparatus 110. Further, in some embodiments, two or more of wearable apparatus 110, body power harvesting device 2610, and energy store device 2605 may be included together in a housing (e.g., included inside a shared physical casing).

Figure 27:
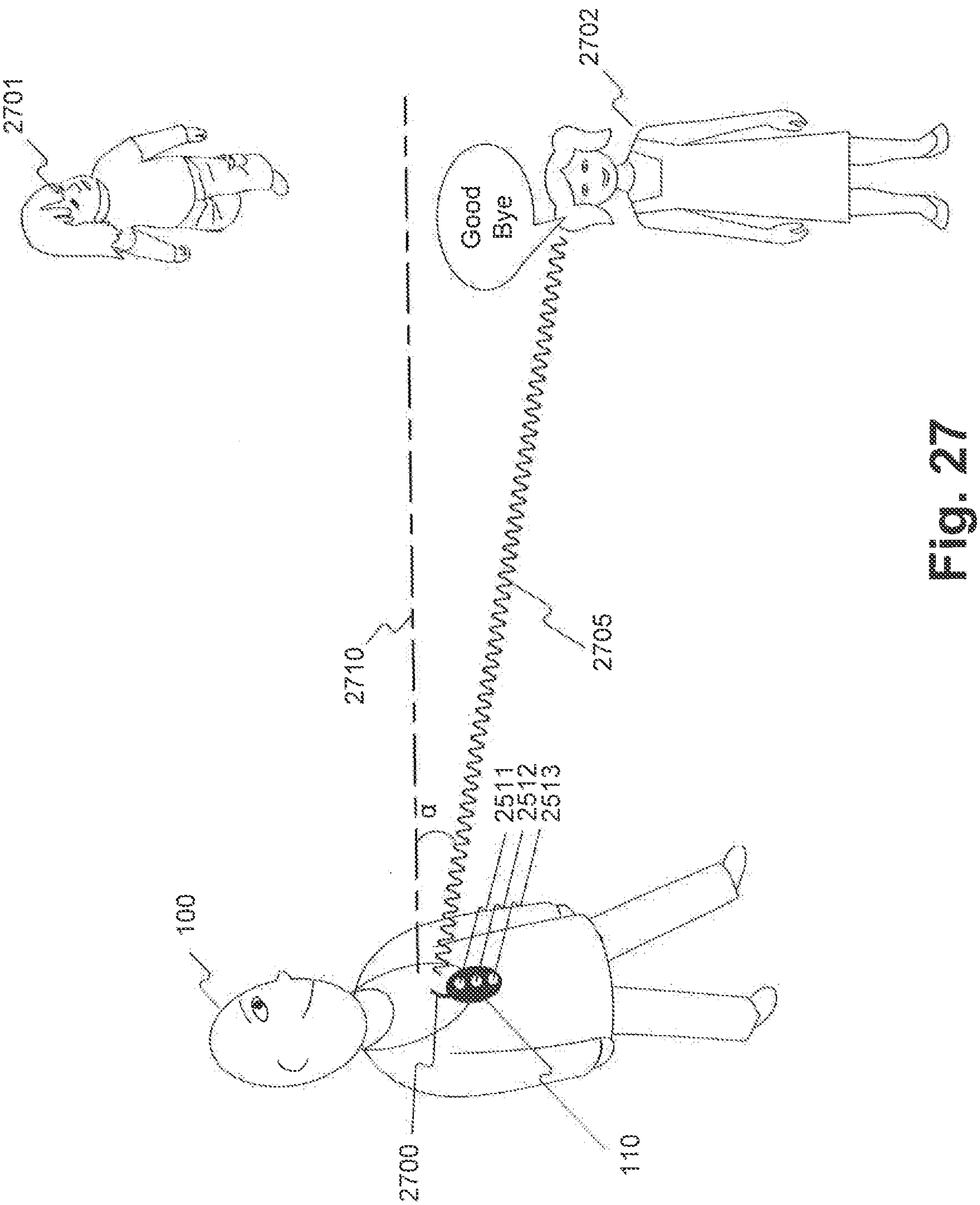
FIG. 27 shows an example environment including a wearable apparatus for capturing image data according to a disclosed embodiment.

FIG. 27 shows an example environment including wearable apparatus 110 for capturing image data. Wearable apparatus 110 may include a directional microphone 2700 configured to detect or receive sound (e.g., a sound wave). Directional microphone 2700 may be attached to base 2500 (shown in FIG. 26). Directional microphone 2700 may detect a sound (e.g., a voice), and provide the detected sound to sound database 2402 for storage. The processing device (e.g., processor 210, 210*a*, 210*b*, or 540) may read or retrieve the sound data from sound database 2402 and analyze the sound data to identify a direction of the sound wave received by microphone 2700. Based on the direction of the detected sound wave relative to microphone 2700 (and, in some embodiments, an orientation of the microphone 2700 relative to wearable apparatus 110), the processing device may selectively activate one or more image sensors 2511, 2512, and 2513 to capture image data of an object or environment in a field of view that includes the direction of sound wave.

As shown in FIG. 27, user 100 is faced with two persons, first person 2701 and second person 2702. Image sensors 2511, 2512, and 2513, visibly shown on wearable apparatus 110 for illustrative purposes, may be in an idle state, in which state one or more of image sensors 2511, 2512, and 2513 may be inactive (e.g., not capturing image data of the environment of user 100), or actively capturing image data of the environment, but not focusing on a particular object, such as persons 2701 and 2702. Additionally or alternatively, when image sensors 2511, 2512, and 2513 are in idle state, image sensors 2511, 2512, and 2513 may not be transmitting captured image data to image database 2401 for storage, or the processing device may not be analyzing any of image data captured by image sensor 2511, 2512, and 2513.

Directional microphone 2700 may detect a voice 2705 (or sound wave 2705), "Good Bye," uttered by second person 2702. The processing device may analyze the voice or sound wave 2705 received by directional microphone 2700 to identify a direction of sound wave 2705, as indicated by an angle $\alpha$ with respect to a horizontal direction 2710, or optical axis 2522 of image sensor 2512 shown in FIG. 26, which may align with the horizontal direction 2710 when the sound is detected (e.g., when the capturing unit 2505 is aligned such that optical axis 2522 of image sensor 2512 faces the middle of first and second persons 2701 and 2702 when the sound is detected). In some embodiments, microphone 2700 may point to a direction that is substantially aligned with horizontal direction 2710. In some embodiments, processing device may not identify the exact value of angle $\alpha$, but rather, may estimate a rough value of angle $\alpha$. Based on the identified direction (as indicated by angle $\alpha$), the processing device may selectively activate one or more of image sensors 2511, 2512, and 2513. For example, all of the image sensors 2511, 2512, and 2513 may be initially inactive (e.g., turned off). In some embodiments, the processing device may determine that the field of view associated with image sensor 2511 includes the identified direction. The processing device may select image sensor 2511 from the plurality of image sensors and activate it to capture image data of second person 2702 who is within the field of view associated with image sensor 2511.

In some embodiments, the processing device may determine that the fields of view associated with image sensors 2512 and 2513 include the identified direction, and may select image sensors 2512 and 2513 to capture image data of the environment (including second person 2702) within their respective fields of view. The processing device may activate or reorient image sensors 2512 and 2513 such that they may capture image data including second person 2702 who uttered the voice detected by directional microphone 2700. In some embodiments, the processing device may prioritize captured image data for processing or analysis based on the directional information. For example, the processing device may give a higher priority to processing image data received from image sensor 2513, whose optical axis 2523 may be aligned with the direction of sound wave 2705, and give a lower priority to processing image data received from image sensor 2511, whose field of view 2541 may not include the direction of sound wave 2705.

In some embodiments, image sensors 2511, 2512, and 2513 may be initially turned on, and may be capturing image data of the environment of user 100, but may not be focusing on a particular object, such as second person 2702. In some embodiments, image sensors 2511, 2512, and 2513 may be turned on but may not be transmitting the captured image data to image database 2401 for storage and for further analysis by the processing device. After identifying the direction of sound wave 2705 received by directional microphone 2700 and determining that the fields of view associated with image sensors 2512 and 2513 include the direction, the processing device may adjust image sensors 2512 and 2513 such that they capture image data including second person 2702 who uttered the voice 2705 and transmit the image data to image database 2401 for storage and for further analysis by the processing device.

In some embodiments, one or more image sensors 2511, 2512, and 2513 may capture image data of the environment of user 100 shown in FIG. 27. The processing device may analyze the image data captured by the one or more of image sensors 2511, 2512, and 2513 to identify a visual trigger, such as detecting a face of second person 2702. The processing device may then cause at least two of the image sensors 2511, 2512, and 2513 to operate simultaneously. For example, the processing device may select image sensors 2512 and 2513, and cause them to operate simultaneously to capture image data including second person 2702 within their fields of view. The processing device may analyze the image data captured by image sensors 2512 and 2513 to extract information regarding second person 2702, such as, the age and gender of second person 2702, a facial expression and/or gesture made by second person 2702, the clothes second person 2702 is wearing, the actions second person 2702 is performing, etc. The processing device may provide such information to user 100 through text, audio, and/or video message output through feedback outputting unit 230, or computing device 120.

In some embodiments, the image data captured by image sensors 2512 and 2513 regarding second person 2702 may have low resolutions (e.g., 1.0 Megapixels, 1.5 Megapixels, etc.). The processing device may combine or aggregate the low resolution image data to generate image data of a higher resolution than an individual resolution of each image sensor 2512 or 2513. The higher resolution image data may provide greater details about second person 2702. Thus, the processing device may extract more accurate information regarding second person 2702 from the higher resolution image data.

Figure 28:
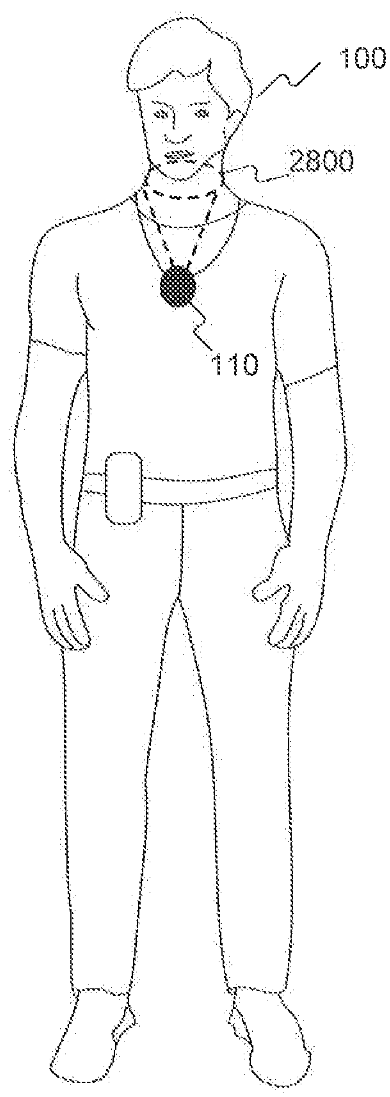
FIG. 28 is a schematic illustration of an example of the user wearing a wearable apparatus according to a disclosed embodiment.

FIG. 28 is a schematic illustration of an example of user 100 wearing wearable apparatus 110 according to a disclosed embodiment. At least one of image sensors 2511, 2512, and 2513 may capture image data of user 100, such as, for example, a portion of the head of user 100, including a chin 2800. The processing device may analyze the image data to identify chin 2800 of user 100. In some embodiments, the processing device may analyze a plurality of sequentially acquired image data to detect that chin 2800 is moving, indicating that user 100 may be speaking. The processing device may determine that user 100 is likely speaking with someone, such as second person 2702 (e.g., based on images acquired of person 2702). Based on detecting the movement of chin 2800, the processing device may activate at least one additional image sensor to capture image data of a portion of the environment in front of user 100. In some embodiment, based on detecting the movement of chin 2800, the processing device may activate microphone 2700 included in wearable apparatus 110 (as shown in FIG. 27) to detect or receive a voice from person 2702 who is speaking with user 100. As discussed above in connection with FIG. 27, the processing device may analyze the sound wave received by microphone 2700, and identify a direction of the sound wave. Based on the identified direction, the processing device may select one or more additional image sensors (such as sensor 2512 and/or 2513) and cause them to operate simultaneously to capture image data in the identified direction, as discussed above in connection with FIG. 27. The one or more additional image sensors may be selected based on the identified direction of the sound and their optical axes and/or fields of view. For example, the processing device may select and activate image sensor 2513 that has an optical axis proximate the direction of sound. By activating microphone 2700 based on detection of a moving chin 2800, microphone 2700 may be maintained in an idle state (e.g., microphone 2700 is powered oft) prior to detection of the moving chin to save energy.

In some embodiments, the processing device may analyze an image including chin 2800 of user 100, and determine or estimate a turning direction of chin 2800 with respect to the direction the chest of user 100 is facing, or with respect to a horizontal direction, such as horizontal direction 2710 shown in FIG. 27. The turning direction may be estimated, for example, about 10° to the left of user 100, or about 15° to the right of user 100. Based on the estimated turning direction of chin 2800, the processing device may select one or more image sensors that have optical axes at least pointing to that turning direction or approximate to that turning direction (e.g., within 1 °, 2°, 3°, etc.).

In some embodiments, the processing device may determine which image sensor to activate for capturing image data based on a combination of the estimated turning direction of chin 2800 and the estimated direction of sound 2705. For example, if the estimated turning direction of chin 2800 is different from the estimated direction of sound 2705, the processing device may activate both image sensors having optical axes pointing to (or approximate to) the estimated turning direction and image sensors having optical axes pointing (or approximate to) to the estimated direction of sound 2705.

In some embodiments, the processing device may determine that second person 2702 is speaking based on one or a combination of a determined orientation of the second person 2702 relative to first person 2701 (e.g., second person 2702 appearing in captured image data as facing first person 2701), a determination from captured image data that the mouth of second person 2702 is opening and closing, and detection of speech by microphone 2700.

Figure 29:
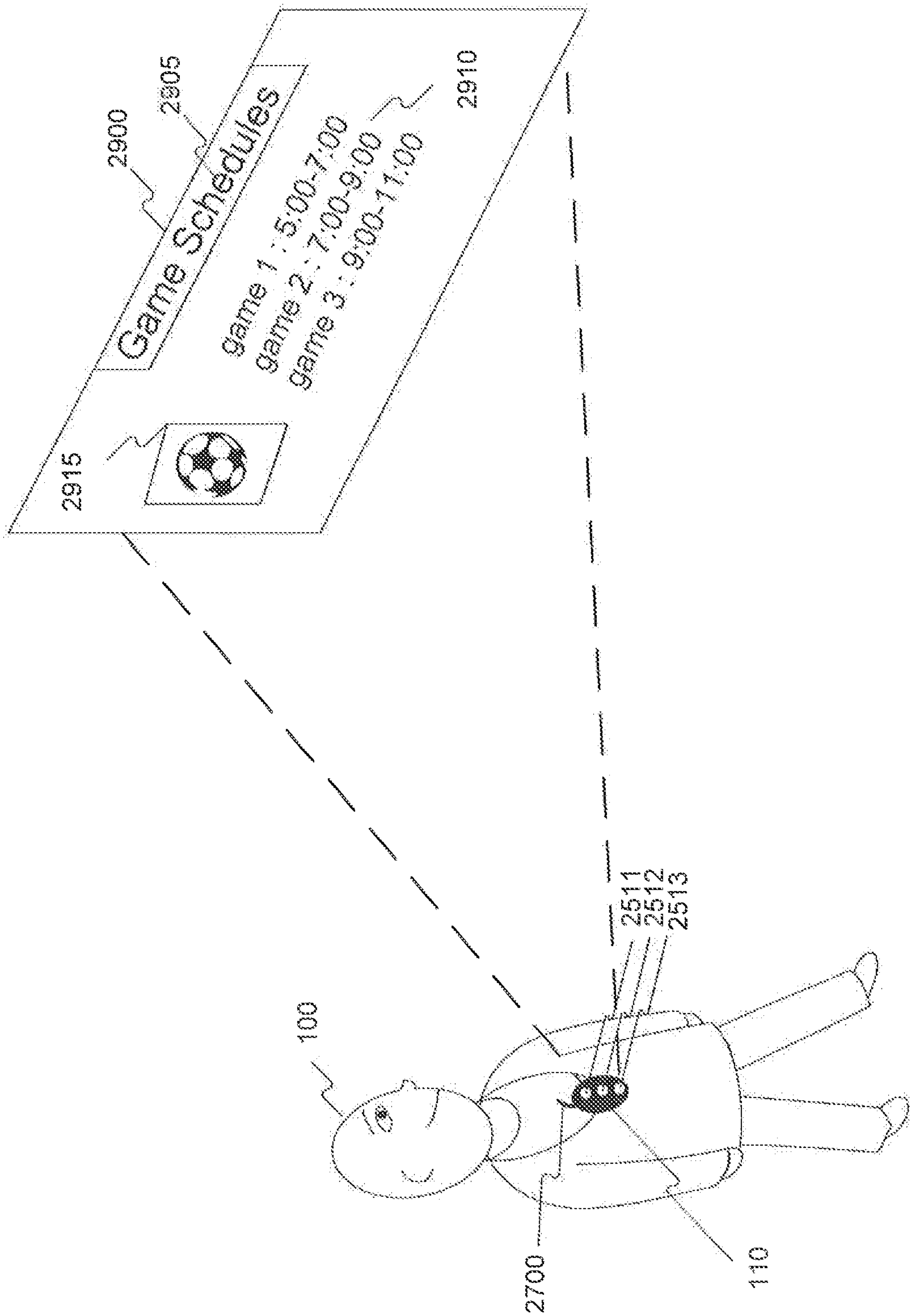
FIG. 29 shows an example environment including a wearable apparatus for capturing image data according to a disclosed embodiment.

FIG. 29 shows an example environment including wearable apparatus 110 for capturing image data. One or more image sensors 2511, 2512, and 2513 (e.g., image sensor 2513) may capture image data of an environment of user 100, which may include an advertisement board 2900, as shown in FIG. 29. The advertisement board 2900 may include first text 2905 "Game Schedules," second text 2910 listing detailed game schedules, and a logo 2915, which may be, for example, a team logo (e.g., a soccer team logo). The processing device may analyze the image data captured by image sensor 2513 to identify a visual trigger. The visual trigger may include one or more of detection of text and detection of a logo.

In the example shown in FIG. 29, the processing device may identify first and second text 2905 and 2910, and logo 2915. The processing device may determine, based on the identified text and logo that the advertisement board 2900 shows game schedules for a soccer game team. The processing device may cause at least two of image sensors 2511, 2512, and 2513 to operate simultaneously. For example, the processing device may cause image sensors 2511 and 2512 to operate simultaneously to capture image data of advertisement board 2900 with better focuses. The processing device may combine or aggregate the image data captured by image sensors 2511 and 2512 to generate image data of a higher resolution than the individual resolution of each of image sensors 2511 and 2512. Other information included in advertisement board 2900 (e.g., other texts, graphics, or logos), which may not be included in the initial image data captured by image sensor 2513, may be extracted from the higher resolution image data. The processing device may provide extracted information to user 100 through a text, audio, and/or video message output through feedback outputting unit 230, or computing device 120.

Figure 30:
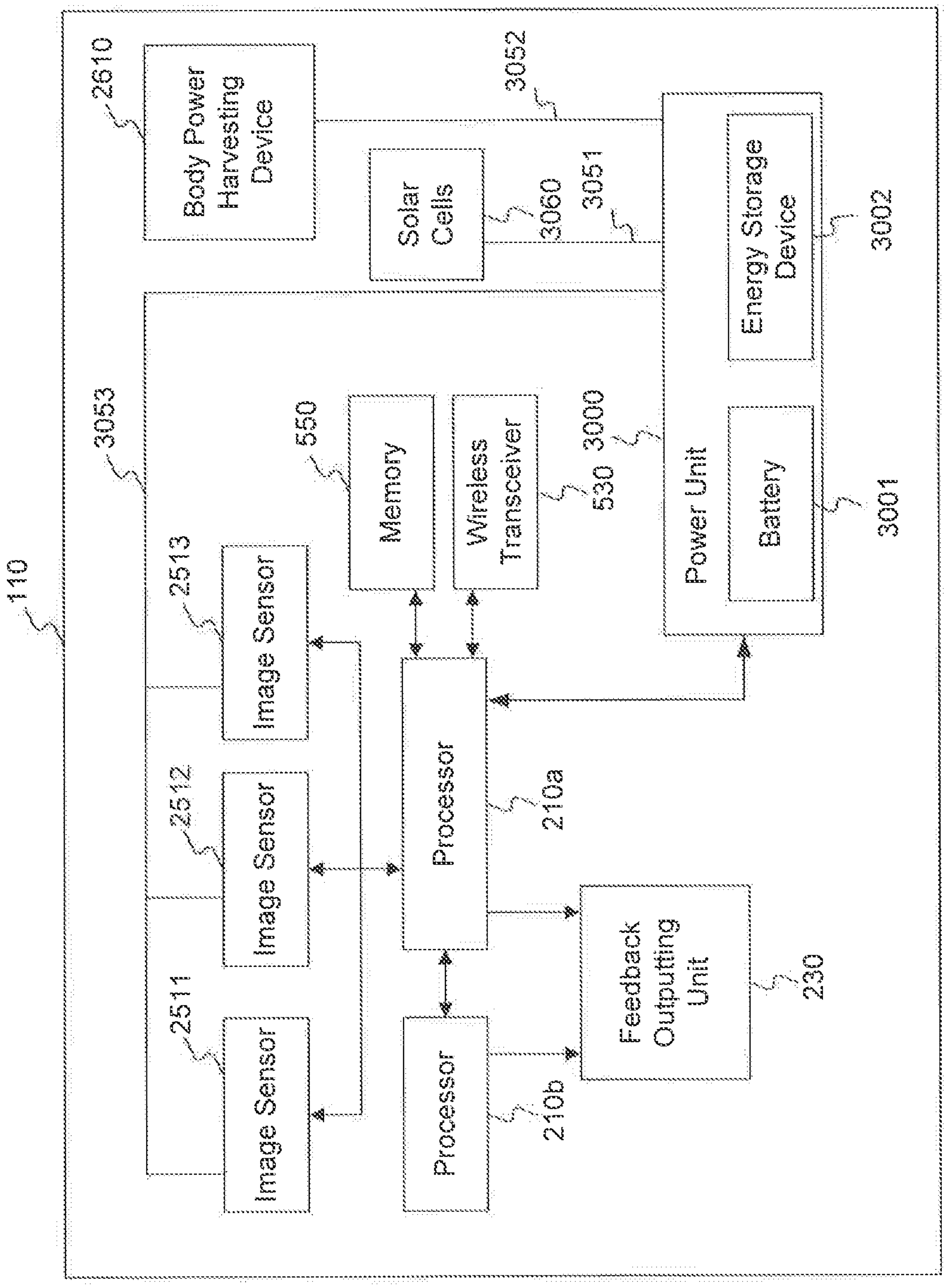
FIG. 30 is a block diagram illustrating an example of the components of a wearable apparatus according to a disclosed embodiment.

FIG. 30 is a block diagram illustrating an example of the components of a wearable apparatus according to a disclosed embodiment. As shown in FIG. 30, wearable apparatus 110 may include components similar to those depicted in FIGS. 10-12. Although not all of the components of wearable apparatus 110 shown in FIGS. 10-12 are shown in FIG. 30, it is understood that wearable apparatus 110 shown in FIG. 30 may include any components of wearable apparatus 110 shown in FIGS. 10-12. Similarly, any components of wearable apparatus 110 shown in FIG. 30 may be included in any embodiment of wearable apparatus 110 shown in FIGS. 10-12. Descriptions of processor 210*a* and 210*b*, feedback outputting unit 230, memory 550, and wireless transceiver 530 are similar to those provide above, and thus are not repeated. As shown in FIG. 30, wearable apparatus includes a plurality of image sensors, such as, three image sensors 2511, 2512, and 2513. Additional or fewer image sensors may also be included.

Components or features of wearable apparatus 110 shown in different examples in FIGS. 25-27 may be used together in any combination in wearable apparatus 110. For example, solar cells 2561 and 2562 and power unit 2570 shown in FIG. 25 may be used in combination with body power harvesting device 2610 shown in FIG. 26 (in such a combination, power unit 2570 may be combined with power unit 2600 or may be separately provided). As another example, solar cells 2561 and 2562 and power unit 2570 shown in FIG. 25 may be used in combination with body power harvesting device 2610 shown in FIG. 26, and microphone 2700 shown in FIG. 27.

As shown in FIG. 30, wearable apparatus 110 may include a power unit 3000, which may be power unit 2570 and/or power unit 2600. Power unit 3000 may include a battery 3001, which may be similar to battery 2571 and battery 2605. Additionally or alternatively, power unit 3000 may include an energy storage device 3002. Energy storage device 3002 may or may not be a battery. For example, energy storage device 3002 may be a capacitor. Wearable apparatus 110 may include solar cells 3000, which may include solar cells 2561 and 2562. Wearable apparatus 110 may include body power harvesting device 2610. Solar cells 3060 and body power harvesting device 2610 may be electrically connected with power unit 3000 through, for example, wires 3051 and 3052. Power unit 3000 may be electrically connected with image sensors 2511, 2512, and 2513 through, for example, a wire 3053.

Figure 31:
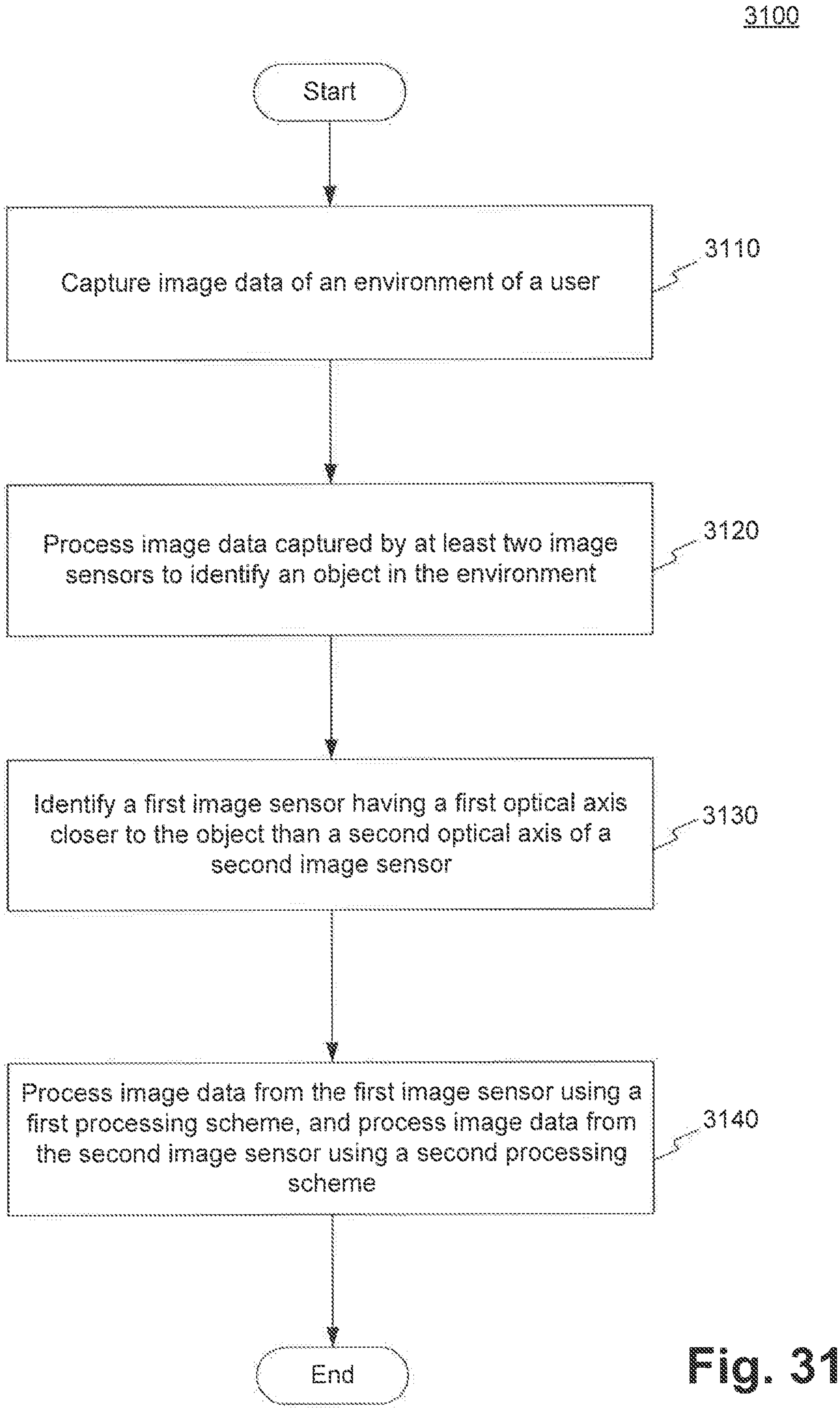
FIG. 31 is a flowchart showing an example method for capturing and processing image data according to a disclosed embodiment.

FIG. 31 is a flowchart showing an example method 3100 for capturing and processing image data according to a disclosed embodiment. Method 3100 may be executed by various devices included in wearable apparatus 110, such as image sensor 220, 220*a*, and/or 220*b*, and at least one processing device (e.g., processor 210 and/or processor 540). Method 3100 may include capturing image data of an environment of a user (e.g., user 100) who wears wearable apparatus 110 (step 3110). For example, one or more image sensors 2511, 2512, and 2513 may capture image data of the environment of user 100, as shown in FIGS. 27-29. Method 3100 may include processing image data captured by at least two image sensors to identify an object in the environment (step 3120). For example, the processing device may process image data captured by image sensors 2511 and 2513 to identify second person 2702.

Method 3100 may include identifying a first image sensor from among the at least two image sensors, the first image sensor having a first optical axis closer to the object than a second optical axis of a second image sensor from among the at least two image sensors (step 3130). For example, the processing device may compare the position of second person 2702 appearing in the images respectively captured by image sensors 2511 and 2513, and determine whether second person 2702 is closer to optical axis 2521 associated with image sensor 2511, or is closer to optical axis 2523 associated with image sensor 2513. In the example shown in FIG. 27, the processing device may determine that second person 2702 is closer to optical axis 2523 associated with image sensor 2513 than optical axis 2521 associated with image sensor 2511.

After identifying the first image sensor (e.g., image sensor 2513), method 3100 may also include processing image data from the first image sensor using a first processing scheme, and processing image data from the second image sensor using a second processing scheme (step 3140). A processing scheme refers to a combination of settings, parameters, and steps for processing image data. For example, the first processing scheme may be continuing to process image data received from an image sensor. The second processing scheme may be discontinuing the processing of image data received from an image sensor. The first and second processing schemes may include an image resolution, a shutter speed, an aperture, a time period to capture images and/or video before discontinuing capturing images and/or video, etc. The first and second processing schemes may also include settings related to image processing, such as desired image sizes, image processing speed, compression ratios, color adjustment, etc. For example, in the example shown in FIG. 27, after identifying that image sensor 2513, which has optical axis 2523 closer to the object, i.e., second person 2702, than optical axis 2521 of image sensor 2511, the processing device may determine whether to continue to process the image data from image sensor 2513, and discontinue processing image data from image sensor 2511.

In some embodiments, the processing device may determine which image sensor has captured image data including the identified object (e.g., second person 2702), and may continue processing image data from the image sensor that has captured image data including the identified object, and discontinue processing image data from other image sensors that have not captured image data including the identified object. For example, if the processing device identifies that image sensor 2513 has captured image data of second person 2702, and image sensor 2511 has not captured image data of second person 2702, the processing device may continue to process image data captured by image sensor 2513, and discontinue processing of image data captured by image sensor 2511.

In some embodiments, the processing device may also determine which image sensor has an optical axis proximate to second person 2702, and which image sensor has an optical axis distal from second person 2702. For example, the processing device may determine that image sensor 2513 has an optical axis proximate to second person 2702, and image sensor 2511 has an optical axis distal from second person 2702. The processing device may continue to process image data captured by image sensor 2513 that has an optical axis proximate to second person 2702, and may discontinue processing image data captured by image sensor 2511 that has an optical axis distal from second person 2702.

In some embodiments, the processing device may determine which optical axis of the image sensors is closer to the object. For example, the processing device may determine that the optical axis of image sensor 2513 is closer to second person 2702 than the optical axis of image sensor 2511. The processing device may continue processing image data captured by image sensor 2513, and discontinue processing image data captured by image sensor 2511. In some embodiments, the processing device may continue processing image data captured by a first image sensor (e.g., the image sensor having an optical axis closest to an object) and discontinue processing image data captured by a plurality of other image sensors (e.g., image sensors having optical axes farther from the object as compared to the first image sensor).

Method 3100 may further include other steps and processes not shown in the flowchart of FIG. 31. For example, method 3100 may further include resuming processing image data captured from the second image sensor after a predetermined time period has elapsed. After discontinuing processing of image data captured by image sensor 2511, the processing device may determine whether a predetermined time period, such as, for example, 1 minute, 10 minutes, 1 hour, etc., has elapsed. If the predetermined time period has elapsed, the processing device may resume processing of image data captured by image sensor 2511.

In some embodiments, method 3100 may further include discontinuing processing of image data from the first image sensor when the object is no longer in the field of view of the first image sensor, when the object is distal from the optical axis of the first image sensor, or when the object is no longer closer to the optical axis of the first image sensor than to the optical axis of the second image sensor. For example, as discussed above in step 3130, image sensor 2513 was identified as having captured image data of second person 2702, having an optical axis proximate second person 2702, or having an optical axis closer to second person 2702 than the optical axis of image sensor 2511, and the processing device continued to process image data captured by image sensor 2513. If the processing device detects, from image data captured by image sensor 2513, that second person 2702 is no longer in the field of view of image sensor 2513, is distal from the optical axis of image sensor 2513, or is no longer closer to second person 2702 than the optical axis of image sensor 2511, the processing device may discontinue processing of the image data from the image sensor 2513.

In some embodiments, method 3100 may further include causing the second image sensor to discontinue capturing image data for at least a portion of a time period during which image data from the first image sensor is being processed. For example, as discussed above, at step 3140, the processing device discontinued processing of the image data from image sensor 2511. The processing device may further cause image sensor 2511 to discontinue capturing image data for at least a portion of a time period during which image data from image sensor 2513 is being processed. The image data from image sensor 2513 may be processed for a time period of 30 minutes, and the processing device may cause image sensor 2511 to discontinue capturing image data for at least the first 15 minutes of the 30-minute time period.

Wearable apparatus 110 may be configured to capture image data of an environment of user 100 using at least one image sensor, which may be a wide viewing angle image sensor. The field of view of the wide viewing angle image sensor may include at least a portion of a chin of user 100. The field of view of the image sensor may be more than 100°, for example, more than 180°, or more than 3000. The image sensor may be included in a capturing unit. The image sensor may be associated with a corresponding lens located on the capturing unit.

Wearable apparatus 110 may include a directional microphone configured to detect or receive a sound or sound wave. Wearable apparatus 110 may further include at least one processing device programmed to analyze the detected sound wave and identify a direction of the sound wave received by the microphone. The processing device may also be programmed to identify a portion of at least one image captured by the at least one image sensor based on the direction of the sound wave received by the microphone. The processing device may also be programmed to store the identified portion of the at least one image in, for example, a storage device or image database. The processing device may be further programmed to identify the chin of user 100 in at least one image captured by the at least one image sensor. For example, when the processing device determines a movement of the chin of user 100 from at least two sequentially captured images, the processing device may determine that the user is speaking, and may activate the microphone.

Wearable apparatus 110 may include one or more energy devices configured to provide power to wearable apparatus 110 and save energy cost associated with operating wearable apparatus 110. For example, wearable apparatus 110 may include at least one solar cell configured to convert the solar energy into electrical energy, which may be used to power some components of wearable apparatus 110, such as the image sensor. Using solar cells to provide at least a portion of the energy needed to operate wearable apparatus 110 may help reduce the cost associated with operating wearable apparatus 110, and prolong the standby and operation time of wearable apparatus 110. In some embodiments, a plurality of solar cells may be included in the capturing unit proximate the lens. Wearable apparatus 110 may include a power unit that includes a battery for storing at least some energy generated by at least one solar cell.

In some embodiments, wearable apparatus 110 may be associated with a body power harvesting device, such as one converting the body motion or mechanical energy into electrical energy. Wearable apparatus 110 may further include an energy storage device configured to store energy derived from movements of user 100. The converted electrical energy may be used to power certain components of wearable apparatus 110, such as the image sensor. This may reduce the energy cost associated with operating wearable apparatus 110 and prolong the standby and operation time of wearable apparatus 110.

Figure 32:
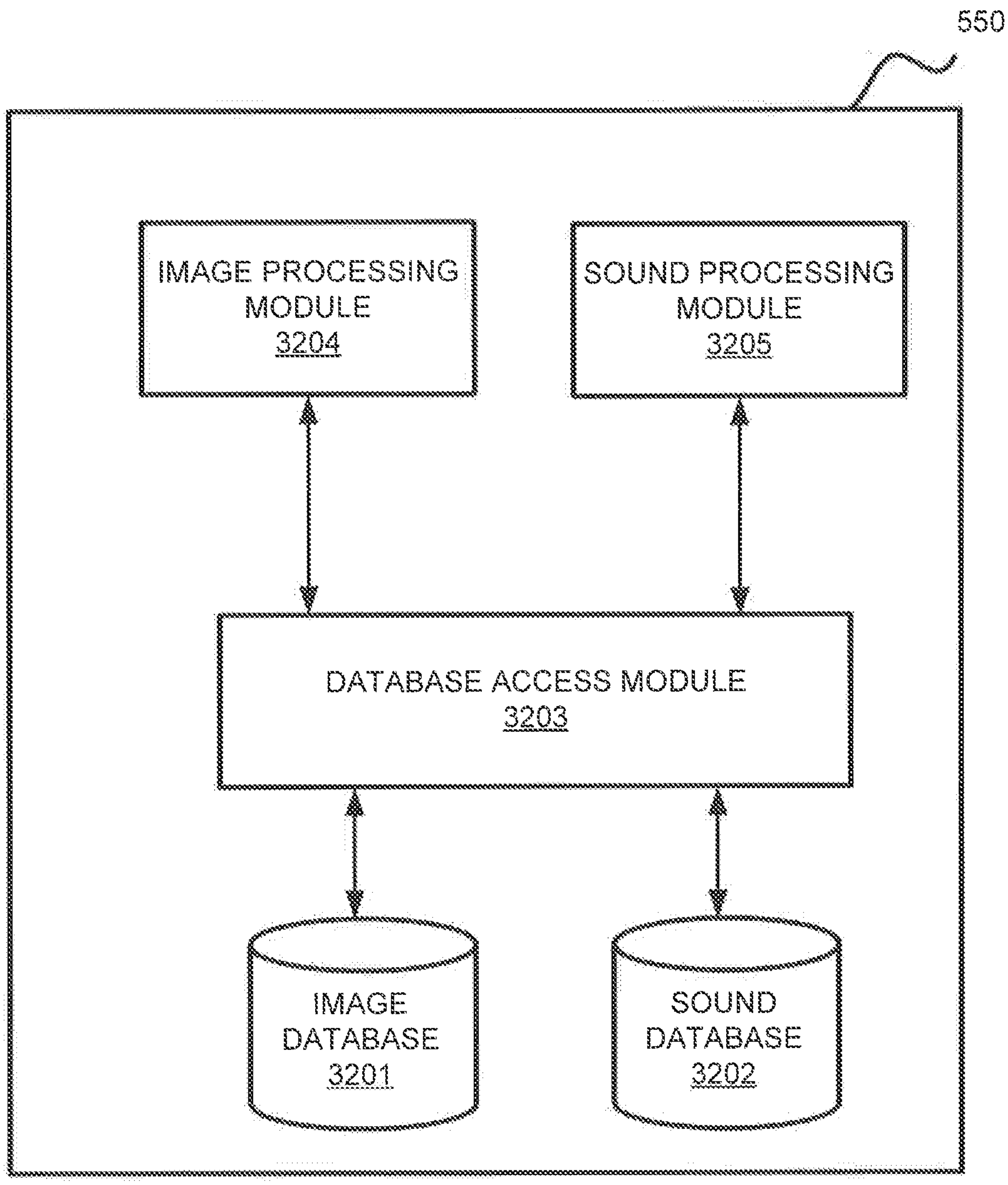
FIG. 32 is a diagram illustrating an example memory storing a plurality of modules according to a disclosed embodiment.

FIG. 32 is a block diagram illustrating a memory (e.g., memory 550, 550*a*, and/or 550*b*) according to the disclosed embodiments. The memory may include one or more modules, or sets of instructions, for performing methods consistent with the disclosed embodiments. For example, the memory may include instructions for at least one processing device to analyze image captured by the image sensor and/or sound detected by the microphone. In some embodiments, the processing device may be included in wearable apparatus 110. For example, the processing device may be processor 210, 210*a*, and/or 210*b* shown in FIGS. 10 and 11. The processing device may process the image data captured by the image sensor in near real time, as the image data are being captured by the image sensor. In some embodiments, the processing device may be a processor that is separately located from wearable apparatus 110. The processing device may be a processor that is remotely connected with wearable apparatus 110 through network 240, which may be a wired or wireless network, or through any other connectivity means, such as infrared, Bluetooth, near field communication (NFC), etc. For example, the processing device may be processor 540 included in computing device 120, which may be connected with wearable apparatus 110 through a wired or wireless connection, such as through a cable, Bluetooth, WiFi, infrared, or near field communication (NFC). In some embodiments, the processing device may be a processor included in server 250, which may be wirelessly connected with wearable apparatus 110 through network 240. In some embodiments, the processing device may be a cloud computing processor remotely and wirelessly connected with wearable apparatus 110 through network 240. Wearable apparatus 110 may transmit captured image data to the processing device in near real time, and the processing device may process the captured image data and provide results of processing to wearable apparatus 110 in near real time.

In the embodiment shown in FIG. 32, memory 550 comprises an image database 3201, a sound database 3202, a database access module 3203, an image processing module 3204, and a sound processing module 3205, for performing the functionality of the disclosed methods. Additional or fewer databases and/or modules may be included in memory 550. The modules and databases shown in FIG. 32 are by example only, and a processor in the disclosed embodiments may operate according to any suitable process.

In the embodiment shown in FIG. 32, memory 550 is configured to store an image database 3201. Image database 3201 may be configured to store various images, such as images captured by an image sensor (e.g., image sensor 220, 220*a*, and/or 220*b*). Image database 3201 may also be configured to store data other than image data, such as textual data, audio data, video data, etc. Alternatively or additionally, memory 550 may include a sound database 3202 configured to store audio data, such as sound detected by the microphone.

As shown in FIG. 32, memory 550 is also configured to store a database access module 3203. Database access module 3203 may be configured to access image database 3201 and sound database 3202, for example, to retrieve previously stored image data captured by the image sensor for analysis. In some embodiments, database access module 3203 may be configured to retrieve previously stored sound data that may be received by a microphone. Database access module 3203 may also be configured to store image data into image database 3201 and store sound data into sound database 3202.

In the embodiment shown in FIG. 32, memory 550 is configured to store an image processing module 3204. Image processing module 3204 may be configured to perform various analyses and processes of image data captured by the image sensor to identify an object. Memory 550 is configured to store a sound processing module 3205. Sound processing module 3205 may be configured to perform various analyses and processes of sound data, such as sound data recorded by a microphone. Sound processing module 3205 may determine a direction associated with a sound, for example, where the sound is coming from. The direction information determined from the sound data may be used by sound processing module 3205 and/or image processing module 3204 to identify a portion of at least one image captured by the at least one image sensor. Database access module 3203 may store the identified portion of the at least one image into image database 3201.

Figure 33:
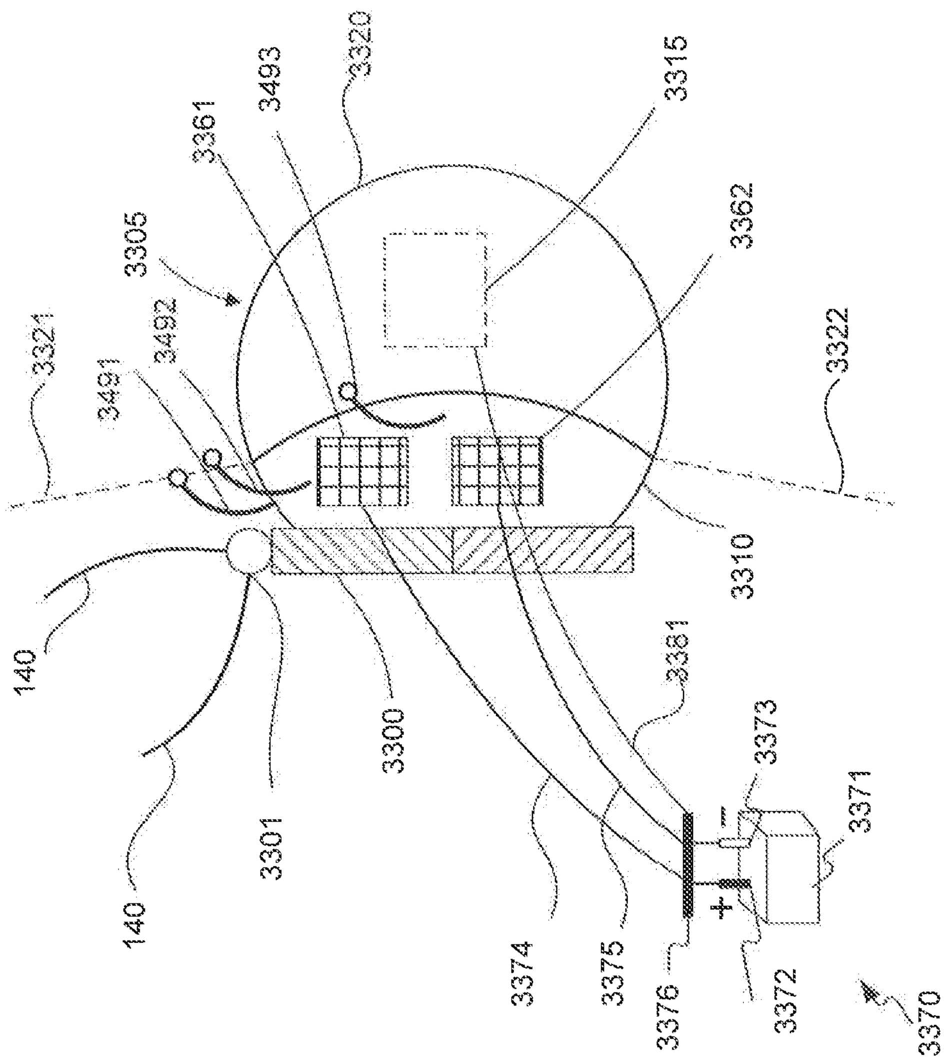
FIG. 33 is a schematic illustration of a side view of an example wearable apparatus having a wide viewing angle image sensor for capturing image data according to a disclosed embodiment.

FIG. 33 is a schematic illustration of a side view of an example wearable apparatus 110 having an image sensor for capturing image data of an environment of user 100, consistent with the disclosed embodiments. Wearable apparatus 110 may be worn by user 100 in various ways through an attachment mechanism. The attachment mechanism may include any suitable means. For example, as shown in FIG. 1B, wearable apparatus 110 may be carried on necklace 140 worn by user 100. As shown in FIG. 3A, wearable apparatus 110 may be attached to eye glasses 130 through support 310 and screw 320. As shown in FIG. 4A, wearable apparatus 110 may include a hanging ring 410 for attaching to, for example, necklace 140. As shown in FIG. 4B, wearable apparatus 110 may include a clip 420 for attaching to the belt or cloth of user 100. FIG. 33 shows that wearable apparatus 110 includes a base 3300 to which necklace 140 may be attached through a fastening device 3301, which may be similar to ring 410 disclosed in FIG. 4A. In some embodiments, wearable apparatus 110 may be worn on user's head (e.g., clipped to a cap, hat, or helmet worn by user 100) or user's arm (e.g., secured via an arm band).

Wearable apparatus 110 may include an image capturing unit 3305 (or a capturing unit 3305) mounted on base 3300. Any suitable mounting means, such as glue, screws, bolts and nuts, clamping, etc., may be used for mounting capturing unit 3305 onto base 3300. Image capturing unit 3305 may include a housing 3310 having a semi-sphere, half sphere, or sphere shape. Housing 3310 may include other three-dimensional shapes, such as cubic shape, cylindrical shape, etc.

Wearable apparatus 110 may include an image sensor 3315. Image sensor 3315 may be a wide viewing angle image sensor 3315 (also referred as wide angle image sensor 3315), which may be associated with a field of view indicated by the dashed lines 3321 and 3322. The angle formed by the dashed lines 3321 and 3322, e.g., from dashed line 3321 to dashed line 3322 in a clockwise direction, indicates the angle of the field of view. The angle may be more than 100°, such as more than 180°, or more than 300°. In some embodiments, wearable apparatus 110 may include a plurality of image sensors, and at least one of the plurality of image sensors a wide angle image sensor. Suitable number of image sensors may be included, such as two, three, four, etc. In some embodiments, wide angle image sensor 3315 may include a plurality of wide angle image sensors distributed in the capturing unit 3305. Image sensor 3315 may be similar to image sensors 220, 220*a*, and 220*b* discussed above and depicted in, e.g., FIGS. 5, 10, and 11. Image sensor 3315 may be enclosed within housing 3310 of capturing unit 3305. Image sensor 3315 may be associated with a corresponding lens 3320. Lens 3320 may be a single lens, or may include a plurality of small lenses. Lens 3320 may be at least partially disposed on housing 3310, or may form a part of housing 3310 to enclose image sensor 3315.

Wearable apparatus 110 may include at least one solar cell configured to provide power to some components of wearable apparatus 110, such as image sensor 3315. As shown in FIG. 33, wearable apparatus 110 may include two solar cells 3361 and 3362. Solar cells 3361 and 3362 may be configured to convert solar energy into electrical energy, and provide the electrical energy to power one or more components of wearable apparatus 110, such as image sensor 3315. Additional or fewer solar cells may be included.

Solar cells 3361 and 3362 may be included in capturing unit 3305 that includes image sensor 3315. As shown in FIG. 33, solar cells 3361 and 3362 may be disposed on an outer surface of housing 3310 proximate to lens 3320. Although not shown, solar cells 3361 and 3362 may be disposed at other locations on the outer surface of housing 3310. For example, one solar cell 3361 may be disposed on the opposite side of housing 3310 with respect to solar cell 3362. In some embodiments, additional solar cells may be on the opposite side of housing 3310. In some embodiments, a single solar cell may cover a substantial portion of the outer surface of housing 3310.

Wearable apparatus 110 may include a power unit 3370 electrically connected with solar cells 3361 and 3362. In some embodiments, power unit 3370 may be incorporated within base 3300 or housing 3310. In some embodiments, as shown in FIG. 33, power unit 3370 may be provided separately from base 3300 or housing 3310 and be electrically connected with other components of wearable apparatus 110. For example, power unit 3370 may be clipped to the belt of user 100. Power unit 3370 may include a battery 3371 configured for storing at least some energy generated by solar cells 3361 and 3362. Solar cells 3361 and 3362 may be electrically connected with a positive terminal 3372 and a negative terminal 3373 of battery 3371 through connection lines 3374, 3375, and a power control line 3376.

Solar cells 3361 and 3362 included in wearable apparatus 110 may provide at least some energy to power some components of wearable apparatus 110, such as image sensor 3315. Power unit 3370 may be electrically connected with image sensor 3315 through a wire 3381 and power control line 3376 to supply power to image sensor 3315. Using solar cells to supply at least a portion of the energy needed to power components of wearable apparatus 110 may reduce the cost associated with operating wearable apparatus 110, and may prolong the standby and operation time of wearable apparatus 110. Power unit 3370 may include a separate battery configured to provide additional energy for the operation of wearable apparatus 110.

Wearable apparatus 110 may include two or more directional microphones configured to detect or receive sound (e.g., a sound wave). In the example shown in FIG. 33, wearable apparatus 110 includes three microphones 3491, 3492, and 3493. Additional or fewer microphones may be included. Microphones 3491-3493 may be attached to base 3300 and/or housing 3310, or may be embedded within base 3300 and/or housing 3310. Microphones 3491-3493 may detect a sound (e.g., a voice), and provide the detected sound to sound database 3202 for storage. The processing device (e.g., processor 210, 210*a*, 210*b*, or 540) may read or retrieve the sound data from the sound database 3202 and analyze the sound data to identify a direction of the sound received by microphones 3491-3493. Based on the direction of the detected sound, the processing device may identify a portion of at least one image captured by image sensor 3315, and process and/or store the identified portion of the at least one image in image database 3201.

Figure 34:
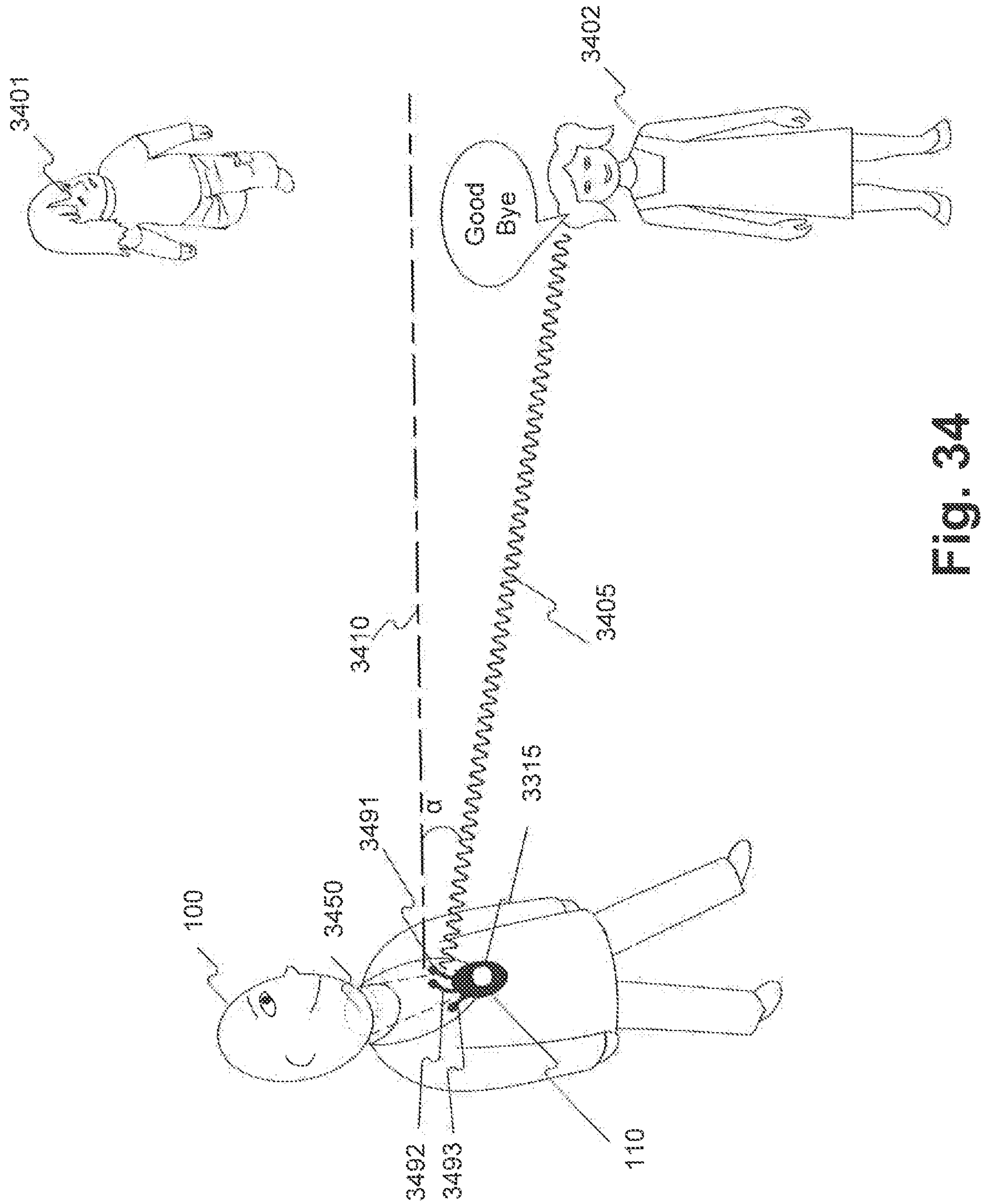
FIG. 34 shows an example environment including a wearable apparatus for capturing image data according to a disclosed embodiment.

FIG. 34 shows an example environment including a wearable apparatus for capturing image data according to a disclosed embodiment. As shown in FIG. 34, first person 3401 and second person 3402 are facing user 100. Image sensor 3315, visibly shown on wearable apparatus 110 for illustrative purposes, may capture an image of the environment of user 100, including persons 3401 and 3402. Image sensor 3315 may also capture image data of user 100, such as, for example, a portion of a chin 3450. The processing device may analyze the image data to identify chin 3450 of user 100. In some embodiments, the processing device may analyze a plurality of sequentially acquired image data to detect that chin 3450 is moving. The processing device may further determine, based on a moving chin, that user 100 is speaking with someone, eating, or turning his or her head.

The movement and/or location of chin 3450 in the captured image may be used as a trigger for the processing device to take actions in controlling and/or selecting microphones 3491-3493 and processing captured image data. For example, when the processing device determines that user 100 is eating based on the movement of chin 3450, the processing device may turn off one or more microphones 3491-3493 or may deactivate one or more microphones 3491-3493 so that one or more microphones are in an idle state. When the processing device determines that chin 3450 is turning (which may indicate that the head of user 100 is turning), the processing device may further determine an estimated direction chin 3450 (and head of user 100) is turning to or facing. The processing device may determine, based on the estimated direction chin 3450 or the head is facing, an area of an image to analyze. For example, when the processing device determines that chin 3450 is facing forward in the direction the chest of user 100 is facing, the processing device may determine that an area in the middle of the captured image should be analyzed. As another example, when the processing device determines that chin 3450 (and head of user 100) appears to face to the left of user 100, the processing device may estimate a direction chin 3450 or the head is facing. The processing device may select an area in the captured image in the estimated direction to the left of user 100, and may analyze the selected area. In some embodiments, the processing device may discard one or more portions of the image outside of the selected area. Analyzing a selected area of interest rather than the entire image captured by wide viewing angle image sensor 3315 may reduce the processing time, such as when near real time processing of image data is performed.

In some embodiments, the detection of moving chin 3450 may indicate that user 100 is speaking with someone, and the processing device may selectively activate one or more microphones 3491-3493, which may be in an idle state. In the idle state, microphones 3491-3493 may either be turned off (e.g., powered off), or turned on but not recording sound (e.g., receiving sound but not transmitting sound to sound database 3202 for storage).

Figure 35:
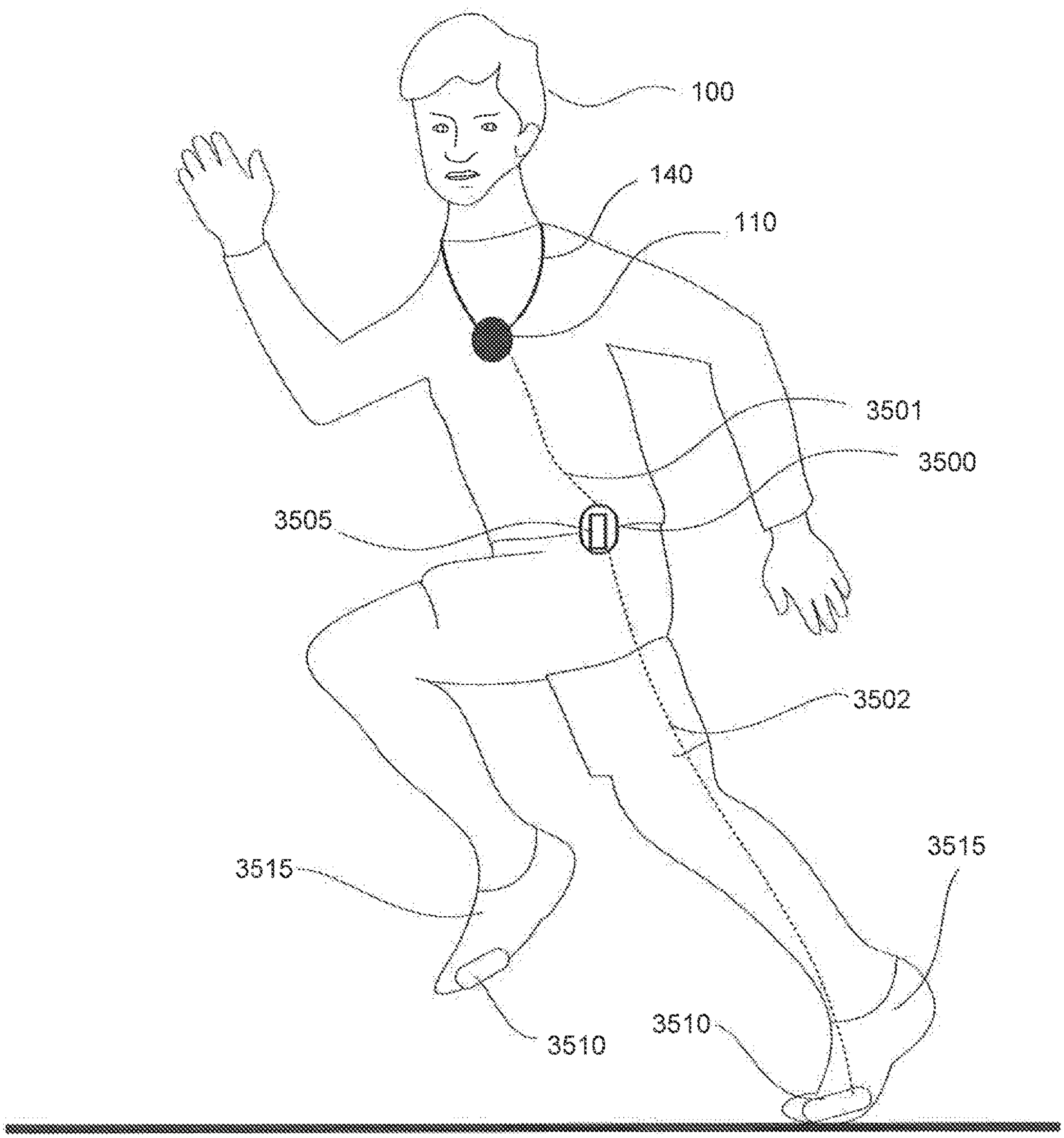
FIG. 35 is a schematic illustration of an example of a user wearing a wearable apparatus according to a disclosed embodiment.

One or more microphones 3491-3493 may detect a sound wave 3405 (or voice 3405), "Good Bye," uttered by second person 3402. The processing device may analyze the voice or sound wave 3405 received by one or more microphone 3491-3493 to identify a direction of sound wave 3405, as indicated in FIG. 35 by an angle $\alpha$ with respect to a horizontal line 3410. In some embodiments, processing device may not identify the exact value of angle $\alpha$, but rather, may estimate a rough value of angle $\alpha$. Based on the identified direction, the processing device may identify a portion of at least one image captured by image sensor 3315. For example, after identifying the direction of sound wave 3405, the processing device may adjust a resolution of the wide angle image sensor 3315 and capture image data of second person 3402 in a high resolution. For example, image sensor 3315 may capture image data of the face, hair style, and/or dress of second person 3402 in a high resolution. The processing device may analyze the captured image data and provide detailed information regarding second person 3402 to user 100. For example, wearable apparatus 110 may provide the detailed information regarding second person 3402 to user 100 in text, audio, and/or video messages through feedback outputting unit 230 and/or computing device 120.

In some embodiments, image sensor 3315 may be initially turned on, and may be capturing image data of the environment of user 100, but may not be transmitting the captured image data to image database 3201 for storage and for further analysis by the processing device. After identifying the direction of sound wave 3405 received by one or more microphones 3491-3493, the processing device may adjust a resolution of image sensor 3315 such that it captures image data of second person 3402 with a high resolution and transmit the captured data to image database 3201 for storage and further analysis. Image sensor 3315 may capture image data of second person 3402 and transmit the image data to image database 3201 for storage and for further analysis by the processing device.

FIG. 35 is a schematic illustration of an example of user 100 wearing wearable apparatus 110 according to a disclosed embodiment. In this embodiment, wearable apparatus 110 may include a power unit 3500 including an energy storage device 3505 (e.g., a battery, a capacitor, etc.) configured to store energy derived from movements of user 100. In some embodiments, power unit 3500 may be incorporated within housing 3310 or base 3300. In some embodiments, as shown in FIG. 34, power unit 3500 may be provided separately from housing 3310 or base 3300, and be electrically connected with other components, such as image sensor 3315 of wearable apparatus through one or more wires 3501.

User 100 may carry a body power harvesting device 3510 configured to convert body motion power into electrical energy. Body power harvesting device 3510 may be electrically connected with power unit 3500 through one or more wires 3502. Wires 3501 and 3502 may be at least partially incorporated with the clothes user 100 is wearing. When user 100 is walking, running, or jumping, the feet of user 100 may impact the ground with shoes 3515 and the impact may generate energy. In some embodiments, body power harvesting device 3510 and wearable apparatus 110 may be included together in a housing (e.g., included inside a shared physical casing).

An example body power harvesting device 3510 may include a piezoelectric device incorporated within or at the bottoms of shoes 3515 worn by user 100. The piezoelectric device may be configured to convert mechanical energy generated by the impact between the ground and shoes 3515 when user 100 is walking, running, or jumping, into electrical energy. The piezoelectric device includes piezoelectric materials that convert mechanical energy into electrical energy when the materials are bent and/or compressed.

Body power harvesting device 3510 may supply converted electrical energy to energy storage device 3505 for storage. The stored electrical energy may be used to power certain components of wearable apparatus 110, such as image sensor 3315. Harvesting a portion of the body motion power into electric power and use that for powering certain components of wearable apparatus 110 may reduce the energy cost associated with operating wearable apparatus 110 and may prolong the standby and operation time of wearable apparatus 110. In some embodiments, other body power harvesting devices, such as one that converts body heat energy into electrical energy may also be included in or otherwise associated with wearable apparatus 110. Further, in some embodiments, two or more of wearable apparatus 110, body power harvesting device 3510, and energy store device 3505 may be included together in a housing (e.g., included inside a shared physical casing).

Figure 36:
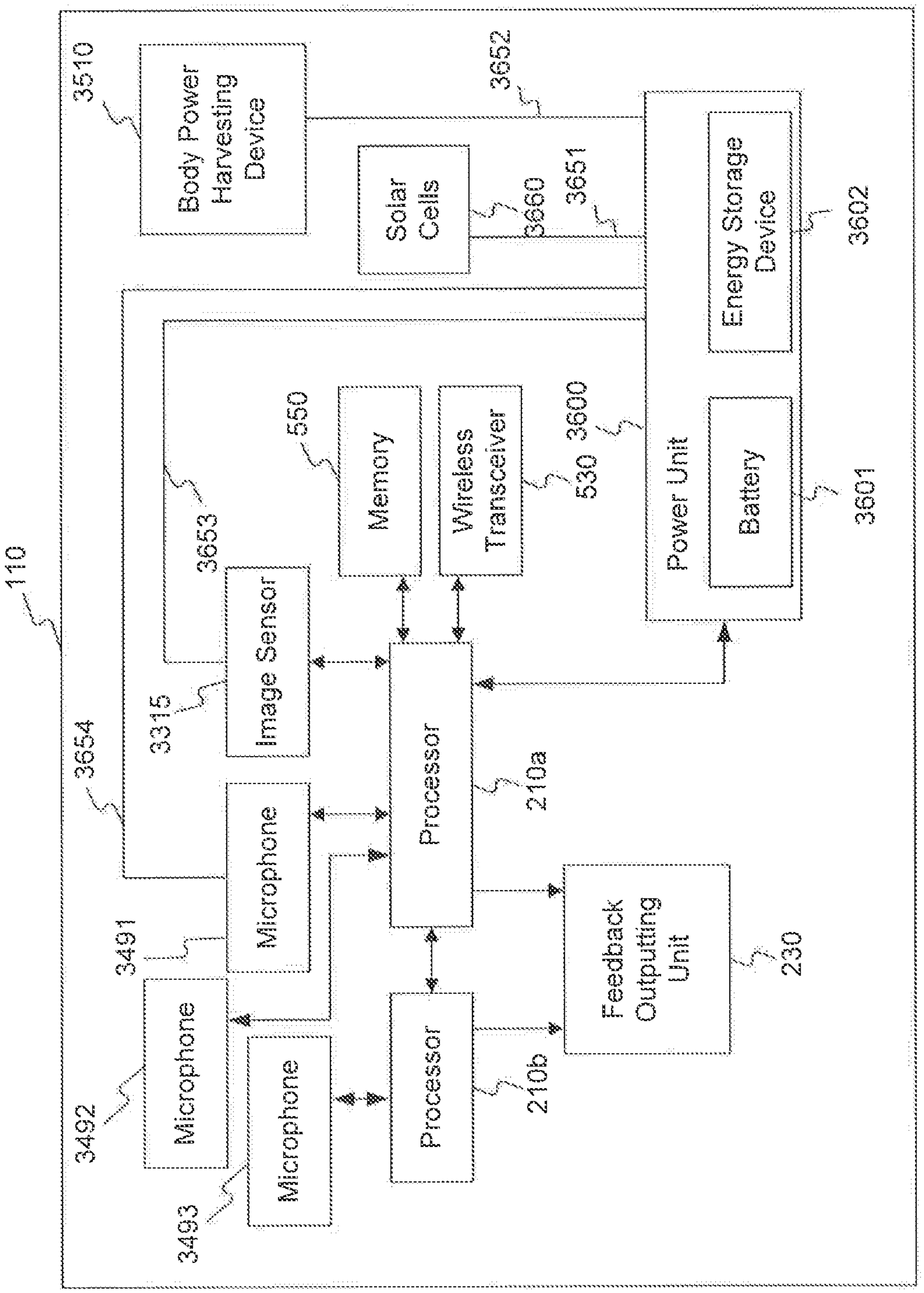
FIG. 36 is a block diagram illustrating an example of the components of a wearable apparatus according to a disclosed embodiment.

FIG. 36 is a block diagram illustrating an example of the components of a wearable apparatus according to a disclosed embodiment. As shown in FIG. 36, wearable apparatus 110 may include components similar to those depicted in FIGS. 10-12. Although not all of the components of wearable apparatus 110 shown in FIGS. 10-12 are shown in FIG. 36, wearable apparatus 110 shown in FIG. 36 may include any components of wearable apparatus 110 shown in FIGS. 10-12. Similarly, any components of wearable apparatus 110 shown in FIG. 36 may be included in any embodiment of wearable apparatus 110 shown in FIGS. 10-12. Descriptions of processor 210*a* and 210*b*, feedback outputting unit 230, memory 550, and wireless transceiver 530 are similar to those provided above, and thus are not repeated. As shown in FIG. 36, wearable apparatus 110 includes an image sensor 3315. Additional sensors may also be included.

Components or features of wearable apparatus 110 shown in different examples in FIGS. 14-16 may be used together in any combination in wearable apparatus 110. For example, one or more microphones 3491-3493, solar cells 3361 and 3362, and power unit 3370 shown in FIG. 33 may be used in combination with body power harvesting device 3510 shown in FIG. 35 (in such a combination, power unit 3370 may be combined with power unit 3500 or may be separately provided).

As shown in FIG. 36, wearable apparatus 110 may include a power unit 3600, which may be power unit 3370 and/or power unit 3500. Power unit 3600 may include a battery 3601, which may be similar to battery 3371 and battery 3505. Additionally or alternatively, power unit 3600 may include an energy storage device 3602. Energy storage device 3602 may or may not be a battery. For example, energy storage device 3602 may be a capacitor. Wearable apparatus 110 may include solar cells 3660, which may include solar cells 3361 and 3362. Wearable apparatus 110 may include body power harvesting device 3510. Solar cells 3660 and body power harvesting device 3510 may be electrically connected with power unit 3600 through, for example, wires 3651 and 3652. Power unit 3600 may be electrically connected with image sensor 3315 through, for example, a wire 3653. Power unit 3600 may be electrically connected with one or more microphones 3491-3493 through, for example, a wire 3654 and other wires not shown in FIG. 36. For example, electrical energy converted by solar cells 3660 and/or body power harvesting device 3510 may be used to power one or more microphones 3491-3493.

Figure 37:
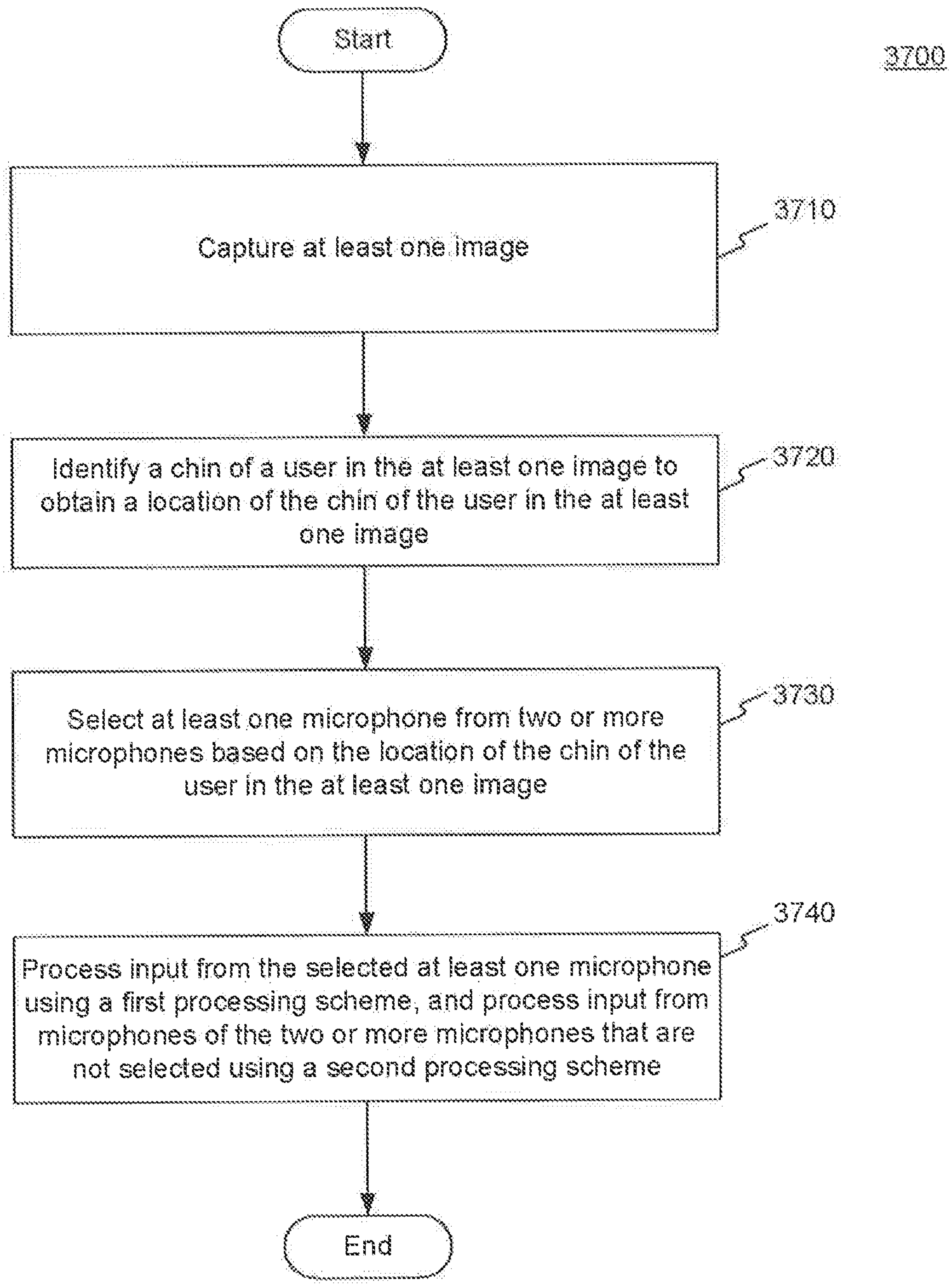
FIG. 37 is a flowchart showing an example method for capturing and processing image data according to a disclosed embodiment.

FIG. 37 is a flowchart showing an example method 3700 for capturing and processing image data according to a disclosed embodiment. Method 3700 may be executed by various devices included in wearable apparatus 110, such as image sensor 220, 220*a*, 220*b*, and/or 3315, and at least one processing device (e.g., processor 210 and/or processor 540).

Method 3700 may include capturing at least one image of an environment of a user (e.g., user 100) using at least one image sensor included in wearable apparatus 110 that user 100 wears (step 3710). For example, image sensor 3315 may capture image data of the environment of user 100, as shown in FIG. 34. The field of view associated with image sensor 3315 may include at least a portion of chin 3450 of user 100, as shown in FIG. 34. The image data captured by image sensor 3315 may include at least a portion of chin 3450. In some embodiments, the processing device may analyze the image data including the portion of chin 3450. The processing device may analyze two or more sequentially captured image data including chin 3450, and determine that chin 3450 is moving, indicating that user 100 is speaking with someone. If one or more microphones 3491-3493 are in an idle state, the processing device may turn on or otherwise activate one or more microphones 3491-3493 after determining that user 100 is speaking with someone.

Method 3700 includes identifying a chin of a user in the at least one image to obtain a location of the chin of the user in the at least one image (step 3720). For example, one or more microphones 3491-3493 may receive or detect a sound 3405, as shown in FIG. 34.

Method 3700 may include selecting at least one microphone from two or more microphones based on the location of the chin of the user in the at least one image (step 3730). In some embodiments, the identified location of chin 3450 in the captured images and/or the estimated direction of chin 3450 may be used to select one or more microphones out of a group of two or more microphones 3491-3493 attached to a wearable camera (e.g., the camera included in wearable apparatus 110). For example, the microphones may be selected based on a rule associating a direction and/or location with one or more microphones 3491-3493 to be selected. As another example, the input (e.g., received sound signal) of the selected microphones may be processed using a first processing scheme, while the input coming from the microphones that were not selected may be processed using a second processing scheme. In some embodiments, the first processing scheme may include analyzing the input using a speech to text technique. In some embodiments, the input from the selected microphones may be stored. In some embodiments, the microphones that were not selected may be turned off.

In some embodiments, the identified location of chin 3450 in the captured images and/or the estimated direction of chin 3450 may be used to select a portion of the captured images. For example, the portion of the captured images may be selected based on a rule associating a direction and/or location with one or more regions to be selected. As another example, the selected a portion of the captured images may be processed using a different processing scheme from the processing scheme used on other parts of the captured images. In some embodiments, the selected a portion of the captured images may be stored.

Method 3700 may include processing input from the selected at least one microphone using a first processing scheme, and processing input (e.g., detected or received sound signal) from microphones of the two or more microphones that are not selected using a second processing scheme (step 3740). For example, the first processing scheme may include storing the input from the selected at least one microphone. The second processing scheme may include ignoring the input from the microphones that are not selected. The processing device may execute modules and/or instructions to process the input according to the first and second processing schemes.

Method 3700 may include other steps not listed in the flowchart. For example, method 3700 may include identifying, by the processing device, a portion of the at least one image captured by the at least one image sensor based on the location of the chin of the user and processing the identified portion of the at least one image. Processing the identified portion of the at least one image may include storing the identified portion of the at least one image.

The processing device may identify a direction of the sound detected by one or more microphones 3491-3493. For example, as discussed above in connection with FIG. 34, the processing device may analyze sound 3405 and determine an angle α of sound 3405 with respect to horizontal direction or horizontal line 3410.

Method 3700 may include identifying a portion of at least one image captured by image sensor 3315 based on the direction of sound 3405. For example, the processing device may adjust a resolution of image sensor 3315 so that image sensor 3315 may capture image data in its field of view including the identified direction with a high resolution. The processing device may analyze a portion of at least one image captured by image sensor 3315 regarding second person 3402, such as the face of second person 3402. In some embodiments, the processing device may analyze an area of interest in the at least one image and may discard image data associated with other areas of the image. For example, the processing device may perform a crop function to reduce the image to be analyzed to a selected area, and discard other areas of the image. Analyzing an area of interest of the image, rather than the entire image, may help reduce the time needed to analyze the image.

In some embodiments, image sensor 3315 may capture image data of the environment before user 100, including first person 3401 and second person 3402. The processing device may identify a portion of at least one image captured by image sensor 3315. For example, the processing device may identify chin 3450 of user from an image captured by image sensor 3315. From more than one image captured by image sensor 3315, the processing device may identify that chin 3450 is moving. Based on the movement of chin 3450, the processing device may determine that user 100 is speaking with someone. The processing device may determine a direction of sound 3405 detected by one or more microphones 3491-3493. The processing device may select an area of interest from an image captured by wide viewing angle image sensor 3315 based on the direction of sound 3405. For example, sound 3405 may have a direction that is to the right of user 100, the processing device may select an area of interest that includes second person 3405, who appears to the right of user 100 in the captured image. The processing device may discard image data for the area of the image that is to the left of user 100. The processing device may analyze the selected area of interest of the captured image.

Method 3700 may include processing the identified portion of the at least one image. For example, the processing device may cause the identified portion (e.g., chin 3450 of user 100 or area of interest including second person 3402) of the at least one image to be stored in image database 3201 or any other storage devices. Stored image data may be further analyzed by the processing device to extract information regarding an object (e.g., second person 3402) identified from the image data. For example, the processing device may analyze the stored image data of the area of interest including second person 3402 to extract information about the facial expression on second person, the hair style of second person 3402, the dress second person 3402 is wearing, and the actions second person 3402 is performing, etc. In some embodiments, processing the identified portion of the at least one image includes storing the identified portion of the at least one image.

Wearable apparatus 110 may be configured to selectively process images captured by image sensors (e.g., image sensor 220, 220*a*, and/or 220*b*). In some embodiments, wearable apparatus 110 may be configured to distinguish between different types of image data (or images) captured from an environment of a user 100 through a wearable image sensor, such as image sensor 220, 220*a*, and/or 220*b*. For example, at least one processing device (e.g., processor 210, 201*a*, 210*b*, and/or 540) may be programmed to access at least one rule from a rule database for classifying images. The processing device may be programmed to distinguish the different types of image data (or images) by classifying, according to the at least one rule, at least a first subset of the images as key images, and at least a second subset of the images as auxiliary images. A key image may be an image that includes information that is important or has a particular significance to at least one purpose of operating wearable apparatus 110 and/or to a user of wearable apparatus 110. An auxiliary image may be an image that includes information that is less important to the at least one purpose of operating wearable apparatus 110 and/or to a user of wearable apparatus 110, as compared to a key image. Thus, the key images and auxiliary images may be defined based on predetermined rules.

User 100 of wearable apparatus 110, the manufacturer of wearable apparatus 110, and/or other third parties may define the rules and update the rules. The rules may be updated based on data received by wearable apparatus 110 from network 240 (e.g., transmitted by one or more of computing device 120 and server 250). For example, when at least one the purpose of operating wearable apparatus 110 is to capture images of persons in the field of view of wearable apparatus 110, a key image would be an image that includes one or more persons. An auxiliary image may be an image that does not include any people, such as an image of a shop on the street.

The purpose of operating wearable device 110 may be general or specific. For example, as discussed above, simply identifying a person in an image may constitute categorizing the image as a key image. In some embodiments, the purpose may be more specific. For example, in some embodiments, only images that include persons that are known to the user of wearable apparatus 110 may be classified as key images. Wearable apparatus 110 may determine that a person appearing in image data is known to the user by, for example, comparing facial features of a person in a captured image to a database storing images including faces of persons known to a user of wearable apparatus 110.

In some embodiments, the processing device may be programmed to delete at least some of the auxiliary images. Deleting some auxiliary images may save data storage space needed for the operation of the wearable apparatus 110, thereby reducing the cost of associated with operating wearable apparatus 110.

In some embodiments, the at least one rule may classify images that include an object in the environment of user 100 as key images, and classify images that do not include the object as auxiliary images. For example, the rule may classify images including a person as key images, and classify images that do not include the person as auxiliary images. In some embodiments, the rule may classify images including an object as auxiliary images, and classify images that do not include the object as key images. For example, the rule may classify images including a product advertisement as auxiliary images, and classify images that do not include the product advertisement as key images.

In some embodiments, the rule may classify images according to image quality level. For example, the rule may classify images having a quality level that is higher than or equal to a predetermined quality threshold as key images, and images having a quality level that is lower than the predetermined quality threshold as auxiliary images. The predetermined quality threshold may be determined based on at least one of a resolution of the image, a level of focus, the location of a predefined object within the image, etc. For example, an image may be classified as a key image when the resolution of the image is higher than or equal to 3.0 Megapixels (an example of the predetermined quality threshold). As another example, an image may be classified as a key image when a person appears in the image at a location that is within a predetermined distance from a center point of the image (or be classified as an auxiliary image when the person appears in the image at a location that is outside of the predetermined distance from the center point of the image).

In some embodiments, the rule may associate a first importance level to an image including one or more of a face, a product, and text. The first importance level may be higher than an importance level of an image that does not include a face, a product, or text. In some embodiments, the rule may associate a second importance level to an image including one or more of a predefined location, a predefined face of a specific individual, a predefined type of object, and a predefined text. The second importance level may be higher than the first importance level.

In some embodiments, the processing device may be programmed to process at least one key image to recognize image content (e.g., activities performed by persons, signage, and/or advertisement shown on buildings) within the key image. The processing device may be programmed to select, based on the recognized image content, one of a plurality of alternative actions associated with the key image, and may execute the selected action. In some embodiments, the plurality of alternative actions may include transmitting the key image to a computing device (such as computing device 120 and/or server 250), and transmitting information regarding the key image to the computing device. The information regarding the key image may include location information (e.g., where key image is captured), time information (e.g., when key image is captured), contextual information (e.g., what is happening in the key image), etc.

Figure 38:
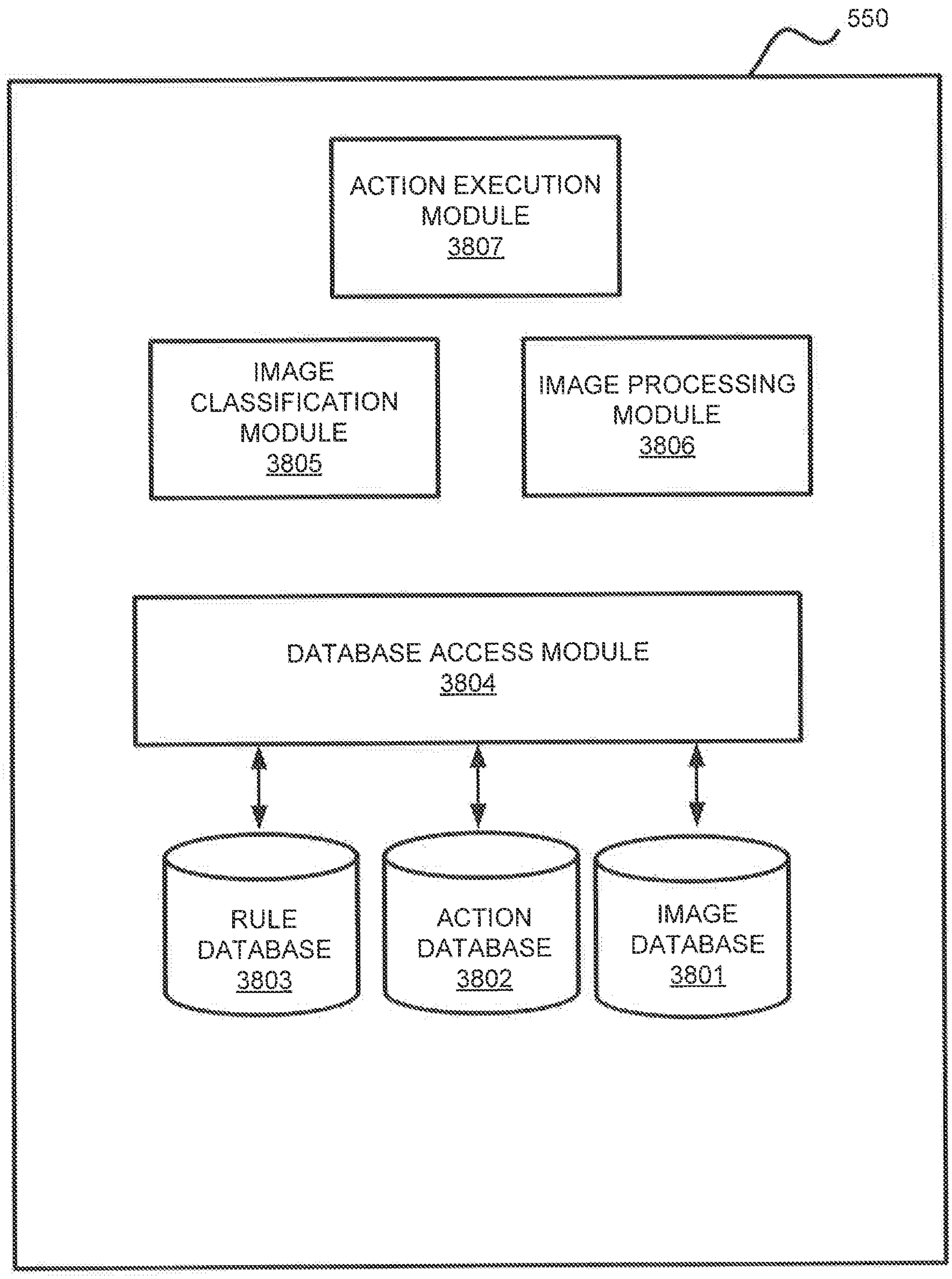
FIG. 38 is a block diagram illustrating an example memory storing a plurality of modules and databases.

FIG. 38 is a block diagram illustrating a memory (e.g., memory 550, 550*a*, and/or 550*b*) according to the disclosed embodiments. The memory may include one or more modules or sets of instructions, which when executed by at least one processing device, carry out methods consistent with the disclosed embodiments. For example, the memory may include instructions executable by the at least one processing device to process or analyze images captured by the image sensors. In some embodiments, the processing device may be included in wearable apparatus 110. For example, the processing device may include processor 210, 210*a*, and/or 210*b* shown in FIGS. 10 and 11. The processing device may process the image data captured by the image sensors in near real time, as the image data are being captured by the image sensors. In some embodiments, the processing device may include a processor that is separately located from wearable apparatus 110. The processing device may include a processor that is remotely connected with wearable apparatus 110 through network 240, which may be a wired or wireless network, or through any other connectivity means, such as Bluetooth, near field communication (NFC), etc. For example, the processing device may include processor 540 included in computing device 120, which may be connected with wearable apparatus 110 through a wired or wireless connection, such as through a cable, Bluetooth, WiFi, infrared, or near field communication (NFC). In some embodiments, the processing device may include a processor included in server 250, which may be wirelessly connected with wearable apparatus 110 through network 240. In some embodiments, the processing device may include a cloud computing processor remotely and wirelessly connected with wearable apparatus 110 through network 240. Wearable apparatus 110 may transmit captured image data to the processing device in near real time, and the processing device may process the captured image data and provide results of processing to wearable apparatus 110 in near real time. Further, in some embodiments, one or more databases and one more modules may be located remotely from wearable apparatus 110 (e.g., included in computing device 120 and/or server 250).

In the example shown in FIG. 38, memory 550 includes or stores an image database 3801, an action database 3802, and a rule database 3803. Memory 550 may also include a database access module 3804, an image classification module 3805, an image processing module 3806, and an action execution module 3807. Additional or fewer databases and/or modules may be included in memory 550. The modules and databases shown in FIG. 38 are examples, and a processor in the disclosed embodiments may operate according to any suitable process.

In the embodiment shown in FIG. 38, memory 550 is configured to store an image database 3801. Image database 3801 may be configured to store various images, such as images (or image data) captured by an image sensor (e.g., image sensor 220, 220*a*, and/or 220*b*). Image database 3801 may also be configured to store data other than image data, such as textual data, audio data, video data, etc. For example, image database 3801 may be configured to store information related to the images, such as location information, date and time information, an identity of an object identified in the images, information associated with key images, and/or information associated with auxiliary images, etc.

In the example shown in FIG. 38, memory 550 is also configured to store an action database 3802. Action database 3802 may be configured to store predefined actions that may be taken by the processing device. For example, the predefined actions may be taken by the processing device in response to identifying an object from an image, classifying an image as a key image, recognizing image content within the key image, classifying an image as an auxiliary image, etc. Examples of the predefined actions may include transmitting key images to a computing device and transmitting information regarding the key images to the computing device. The predefined actions may also be referred to as alternative actions. In some embodiments, the predefined actions stored in action database 3802 may also be updated, either periodically or dynamically. For example, as the environment of user 100 and/or the context associated with capturing image data change, as may be identified from the captured images, the predefined actions may be updated to reflect the changing environment and/or context associated with capturing image data.

Memory 550 is also configured to store a rule database 3803. Rule database 3803 may be configured to store one or more predefined rules that may be predefined by user 100 and/or the manufacturer of wearable apparatus 110. In some embodiments, rule database 3803 may also be configured to store one or more dynamically updatable rules that may be updated after the initial rules are stored in rule database 3803. For example, the dynamically updatable rules may be updated, e.g., by processing device, periodically, in near real time based on changing context identified in the captured images. For example, a rule stored in rule database 3803 may classify a first image as a key image when the first image includes a particular object and classify a second image as an auxiliary image when the second image does not include the particular object. This rule may be updated as the environment of user 100 and/or the context associated with capturing image data change, as may be identified from the captured images. For example, the updated rule may classify a first image as an auxiliary image when the first image includes the particular object and classify a second image as a key image when the second image does not include the particular object.

As shown in FIG. 38, memory 550 is also configured to store a database access module 3804. The processing device may execute instructions associated with database access module 3804 to access image database 3801, action database 3802, and rule database 3803, for example, to retrieve previously stored image data, predefined actions, and/or rules for performing analysis of the image data. The processing device may also execute instructions associated with database access module 3804 to store image data in image database 3801, actions in action database 3801, and rules in rule database 3803.

In the embodiment shown in FIG. 38, memory 550 is configured to store an image classification module 3805. The processing device may execute instructions associated with image processing module 3804 to perform various analyses and processes of image data captured by the image sensor to classify the captured images. For example, the processing device may execute instructions associated with image processing module 3804 to read or retrieve one or more rules from rule database 3803 (e.g., through database access module 3804), and use the rules to classify the captured images. The processing device may classify the images into key images and auxiliary images based on the rules.

In the embodiment shown in FIG. 38, memory 550 is configured to store an image processing module 3806. The processing device may execute instructions associated with image processing module 3806 to perform various analyses and processes of image data captured by the image sensor. For example, the processing device may execute instructions associated with image processing module 3806 to identify an object from an image, such as a key image and/or an auxiliary image. As another example, the processing device may execute instructions associated with image processing module 3806 to recognize image content (e.g., activities performed by persons, signage and/or advertisement shown on buildings) within at least one key image.

In the embodiment shown in FIG. 38, memory 550 is configured to store an action execution module 3807. The processing device may execute instructions associated with action execution module 3807 to select alternative actions stored in action database 3802, and execute the selected actions. The processing device may select the actions based on, for example, recognized image content from a key image.

Figure 39:
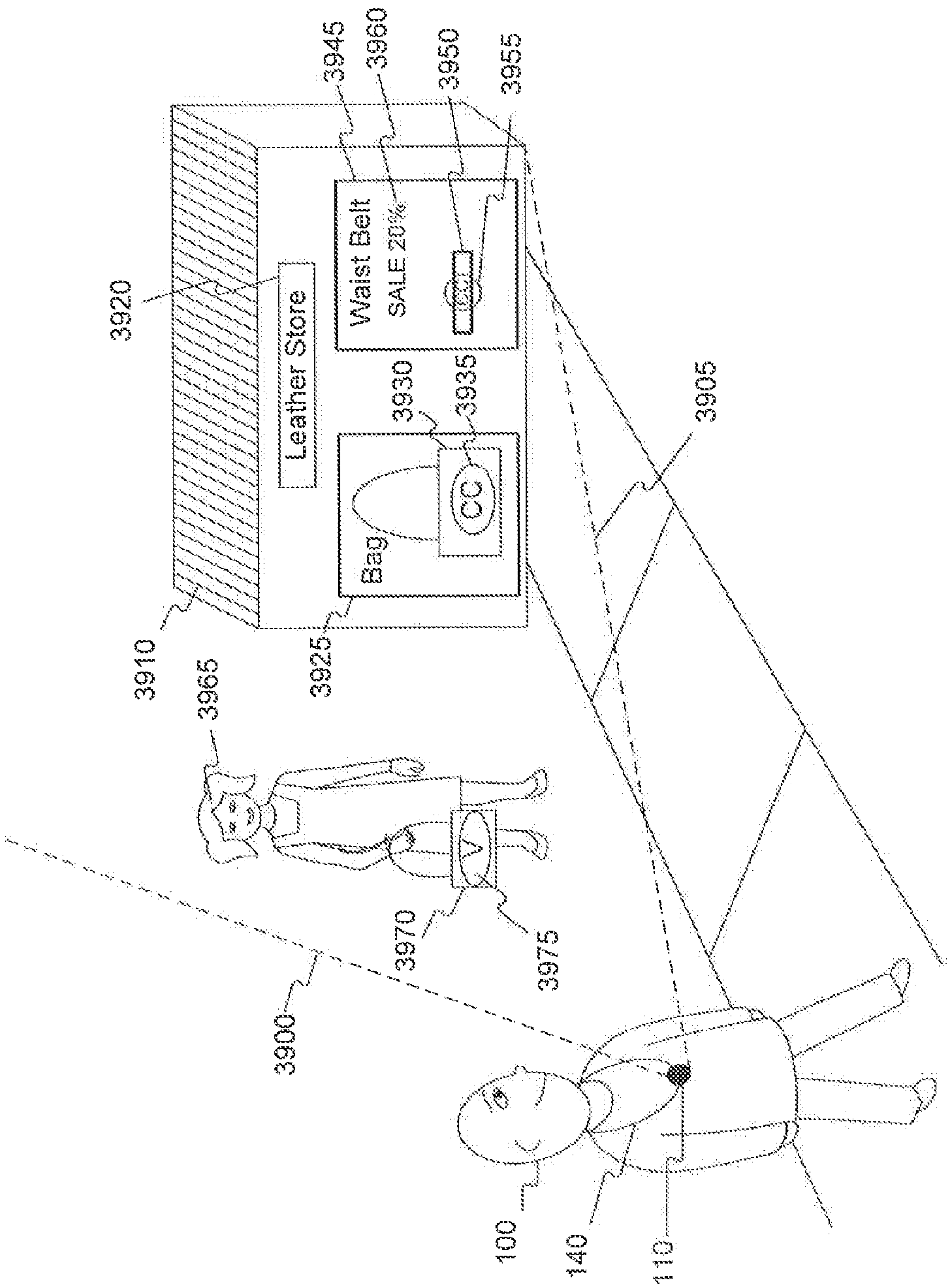
FIG. 39 shows an example environment including a wearable apparatus for capturing and processing images.

FIG. 39 shows an example environment including wearable apparatus 110 for capturing and processing images, consistent with the disclosed embodiments. As shown, wearable apparatus 110 may be carried on necklace 140 worn by user 100. Wearable apparatus 110 may be worn by user 100 on any suitable part of user 100. For example, wearable apparatus 110 may be attached to a belt or shirt of user 100 using clip 420 shown in FIG. 4B. As another example, wearable apparatus 110 may be attached to an arm band or magnetic coupler secured to an arm of user 100. As a further example, wearable apparatus 110 may be attached to a helmet, cap, or hat worn by user 100. Wearable apparatus 110 may include image sensor 220, 220*a*, and/or 220*b* (as shown in FIGS. 10 and 11), which has a field of view indicated by dashed lines 3900 and 3905. Image sensor 220, 220*a*, and/or 220*b* may capture one or more images of the scene or environment in front of user 100. In this example, user 100 may be walking or standing on a street facing a building 3910. One or more images captured by image sensor 220, 220*a*, and/or 220*b* may include building 3910. Building 3910 may be a store, and may include a sign 3920 with a name of the store, e.g., "Leather Store," on the front side of the building 3910 (hence building 3910 may also be referred to as the leather store building 3910).

One or more images captured by the image sensors of wearable apparatus 110 may include an advertisement 3925 on the front wall of building 3910, which may include a picture of a hand bag 3930. The image of advertisement 3925 may also include a logo 3935 of text "CC" included within an oval. Logo 3935 may be a brand logo of the hand bag. The image may also include text "Bag" shown in advertisement 3925.

One or more images captured by the image sensors of wearable apparatus 110 may include an advertisement 3945 on the front wall of building 3910. The image may include a picture 3955 of a belt 3950 having a logo with text "CC,"

which may be the brand of the belt. The image may also include text 3960 "Waist Belt, Sale 20%" in advertisement 3945.

One or more images captured by the image sensors of wearable apparatus 110 may include a person 3965, who may carry a hand bag 3970, which may include a logo 3975 of text "V" included in an oval.

The processing device may analyze or process the captured plurality of images to classify the images into key images and auxiliary images. For example, the processing device may access at least one rule stored in rule database 3803 for classifying images. The processing device may classify, according to the at least one rule, at least a first subset of the plurality of images as key images, and at least a second subset of the plurality of images as auxiliary images. For example, the rule may classify images that include person 3965 as key images, and classify images that do not include person 3965 as auxiliary images. In the example shown in FIG. 41, based on the rule, the processing device may classify a first set of images that include person 3965 as key images (e.g., an image including person 3965 alone, an image including person 3965 and advertisement 3925, an image including person 3965, advertisement 3925 and advertisement 3945, etc.). The processing device may classify a second set of images that do not include person 3965 as auxiliary images (e.g., an image including advertisement 3945 alone, an image including the entire leather store only, etc.).

In some embodiments, the rule may state the opposite. For example, the rule may classify images including an object as auxiliary images, and images not including an object as key images. The object may be picture 3955 of a waist belt. Based on this rule, the processing device may classify a first subset of images that include picture 3955 of the waist belt as auxiliary images (e.g., an image including only picture 3955 of the waist belt, an image including advertisement 3945 showing picture 3955 of the waist belt and a part of advertisement 3925, an image of the entire leather store 3910 including picture 3955 of the waist belt, etc.). The processing device may classify a second subset of images not including picture 3955 of the waist belt as key images (e.g., an image including advertisement 3925 only, an image including person 3965 only, an image including advertisement 3925 and person 3965, etc.).

The rule may classify images according to an image quality level. For example, the rule may classify images as key or auxiliary images based on a predetermined quality threshold, such as a predetermined resolution. In some embodiments, the rule may classify an image having a resolution of less than 3.0 Megapixels as an auxiliary image, and an image having a resolution greater than or equal to 3.0 Megapixels as a key image. In the example shown in FIG. 39, if an image of person 3965 has a resolution of less than 3.0 Megapixels, the processing device may classify the image as an auxiliary image. If an image of person 3965 has a resolution of greater than 3.0 Megapixels, the processing device may classify the image as a key image. The 3.0 Megapixels is only used as an example. Other resolutions (e.g., 1 Megapixels, 2 Megapixels, 4 Megapixels, 5 Megapixels, etc.) may be used as the quality threshold, and may be set based on implementations of wearable apparatus 110.

The rule may associate a first importance level to an image including one or more of a face, a product, or text. The first importance level may be represented by a number, such as, "1.0", or may be represented by an alphabet, such as "A". In some embodiments, the first importance level may be represented by a symbol, such as "*". For example, wearable apparatus 110 may capture an image including person 3965. The processing device may associate, based on the rule, the image including the face of person 3965 with the first importance level, such as "1.0". As another example, the processing device may associate an image including hand bag 3970 (a product) with the first importance level. As a further example, the processing device may associate an image including "Bag" (text) with the first importance level.

The first importance level may be higher than an importance level of an image that does not include a face, a product, or text. For example, the processing device may associate, based on a rule, an importance level (e.g., represented by a number "0.5") to an image of the roof of building 3910, which does not include a face, a product, or text. The first importance level, represented by the number "1.0", is higher than the importance level represented by the number "0.5."

The rule may associate a second importance level, which may be represented by any of the means discussed above in connection with the first importance level, to an image including one or more of a predefined location, a predefined face of a specific individual, a predefined type of object, and a predefined text. For example, the rule may associate a second importance level represented by a number "2.0" to an image including a restaurant, including the face of person 3965, including a hand bag with logo 3935 or "CC" brand, or including text "Bag," or including a combination thereof. The second importance level "2.0" is higher than the first importance level "1.0".

The processing device may process or analyze at least one key image to recognize image content within the at least one key image. For example, the process device may classify an image including person 3965 and advertisement 3925 as a key image. The processing device may analyze this image to recognize that the hand bag 3970 carried by person 3965 has a logo 3975 that is different from logo 3935 of hand bag 3930 shown in advertisement 3925. Based on the recognized image content, the processing device may select one of a plurality of alternative actions associated with the key image. For example, the alternative actions associated with the key image may include transmitting the key image to a computing device (e.g., computing device 120 and/or server 250), and transmitting information regarding the key image to the computing device (such as location information regarding where the key image is captured, time information regarding when the key image is captured, etc.). The processing device may execute the selected action. For example, the processing device may select an action of transmitting the key image to the computing device 120 from a plurality of actions stored in action database 3802. The processing device may transmit the key image to the computing device 120, which may also be carried by user 100. The processing device may also transmit information regarding the key image to the computing device. The information regarding the key image may include, for example, that the brand of hand bag carried by person 3965 is different from the brand of hand bag shown in advertisement 3925, that person 3965 probably likes hand bags and she may like the hand bag shown in advertisement 3925, and that the "CC" brand of hand bag shown in advertisement 3925 is a better brand than the "V" brand person 3965 is carrying. Computing device 120 may display the key image including person 3965 along with the information regarding the key image.

FIG. 40 shows an example database table for storing information associated with key images. Database table

4000 may be stored in memory 550, memory 550*a*, memory 550*b*, and storage devices included in server 250. For example, database table 4000 may be stored in image database 3801. Database table 4000 may include a plurality of rows and columns. The header row showing “Identifier,” “Object,” “Location,” “Date,” and “Time,” may or may not be part of the actual database table 4000. FIG. 40 shows 50 example rows for storing information and data under the categories of “Identifier,” “Object,” “Location,” “Date,” and “Time.” Three example rows are referenced as 4001, 4002, and 4050. Each row from 4001 to 4050 may store information regarding captured images, such as key images and/or auxiliary images. The information includes an identity or identifier of an object stored in column 4061, a description of an object identified from captured images (e.g., key images and/or auxiliary images) stored in column 4062, a location where the image (e.g., key image and/or auxiliary image) was captured, as stored in column 4063, a data when the image key image and/or auxiliary image) was captured, as stored in column 4064, and a time of day when the image (e.g., key image and/or auxiliary image) was captured, as stored in column 4065.

As shown in column 4061, each object identified from the captured images (e.g., key images and/or auxiliary images) may be associated with a unique identifier stored in database table 4000. The identifier may include a number uniquely assigned to the object in database table 1100. In some embodiments, the identifier may also include an alphabet (e.g., “ABC,” “BCD,” etc.). In some embodiments, the identifier may include a symbol (e.g., “#,” “$,” etc.). In some embodiment, the identifier may include any combination of a number, an alphabet, and a symbol. The processing device (e.g., processor 210 and/or processor 540) may read or retrieve data related to the occurrence of a product descriptor from database table 100 by pointing or referring to an identifier.

Three example database rows are shown in FIG. 40 for three objects identified from the captured images. The first object is the bag advertisement 3925 (e.g., advertisement 3925) shown in FIG. 39, which may be associated with an identifier “1001.” The location where the bag advertisement 3925 was captured may be “15 K Street, Washington, D.C.” The date and time where the bag advertisement 3925 was captured may be “6/7/2015,” and “3:00 p.m.”

Referring to the example database table 4000 shown in FIG. 40, the second object is the logo 3935 of “CC” as shown in FIG. 39, which may be associated with an identifier of “1002.” The location where the logo 3935 of “CC” was captured may be “15 K Street, Washington, D.C.” The date and time where the logo 3935 was captured may be “6/7/2015,” and “3:00 p.m.”

Referring to the example database table 4000 shown in FIG. 40, the third object shown in database table 4000 is the logo 3975 of “V,” as shown in FIG. 39. The third object may be associated with an identifier “1050,” which indicates that the object of logo 3975 may be the fifth entry in database table 1100. The location where the logo 3975 was captured may be a GPS location of “GPS 38.9047° N, 77.0164° W.” The date and time where the logo 3975 was captured may be “5/15/2015,” and “1:00 p.m.”

The database table 4000 may store other information and data. For example, database table 4000 may store a predefined location, a predefined face of a specific individual, a predefined type of object, a predefined text, etc. The database table 4000 may also store the importance level (e.g., the first importance level, the second importance level) associated with the images (e.g., the key images and/or the auxiliary images).

Figure 41:
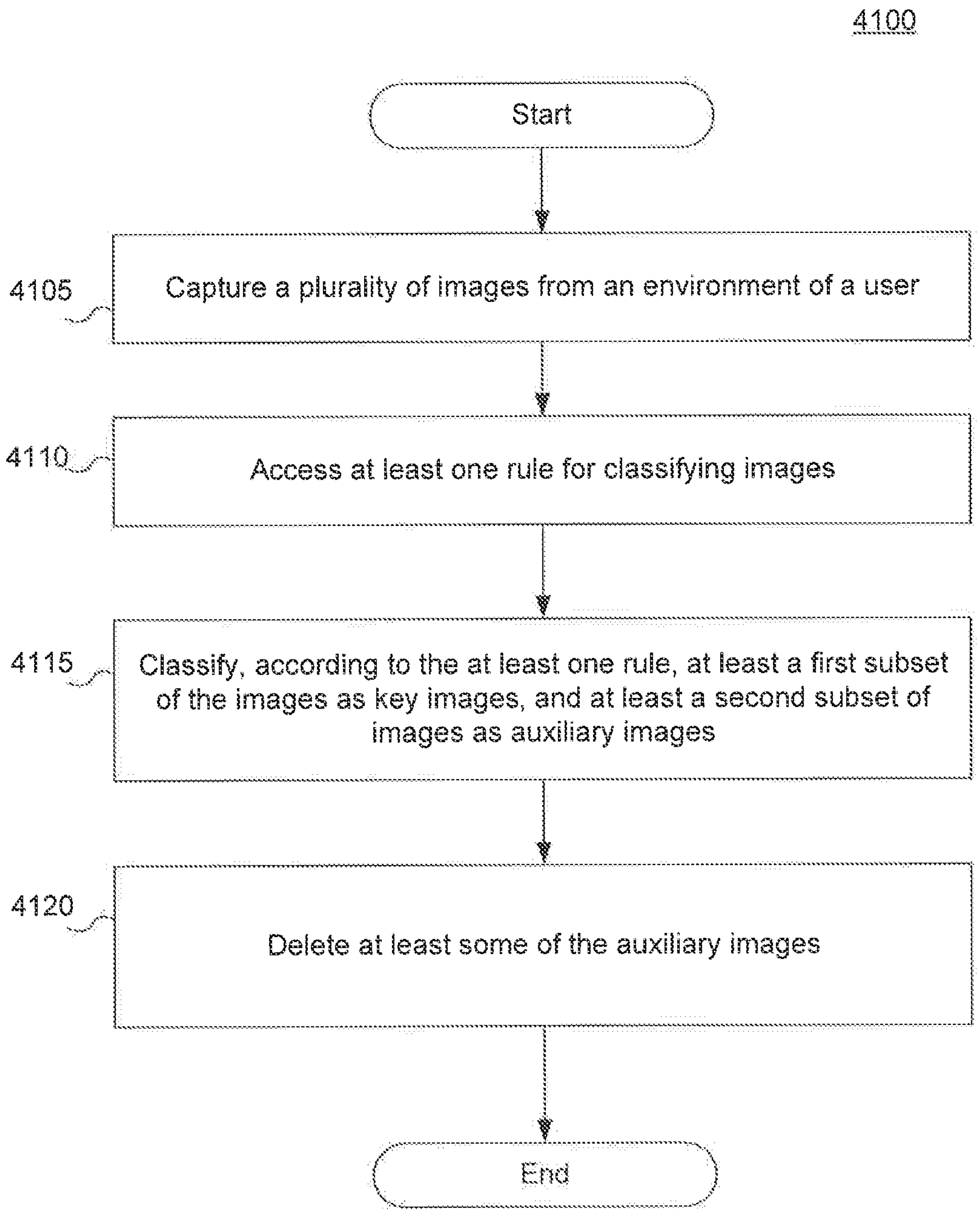
FIG. 41 is a flowchart illustrating an example method for selectively processing images

FIG. 41 is a flowchart illustrating an example method 4100 for selectively processing images, consistent with the disclosed embodiments. Method 4100 may be performed by various devices included in wearable apparatus 110, such as, image sensor 220, 220*a*, and/or 220*b* and a processing device (e.g., processor 210 and/or processor 540).

Method 4100 may include capturing a plurality of images from an environment of user 100 (step 4105). For example, image sensor 220, 220*a*, and/or 220*b* may capture a plurality of images of the environment of user 100, such as an image of various objects shown in FIG. 7, such as an image of building 3910, an image of advertisement 3925, an image of advertisement 3945, an image of person 3965, an image of hand bag 3970, etc.

Method 4100 may also include accessing at least one rule for classifying images (step 4110). For example, the processing device may access rule database 3803 to read or retrieve a rule for classifying images. Method 4100 may also include classifying, according to the at least one rule, at least a first subset of the images as key images, and at least a second subset of images as auxiliary images (step 4115). Examples of classification images into key images and auxiliary images by the processing device are discussed above in connection with FIG. 39. Method 4100 may further include deleting at least some of the auxiliary images (step 4120). For example, the processing device may delete at least some of the auxiliary images from image database 3801. Deleting auxiliary images may save data storage space needed for the operation of wearable apparatus, thereby reducing cost.

Figure 42:
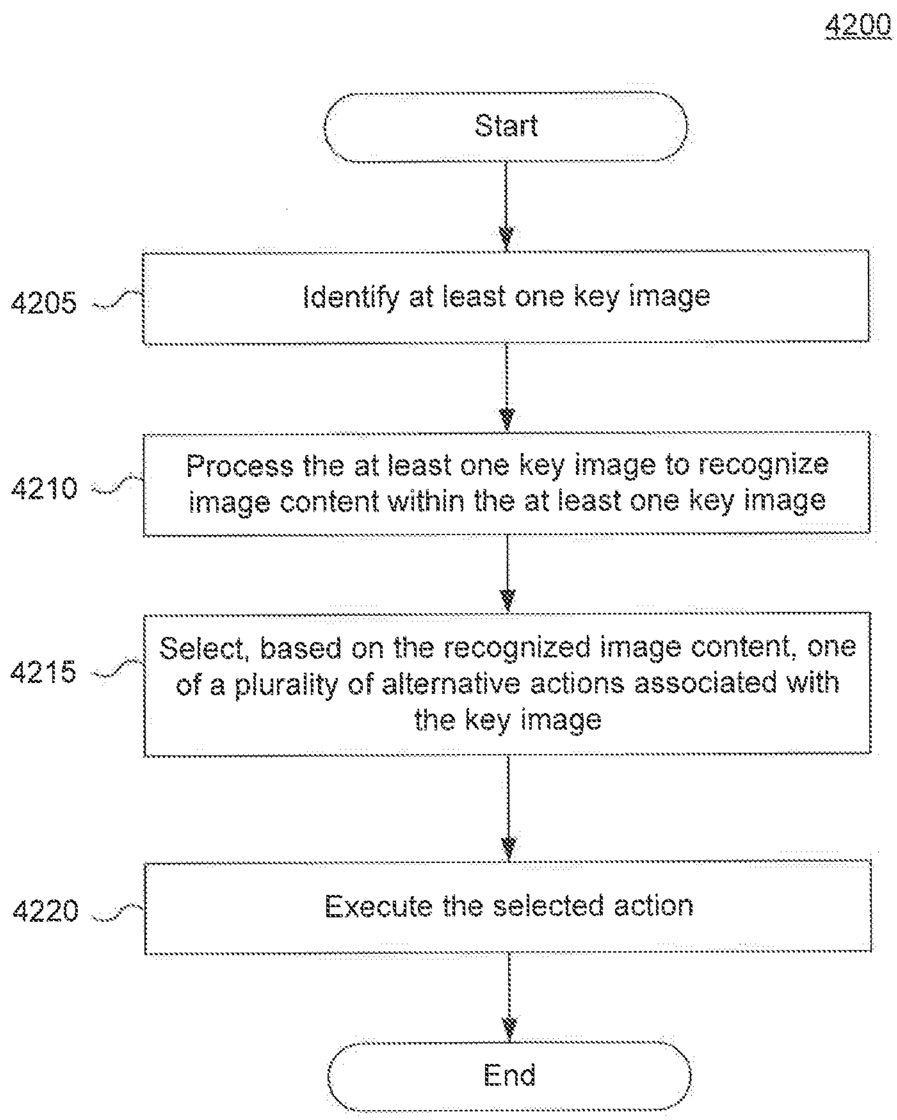
FIG. 42 is a flowchart illustrating an example method for selectively processing images

FIG. 42 is a flowchart illustrating an example method 4200 for selectively processing images, consistent with the disclosed embodiments. Method 4100 may be performed by various devices included in wearable apparatus 110, such as, image sensor 220, 220*a*, and/or 220*b* and a processing device (e.g., processor 210 and/or processor 540). Steps included in method 4200 may be combined with the steps of method 4100. For example, method 4100 may include steps of method 4200, and method 4200 may include steps of method 4100.

Method 4200 may include identifying at least one key image (step 4205). In some embodiments, identifying the at least one key image may be performed by the processing device after step 4115 has been performed, e.g., after classifying the images into key images and auxiliary images has been performed. In some embodiments, the processing device may access image database 3801 to read or retrieve one or more key images previously classified and stored in image database 3801, and identify at least one key image from the plurality of key images.

Method 4200 may include processing the at least one key image to recognize image content within the at least one key image (step 4210). For example, the processing device may process the at least one identified key image to recognize the image content of the key image (e.g., objects and context information included in the key image). In the example shown in FIG. 39, the processing device may analyze a key image including person 3965 to recognize the image content. The image content may be, e.g., person 3965 carrying a hand bag 3970, who appears to be going to the leather store building 3910 to do some shopping, or who appears to be waiting to meet someone, etc.

Method 4200 may also include selecting, based on the recognized image content, one of a plurality of alternative actions associated with the key images (step 4215). The alternative actions may include transmitting the at least one key image to a computing device (e.g., computing device 120 and/or server 250), and transmitting information regarding the at least one key image to the computing device. For example, based on the recognized image content, the processing device may select an action of transmitting the key image including person 3965 carrying hand bag 3970 to computing device 120.

Method 4200 may further include executing the selected action (step 4220). For example, the processing device may transmit the key image to computing device, and cause the key image to be displayed to user 100, who may be carrying computing device 120.

Wearable apparatus 110 may capture repetitive images, and may perform methods to discard and/or ignore at least some of the repetitive images. The devices and methods discussed under this heading may be combined with the any device and/or method discussed above and below.

In some embodiments, image sensors included in wearable apparatus 110 may capture repetitive images. Two images may be considered repetitive when the images show the same, similar, or overlapping image content. For example, two images may be considered repetitive when they show image content that is substantially the same, or when they capture substantially the same portion of the environment of user 100, or when they capture substantially the same objects, etc. Repetitive images of the environment of user 100 may not all be necessary for obtaining information regarding the environment of user 100. Some of the repetitive images may be deleted, discarded, or ignored during image processing. This may save processing time and increase the image processing speed of wearable apparatus 110.

In some embodiments, the processing device may be programmed to identify at least two or more of a plurality of images as repetitive images. At least one rule stored in rule database 3803 may classify at least one of the repetitive images as a key image, and at least one of the repetitive images as an auxiliary image. The key image may be used to generate an image log. The image log may record identifiers of a plurality of key images, locations where the key images are captured, date and time the key images are captured, and descriptions of image content of the key images, etc. Some of the auxiliary images may be deleted.

A first image may also be considered as repetitive of a second image when the first image captures substantially the same objects as the second image, but a predetermined contextual situation associated with the second image no longer exists when the first image was captured. Predetermined contextual situations may include at least one of the following: meeting with an individual, visiting a location, and interacting with an object, entering a car, participating in a sport activity, and eating a meal. Other contextual situations may also be defined. The non-existence of such a predetermined contextual situation may cause an image to become a repetitive image. For example, in the example shown in FIG. 39, user 100 may be meeting with person 3965. A first image may include person 3965 carrying hand bag 3970 and advertisement 3925 showing an image of hand bag 3930. In the first image, the hand bag 3930 may provide useful information to user 100. For example, hand bag 3930 may have a similar design as hand bag 3970 person 3965 is carrying, and the processing device may inform user 100 that person 3965 may also like hand bag 3930. When a second image is captured, person 3965 may have left the scene, and second image includes only advertisement 3925 showing hand bag 3930. The second image may no longer be useful to user 100. Thus, due to the non-existence of the predetermined contextual situation, second image may become a repetitive image of first image. Wearable apparatus 110 may provide a user interface to allow user 100 to define a plurality of predetermined contextual situations.

Figure 43:
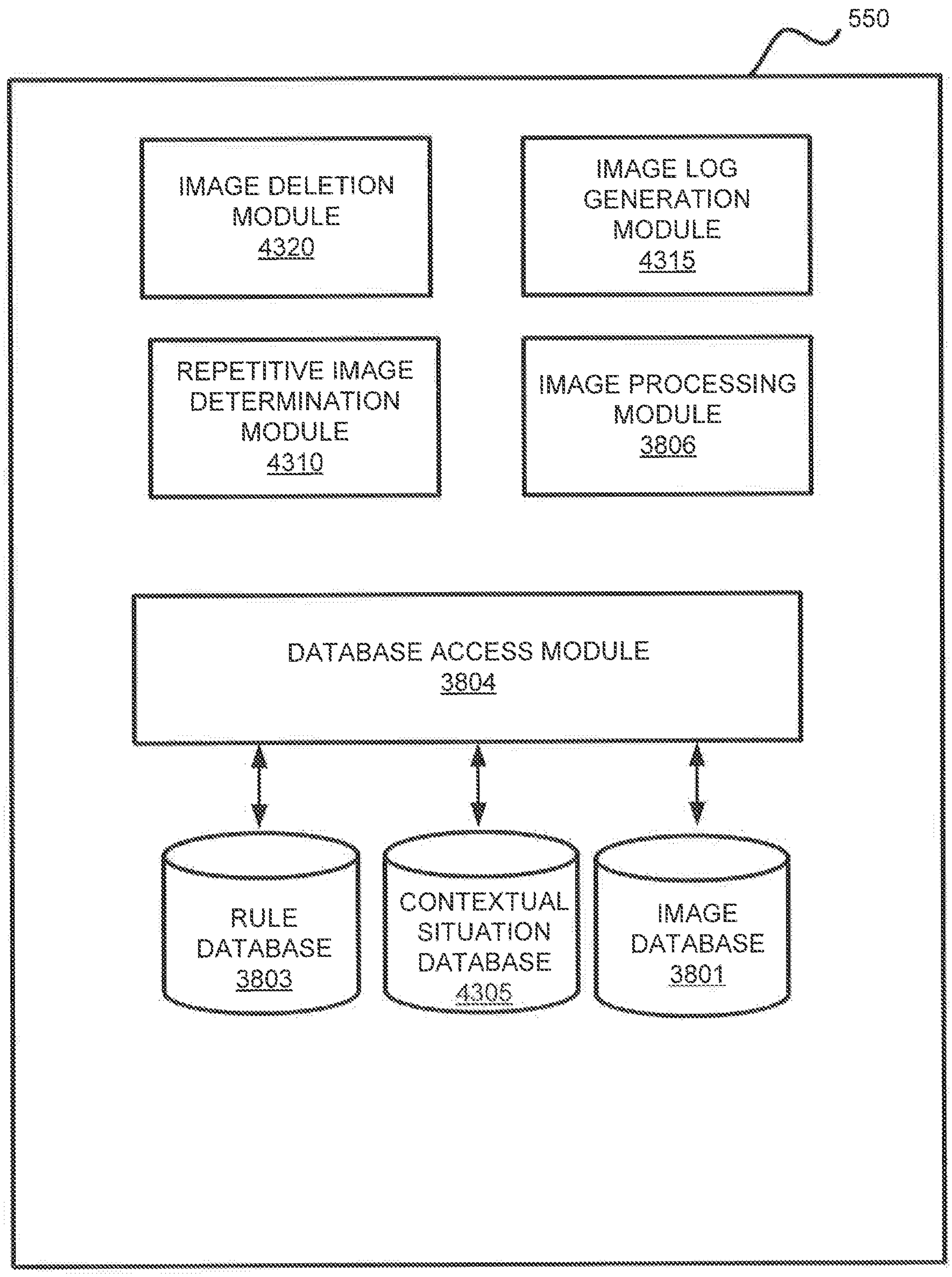
FIG. 43 is a block diagram illustrating a memory storing a plurality of modules and databases.

FIG. 43 is a block diagram illustrating a memory (e.g., memory 550, 550*a*, and/or 550*b*) according to the disclosed embodiments. Memory 550 may include databases and/or modules that are similar to those shown in FIG. 38. Thus, the descriptions of the same databases and/or modules are not repeated. Databases and/or modules shown in FIG. 43 may be combined with databases and/or modules shown in FIG. 38, or used as alternatives to the databases and/or modules shown in FIG. 38. Databases and/or modules shown in FIG. 38 may also be included in FIG. 43, or used as alternatives to the databases and/or modules shown in FIG. 43.

In the embodiment shown in FIG. 43, memory 550 is configured to store a contextual situation database 4305. Contextual situation database 4305 may be configured to store predetermined contextual situations, such as those discussed above. Memory 550 is also configured to store a repetitive image determination module 4310. The processing device may execute instructions associated with repetitive image determination module 4310 to determine whether two or more images are repetitive. In some embodiments, the processing device may compare image content of the two or more images. For example, the processing device may compare the environment captured in the images, the objects identified from the images, the date and time the images are captured, the contextual situations associated with the images. When the images show the same environment, same objects, similar objects, overlapping environment and/or objects, same environment and similar objects but non-existence of a predetermined contextual situation, the processing device may determine that the two or more images are repetitive.

In the embodiment shown in FIG. 43, memory 550 is configured to store an image log generation module 4315. The processing device may execute instructions associated with image log generation module 4315 to generate an image log. For example, the processing device may use identified key images to generate an image log, which may show information such as the identifiers of the images, date and/or time the images are captured, brief descriptions of the image content of the images, etc. The image log may be stored in image database 3801.

In the embodiment shown in FIG. 43, memory 550 is configured to store an image deletion module 4320. The processing device may execute instructions associated with image deletion module 4320 to delete an image. For example, the processing device may classify, based on a rule, some repetitive images as key images, and some repetitive images as auxiliary images. The processing device may delete at least some of the auxiliary images from image database 3801.

Figure 44:
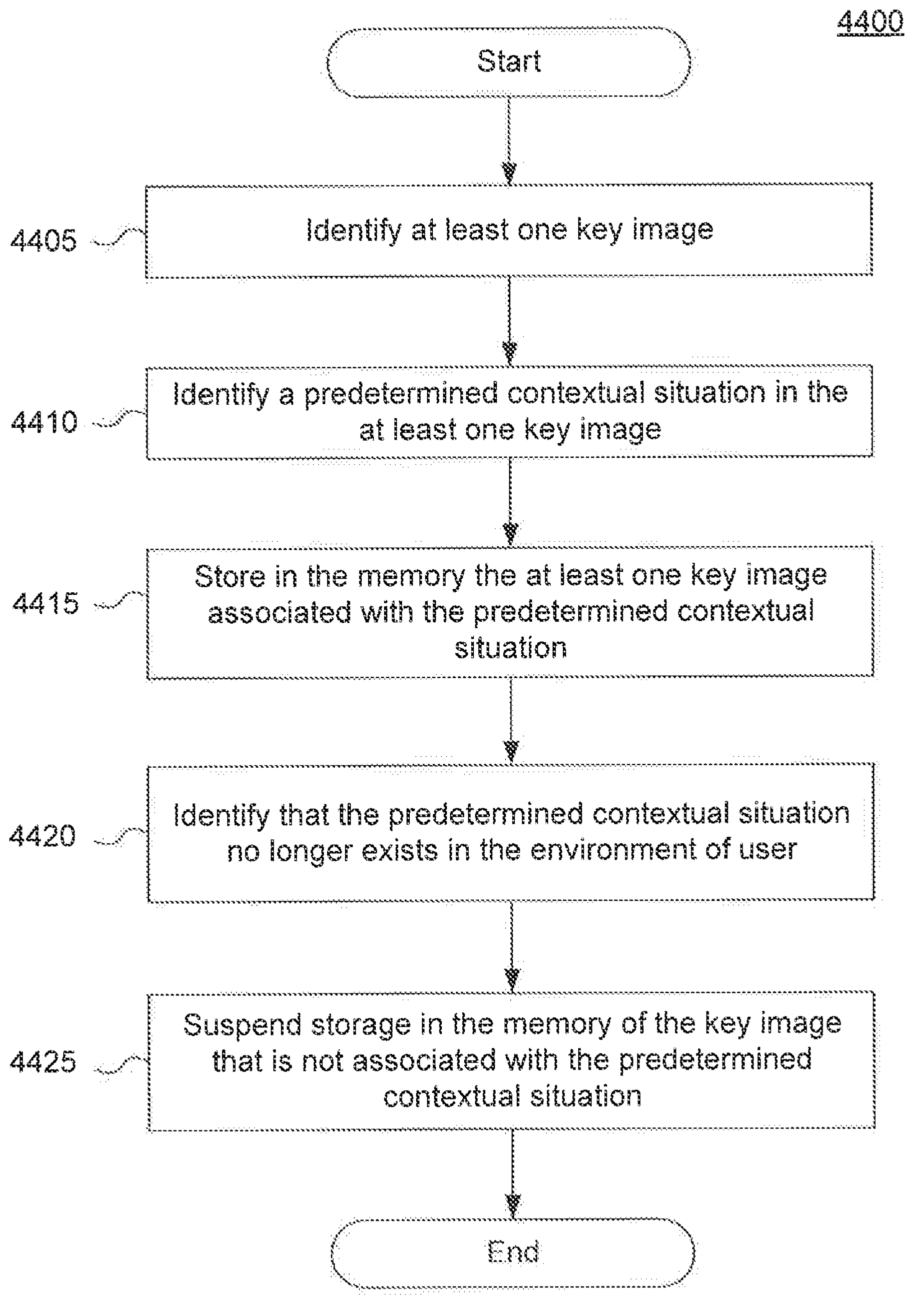
FIG. 44 is a flowchart illustrating an example method for selectively processing images.

FIG. 44 is a flowchart illustrating an example method 4400 for selectively processing images, consistent with the disclosed embodiments. Method 4400 may be performed by various devices included in wearable apparatus 110, such as, image sensor 220, 220*a*, and/or 220*b* and a processing device (e.g., processor 210 and/or processor 540). Steps included in method 4400 may be combined with the steps of method 4100 and/or method 4200. For example, method 4100 and/or method 4200 may include steps of method 4400, and method 4400 may include steps of method 4100 and/or method 4200.

Method 4400 may include identifying at least one key image (step 4405). In some embodiments, identifying the at least one key image may be performed by the processing device after step 4115 has been performed, e.g., after classifying the images into key images and auxiliary images has been performed. In some embodiments, the processing device may access image database 3801 to read or retrieve one or more key images previously classified and stored in image database 3801, and identify at least one key image from the plurality of key images.

Method 4400 may include identifying a predetermined contextual situation in the at least one key image (step 4410). For example, the processing device may process the at least one identified key image to identify a predetermined contextual situation exists in the key image. The processing device may first determine a contextual situation from the key image, and then compare the determined contextual situation with the predetermined contextual situations stored in the contextual situation database 4305, such as meeting with an individual, visiting a location, and interacting with an object, entering a car, participating in a sport activity, and eating a meal. When a match is found, the processing identifies that the predetermined contextual situation exists in the key image. In the example shown in FIG. 39, the predetermined contextual situation may be meeting with an individual. For example, user 100 may be meeting with person 3965.

Method 4400 may include storing, in a memory (e.g., memory 550, such as image database 3801), the at least one key image associated with the predetermined contextual situation (step 4415). For example, the processing device may store the at least one key image into image database 3801. In the example shown in FIG. 39, the predetermined contextual situation may be meeting with an individual (e.g., user 100 may be meeting with person 3965). An image having advertisement 3925 including the hand bag 3930 may be identified as a key image because it provide useful information regarding the hand bag 3930, i.e., it is something person 3965 may like. The processing device may store the key image associated with user 100 meeting with person 3965 into image database 3801.

Method 4400 may also include identifying that the predetermined contextual situation no longer exists in the environment of user 100 (step 4420). For example, the processing device may identify from an image that person 3965 has left. Based on this identification, the processing device may identify that the predetermined contextual situation (e.g., meeting with individual) no longer exists because user 100 is no longer meeting with person 3965. After identifying that the predetermined contextual situation no longer exists, the method may further include suspending storage in the memory of the key image that is not associated with the predetermined contextual situation (step 4425). For example, after person 3965 has left from the environment of user 100, user 100 is no longer meeting with person 3965. The key image including advertisement 3925 that shows hand bag 3930 may no longer provide useful information to user 100. The processing device may suspend storing the key image in image database 3801.

Wearable apparatus 110 may have a privacy mode, under which wearable apparatus 10 may stop or suspend capturing images of the environment of user 100, or stop or suspend storing captured images. The devices and methods discussed under this heading may be combined with the any device and/or method discussed above and below.

In some embodiments, the processing device may be programmed to identify in at least one of the key images a visual trigger associated with a private contextual situation, and suspend storage of images associated with the private contextual situation. The private contextual situation may be a situation where the privacy of a person or a plurality of persons is of concern, which may make it inappropriate for wearable apparatus 110 to capture images including the person or persons. In some embodiments, the processing device may suspend or stop capturing images by the image sensors (e.g., image sensor 220, 220*a*, 220*b*) after identifying the visual trigger associated with the private contextual situation. The visual trigger may include a predefined hand gesture, a restroom sign, a toilet, nudity, and/or a face of an individual. For example, the predefined hand gesture may include a hand gesture from a person (e.g., person 3965) suggesting user 100 to stop capturing image of the person. In some embodiments, being near or in the restroom or toilet may be a private contextual situation. In some embodiments, being faced with nudity of a person or a part of a person's body may be a private contextual situation. In some embodiments, the processing device may resume storage of key images when the private contextual situation no longer exists.

Figure 45:
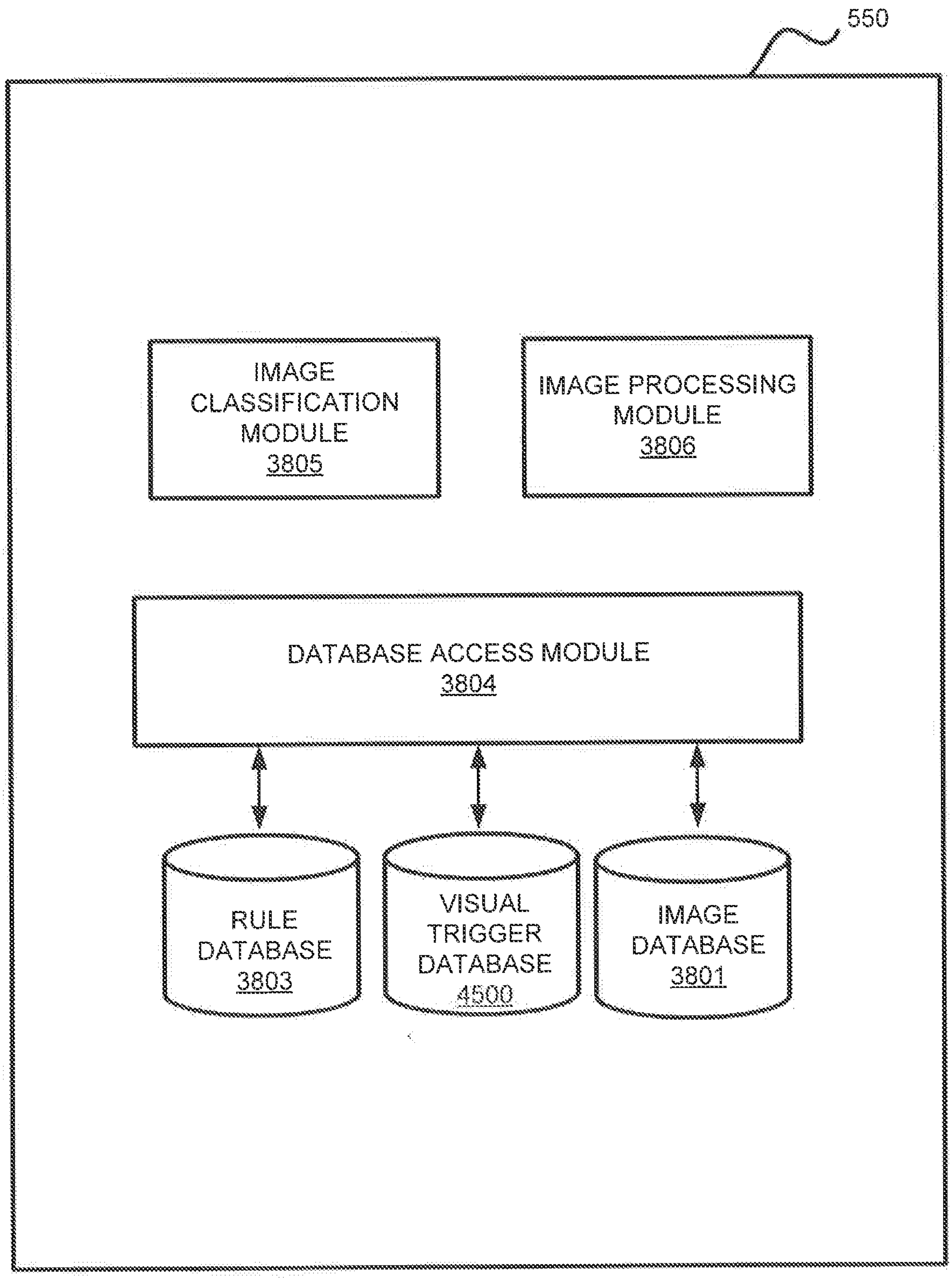
FIG. 45 is a block diagram illustrating a memory storing a plurality of modules and databases.

FIG. 45 is a block diagram illustrating a memory (e.g., memory 550, 550*a*, and/or 550*b*) according to the disclosed embodiments. Memory 550 may include databases and/or modules that are similar to those shown in FIG. 38 and FIG. 43. Thus, the descriptions of the same databases and/or modules are not repeated. Databases and/or modules shown in FIG. 45 may be combined with databases and/or modules shown in FIG. 38 and/or FIG. 43, or used as alternatives of the databases and/or modules shown in FIG. 38 and/or FIG. 43. Databases and/or modules shown in FIG. 38 and/or FIG. 43 may also be included in FIG. 45, or used as alternatives to the databases and/or modules shown in FIG. 45.

In the embodiment shown in FIG. 43, memory 550 is configured to store a visual trigger database 4500, which may be configured to store predetermined visual triggers, as discussed above. The processing device may access visual trigger database 4500 to read or retrieve one or more visual triggers, and compare captured images with the visual triggers to determine whether the captures images include one or more of the visual triggers. Once a visual trigger associated with a private contextual situation is identified from the images, the processing device may suspend storage of captured images, or suspend capturing of images of the environment including the visual trigger. When the private contextual situation no longer exists, the processing device may resume storage of the images (e.g., key images), or resume capturing of the image (e.g., key images).

Figure 46:
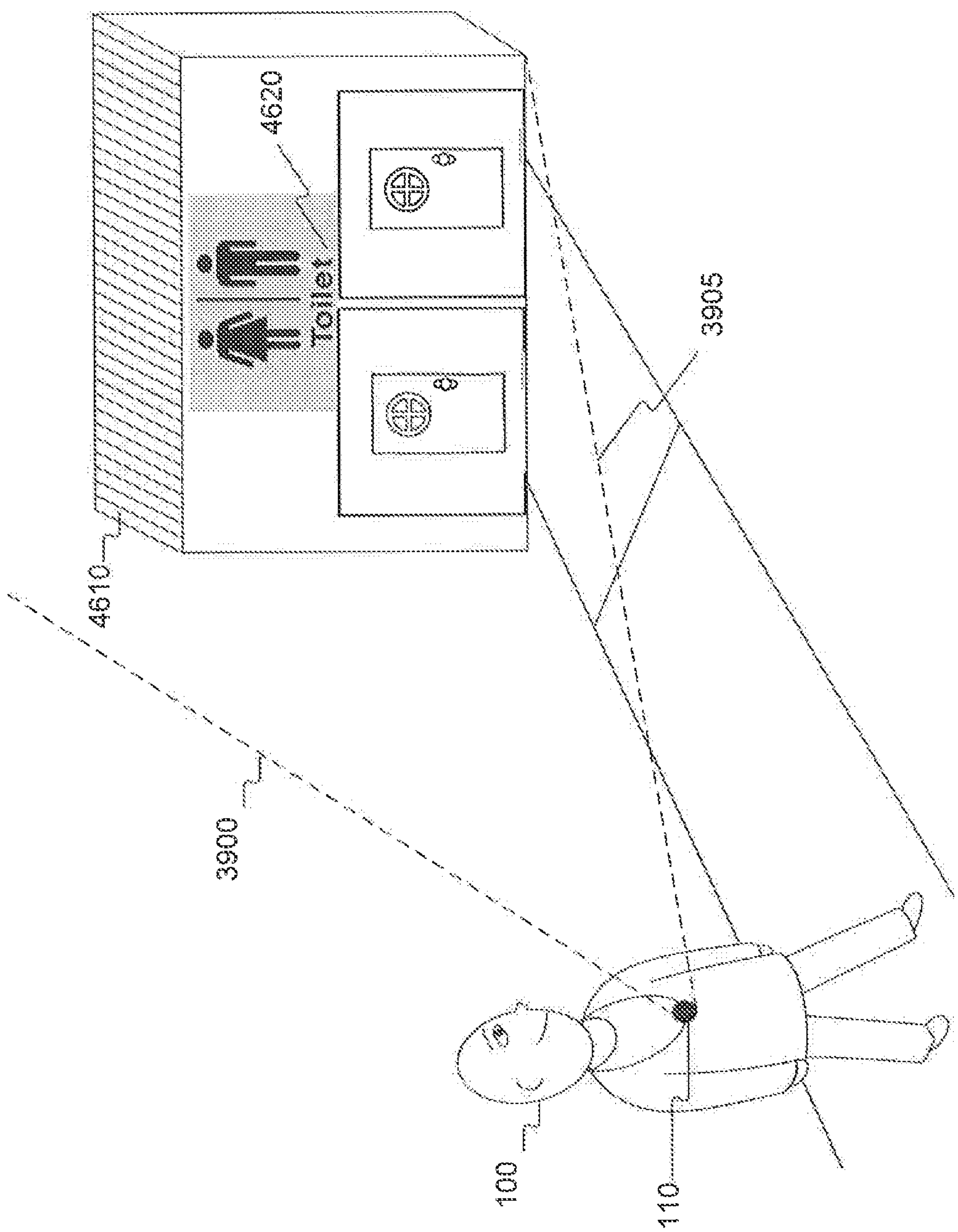
FIG. 46 shows an example environment including a wearable apparatus for capturing and processing images.

FIG. 46 shows an example environment including wearable apparatus 110 for capturing and processing images, consistent with the disclosed embodiments. The environment of user 100 may include a restroom or toilet 4610. The toilet 4610 may include a sign 4620 indicating that it is a toilet (or toilet sign 4620). After identifying the toilet sign 4620 from an image captured by wearable apparatus 110, the processing device may compare the toilet sign 4620 with the visual triggers stored in visual trigger database 4500. The processing device may determine that the camera of wearable apparatus 110 is capturing an image of a toilet or restroom, which indicates that there is a private contextual situation in front of user 100 and the wearable apparatus 110. The processing device may stop and/or suspend capturing images of the environment of user 100 including the toilet 4610, or stop and/or suspend storing images captured by the image sensors in image database 3801. When user 100 walks away from toilet 4610 such that the images captured by wearable apparatus 110 no longer includes toilet 4610, the processing device may resume capturing images of the environment of user 100, and/or resume storage of images (e.g., key images) of the environment of user 100.

Figure 47:
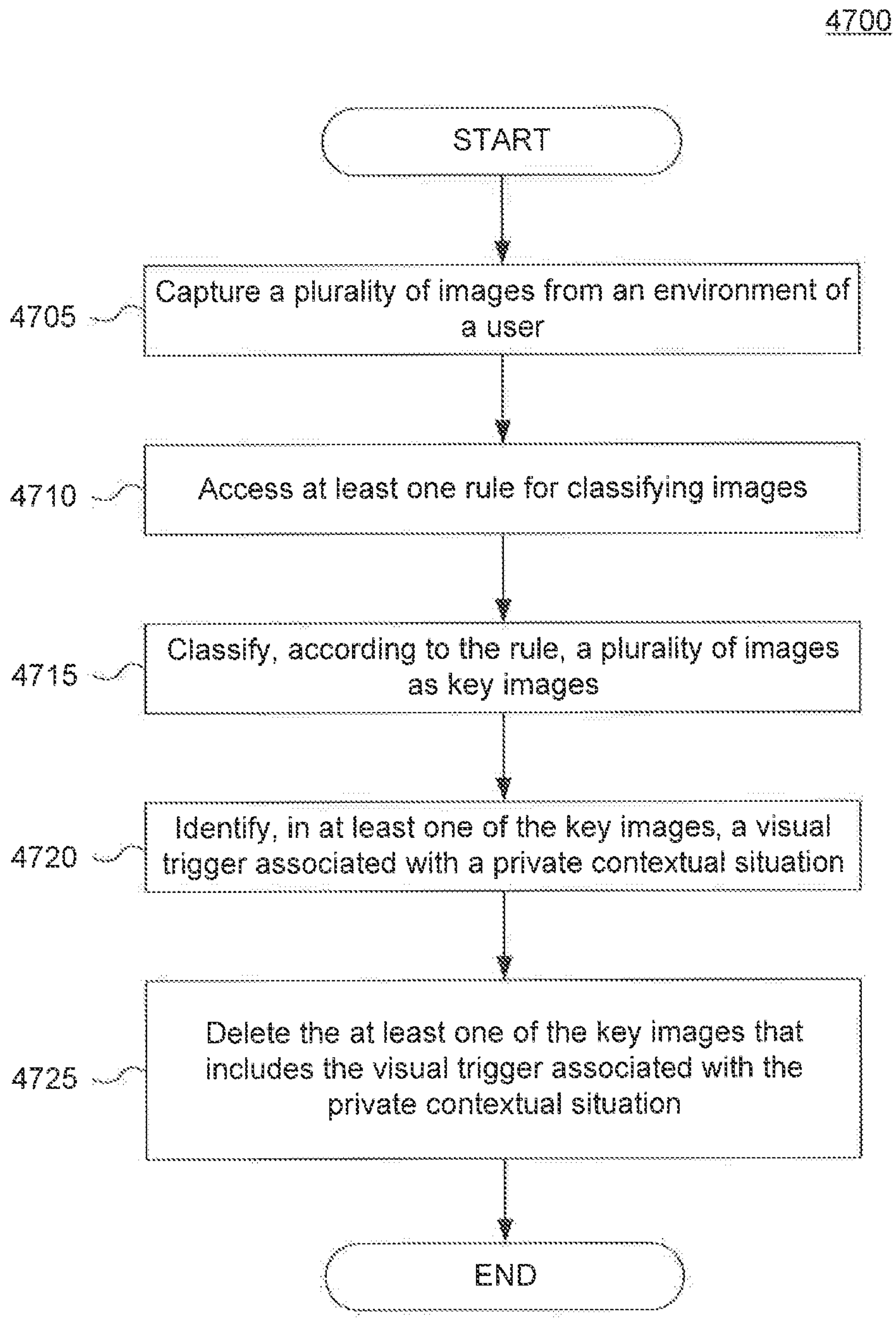
FIG. 47 is a flowchart illustrating an example method for selectively processing images.

FIG. 47 is a flowchart illustrating an example method 4700 for selectively processing images, consistent with the disclosed embodiments. Method 4700 may be performed by various devices included in wearable apparatus 110, such as, image sensor 220, 220*a*, and/or 220*b* and a processing device (e.g., processor 210 and/or processor 540). Steps included in method 4700 may be combined with the steps of methods 4100, 4200, and 4400. For example, methods 4100, 4200, and 4400 may each include steps of method 4700, and method 4700 may include steps of methods 4100, 4200, and 4400.

Method 4700 may include capturing a plurality of images from an environment of user 100 (step 4705). For example, image sensors included in wearable apparatus 110 may capture a plurality of images from the environment of user 100 shown in FIG. 39 or FIG. 46. Method 4700 may also include accessing at least one rule for classifying images (step 4710). For example, the processing device may access rule database 3803 to read or retrieve at least one rule for classifying images as key images and auxiliary images. Method 4700 may also include classifying, according to the at least one rule, a plurality of images as key images (step 4715). For example, a rule may classify an image including a face of a person, a product, or text as a key image. The processing device may classify a plurality of images including person 3965, hand bag 3935, and text "Bag." as captured from the environment shown in FIG. 39, as key images. Method 4700 may further include identifying, in at least one of the key images, a visual trigger associated with a private contextual situation (step 4720). For example, the processing device may identify from a key image including person 3965 a hand gesture suggesting user 100 to stop capturing images of person 3965. The hand gesture suggesting user 100 to stop capturing images may be associated with a private contextual situation. For example, person 3965 may want privacy, and may not wish to be captured in any image. As another example, the processing device may identify that there is a private contextual situation in the environment of user 100, such as a toilet or restroom, as shown in FIG. 46. Method 4700 may further include deleting the at least one of the key images that includes the visual trigger associated with the private contextual situation (step 4725).

Wearable apparatus 110 may be configured to capture images from an environment of user 100 through a wearable image sensor, such as image sensor 220, 220*a*, and/or 220*b*. One or more images captured by wearable apparatus 110 may show what activities user 100 has been engaged or involved in. At least one processing device, such as processor 210 and/or processor 540 may be programmed to perform various processes on the captured images to identify an activity occurring in the environment of user 100. For example, the processing device may identify, from the captured images, that user 100 is or has engaged in a sport activity (e.g., playing soccer game), a music activity (e.g., attending a concert), or a transit activity (e.g., riding a bus). The processing device may associate the activity with an activity category, such as sports, music, transit, etc. The processing device may cause transmission of at least the activity category to a remotely located computing device (e.g., computing device 120 and/or server 250 that may be remotely located and in communication with wearable apparatus 110 via network 240) via a communications interface. The communication interface may include wireless transceiver 530 and/or 530*b*. The communication interface may include other suitable communication means configured to transmit and receive data including, for example, one or more wired connections.

In some embodiments, the processing device may be programmed to determine a location (e.g., a soccer field, a GPS address, a street address, etc.) at which the activity (e.g., soccer game, music lesson, shopping activity) occurred and to transmit the location to the computing device via the communications interface. In some embodiments, the processing device may transmit at least one of the plurality of images depicting the activity (e.g., soccer game) to the computing device.

In some embodiments, the processing device may cause the computing device to display a life log including the at least one of the plurality of images depicting the activity in association with the activity category. The remotely located computing device may be located at, e.g., a doctor's office or an activity tracking center. The life log may show the doctor or an activity monitoring operator what activities user 100 has been or is engaged in. The life log may show activities under different activity categories.

In some embodiments, the processing device may determine an elapsed time of the activity, and transmit the elapsed time to the computing device. For example, the processing device may determine, from a plurality of images captured by the image sensors of wearable apparatus 110, the amount of time has elapsed relating to an activity (e.g., 30 minutes has elapsed for user 100 engaging in a soccer game). The processing device may transmit the 30 minutes elapsed time to the computing device, such that, for example, the doctor or the activity monitoring operator may track the amount of time of the activity in which user 100 has engaged or is performing.

In some embodiments, the processing device may determine an interest level of user 100 regarding an activity category (e.g., sports). The interest level may be quantified (e.g., represented by numbers). For example, the interest level may be represented by any integer number ranging from 1 to 5, which a higher number indicating a higher interest level. Other methods, such as symbols, alphabets, etc., may also be used to represent interest levels. In some embodiments, the processing device may determine the interest level based on at least the elapsed time of the activity.

In some embodiments, the processing device may determine a number of activities associated with one or more activity categories that were performed by the user over a time period. For example, the processing device may process a plurality of images captured by the image sensors to determine the number of activities, such as the number of sports (basketball, soccer, ping pong, etc.) associated with the sports category that were performed by user 100 over the last day, week, or month. As another example, the processing device may determine the number of music activities, such as playing piano, playing drum, attending concert, which are associated with the music category that were performed by user 100 over the last day, week, or month.

In some embodiments, the processing device may select a recommendation for user 100 based on at least the activity category. For example, the processing device may select a schedule of a soccer game in two days as a recommendation based on information derived from captured images indicating that indicates user 100 is interested in the activity category of sports.

In some embodiments, the processing device may select at least one of an advertisement and a coupon for presenting to the user based on at least the activity category. For example, based on information derived from the captured images indicating that user 100 is interested in the activity category of sports, the processing device may select an advertisement and/or a coupon relating to a sales event of a soccer shirt of a local team.

In some embodiments, the processing device may receive at least one of an advertisement and a coupon for presenting to the user based on at least the activity category. For example, the processing device may transmit information regarding the activities user 100 has performed or is performing, and/or the activity category associated with the activities user 100 has performed or is performing, to server 250. Server 250 may analyze the information regarding activities and/or activity category, and based on the analysis, select an advertisement and/or a coupon relating to sales of the soccer shirt of the local team as recommended information to present to user 100. Server 250 may transmit the recommended information (or recommendation) to the processing device. The processing device may transmit the recommended information to a device user 100 is also carrying, such as computing device 120, and cause computing device 120 to display the advertisement and/or coupon to user 100.

In some embodiments, the processing device may transmit information regarding the activities user 100 has performed or is performing, and/or the activity category associated with the activities user 100 has performed or is performing to computing device 120 and/or server 250. Computing device and/or server 250 may analyze the information regarding activities and/or activity category, and based on the analysis, select an advertisement and/or a coupon relating to sales of a soccer shirt of the local team as recommended information to presented to user 100. Computing device and/or server 250 may transmit the recommended information (or recommendation) to the processing device. The processing device may output the advertisement and/or coupon as an audio message through feedback outputting unit 230.

Figure 48:
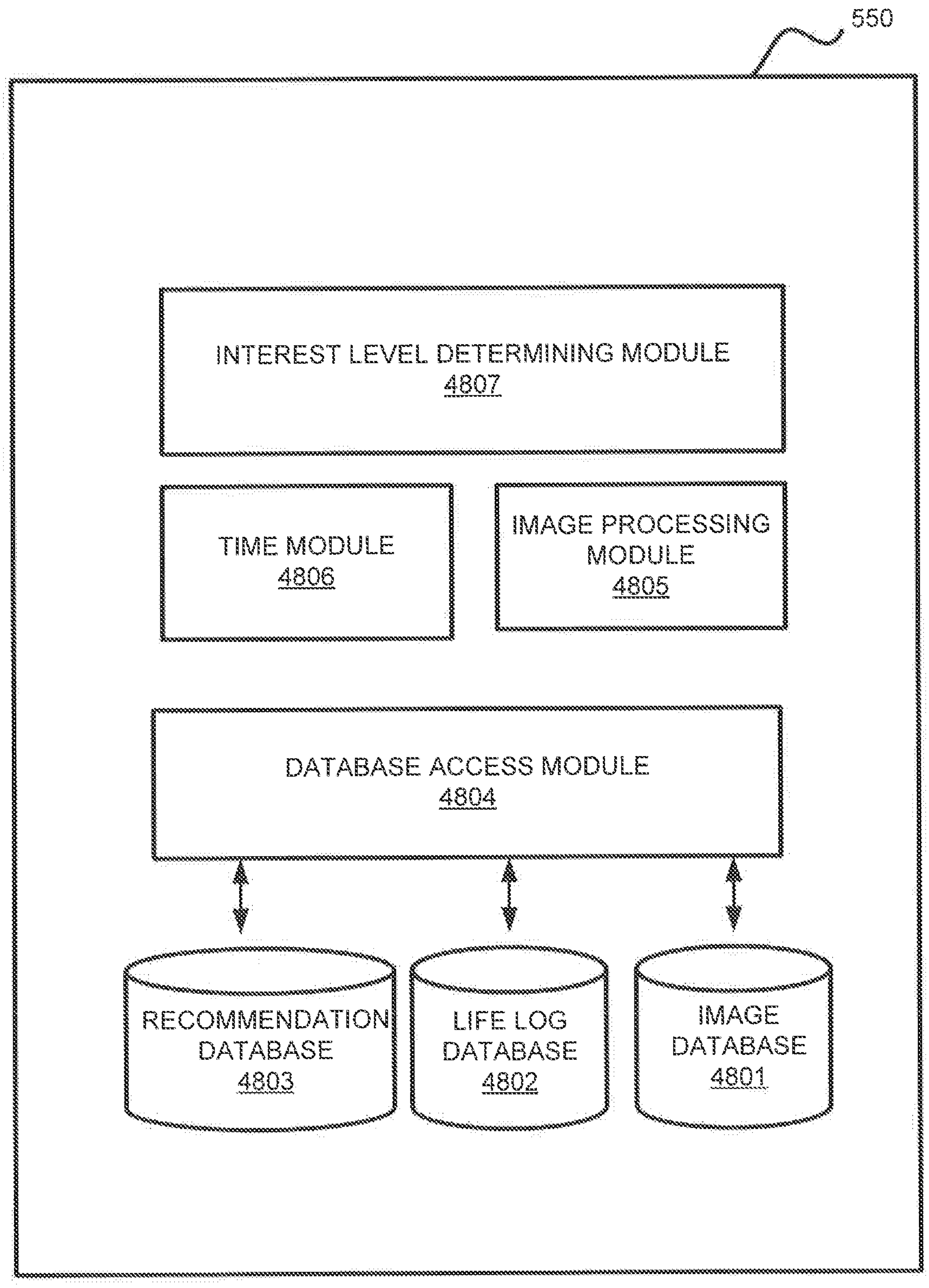
FIG. 48 is a block diagram illustrating an example memory storing a plurality of modules and databases.

FIG. 48 is a block diagram illustrating a memory (e.g., memory 550, 550*a*, and/or 550*b*) according to the disclosed embodiments. The memory may include one or more modules or sets of instructions, which when executed by at least one processing device, carry out methods consistent with the disclosed embodiments. For example, the memory may include instructions executable by the at least one processing device to process or analyze images captured by the image sensors. In some embodiments, the processing device may be included in wearable apparatus 110. For example, the processing device may include processor 210, 210*a*, and/or 210*b* shown in FIGS. 10 and 11. The processing device may process the image data captured by the image sensors in near real time, as the image data are being captured by the image sensors. In some embodiments, the processing device may include a processor that is separately located from wearable apparatus 110. The processing device may include a processor that is remotely connected with wearable apparatus 110 through network 240, which may be a wired or wireless network, or through any other connectivity means, such as Bluetooth, near field communication (NFC), etc. For example, the processing device may include processor 540 included in computing device 120, which may be connected with wearable apparatus 110 through a wired or wireless connection, such as through a cable, Bluetooth, WiFi, infrared, or near field communication (NFC). In some embodiments, the processing device may include a processor included in server 250, which may be wirelessly connected with wearable apparatus 110 through network 240. In some embodiments, the processing device may include a cloud computing processor remotely and wirelessly connected with wearable apparatus 110 through network 240. Wearable apparatus 110 may transmit captured image data to the processing device in near real time, and the processing device may process the captured image data and provide results of processing to wearable apparatus 110 in near real time. Further, in some embodiments, one or more databases and one or more modules may be located remotely from wearable apparatus 110 (e.g., included in computing device 120 and/or server 250).

In the example shown in FIG. 48, memory 550 includes or stores an image database 4801, a life log database 4802, and a recommendation database 4803. Memory 550 may also include a database access module 4804, an image processing module 4805, a time module 4806, and an interest level determining module 4807. Additional or fewer databases and/or modules may be included in memory 550. The modules and databases shown in FIG. 48 are examples, and a processor in the disclosed embodiments may operate according to any suitable process.

In the embodiment shown in FIG. 48, memory 550 is configured to store an image database 4801. Image database 4801 may be configured to store various images, such as images (or image data) captured by an image sensor (e.g., image sensor 220, 220*a*, and/or 220*b*), which may depict activities user 100 has performed or is performing. Image database 4801 may also be configured to store data other than image data, such as textual data, audio data, video data, etc. For example, image database 4801 may be configured to store information related to the images, such as location information, date and time information, an identity of an object identified in the images, textual descriptions of activities user 100 has performed, etc.

In the example shown in FIG. 48, memory 550 is also configured to store a life log database 4802. Life log database 4802 may be configured to store various life logs. The life log may include data regarding the activities performed by user 100 in his or her life. For example, the life log may include a plurality of images depicting the activities, such as images captured during a sports game user 100 has involved. The life log may include descriptions of the activities, such as the location, date, time, and duration related to the activities. The life log may also include activity category information. In some embodiments, each life log may record information relating to the activities associated with a particular activity category. In some embodiments, the processing device of wearable apparatus 110 may cause images captured while user 100 is performing an activity to be saved in a life log in near real time.

Memory 550 is also configured to store a recommendation database 4803. Recommendation database 4803 may be configured to store one or more predefined recommendations to be presented to user 100. The recommendations to be presented to user 100 may be based on activities user 100 has performed or is performing, and/or the associated activity category. For example, the recommendations may include a recommendation of soccer, basketball, ping pong associated with the sports activity category. In some embodiments, the recommendations may include an advertisement and/or a coupon based on the activities user 100 has performed or is performing, and/or the associated activity category. For example, the advertisement and/or coupon may relate to a merchant bearing a logo of a local soccer team, and may be associated to the sports activity category.

As shown in FIG. 48, memory 550 is also configured to store a database access module 4804. The processing device may execute instructions associated with database access module 4804 to access image database 4801, life log database 4802, and recommendation database 4803, for example, to retrieve previously stored image data, a life log, and/or recommendations. The processing device may also execute instructions associated with database access module 4804 to store image data in image database 4801, life logs in life log database 4802, and recommendations in recommendation database 4803.

In the embodiment shown in FIG. 48, memory 550 is configured to store an image processing module 4805. The processing device may execute instructions associated with image processing module 4805 to perform various analyses and processes of image data captured by the image sensors. For example, the processing device may execute instructions associated with image processing module 4805 to identify an activity occurring in the environment of user 100. The processing device may execute instructions associated with image processing module 4805 to associate the activity with an activity category. A plurality of activity categories may be stored in image database 4801 or other databases included in memory 550.

In the embodiment shown in FIG. 48, memory 550 is configured to store a time module 4806. The processing device may execute instructions associated with time module 4806 to determine an elapsed time of an activity (e.g., soccer game), or a date and time an image is captured.

In the embodiment shown in FIG. 48, memory 550 is configured to store an interest level determining module 4807. The processing device may execute instructions associated with interest level determining module 4807 to determine an interest level of user 100 in an activity (e.g., soccer game) or an activity category (e.g., sports). In some embodiments, the interest level of user 100 in an activity or an activity category may be determined, by the processing device, based on at least the elapsed time of the activity, as determined from the images depicting the activity. For example, the processing device may determine from the captured images depicting a soccer game, that user 100 has a high interest level in soccer games because the images indicate that user 100 played the soccer game for over an hour. Other information included in the images may also be used to determine the interest level of user 100. For example, if images show that user 100 has watched a soccer game on TV for two hours, the processing device may determine that user 100 has a high interest level in soccer games.

Figure 49:
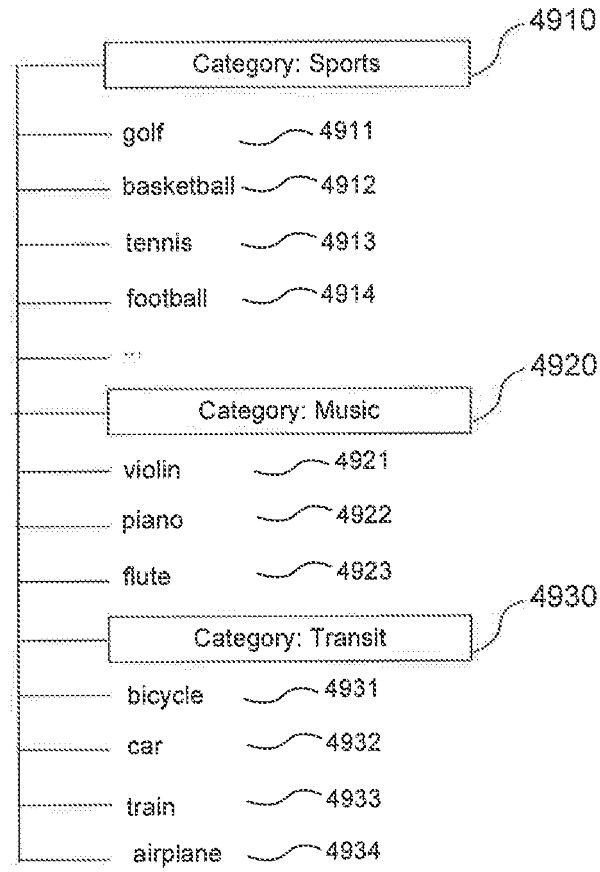
FIG. 49 is a schematic illustration of activity categories and associated activities.

FIG. 49 is a schematic illustration of activity categories and associated activities. These categories may be stored in image database 4801 or any other database included in memory 550. The categories may include a first category 4910 of sports, a second category 4920 of music, and a third category 4930 of transit. Other categories, such as outdoor activity, indoor activity, may also be stored in image database 4801. First category 4910 may include various sports, such as (playing) golf 4911, (playing) basketball 4912, (playing) tennis 4913, and (playing) football 4914. First category 4910 may also include other sports, such as horse racing. Second category 4920 may include various activities related to music. For example, second category 4920 may include (playing) violin 4921, (playing) piano 4922, and (playing) flute 4923. Other music activities, such as attending concert, may also be included. Third category 4930 may include various activities relating to transit. For example, third category 4930 may include (riding) bicycle 4931, (driving) car 4932, (riding) train 4933, and (flying) airplane 4934. Other activities relating to transit, such as taking a cruise, may also be included.

Figure 50:
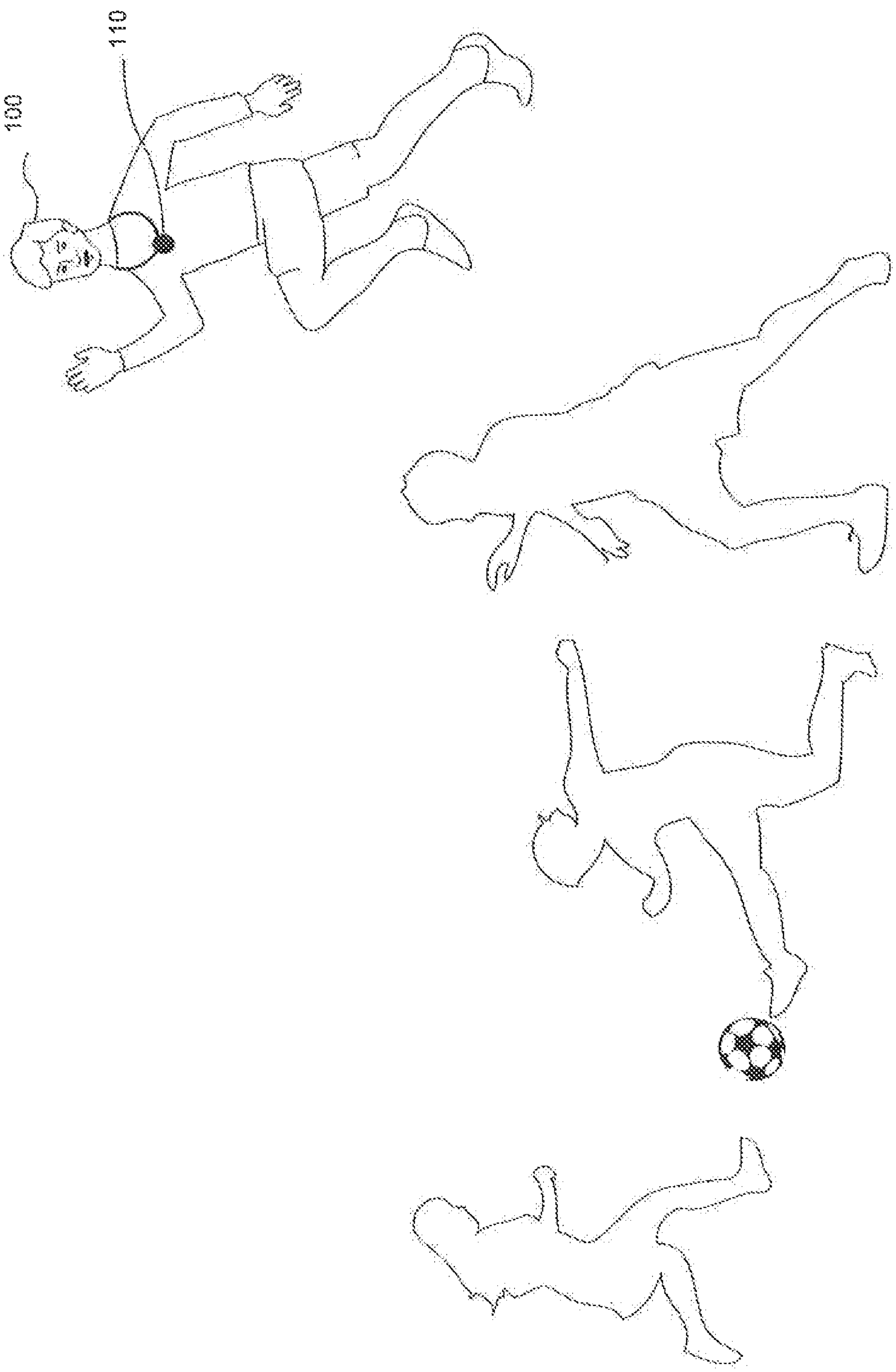
FIG. 50 shows an example environment including a wearable apparatus for capturing and processing images.

FIG. 50 shows an example environment including wearable apparatus 110 for capturing and processing images. User 100 may wear wearable apparatus 110 on his or her neck. User 100 may be playing a soccer game with other players. Wearable apparatus 110 may capture a plurality of images depicting the soccer game while user 100 is playing the game. The images depicting the activity user 100 has performed or is performing may be included in a life log saved in life log database 4802. In some embodiments, user 100 may be watching other players playing the soccer game, and may capture images relating to the soccer game using wearable apparatus 110. The images may reflect that user 100 is watching a soccer game rather than playing the soccer game. For example, the images may reflect that they are captured from a same static point of view, indicating that user 100 is watching rather than playing the soccer game.

Figure 51:
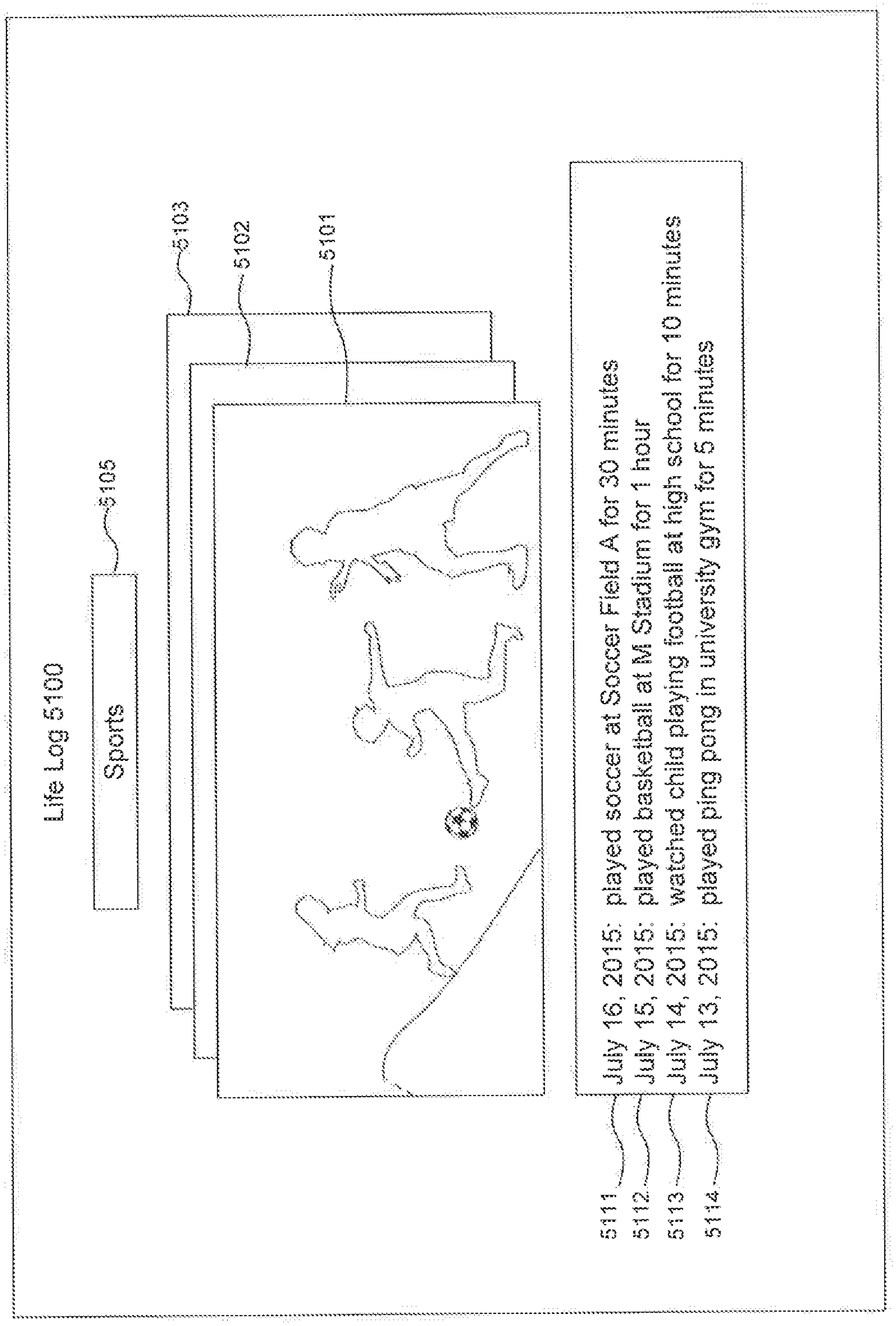
FIG. 51 shows an example life log that stores or records information relating to activities a user has performed or is performing.

FIG. 51 shows an example life log that stores or records information relating to activities user 100 has performed or is performing. For example, life log 5100 may record or store information relating to activities associated with an activity category of sports 5105 that user 100 has performed or is performing. Life log 5100 may be in the form of an electronic folder, which may include files, such as image files relating to activities user 100 has performed or is performing, as captured by wearable apparatus 110. Life log 5100 may also include text, such as descriptions of image files and/or activities. Life log 5100 may be stored in life log database 4802, and may be read or retrieved by the processing device. Life log 5100 may be transmitted from life log database 4802 to other devices for analysis and/or display, such as computing device 120 and/or server 250. For example, user 100 or another person, such as a doctor or an activity monitoring operator may view life log 5100 to learn what activities user 100 has performed during a day, a week, a month, a year, etc. In the embodiment shown in FIG. 51, life log 5100 includes a plurality of images 5101, 5102, 5103 depicting sports related activities user 100 has performed. Life log 5100 may also include images depicting activities user 100 has not performed but watched. Life log 5100 may also include a plurality of textual entries 5111-5114 describing activities user 100 has performed, or otherwise captured using wearable apparatus 110. Information included in the textual entries 5111-5114 may include date, time, a description of the activity (including location and a duration of time the activity lasts), etc.

Figure 52:
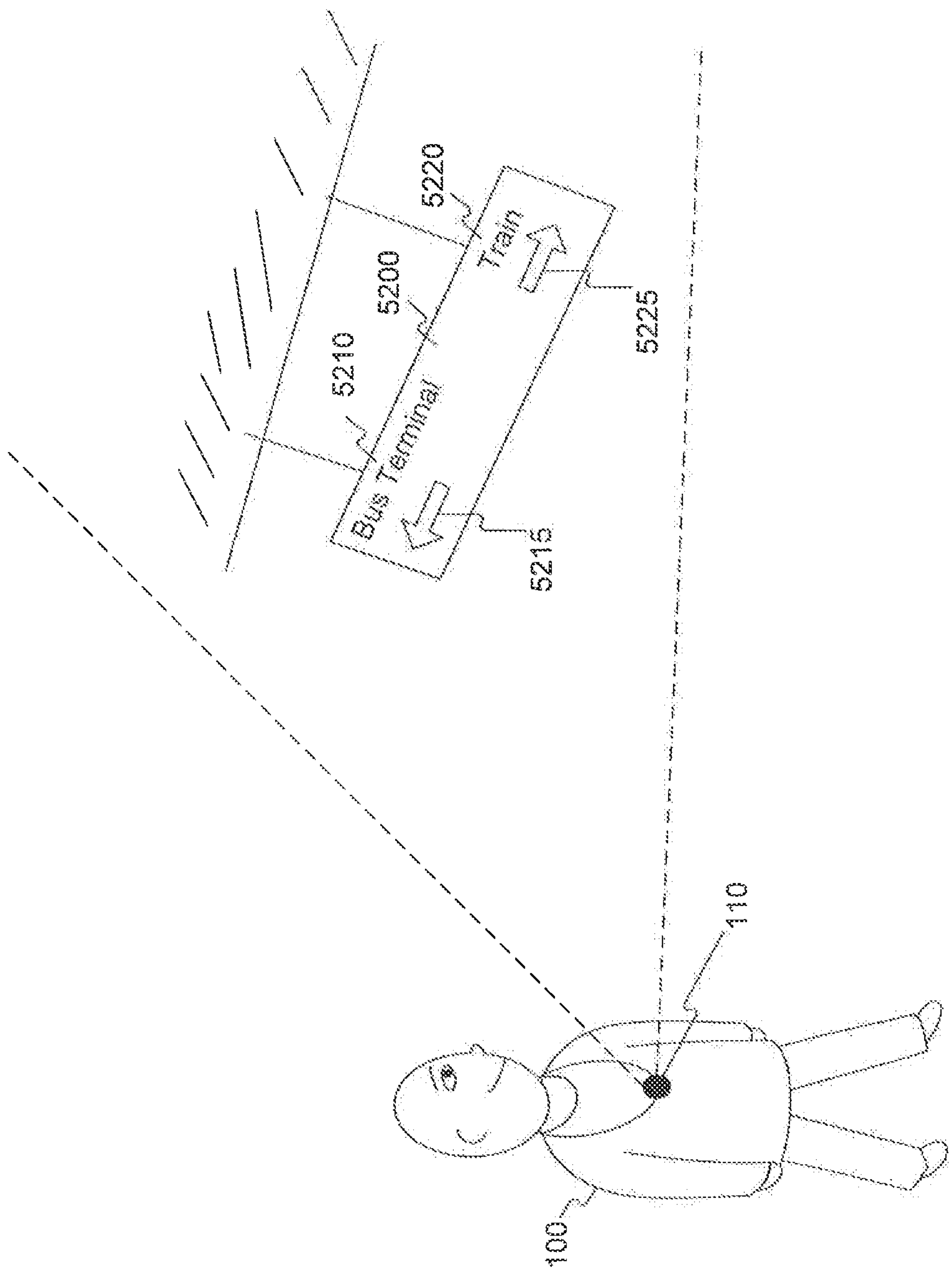
FIG. 52 shows an example environment including a wearable apparatus for capturing and processing images.

FIG. 52 shows an example environment including wearable apparatus 110 for capturing and processing images. User 100 may wear wearable apparatus 110 on his or her neck. User 100 may be in a transit center, walking to catch a bus or a train. In some embodiments, wearable apparatus 110 may capture a plurality of images of the transit center as user 100 walks through the transit center. For example, wearable apparatus 110 may capture an image of a direction sign 5200, which may include text label 5210 indicating "Bus Terminal" and text label 5220 indicating "Train." An arrow 5215 may be associated with text label 5210 instructing user 100 to turn left to go to a bus terminal. An arrow 5225 may be associated with text label 5220 instructing user 100 to turn right to go to a train station. User 100 may turn left to go to the bus terminal, take a ride on a bus to go to a destination. Along the trip, wearable apparatus 110 may continue capturing images to record the activities user 100 has performed.

Figure 53:
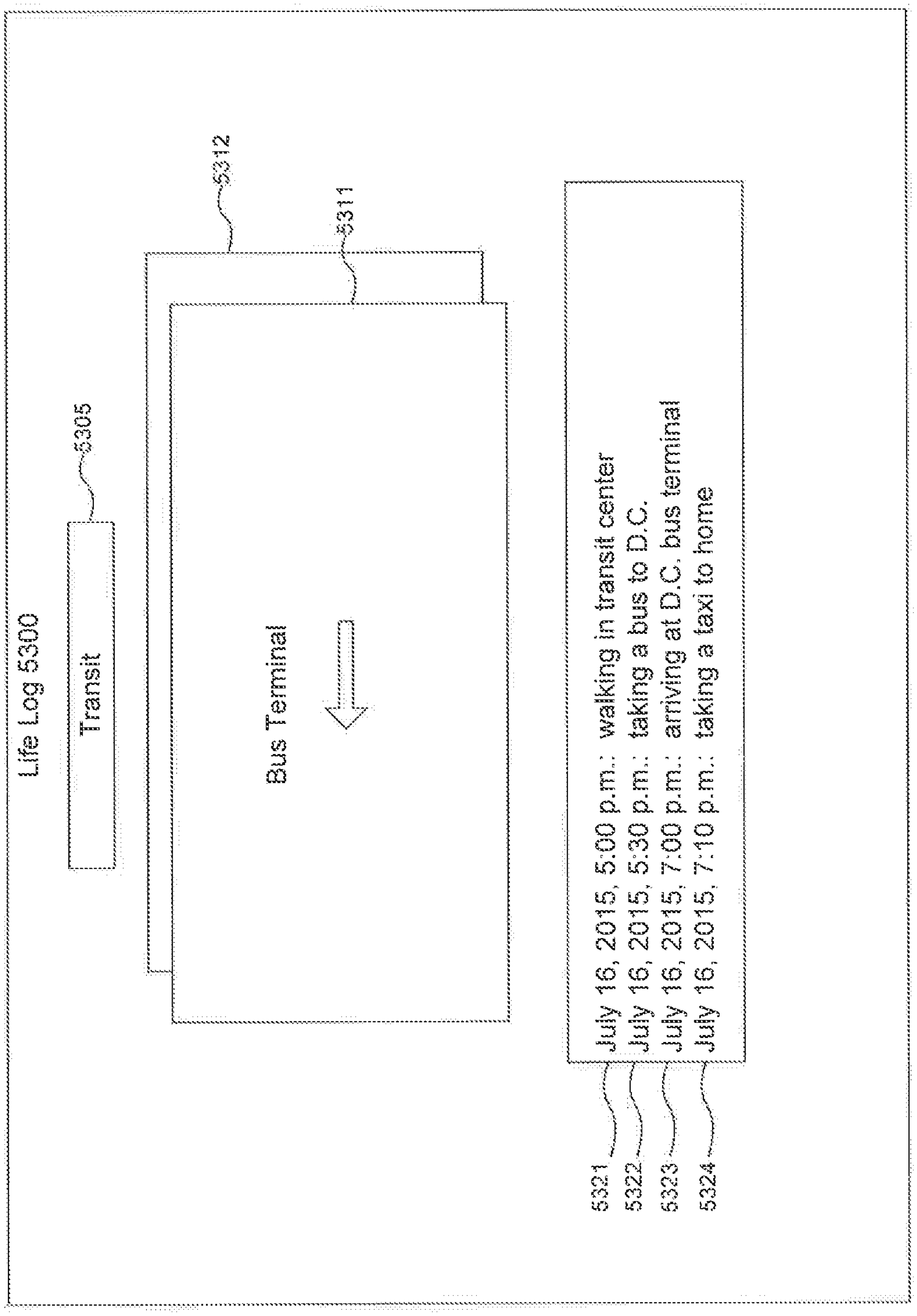
FIG. 53 shows an example life log that stores or records information relating to activities a user has performed or is performing.

FIG. 53 shows an example life log that stores or records information relating to activities user 100 has performed or is performing. Life log 5300 may be similar to life log 5100, except that life log 5300 may record or store information relating to activities associated with an activity category of transit 5305. Life log 5300 may include a plurality of images captured by wearable apparatus 110 that depict activities of user 100 relating to transit. For example, life log 5300 may include a first image 5311 depicting a portion of direction sign 5200 that instructs user 100 to turn left to go to the bus terminal. Life log 5300 may include a second image 5312, which may depict another portion of direction sign 5200 that instruct user 100 to turn right to go to train stations, for example. Life log 5300 may include other images captured during the trip user 100 has taken, which may depict activities user 100 has performed on the trip. Life log 5300 may include textual entries 5321-5324. The textual entries may describe the activities relating to activity category of transit that user 100 has performed or involved. Each textual entry may include a date, time, a description of the activity, etc.

Figure 54:
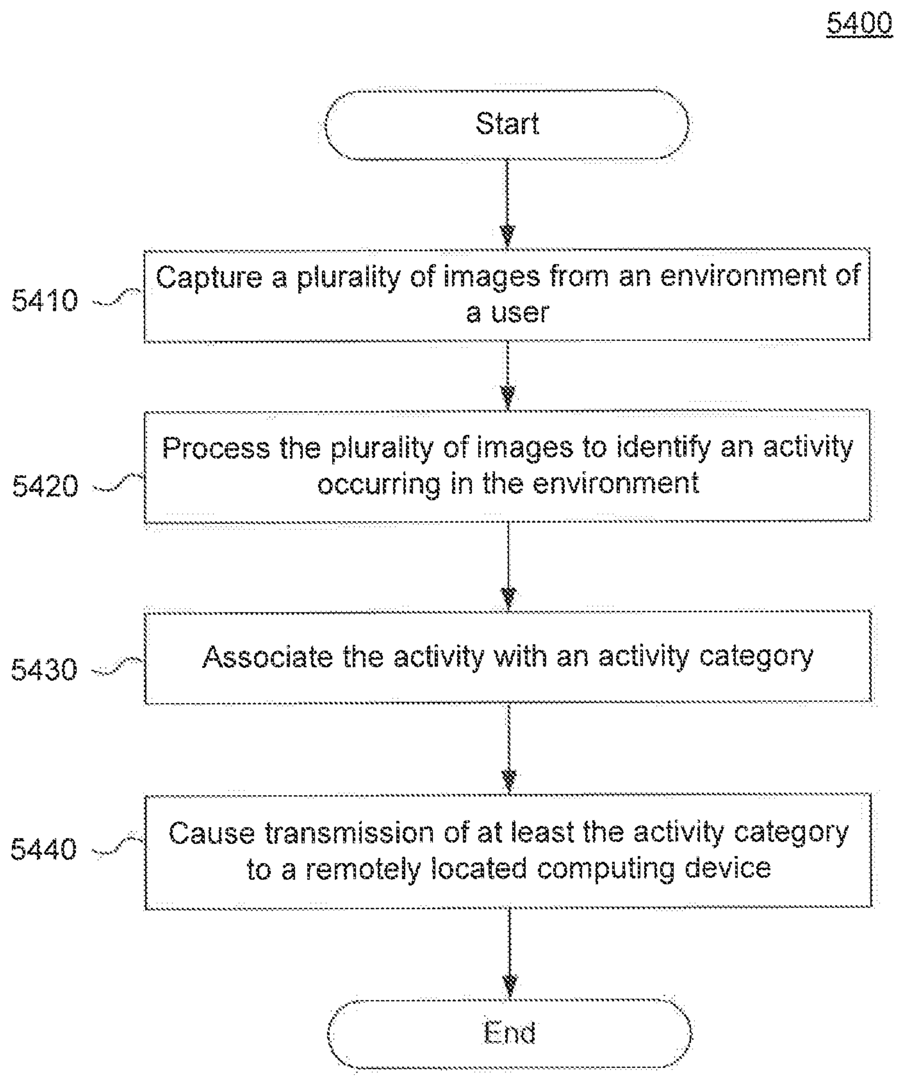
FIG. 54 is a flowchart showing an example method for capturing and processing image data.

FIG. 54 is a flowchart showing an example method 5400 for capturing and processing image data according to a disclosed embodiment. Method 5400 may be executed by various devices included in wearable apparatus 110, such as image sensor 220, 220*a*, and/or 220*b*, and at least one processing device (e.g., processor 210 and/or processor 540). Method 5400 may include capturing a plurality of images from an environment of a user (e.g., user 100) who wears wearable apparatus 110 (step 5410). For example, one or more image sensors 220, 220*a*, and/or 220*b* may capture image data of the environment of user 100. Method 5400 may include processing the plurality of images to identify an activity occurring in the environment of user 100 (step 5420). For example, the processing device may process the images to identify a soccer game occurring in the environment of user 100. In some embodiments, the processing device may identify, from the images, that user 100 has performed or is performing the activity (e.g., playing the soccer game). Method 5400 may also include associating the activity with an activity category (step 5430). For example, the processing device may associate the soccer game activity identified from the images with an activity category of sports. Method 5400 may also include causing transmission of at least the activity category to a remotely located computing device (step 5440). The transmission may be performed via a communications interface, such as wireless transceiver 530 and/or 530*b*. For example, the processing device may cause the activity category of sports and/or the soccer game activities to be transmitted to computing device 120 and/or server 250. Computing device 120 and/or server 250 may select a recommendation (e.g., an advertisement and/or coupon related to a merchant associated with the activity category) and transmit the recommendation to the processing device of wearable apparatus 110. In some embodiments, the processing device of wearable apparatus 110 may cause the recommendation to be output to user 100 through feedback outputting unit 230.

Method 5400 may include other steps and/or processes. For example, method 5400 may include determining, through the processing device, a location at which the activity occurred and transmitting the location to the computing device (e.g., computing device 120 and/or server 250) via the communications interface (e.g., wireless transceiver 530 and/or 530*b*). Method 5400 may also include transmitting, through the processing device, at least one of a plurality of images depicting the activity (e.g., soccer game) to the computing device. Method 5400 may also include causing, through the processing device, the computing device to display a life log (e.g., life log 5100 and/or 5300) including at least one of the plurality of images depicting the activity (e.g., soccer game) in association with the activity category (e.g., sports).

In some embodiments, method 5400 may include determining, through the processing device, an elapsed time of the activity. Method 5400 may include transmitting, through the processing device, the elapsed time to the computing device (e.g., computing device 120 and/or server 250). Method 5400 may also include determining, through the processing device, an interest level of the user regarding the activity category (e.g., soccer game). The interest level may be determined, e.g., through the processing device, based on at least the elapsed time of the activity. For example, based on duration of time information recorded or stored in the life log (e.g., life log 5100), the processing device may determine that user 100 has a high level of interest in soccer games because user 100 played the soccer game for 30 minutes, as shown in textual entry 5111. The processing device may assign a number "5" to represent the high interest level. The processing device may determine that user 100 has a low level of interest in ping pong because textual entry 5114 indicates that user 100 played ping pong for only 5 minutes. The processing device may assign a number "1" to represent the low interest level.

In some embodiments, method 5400 may also include determining, through the processing device, a number of activities associated with one or more activity categories that were performed by the user over a time period. For example, the processing device may analyze one or more life logs (e.g., life log 5100) to determine how many sports activities user 100 has performed over a week, a month, a year, etc. As another example, the processing device may analyze one or more life log (e.g., life log 5300) to determine how many rides (of cars, buses, trains, etc.) user 100 has taken over a week, a month, a year, etc.

In some embodiments, method 5400 may include selecting, through the processing device, a recommendation for user 100 based on at least the activity category. For example, the processing device may select, from a plurality of recommendations stored in recommendation database 4803, a recommendation for user 100 based on the activity category (e.g., sports) associated with the activities (e.g., soccer games) user 100 has performed. In some embodiments, the processing device may select an advertisement and/or a coupon for a merchant related to sports. The advertisement and/or coupon may be previously received by the processing device and stored in recommendation database 4803.

User 100 may be interested in some activities and not interested in others. The processing device may determine an interest level of user 100 related to an activity or an activity category. In some embodiments, the processing device may cause the computing device (e.g., computing device 120 and/or server 250) to display a life log including information regarding activities associated with the activity category for which user 100 is determined to have at least a certain level of interest. In some embodiments, the processing device may cause the computing device to omit information from a life log regarding activities associated with the activity category for which user 100 is determined to have less than a certain level of interest. In some embodiments, the processing device may determine a preference of the user related to the activity, for example, based on whether user 100 deleted information related to the activity from the life log, or whether user 100 flagged information related to the activity as being not of interest. Selectively including and/or excluding information from the life log may save the storage space needed for storing the life log.

In some embodiments, the processing device may cause the computing device (e.g., computing device 120 and/or server 250) to delete information related to the activity category based on the preference of user 100. In some embodiments, the processing device may cause the computing device to include information in the life log related to a child under the user's supervision. In some embodiments, the processing device may cause the computing device to include information in the life log related to images that include text.

In some embodiments, the processing device may process the plurality of images to identify an activity occurring in the environment of user 100. The processing device may access profile information related to the user, and determine, based on the profile information, that images of the activity are to be included in a life log. The processing device may transmit at least one of the images of the activity to a remotely located computing device via the communications interface for inclusion in the life log.

In some embodiments, the processing device may select one or more coupons for user 100 based on the activity and transmit one or more identifiers of the one or more coupons to the computing device. In some embodiments, the processing device may select one or more advertisements for the user based on the activity and transmit one or more identifiers of the one or more advertisements to the computing device. For example, the identifier of the coupons and/or the advertisements may include a hyperlink pointing to the storage location (e.g., recommendation database 4803) where the coupons and/or advertisements are stored.

Figure 55:
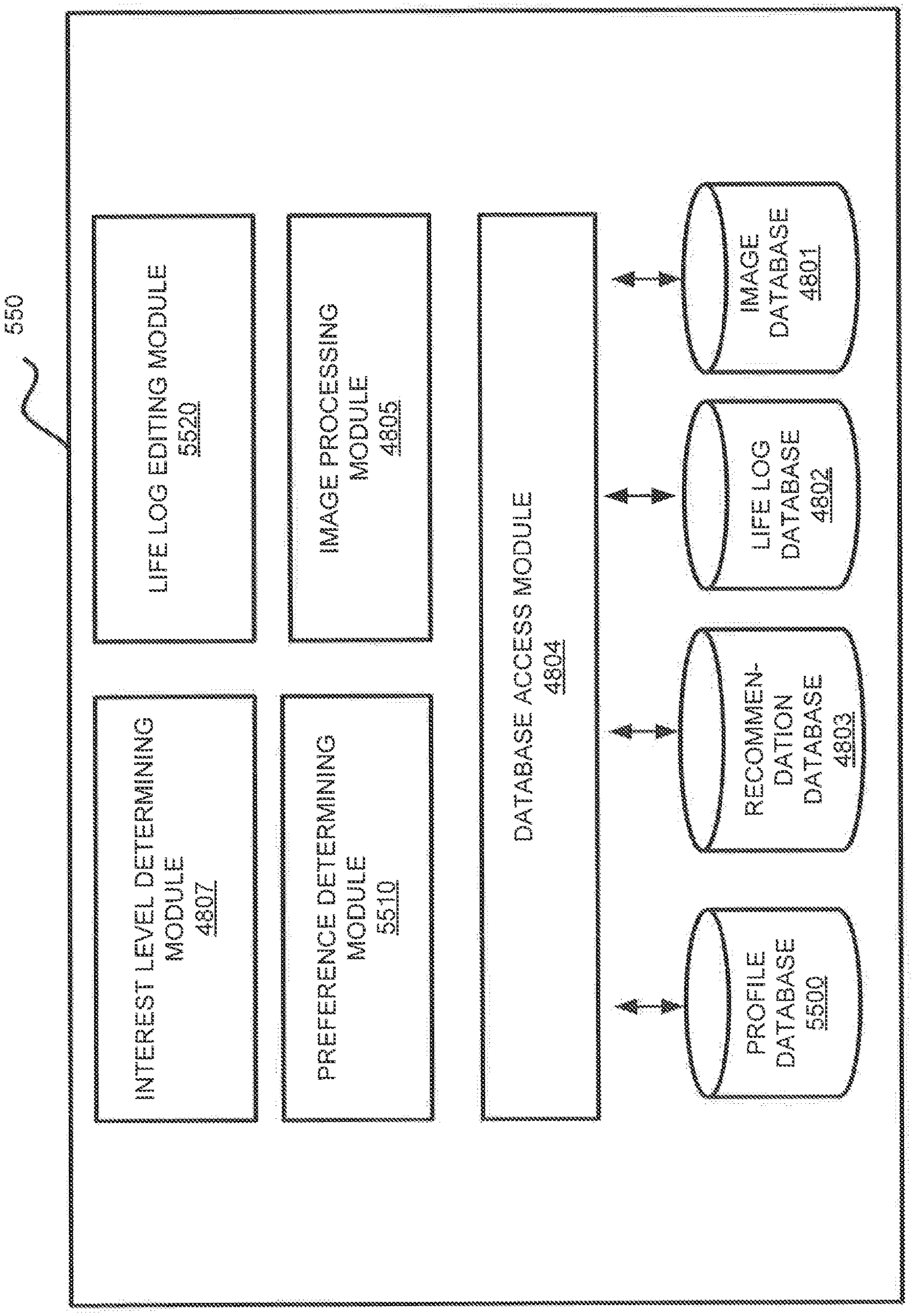
FIG. 55 is a block diagram illustrating a memory storing a plurality of modules and databases.

FIG. 55 is a block diagram illustrating a memory (e.g., memory 550, 550*a*, and/or 550*b*) according to the disclosed embodiments. Memory 550 may include databases and/or modules that are similar to those shown in FIG. 48. Thus, the descriptions of the same databases and/or modules are not repeated. Databases and/or modules shown in FIG. 55 may be combined with databases and/or modules shown in FIG. 48, or used as alternatives to the databases and/or modules shown in FIG. 48. Databases and/or modules shown in FIG. 48 may also be included in FIG. 55, or used as alternatives to the databases and/or modules shown in FIG. 55.

In the embodiment shown in FIG. 55, memory 550 is configured to store or include a profile database 5500, a preference determining module 5510, and a life log editing module 5520. Profile database 5500 may be configured to store profile information regarding user 100. Profile information may include preferences, age, gender, health condition, etc., regarding user 100. Preferences may include preferences for activity categories. For example, user 100 may prefer sports to music. Preferences may include preferences for activities within an activity category. For example, user 100 may prefer soccer to ping pong.

The processing device may execute instructions associated with preference determining module 5510 to determine a preference of user 100 based on images depicting activities user 100 has performed. For example, the processing device may determine a preference of user 100 related to an activity. Determination of the preference may be based on the duration of time user 100 was engaged in the activity, as the processing device may identify from the captured images, and/or from the life log (e.g., life log 5100).

Figure 56:
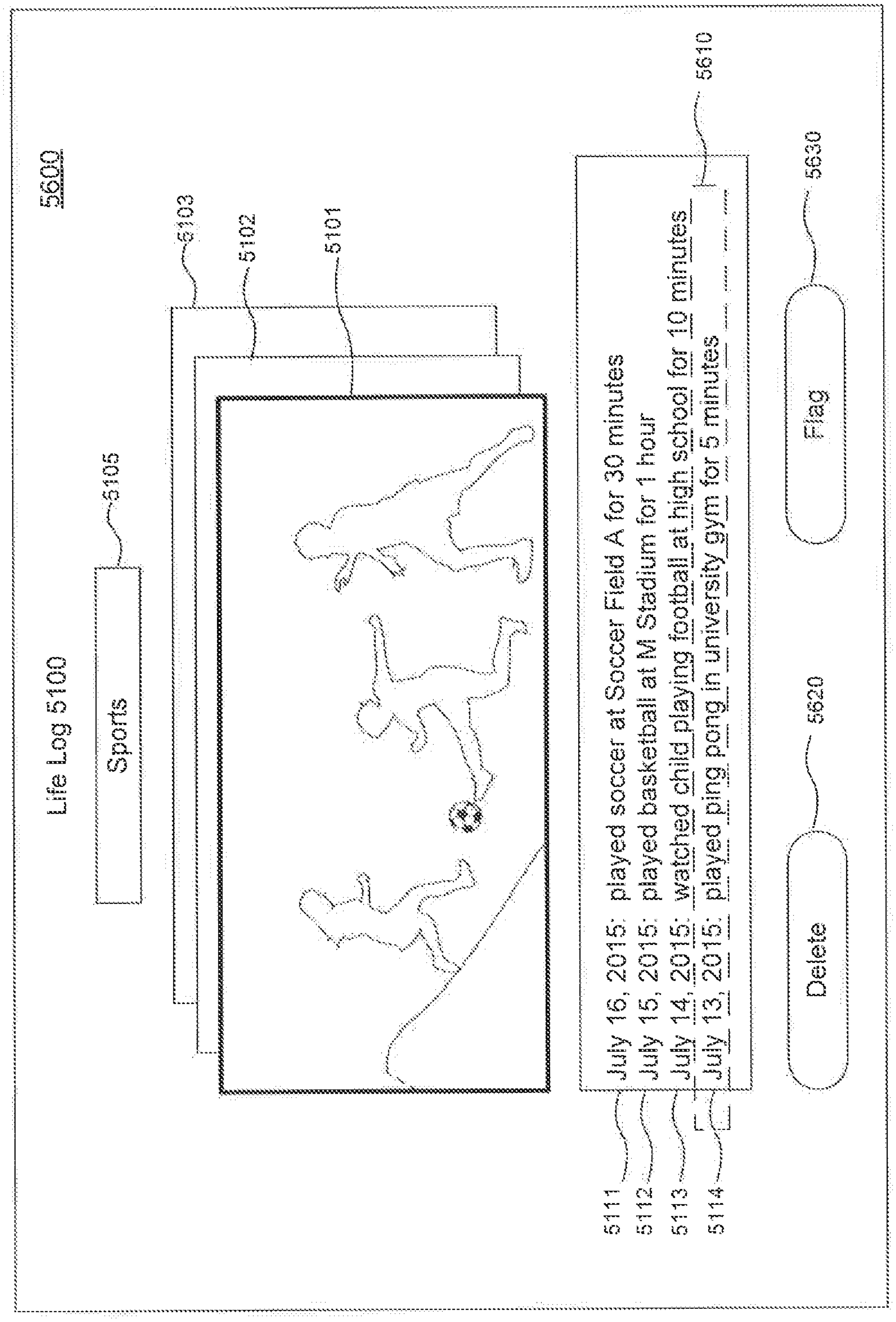
FIG. 56 is an example user interface displaying a life log on a display screen of a computing device.

FIG. 56 is an example user interface 5600 displaying life log 5100 on a display screen of a computing device. In some embodiments, determination of the preference of user 100 related to the activity may be based on whether user 100 deleted information related to the activity, for example, from a life log. The processing device may execute instructions associated with life log editing module to enable user 100 to edit a life log. A life log may be displayed on a display screen of a device (e.g., computing device 120) and/or a screen associated with a device, such as server 250, as shown in FIG. 56. User interface 5600 may enable user 100 to select an image (e.g., one or more of images 5101-5103), and/or a textual entry (e.g., one or more textual entries 5111-5114) describing the images and/or activities. For example, user interface 5600 may include a touch interface that enables user 100 to touch an image so that the image is displayed in front of other images with a bold frame to indicate selection. Other methods may also be used to select an image using other data input devices (e.g., a keyboard, mouse, etc.). User interface 5600 may display a selection box 5610, which user 100 may move from one textual entry to another to select one of the textual entries 5111-5114. Other selection means may also be used to select a textual entry.

User interface 5600 may include a delete button 5620, which may enable user 100 to instruct the processing device associated with wearable apparatus 110, computing device 120, and/or server 250 to delete selected information, such as the selected image and/or textual entry, from life log 5100 stored in life log database 4802, and/or from image database 4801. The deletion function may be realized using other methods. For example, a swipe input received from user 100 after an image is selected by user 100 may cause the image to be deleted. User interface may also include a flag button 5630, which when selected by user 100, enables user 100 to flag selected information, such as the selected image and/or textual entry. For example, user 100 may select image 5101 and flag it, or may select textual entry 5114 and flag it. Depending on implementations, flagged image and/or textual entry may be used to identify items that user 100 has no or low interest, items that user 100 prefers or has high interest, items that are important, items that are not unimportant, items that will be automatically deleted after a time period, items that will be transmitted to another life log and/or device, etc.

In some embodiments, the determination of a preference of user 100 related to a certain activity may be based on whether user 100 deleted information related to the activity. For example, if the processing device determines that user 100 deleted selected textual entry 5114, which describes a ping pong activity, the processing device may determine that ping pong is not a preferred sport or activity of interest for user 100. In some embodiments, the determination of a preference of user 100 related to a certain activity may be based on whether user 100 flagged information related to the activity as being not of interest. For example, if the processing device determines that user 100 has selected textual entry 5114, and flagged it (e.g., processing device receives user input on flag button 5630), the processing device may determine that user 100 is not interested in ping pong or it is not a preferred sport of activity of interest for user 100. In some embodiments, the processing device may determine that user 100 has selected textual entry 5111 and flagged it as an item of high interest, and the processing device may determine that soccer is a preferred sport for user 100.

In some embodiments, at least one of the image data 4801, life log database 4802), profile database 5500, and/or recommendation database 4803 may be stored in a memory associated with computing device 120 and/or server 250. The processing device of wearable apparatus 110 may send a signal to computing device 120 and/or server 250 to cause computing device 120 and/or server 250 to delete information, such as images, textual entries, profile information, recommendation items, etc. In some embodiments, the processing device of wearable apparatus 110 may send a signal to computing device 120 and/or server 250 to cause computing device 120 and/or server 250 to delete information related to the activity category based on the preference of user 100. For example, if user prefers sports to music, the processing device may send a signal to computing device 120 and/or server 250 to cause them to delete information (e.g., images, textual entries) related to the activity category of music.

In some embodiments, the processing device of wearable apparatus 110 may send a signal to computing device 120 and/or server 250 to cause computing device 120 and/or server 250 to include information in a life log related to a child under the supervision of user 100. For example, a child may be under supervision of user 100, and may perform various activities during a day, such as playing soccer games, playing piano, riding buses, etc. Wearable apparatus 110 may capture images depicting activities the child has performed or is performing, and may send the captured images to computing device 120 and/or server 250. The processing device may cause computing device 120 and/or server 250 to include images and/or textual entries relating to the activities performed by the child under the supervision of user 100 in a life log of the child, and/or in a life log of user 100.

In some embodiments, the processing device of wearable apparatus 110 may send a signal to computing device 120 and/or server 250 to cause computing device 120 and/or server 250 to include information in a life log related to images that include text. For example, referring back to FIG. 53, wearable apparatus 110 may capture image 5311 at a transit center, which includes the text "Bus Terminal." The processing device may send the image to computing device 120 and/or server 250, and cause computing device 120 and/or server 250 to include information (e.g., the image, and/or text "Bus Terminal" extracted from the image) in life log 5300.

Figure 57:
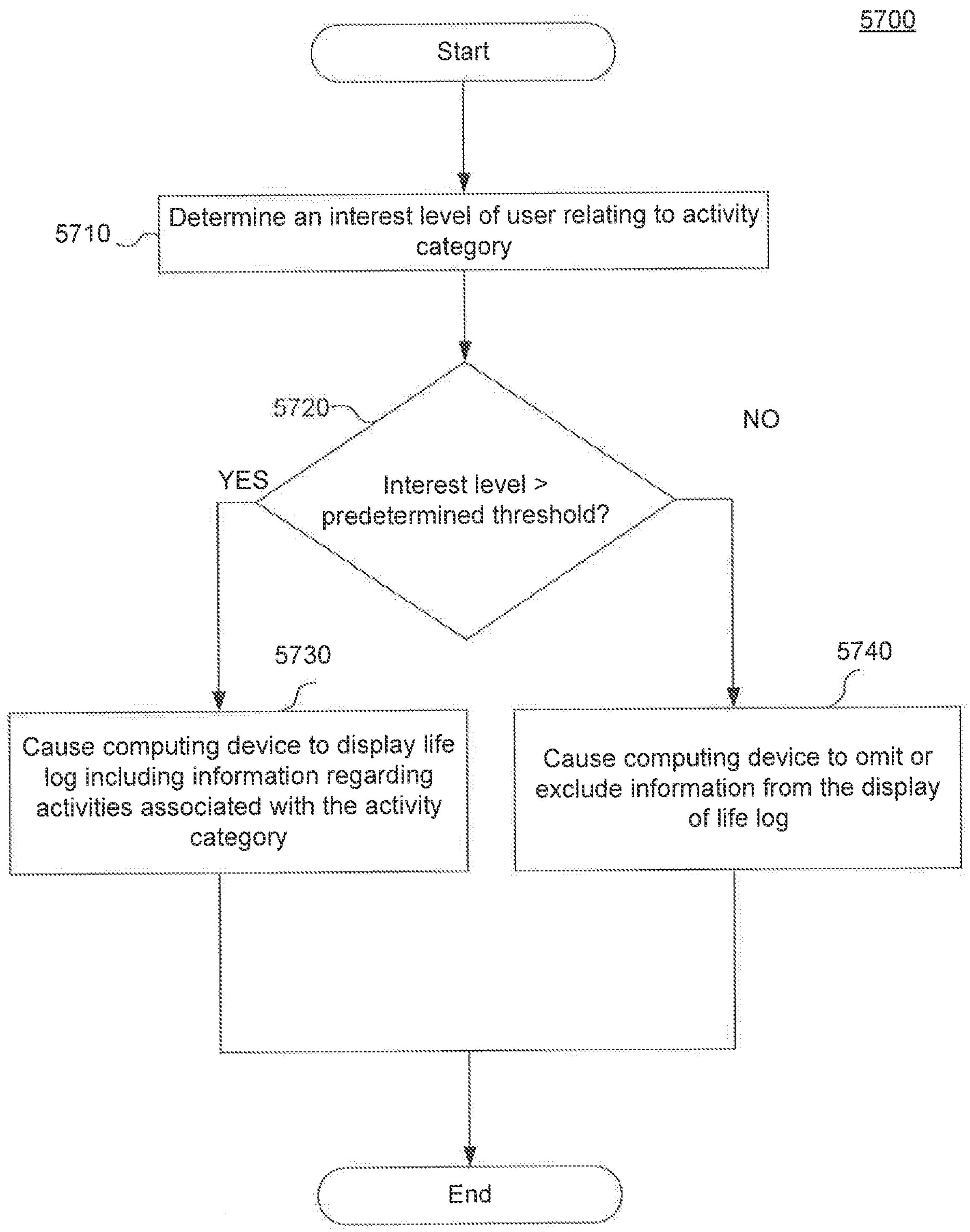
FIG. 57 is a flowchart showing an example method for processing information based on a level of interest.

FIG. 57 is a flowchart showing an example method 5700 for processing information based on a level of interest. Method 5700 may be executed by various devices included in wearable apparatus 110, such as image sensor 220, 220*a*, and/or 220*b*, and at least one processing device (e.g., processor 210 and/or processor 540). Method 5700 may include determining an interest level of user 100 relating to an activity category (step 5710). For example, the processing device may determine an interest level of user 100 relating to an activity category of sports, an activity category of music, and/or an activity category of transit. The interest level may be represented by a number, such as "1" to "5," with a higher number indicating a higher interest level. Other methods, such as symbols, alphabets, may also be used to represent the interest level.

Method 5700 may include determining whether the interest level is greater than a predetermined threshold (step 5720). The predetermined threshold may be, for example, "2." When the processing device determines that the interest level is higher than the predetermined threshold (Yes, step 5720), method 5700 may include causing a computing device to display a life log including information regarding activities associated with one or more activity categories for which the user has a level of interest (or interest level) that is higher than the predetermined threshold (step 5730). For example, when the processing device determines that user 100 has an interest level of 4 in activity categories of sports and music, which is higher than the predetermined threshold of 2, the processing device may cause computing device 120 and/or server 250 to display a life log (e.g., life log 5100 and/or another life log recording activities relating to music) that include information (e.g., images and/or textual entries) regarding activities (e.g., soccer games, basketball games, concert) associated with the sports and music activity categories.

When the processing device determines that the interest level is higher than the predetermined threshold (No, step 5720), method 5700 may include causing a computing device to omit information from a life log regarding activities associated with one or more activity categories for which the user has an interest level less than or equal to the predetermined threshold (step 5740). For example, when the processing device determines that user 100 has an interest level of 1, which is higher than the predetermined threshold of 2, in activity category of transit, the processing device may cause computing device 120 and/or server 250 to omit, from a life log, information (e.g., images and/or textual entries) regarding activities (e.g., riding buses, riding trains) associated with the transit activity category.

In some embodiments, the processing device may be programmed to cause computing device 120 and/or server 250 to include or exclude information from a life log (e.g. life log 5100 and/or 5300) regarding activities associated with one or more activity categories based on the determined interest level. If user 100 has a high interest level in an activity, or in activities of a category, the processing device may cause computing device 120 and/or server 250 to include information (e.g., images and/or textual entries) in a life log. If user has a low interest level in an activity or in activities of a category, the processing device may cause computing device 120 and/or server 250 to exclude information (e.g., images and/or textual entries) in a life log.

Figure 58:
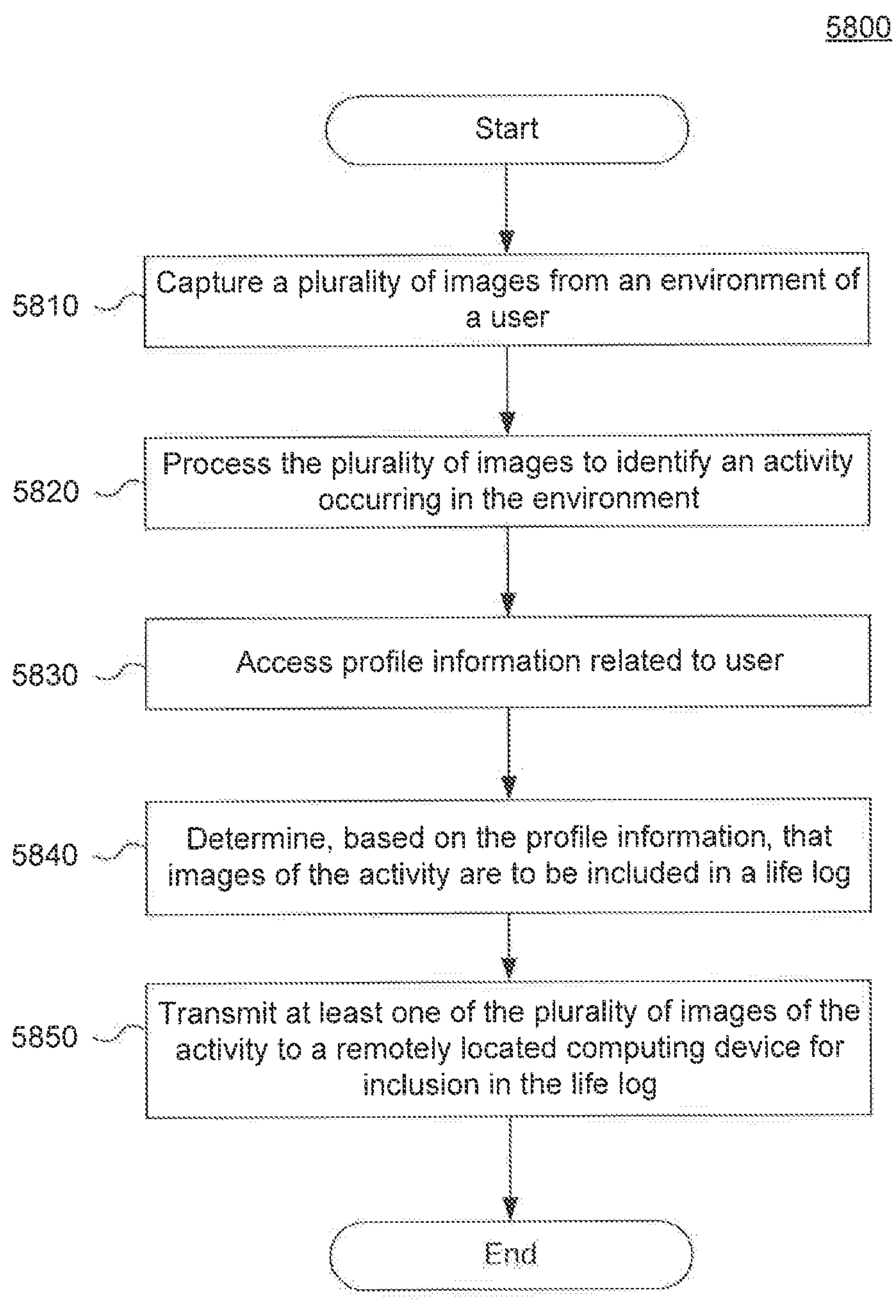
FIG. 58 is a flowchart showing an example method for capturing and processing image data.

FIG. 58 is a flowchart showing an example method 5800 for capturing and processing image data according to a disclosed embodiment. Method 5800 may be executed by various devices included in wearable apparatus 110, such as image sensor 220, 220*a*, and/or 220*b*, and at least one processing device (e.g., processor 210 and/or processor 540). Method 5800 may include capturing a plurality of images from an environment of user 100 (step 5810). For example, one or more image sensors 220, 220*a*, and/or 220*b* may capture image data of the environment of user 100. Method 5800 may include processing the plurality of images to identify an activity occurring in the environment (step 5820). For example, the processing device may process the images to identify a soccer game occurring in the environment of user 100. Method 5800 may include accessing profile information related to user 100 (step 5830). For example, the processing device may access profile database 5500 to read or retrieve profile information relating to user 100, such as user's age, gender, health condition, etc. Method 5800 may include determining, based on the profile information, that images of the activity are to be included in a life log (step 5840). For example, the processing device may determine, based on profile information indicating that doctors have asked user 100 to exercise during each day, that images depicting user 100 performing sports activities are to be included in a life log of user 100. Method 5800 may also include transmitting at least one of the images of the activity to a remotely located computing device for inclusion in the life log (step 5850). For example, life log database 4802 may be stored in a memory associated with a remotely located computing device, such as computing device 120 and/or server 250. The processing device may transmit at least one of the images depicting activities user 100 has performed to computing device 120 and/or server 250 for storage in life log database 4802.

One application of wearable technology and "life logging" is the ability to derive and store information related to objects that the user encounters for later use. As one example, an individual user 100 may use a wearable camera system to life log, and the camera system may detect that the user is holding an object. Apparatus 110 may execute software instructions to create an entry within a database for the object, thus reflecting a "catalog" of objects that the user encountered in his or her environment. This catalog can be deployed for situations beneficial to the user. For example, objects known to be harmful to the user, such as food that is an allergen or drugs that cause interactions or side effects, can be detected and information stored for those objects can be retrieved from the database. The user can then be quickly warned of the danger in an efficient manner.

Figure 59:
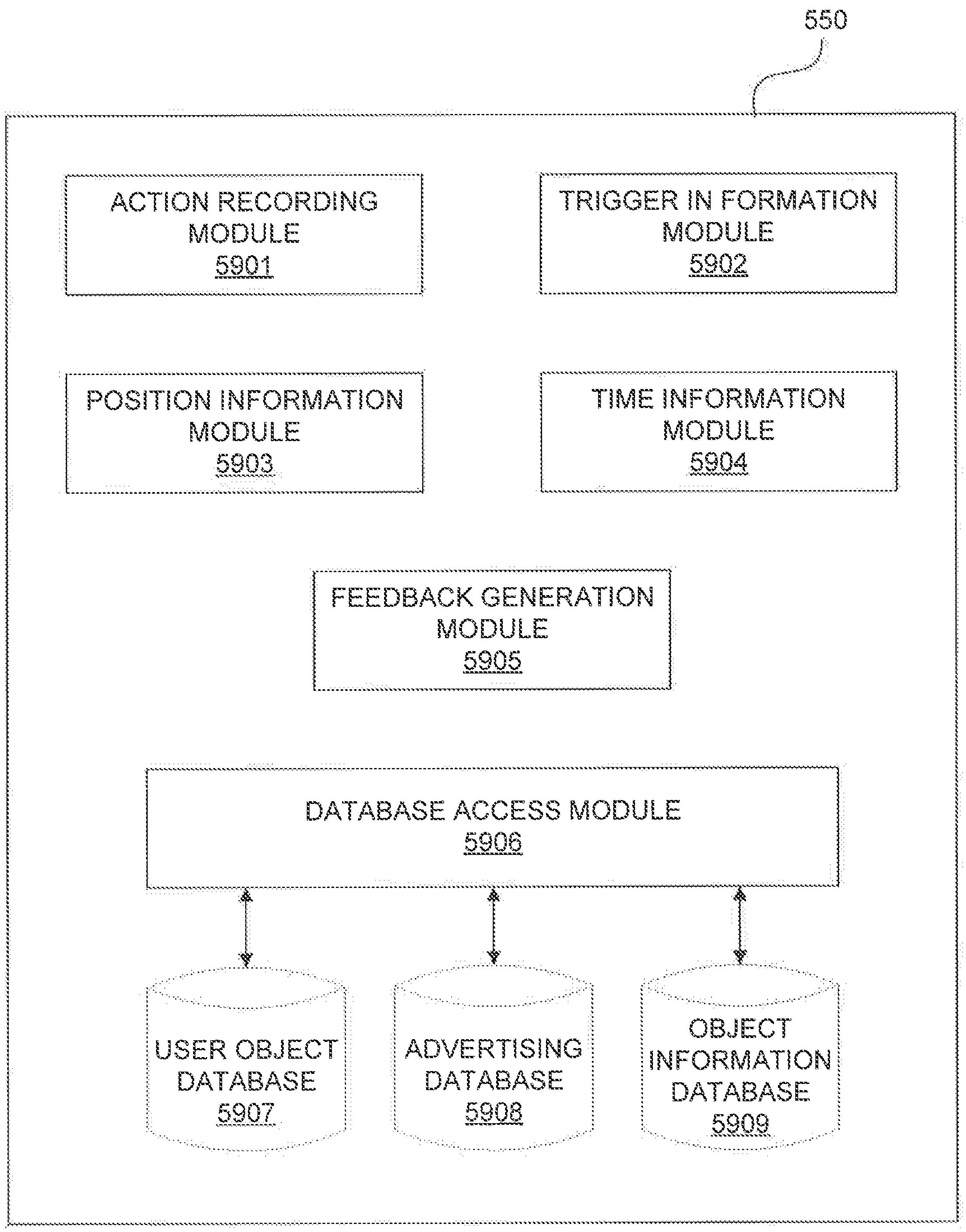
FIG. 59 is a block diagram illustrating an example of a memory contained within an apparatus for deriving and storing information relating to objects held by a user in image data from a wearable camera system, consistent with disclosed embodiments.

FIG. 59 is a block diagram illustrating memory 550 associated with apparatus 110 according to one embodiment. The memory may include one or more modules or sets of instructions, which when executed by at least one processing device, carry out methods consistent with the disclosed embodiments. For example, the memory may include instructions executable by the at least one processing device to process or analyze images captured by the image sensors. In some embodiments, the processing device may be included in wearable apparatus 110. For example, the processing device may include processor 210, 210*a*, and/or 210*b* shown in FIGS. 10 and 11. The processing device may process the image data captured by the image sensors in near real time, as the image data are being captured by the image sensors. In some embodiments, the processing device may include a processor that is separately located from wearable apparatus 110. The processing device may include a processor that is remotely connected with wearable apparatus 110 through network 240, which may be a wired or wireless network, or through any other connectivity means, such as Bluetooth, near field communication (NFC), etc. For example, the processing device may include processor 210 included in computing device 120, which may be connected with wearable apparatus 110 through a wired or wireless connection, such as through a cable, Bluetooth, WiFi, infrared, or near field communication (NFC). In some embodiments, the processing device may include a processor included in server 250, which may be wirelessly connected with wearable apparatus 110 through network 240. In some embodiments, the processing device may include a cloud computing processor remotely and wirelessly connected with wearable apparatus 110 through network 240. Wearable apparatus 110 may transmit captured image data to the processing device in near real time, and the processing device may process the captured image data and provide results of processing to wearable apparatus 110 in near real time. Further, in some embodiments, one or more database and one more modules may be located in remotely from wearable apparatus 110 (e.g., included in computing device 120 and/or server 250).

In the example shown in FIG. 59, memory 550 comprises an action recording module 5901, a trigger information module 5902, a position information module 5903, a time information module 5904, a feedback generation module 5905, a database access module 5906, a user object database 5907, an advertising database 5908, and an object information database 5909. Additional or fewer databases and/or modules may be included in memory 550. The modules and databases shown in FIG. 59 are examples, and a processor in the disclosed embodiments may operate according to any suitable process.

Action recording module 5901 may provide functionality for apparatus 110 to capture and/or store image data. In some embodiments, this image data may include or depict actions performed by user 100 via image sensor 220. For example, as part of "life logging," image sensor 220 may capture anything that appears in the field of view of user 100. Processor 210 may execute action recording module 5901 to cause image sensor 220 to acquire the images, and may additionally use action recording module 5901 to adjust one or more parameters associated with image sensor 220. In some embodiments, user 100 may be able to start and stop the collection of image data by action recording module 5901 and apparatus 110 using function button 430. In other embodiments, apparatus 110 may be configured to capture image data via action recording module 5901. In one embodiment, processor 210 and image sensor 220 may be operatively connected via wires or other such mechanical couplings. In other embodiments, processor 210 and image sensor 220 may be operatively connected via wireless transceiver(s) 530.

Trigger information module 5902 may provide functionality for apparatus 110 to analyze real-time image data captured by image sensor 220 and action recording module 5901, and more specifically, to identify and analyze one or more triggers in image data captured by image sensor 220 of apparatus 110. The term "trigger" includes any information in the image data that may cause apparatus 110 to execute an action. For example, apparatus 110 may detect as a trigger a finger or hand of user 100 holding an object. In some embodiments, apparatus 110 may begin acquiring image data via image sensor 220 when a trigger is detected. In other embodiments, image sensor 220 may already be acquiring image data, and the detection of a trigger by trigger information module 5902 may cause processor 210 or other modules stored in memory 550 to execute software instructions to perform various tasks. In these embodiments, processor 210 may be configured to transmit image data (either stored data or in real time) to a remote system such as server 250 for purposes of analyzing the image data to determine whether a trigger is present in the image data.

In alternative embodiments, action recording module 5901 may not record any data; instead, trigger information module 5902 may simply analyze images viewed through image sensor 220. In these embodiments, information relating to a trigger, to an associated object or objects, or to user 100 may be extracted by trigger information module 5902, and the information may be transmitted to an external system, such as server 250.

Trigger information module 5902 may also be configured to determine from the captured image data particular information about one or more of an object associated with the trigger, or about user 100. For example, in a particular circumstance, trigger information module may recognize the hand of user 100 in the image data, and may interpret the hand of user 100 as a trigger. Trigger information module 5902 may analyze image data in which the hand trigger appears. In these embodiments, other information may be extracted from the image data, as will be discussed in detail below. For example, the hand of user 100 serving as the trigger may be holding an object, and after detecting the trigger and the object, trigger information module 5902 may determine information about the object and transmit that information to an external server (such as server 250) or to a database (such as databases 5907-5909). Additionally or alternatively, trigger information module 5902 may be configured to send a query to external servers or databases regarding a trigger or an associated object. In these embodiments, trigger information module 5902 may be configured to receive additional information or instructions from the remote servers or databases, and may use that information or instructions to perform tasks. Trigger information module 5902 may also be configured to determine information about the user 100 of apparatus 110, such as demographic information of the user, past behavior of the user, or past interactions between the user, the trigger, and the object, if any.

Position information module 5903 may provide functionality for apparatus 110 and processor 210 to determine positional information for events and activities captured by image sensor 220 and action recording module 5901. In some embodiments, position information module 5903 may generate positional information associated with this image data, and may store it within memory 550 for later access and analysis. This positional information may take the form of metadata, labels on images indicating location, or any other such information. Position information module 5903 may determine and/or generate positional information in various ways. For example, position information module 5903 may comprise a global positioning system (GPS) receiver, and may determine positional information by receiving GPS coordinates from associated satellites. In other embodiments, position information module 5903 may be programmed to include map data, and may be configured to detect the location of apparatus 110 and/or user 100 (or other associated objects) from the map data. Any other means of determining or deriving positional information may be used that are familiar to those of skill in the art.

Time information module 5904 may provide functionality for apparatus 110 and processor 210 to determine the elapsed time between events and activities captured by image sensor 220 and action recording module 5901. In some embodiments, time information module 5904 may generate time information associated with this image data, and may store it within memory 550 for later access and analysis. This time information may take the form of a "timestamp," metadata, or any other such information. In alternative embodiments, time information module 5904 may be configured to generate a visual display of the time on images from the captured image data.

Feedback generation module 5905 may provide functionality for apparatus 110 to generate and transmit information to user 100, or to a third party or a remote computing system, such as server 250. Processor 210 may execute feedback generation module 5905 to generate and process feedback in a given context, then transmit the generated feedback to feedback-outputting unit 320 for output. In one embodiment, processor 210 and feedback-outputting unit 320 may be operatively connected via a wire or other such direct connection. In other embodiments, processor 210 and feedback-outputting unit 320 may be operatively connected via wireless transceiver(s) 530. In some embodiments, feedback generation module 5905 may generate audible feedback to user 100 or a third party. In other embodiments, feedback generation module 5905 may generate textual or graphical feedback, such as statistics, data, or information.

As shown in FIG. 59, memory 550 is also configured to store a database access module 5906. The processing device may execute instructions associated with database access module 5906 to access user object database 5907, advertising database 5908, and object information database 5909, for example, to retrieve previously stored image data, predefined actions, and/or rules for performing analysis of the image data. The processing device may also execute instructions associated with database access module 5906 to store data and information in each of user object database 5907, advertising database 5908, and object information database 5909.

In the embodiment shown in FIG. 59, memory 550 is configured to store a user object database 5907. User database 5907 may be configured to store information associated with various objects that user 100 has previously detected and described when those objects were associated in image data captured by image sensor 220 and associated with a trigger detected and analyzed by trigger information module 5902. This process will be discussed in further detail below in association with FIG. 61 and process 6100. In essence, user database 5907 may serve as a "catalog" of objects that user 100 has previously held and perceived, and may serve as a reference to retrieve information about those objects in the future or to help locate a previously-held object.

In the example shown in FIG. 59, memory 550 is also configured to store an advertising database 5908. Advertising database 5908 may be configured to store information relating to objects that are products, such as branded products. In some embodiments, when user 100 perceives and holds an object, trigger information module 5902 and/or position information module 5903 may be executed to determine that the object is a product, and may determine that the product is associated with a particular brand or sponsor. In these embodiments, processor 210 may be configured to transmit information about the user (such as the demographic information described above, as well as additional information such as purchasing habits of user 100) and/or the perceived product to advertising database 5908, or to an external server, such as server 250. As will be discussed in further detail below, advertising database 5908 and/or server 250 may then be configured to return advertising information for presentation to user 100 based on the user information and product information.

Memory 550 may also be configured to store an object information database 5909. Object information database 5909 may contain general information about a vast number of objects that could potentially be encountered or analyzed by apparatus 110. As a non-limiting example, object information database 5909 may contain information about products, food items, pharmaceutical drugs, plants, animals, humans, landmarks, etc. In these embodiments, object information database 5909 may be akin to an encyclopedia, where information on a wide variety of topics may be stored. Information stored in object information database 5909 may inform data entries for catalogued objects stored in user object database 5907.

Action recording module 5901, trigger information module 5902, position information module 5903, time information module 5904, feedback generation module 5905, database access module 5906, user object database 5907, advertising database 5908, and object information database 5909 may be implemented in software, hardware, firmware, a mix of any of those, or the like. For example, if the modules are implemented in software, they may be stored in memory 550, as shown in FIG. 59. The databases may be stored within memory 550 as well, or may be stored on a remote computer system (such as server 250) accessible by apparatus 110 through database access module 5906. Other components of processor 210 may be configured to perform processes to implement and facilitate operations of the modules.

Thus, action recording module 5901, trigger information module 5902, position information module 5903, time information module 5904, feedback generation module 5905, database access module 5906, user object database 5907, advertising database 5908, and object information database 5909 may include software, hardware, or firmware instructions (or a combination thereof) executable by one or more processors (e.g., processor 210), alone or in various combinations with each other. For example, the modules may be configured to interact with each other and/or other modules of apparatus 110 to perform functions consistent with disclosed embodiments. In some embodiments, any of the disclosed modules (e.g., action recording module 5901, trigger information module 5902, position information module 5903, time information module 5904, feedback generation module 5905, and database access module 5906) may each include dedicated sensors (e.g., image sensors, etc.) and/or dedicated application processing devices to perform the functionality associated with each module.

As used herein, real-time image data may refer to image data captured in real-time or near real-time. For example, action recording module 5901 may monitor the field-of-view of apparatus 110 to detect inputs. Accordingly, action recording module 5901 and any of the other disclosed modules may operate in parallel to process captured image data. That is, apparatus 110 may capture and analyze image data in parallel, or may institute a queue-like implementation whereby image data is captured and then analyzed in a continuous fashion (i.e., a first image is captured and analyzed while a subsequent image is captured and then subsequently analyzed).

Figure 60A:
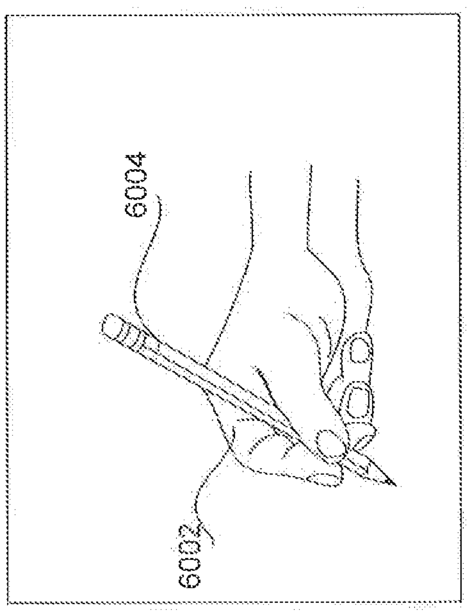
FIGS. 60A-60D are example illustrations of image data captured by a wearable camera system as part of an apparatus for deriving and storing information relating to objects held by a user in image data from a wearable camera system, consistent with disclosed embodiments.

FIGS. 60A-60D illustrate examples of image data captured by apparatus 110 representing fields of view of image sensor 220, consistent with certain disclosed embodiments. In some embodiments, the field of view of image sensor 220 may correspond to or be similar to the field of view of user 100. In the example of FIG. 60A, image data captured by image sensor 220 indicates that hand 6002 of user 100 is holding an object, here, pencil 6004. Processor 210 may be configured to execute action recording module 5901 to record the image data, or may be configured to automatically be recording the image data in real time. In some embodiments, such as the example illustrated in FIG. 60A, processor 210 (via trigger information module 5902) may be configured to recognize hand 6002 as a trigger. This process will be described in further detail below in association with FIG. 61 and process 6100. In brief, after detecting the presence of hand-related trigger 6002, processor 210 may be configured to take one or more of a number of alternative actions. In the illustrated embodiment of FIG. 60A, processor 210 may be configured to store information related to an object that user 100 is holding that is associated with hand-related trigger 6002. Alternatively, user 100 may affirmatively indicate in some manner that he/she wishes to store information about a trigger-associated object, such as a verbal command transmitted through a microphone associated with apparatus 110.

Consistent with disclosed embodiments, apparatus 110, via action recording module 5901, may record the presence of trigger-associated object 6004, which in FIG. 60A is a pencil. Via trigger information module 5902, apparatus 110 may execute software instructions to derive information about one or more of user 100, trigger 6002, or object 6004. In some embodiments, trigger information module 5902 may derive information from the captured image data related to object 6004. In these embodiments, the derived information may include a position of user 100 and/or apparatus 110 when the object 6004 was encountered. Processor 210 may execute position information module 5903 to determine this information. The derived information may further include a date and time when the object 6004 was encountered. Processor 210 may execute time information module 5904 to determine this information. Trigger information module 5902 may also derive, receive, or otherwise determine information about the object 6004. This may include a name of the object, a category that the object belongs to, and/or previous interactions with the object by the user, etc. In some embodiments, processor 210 may execute database access module 5906 to access information about object 6004 from object information database 5909. In other embodiments, apparatus 110 may be configured to receive information about object 6004 from user 100. For example, apparatus 110 may be equipped with a microphone, and may be configured to receive verbal information from user 100 about object 6004. In other embodiments, user 100 may be able to submit information about object 6004 in textual form, such as from an external computer system or a mobile device, such as computing device 120. Additionally or alternatively, trigger information module 5902 may further determine or access information about user 100 before, during, or after information about object 6004 is determined. In these embodiments, the user information may include demographic information such as age, income, marital status, gender, and/or geographic location, etc.

Figure 60B:
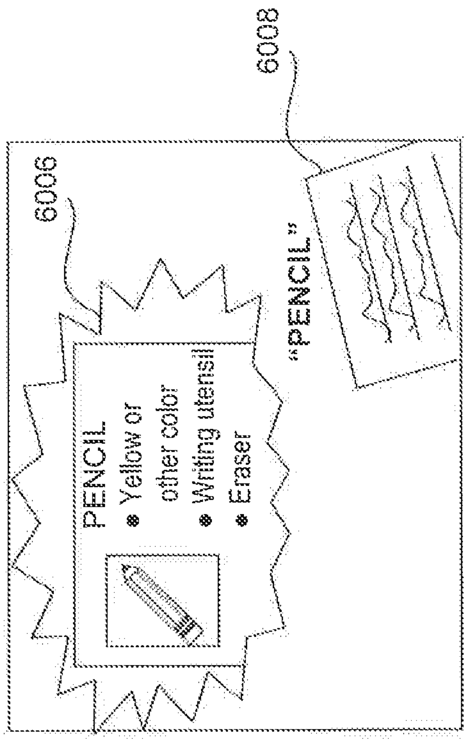

Processor 210 may be configured to store the user and/or object information derived from the image data, for example, in memory 550 or in user object database 5907 via database access module 5906. In these embodiments, the information may be stored in a profile or other file associated with user 100. The stored profile information may be used by one or more of action recording module 5901 or trigger information module 5902 to identify user 100 in the future within image data captured by image sensor 220. FIG. 60B illustrates an example of stored user object information, in the form of an entry that may be stored and accessed within user object database 5907. After determining information about object 6004 (here, a pencil) either from input from user 100 or from accessing data from the Internet or a remote database such as object information database 5909, processor 210 may, via database access module 5906, create an entry associated with the object that can be accessed in the future. An example database entry 6006 for pencil 6004 is illustrated in FIG. 60B. Database entry 6006 may contain a variety of information about object 6004, such as an image taken from image data recorded by action recording module 5901, a list of physical characteristics or other details about the object, one or more locations where the object was encountered (as determined by position information module 5903), and/or dates and times when the object was encountered (as determined by time information module 5904), etc. In some embodiments, processor 210 may execute feedback generation module 5905 to generate audio, visual, and/or other feedback about the object 6004 that may be used in the future to identify the object when seen again or to help find the object if it is lost. In the example of FIG. 7B, feedback generation module 5905 has generated the audible feedback 6008 "PENCIL." to memorialize the name of object 6004. In these embodiments, future interactions with either the same pencil 6004 or another similar such item may result in one or more of action recording module 5901, trigger information module 5902, feedback generation module 5905, or database access module 5906 to be executed by processor 210. For example, user 100 may hold up pencil 6004 in front of the field of view of image sensor 220 at a future time and date (as determined by time information module 5904) and feedback generation module 5905 may transmit audible feedback 6008 to remind user 100 of the object and/or its prior history. Other such feedback may be provided to user 100, such as previous dates, times, and/or places where the object was encountered, etc.

In other embodiments, apparatus 110 may receive a query or other feedback from user 100 that processor 210 may use to bring up information about an object 6004. This process will be discussed in further detail below. In brief, in an example embodiment user 100 may speak the word "PENCIL" into a microphone associated with apparatus 110. In response, processor 210 may execute one or more of feedback generation module 5905 or database access module 5906 to call up information 6006 associated with pencil 6004 in user object database 5907. For example, a stored image of the pencil may be displayed in the field of view of user 100, if apparatus 110 is in the form of glasses. Feedback generation module 5905 may also provide audible feedback to user 100 with information associated with object 6004.

Figure 60C:
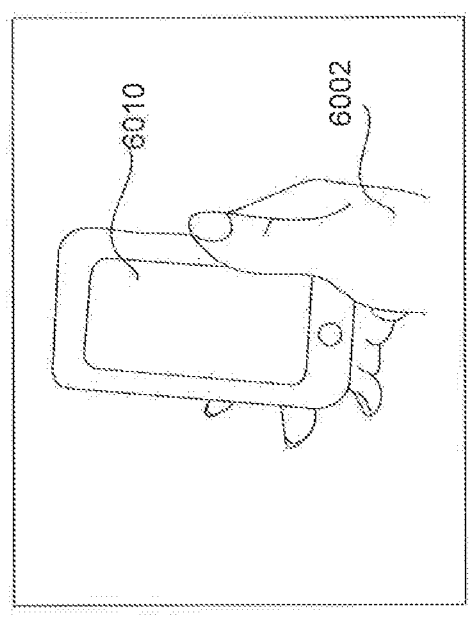

Variations on this basic process can be employed by user 100 or by third parties to perform various tasks. In one example, object information may be used to generate targeted advertising and marketing to user 100. In FIG. 60C, user 100 can be seen to be holding smartphone 6010 in hand 6002 in an example image from image data acquired by image sensor 220. As discussed above, action recording module 5901 may record this image data, and trigger information module 5902 may recognize hand 6002 as a trigger that results in other actions taken by apparatus 110 and processor 210. In the example embodiment of FIGS. 60C-60D, trigger information module 5902 (or other equipped modules) may be executed to determine information about the object that user 100 is holding. In FIG. 60C, for example, user 100 may be at a retail store and may be examining smartphone 6010 while shopping. Trigger information module 5902 may determine that user 100 is shopping and is looking at smartphone 6010, and via database access module 5906, may transmit this information to a remote computer system (such as server 250) or to a database dedicated to this purpose, such as advertising database 5908. In these embodiments, trigger information module 5902 may simultaneously transmit information about user 100, such as demographic information, information about past behavior of user 100, and/or information about past purchases made by user 100, etc.

Server 250 may receive, review, and analyze the received data to select an advertisement or a promotion from advertising database 5908 to prepare for user 100. For example, in the example illustrated in FIG. 60D, user 100 can be seen at a later time interacting with laptop computer 6012. For example, user 100 may be accessing the Internet via the World Wide Web, or may be checking electronic mail (email) messages. Via either of these methods (or another method), user 100 may be presented with an advertisement or promotion for object 6010 (here, a smartphone) by server 250. Server 250 may be associated with one or more entities related to smartphone 6010, including but not limited to the manufacturer of smartphone 6010, a retailer selling smartphone 6010, an outside advertising agency (who may have access to advertising database 5908), or other such entities.

Figure 61:
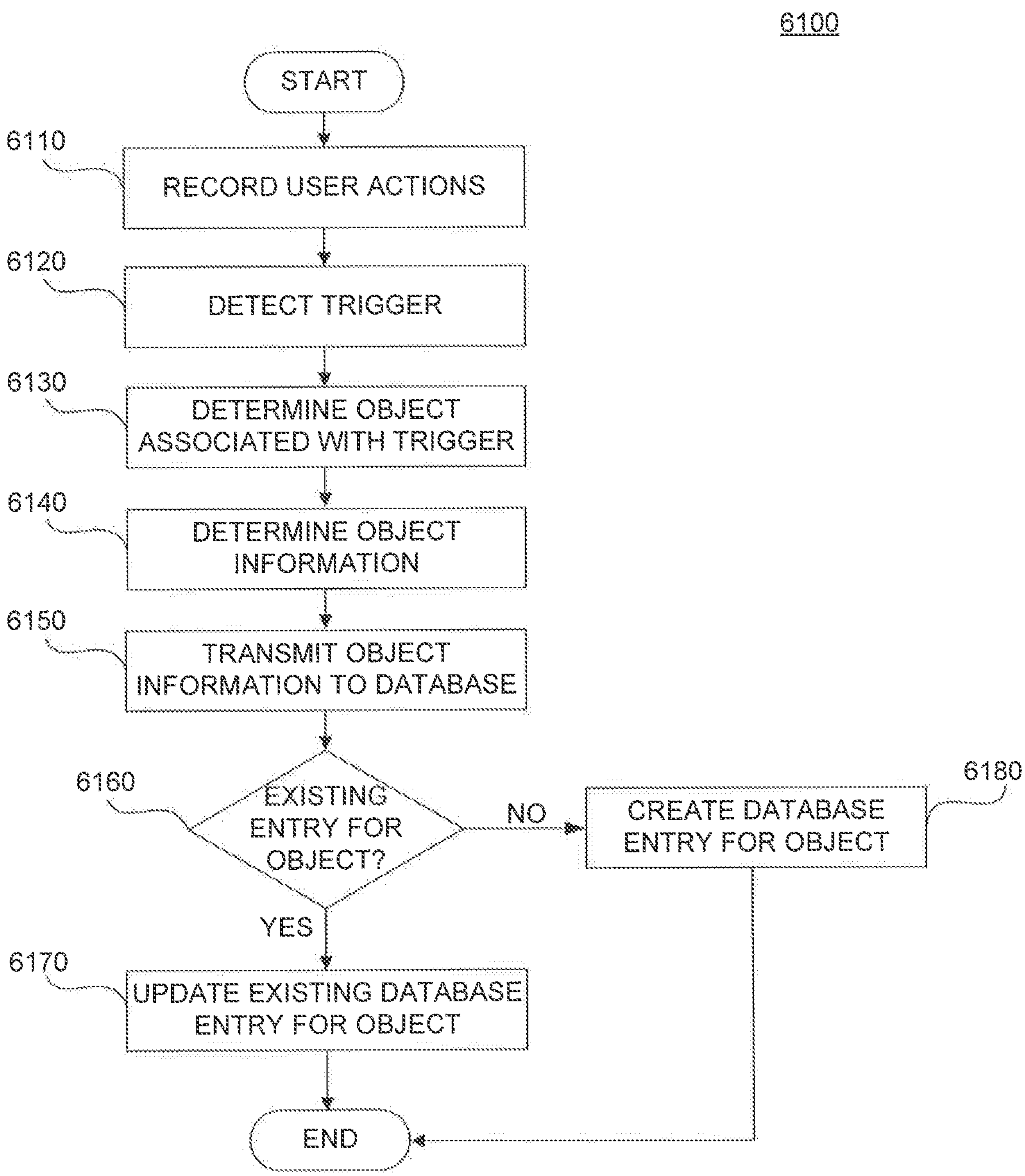
FIG. 61 is an example of a process for deriving and storing information relating to objects held by a user in image data from a wearable camera system, consistent with disclosed embodiments.

FIG. 61 illustrates an example of a process 6100 for storing trigger-associated object information consistent with certain disclosed embodiments. Process 6100, as well as any or all of the individual steps therein, may be performed by various aspects of apparatus 110, such as processor 210, image sensor 220, action recording module 5901, trigger information module 5902, position information module 5903, time information module 5904, feedback generation module 5905, database access module 5906, or any subcomponents therein. In some embodiments, one or more steps of process 6100 may be performed by a remote computing system, such as computing device 120 or server 250. For exemplary purposes, FIG. 61 is described as being performed by processor 210, executing software instructions stored within memory 550.

Processor 210 may execute software instructions via action recording module 5901 that enable apparatus 110 to record real-time image data representing actions of a user 100 using a camera associated with an image sensor, such as Image sensor 220 (Step 6110). In some embodiments, the captured first set of real-time image data may be received as a single streaming video file. In other embodiments, the real-time image data may be received as a series of still images. When the captured image data is received, processor 210 may store the data in memory 550.

According to some embodiments, trigger information module 5902 may configure components of apparatus 110, such as image sensor 220 and/or other components, to operate in a "ready mode" for trigger detection. Trigger information module 5902 may determine if a trigger, such as user 100's hand 6002, is present in the real-time image data (Step 6120). Trigger information module 5902 may further determine information associated with the determined hand trigger. For example, in some embodiments, trigger information module 5902 may be configured to detect and recognize different gestures made by hand 6002 and may detect or derive different information based on the gestures. This process will be discussed in additional detail below in association with FIGS. 62A-66.

In these embodiments, apparatus 110 may initially prompt user 100 to mime various hand triggers. Trigger information module 5902 may capture images of the various hand triggers and store them in one or both of memory 550 or user object database 5907 for ready recognition in the future. In alternative embodiments, trigger information module 5902 may not be configured to recognize a particular hand, and may be pre-configured to recognize any hand, similar appendage, or equivalent substitute. In some embodiments, trigger information module 5902 may be configured to recognize the hand of user 100 when it is covered in a glove, mitten, or other covering.

Processor 210 may be configured to begin recording image data via action recording module 5901 after identifying one or more triggers in image data captured by image sensor 220 of apparatus 110. In these embodiments, processor 210 may be configured to transmit image data (either stored data or in real time) to a remote system such as server 250 for purposes of analyzing the image data to determine whether a trigger is present in the image data.

In alternative embodiments, action recording module 5901 may not record any data; instead, various modules stored within memory 550 may simply analyze images viewed through image sensor 220. In these embodiments, information relating to user 100 or an object may be extracted by trigger information module 5902, and the information may be transmitted to an external system, such as server 250.

Processor 210 may execute software instructions via one or more of action recording module 5901 or trigger information module 5902 that enable apparatus 110 to detect that an object is associated with the hand-related trigger detected in the image data (Step 6130). In some embodiments, Step 6130 may be performed by a remote computing system, such as server 250.

For example, in the illustration previously described in FIGS. 60A and 60C, hand 6012 is holding an object (6004/6010). Trigger information module 5902 may be configured to determine that hand 6012 is performing some sort of action based on its proximity to the object. For example, hand 6012 may be holding an object, pointing to an object, touching an object, grabbing an object, picking up an object, dropping an object, manipulating an object, operating an object, etc. Action recording module 5901 and/or trigger information module 5902 may be configured to perform analysis on the real-time image data in order to determine, i.e., by pixel proximity, gestures, etc., that an object is associated with the trigger.

Via one or more of action recording module 5901, trigger information module 5902, position information module 5903, and time information module 5904, processor 210 may proceed to determine information about the trigger-associated object (Step 6140). In some embodiments, Step 6140 may be performed by a remote computing system, such as server 250. As discussed above in association with FIGS. 60A-60D, the information related to the object that processor 210 may determine may include, but not be limited to, a time that the object was associated with the hand of the user. Time information module 5904 may be configured to assist processor 210 in determining this time via image data captured by image sensor 220 over a pre-determined time period, such as hours, days, weeks, months, or years. In these embodiments, the data may be sent to a remote system, such as server 250 for further analysis. Time information module 5904 may in some embodiments configure a time to be displayed on or with the real time image data, indicating, for example, that a particular object (such as pencil 6004) was held by the user at a particular time on a particular day, i.e. 7:00 PM on January 5th. In some embodiments, time information module 5904 may also be executed to determine a duration of time that the object was associated with the hand. Any time-related information pertaining to the object may be determined by time information module 5904.

The information related to the object may be a location of the user when the object was associated with the hand of the user. Position information module 5903 may be configured to assist processor 210 in determining this position information via image data captured by image sensor 220. In these embodiments, the data may be sent to a remote system, such as server 250 for further analysis. Position information module 5903 may in some embodiments configure positional information to be displayed on or with the real time image data, indicating, for example, that a particular object (such as pencil 6004) was held by the user at a given location such as 500 Main Street. The location may also be expressed in terms of GPS coordinates, latitude and longitude measurements, map data grid coordinates, etc. Any position-related information pertaining to the object may be determined by position information module 5903.

Figure 60D:
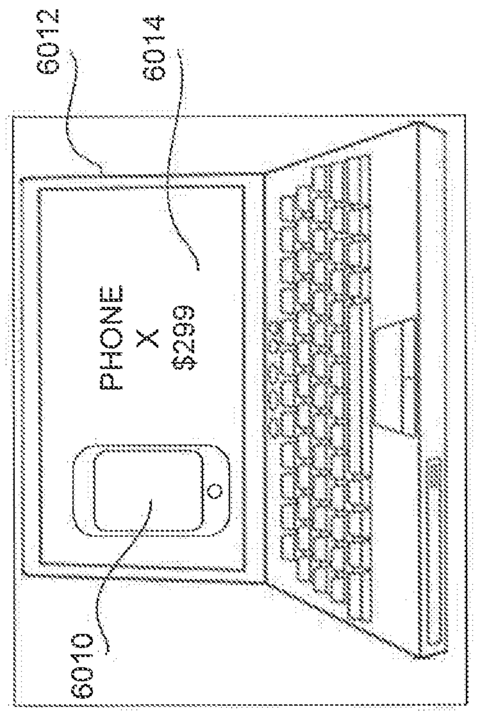

The information related to the object may be an identifier of the object. Trigger information module 5902 may be configured to assist processor 210 in determining an identifier for a trigger-associated object via image data captured by image sensor 220. In these embodiments, the data may be sent to a remote system, such as server 250 for further analysis. As discussed above in association with FIGS. 60A-60C, trigger information module 5902 may determine information about a trigger-associated object in a variety of ways. In some embodiments, apparatus 110 may solicit information from user 100 about the object via an associated microphone. In other embodiments, processor 210 may execute one or more of trigger information module 5902, position information module 5903, or time information module 5904 to determine context relating to the object and/or the trigger to determine information. For example, in the illustration of FIGS. 60C-60D, processor 210 may determine that user 100 is holding a smartphone 6010 in a retail establishment selling electronics. In still other embodiments, processor 210 may execute one or more of action recording module 5901, trigger information module 5902, or database access module 5906 to compare the image of the trigger-associated object from the image data to known objects. For instance, in the example of FIG. 60C, processor 210 may execute database access module 5906 to compare the image of smartphone 6010 to a variety of smartphones stored in object information database 5909. Processor 210 may determine via this analysis that smartphone 6010 is in fact “PHONE X” as shown in FIG. 60D.

In some embodiments, apparatus 100 may further comprise a communications interface, such as one or more of wireless transceiver(s) 530 or data port 570. In these embodiments, processor 210 may be programmed to cause transmission of the determined information related to the trigger-associated object via this communications interface to a remotely located computing device for inclusion in a catalog of objects associated with the user. (Step 6150). For example, processor 210 may execute database access module 5906 to transmit the object information for storage in user object database 5907. In some embodiments, Step 6150 may be performed by a remote computing system, such as server 250. In some embodiments, user object database 5907 may be located within memory 550. In other embodiments, user object database 5907 may be located on a remote computer system, such as server 250.

Processor 210 (via database access module 5906) may determine whether or not a database entry exists for the trigger-associated object within user object database 5907 (Step 6160). In some embodiments, Step 6160 may be performed by or in conjunction with a remote computing system, such as server 250. In some embodiments, user object database 5907 may be organized in various ways that may facilitate searching the database for entries relating to a trigger-associated object. For example, user object database 5907 may be organized into categories or types of objects, and subcategories/subtypes thereof. Part of the object information determined and identified for the trigger-associated object in Step 6140 by processor 210 and modules stored in memory 550 may include a type and subtype of object that the object fits into.

Based on these parameters, processor 210 and/or server 250 may determine that there is an existing entry for the trigger-associated object (Step 6160:YES; Step 6170), and may determine whether or not to add to or update the stored object information within user object database 5907. For example, an image of the trigger-associated object may have been acquired by image sensor 220 via action recording module 5901. Processor 210 may update the database entry (such as entry 6006) by initiating storage of the newly-acquired image(s), and deleting one or more older images associated with the trigger-associated object within the database entry. Processor 210 and/or server 250 may update an existing database entry for the object by adding, deleting, or revising any object information associated with the entry. The updated information may be graphical or textual.

Processor 210 and/or server 250 may determine that there is not an existing entry for the trigger-associated object within user object database 5907 (Step 6160:NO; Step 6180). In these embodiments, processor 210, via one or more of trigger information module 5902, position information module 5903, time information module 5904, feedback generation module 5905, and database access module 5906, may create a new database entry (such as entry 6006) for the trigger-associated object within user object database 5907. Via database access module 5906, processor 210 may add all or any portion of the determined object information to the new database entry, and may determine which type or subtype the object belongs to within user object database 5907. In some embodiments, processor 210 and/or server 250 may cause transmission of the information related to the object to computing device 120 for inclusion in a catalog of objects associated with the user. For example, processor 210 of apparatus 110 may cause such transmission to occur using wireless transceiver 530.

FIGS. 62A-62D illustrate examples of image data captured by apparatus 110 representing fields of view of image sensor 220, consistent with certain disclosed embodiments. In some embodiments, the field of view of image sensor 220 may correspond to or be similar to the field of view of user 100. The examples of FIGS. 62A-62D are similar to those of FIGS. 60A-60D, but illustrate the application of process 6100 and related processes to the selection of one or more warnings for user 100 based on the trigger-associated object.

Figure 62A:
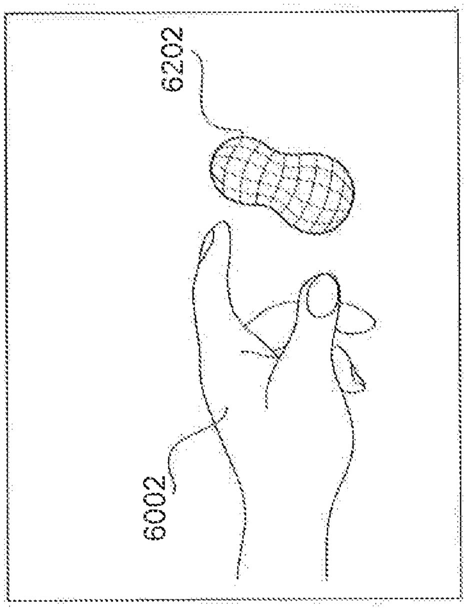
FIGS. 62A-62D are example illustrations of image data captured by a wearable camera system as part of an apparatus for deriving and storing information relating to objects held by a user in image data from a wearable camera system, consistent with disclosed embodiments.

In the example of FIG. 62A, image data captured by image sensor 220 indicates that hand 6002 of user 100 is holding an object, here, peanut 6202. Processor 210 may be configured to execute action recording module 5901 to record the image data, or may be configured to automatically be recording the image data in real time. In some embodiments, such as the example illustrated in FIG. 62A, processor 210 (via trigger information module 5902) may be configured to recognize hand 6002 as a trigger, as discussed above in association with process 6100. As before, processor 210 may be configured to store information related to an object that user 100 is holding that is associated with hand-related trigger 6002. Alternatively, user 100 may affirmatively indicate in some manner that he/she wishes to store information about a trigger-associated object, such as a verbal command transmitted through a microphone associated with apparatus 110.

Consistent with disclosed embodiments, apparatus 110, via action recording module 5901, may record the presence of peanut 6202. Via trigger information module 5902, apparatus 110 may execute software instructions to derive information about trigger 6002 and peanut 6202. As will be discussed in further detail below in association with FIGS. 10-11 and processes 6300 and 6400, in some embodiments, trigger information module 5902 may derive information from the captured image data related to peanut 6202. In these embodiments, the derived information may include a position of user 100 and/or apparatus 110 when the object 6004 was encountered. Processor 210 may execute position information module 5903 to determine this information. The derived information may further include a date and time when the object 6004 was encountered. Processor 210 may execute time information module 5904 to determine this information. Trigger information module 5902 may also derive, receive, or otherwise determine information about the object, such as peanut 6202. This may include a name of the object, a category that the object belongs to, and/or previous interactions with the object by the user, etc.

In these embodiments, processor 210 may execute database access module 5906 to access information about peanut 6202 from one or more of user object database 5907 or object information database 5909. In other embodiments, apparatus 110 may be configured to receive information about peanut 6202 from user 100. For example, apparatus 110 may be equipped with a microphone, and may be configured to receive verbal information from user 100 about peanut 6202. In other embodiments, user 100 (or a third party, such as a physician or other medical professional) may be able to submit information about peanut 6202 as it relates to user 100 in textual form, such as from an external computer system or a mobile device, such as computing device 120. Additionally or alternatively, trigger information module 5902 may further determine or access information about user 100 before, during, or after information about peanut 6202 is determined. In these embodiments, the user information may include demographic information such as age, income, marital status, gender, and/or geographic location, etc.

In the example of FIG. 9B, processor 210 via database access module 5906 has accessed an existing database entry 6204 for peanut 6202 within a user object database 5907 associated with user 100. In this illustration, a sub-type of objects within user object database 5907 are objects that require the generation of warnings to user 100 due to safety risks or other hazards. Here, user 100 has a peanut allergy, and so database entry 6204 is contained within this sub-type.

Processor 210 may analyze this information and determine that a warning is necessary. In these embodiments, feedback generation module 5905 may be executed to generate audible, visible, or tactile feedback to user 100, such as feedback 6206. Feedback 6206 is an audible warning to user 100 that peanut 6202 is associated with an "ALLERGY!" and that user 100 is warned "DO NOT EAT!" In alternative embodiments, processor 210 may transmit the object information associated with peanut 6202 as well as user information (such as demographics or medical history) associated with user 100 to a remotely located computing device (such as server 250) in order to determine the selection of one or more warnings to user 100.

Variations on this basic process can be employed by user 100 or by third parties to perform various tasks. In the examples of FIGS. 9C-9D, the object is now pill bottle 6208, which can be seen to be held by hand 6002 in FIG. 62C. As discussed above for peanut 6202, processor 210 may determine information about the pills within bottle 6208 to determine if they are safe for user 100. For example, processor 210 via action recording module 5901 may perform optical character recognition (OCR) on the label of bottle 6208 to read the text located on the label. The label on bottle 6208 in FIG. 62C indicates that the pills are "DRUG A."

Figure 62B:
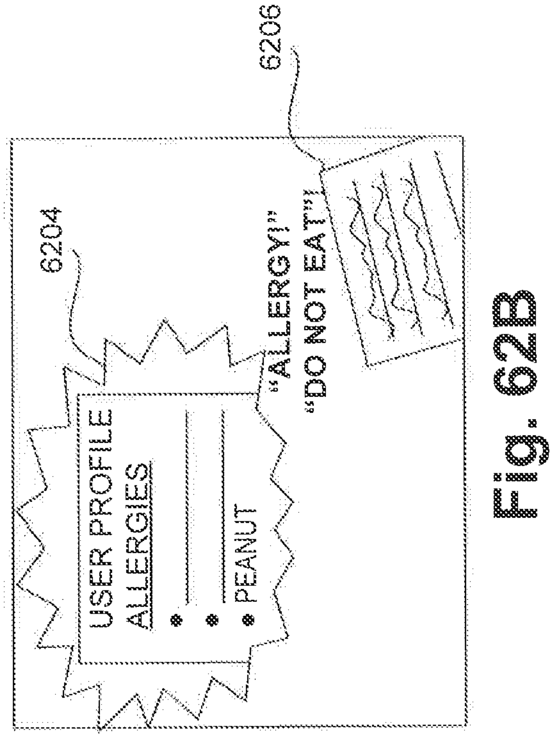
Figure 62C:
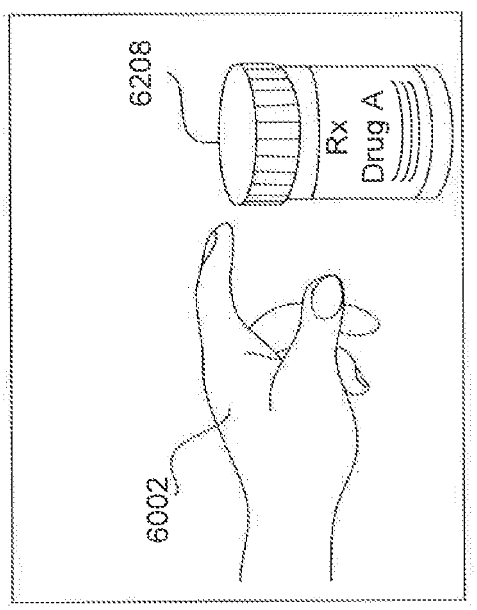
Figure 62D:
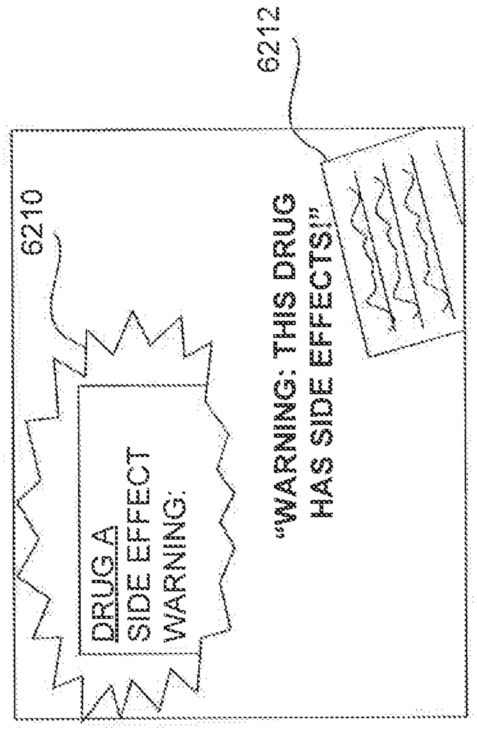

As discussed above, processor 210 or an external system may execute database access module 5906 to compare the derived object information for pill bottle 6208 with one or more of user object database 5907 or object information database 5909. In the illustration of FIG. 62D, a database entry 6210 exists for DRUG A within user object database 5907, and that entry 6210 contains information regarding side effects of DRUG A that may be harmful to user 100.

Processor 210 may analyze this information and determine that a warning is necessary. In these embodiments, feedback generation module 5905 may be executed to generate audible, visible, or tactile feedback to user 100, such as feedback 6212. Feedback 6212 is an audible warning to user 100 that DRUG A of pill bottle 6208 is associated with side effects. In alternative embodiments, processor 210 may transmit the object information associated with pill bottle 6208 as well as user information (such as demographics or medical history) associated with user 100 to a remotely located computing device (such as server 250) in order to determine the selection of one or more warnings to user 100.

Figure 63:
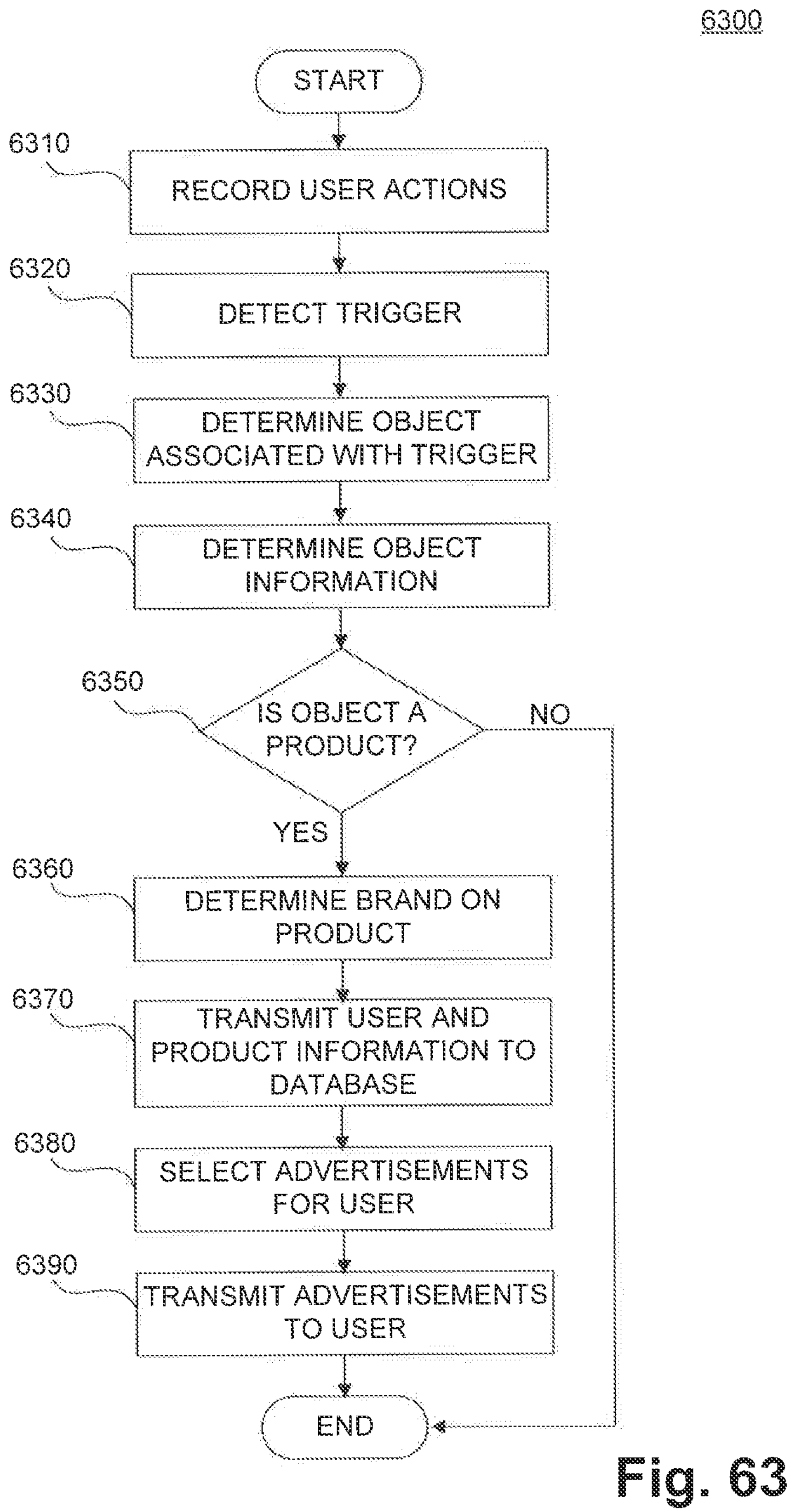
FIG. 63 is an example of a process for using stored object information to select advertisements for a user of a wearable camera system, consistent with disclosed embodiments.

FIG. 63 illustrates an example of a process 6300 for selecting advertisements for a user based on trigger-associated object information consistent with certain disclosed embodiments. Process 6300, as well as any or all of the individual steps therein, may be performed by various aspects of apparatus 110, such as processor 210, image sensor 220, action recording module 5901, trigger information module 5902, position information module 5903, time information module 5904, feedback generation module 5905, database access module 5906, or any subcomponents therein. In some embodiments, one or more steps of process 6300 may be performed by a remote computing system, such as computing device 120 or server 250. For exemplary purposes, FIG. 63 is described as being performed by processor 210, executing software instructions stored within memory 550.

Process 6300 is related to and further describes the illustrated examples shown above in FIGS. 60C-60D, relating to targeting advertising to user 100 based on recognized objects associated with triggers (such as hand-related trigger 6002). Steps 6310-6340 are substantially identical to Steps 6110-6140 of process 6100, and will not be repeated here.

Via one or more of action recording module 5901, trigger information module 5902, or position information module 5903, processor 210 may determine whether or not a trigger-associated object is a "product" (Step 6350). For purposes of this disclosure, a "product" may be defined as an object for sale in a retail store or similar merchant setting. For purposes of the description of process 6300, if processor 210 determines that a trigger-related object is not a product (Step 6350:NO), then process 6300 ends.

If processor 210 determines that the object is a product (Step 6350:YES), via analysis of the determined object information, processor 210 may be further programmed to identify a brand associated with the product (Step 6360). Processor 210 may make the determination in various ways. For example, via action recording module 5901, processor 210 may capture image data from image sensor 220 showing a detailed view of the product sufficient to resolve any logo or other such branding information. In these embodiments, trigger information module 5902 may also be used to derive information. Processor 210 may then execute database access module 5906 to compare the derived branding information with information stored in object information database 5909. Processor 210 may then determine if there is a match with an entry within database 5909, and if there is, may identify the brand in that manner. In some embodiments, there may be no match with any entry in database 5909, and in those embodiments the brand of the product may not be recognizable. In these embodiments, process 6300 may end and feedback generation module 5905 may be optionally executed to inform the user that information about the product was not found.

Via associated communications interfaces such as data port 570 or wireless transceivers 530, processor 210 may transmit the derived product information as well as user information to a remotely located computing device (such as server 250) for use in the selection of one or more advertisements targeted to user 100. As described above in association with FIGS. 60C-60D, the user information may include demographic information, past behavior of the user, and/or past purchases.

Process 6300 may include transmitting user and product information to database (Step 6370). For example, server 250 may transmit user and product information to database 5909.

Server 250 (or alternatively, processor 210 via database access module 5906) may select one or more advertisements or promotions for user 100 based on the received information (Step 6380). In these embodiments, server 250 may access advertising database 5908, and based on the transmitted product and user information, may select advertisements catered specifically to that information. For example, as illustrated in FIG. 60C, the image data indicated that user 100 was holding smartphone 6010, and server 250 may determine that user 100 should be shown an advertisement or provided a promotion (such as a discount or a coupon) relating to smartphone 6010. In other embodiments, advertisements may be selected for user 100 that pertain to related products in the same industry or technology. In still other embodiments, advertisements may be selected for user 100 in a completely different field, based for instance on user 100's demographics. For example, if user 100 has a certain income, they might be shown advertisements listed in advertising database 5908 as being catered to or attractive to people having that income.

Server 250 may transmit the selected advertisement to user 100 (Step 6390). The advertisement or promotion may be transmitted by various means, such as electronically via network 240, by text message, by print, by postal mail, etc. For example, in the illustration of FIG. 601), advertisement 6014 for smartphone 6010 was viewed by user 100 on laptop 6012, as a pop-up ad or in an email message. Any means familiar to those of skill in the art may be used to transmit the ad to user 100, such as providing the ad within an application executing on smartphone 6010 (e.g., a shopping application, a banking application, a social networking application, etc.).

Figure 64:
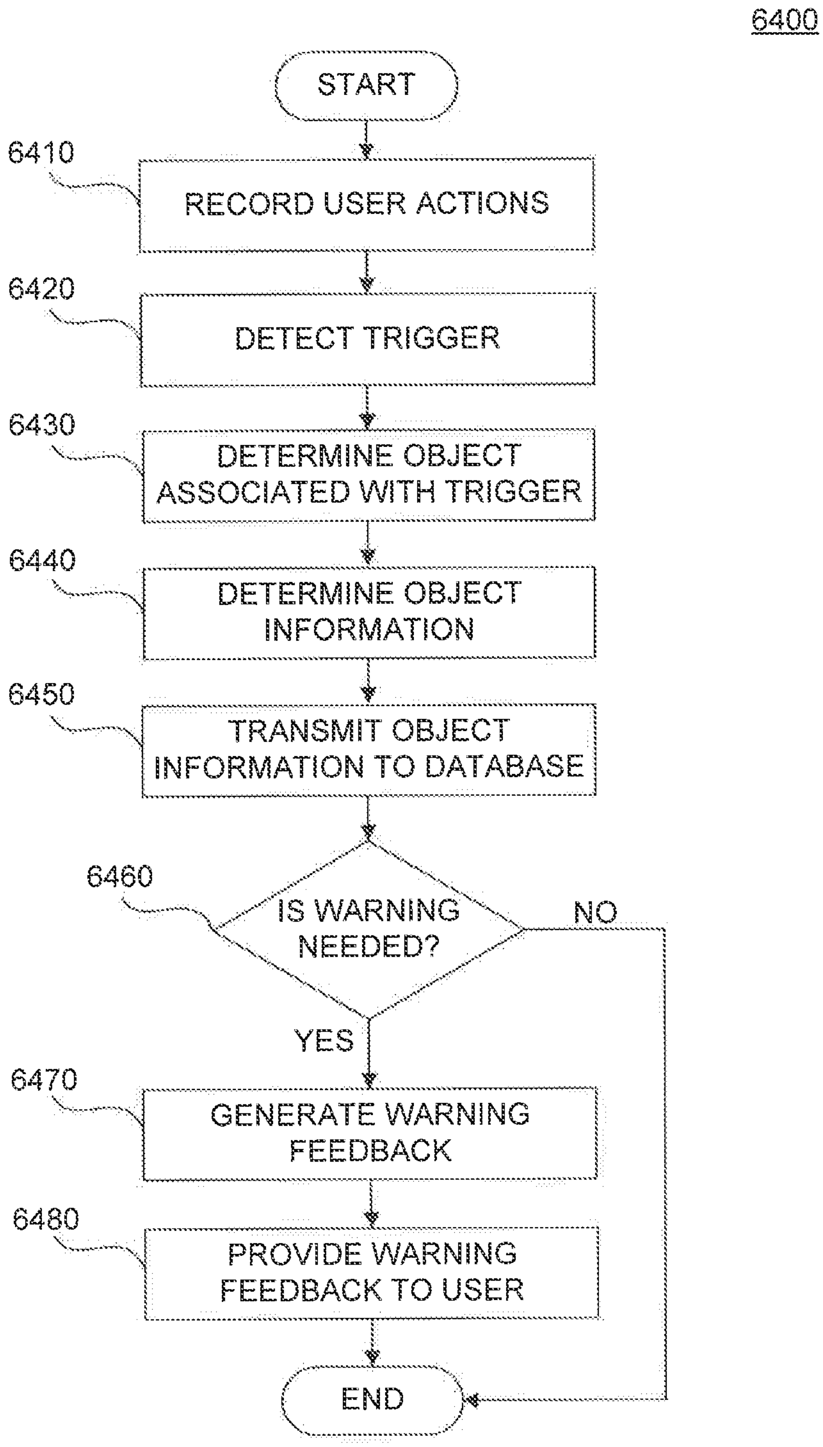
FIG. 64 is an example of a process for deriving and storing information relating to objects held by a user in image data from a wearable camera system, consistent with disclosed embodiments.

FIG. 64 illustrates an example of a process 6400 for deriving and storing information relating to objects held by a user in image data consistent with certain disclosed embodiments. Process 6400, as well as any or all of the individual steps therein, may be performed by various aspects of apparatus 110, such as processor 210, image sensor 220, action recording module 5901, trigger information module 5902, position information module 5903, time information module 5904, feedback generation module 5905, database access module 5906, or any subcomponents therein. In some embodiments, one or more steps of process 6300 may be performed by a remote computing system, such as computing device 120 or server 250. For exemplary purposes, FIG. 63 is described as being performed by processor 210, executing software instructions stored within memory 550.

Process 6400 is related to and further describes the illustrated examples shown above in FIGS. 62A-62D, relating to providing warnings to user 100 based on recognized objects associated with triggers (such as hand-related trigger 6002). Steps 6410-6440 are substantially identical to Steps 6110-6140 of process 6100, and will not be repeated here.

In Step 6450, processor 210 may transmit the derived user and object information to an external computer system or database, such as computing device 120 or server 250 and/or user object database 5907 or object information database 5909. The transmission may be achieved via the communications devices of apparatus 110 described above (i.e., data port 570 or wireless transceivers 530). Server 250 may be operably connected to apparatus 110 and may have the capability to execute one or more of the modules stored in memory 550.

Via one or more of action recording module 5901, trigger information module 5902, position information module 5903, or time information module 5904, processor 210 may determine whether or not a warning is needed for user 100 based on the derived and transmitted user information and object information as discussed above in association with FIGS. 60A-60D. For purposes of the description of process 6400, if processor 210 determines that no warning is needed (Step 6460:NO), then process 6400 ends.

Alternatively, server 250 and/or processor 210 may determine that a warning is needed (Step 6460). Server 250 may make the determination in various ways. For example, via action recording module 5901, server 250 may analyze image data from image sensor 220 showing a detailed view of the object sufficient to resolve any label, logo or other such branding information. In these embodiments, trigger information module 5902 may also be used to derive information. As discussed above in association with FIGS. 62B and 62D, server 250 and/or processor 210 may then execute database access module 5906 to compare the derived user and object information with information stored in user object database 5907 or object information database 5909. As described, it may be determined that the database entries associated with the detected trigger-associated object (such as peanut 6202 or pill bottle 6208) may reside within a sub-type of database entries within databases 5907/5909 associated with warnings.

Via feedback generation module 5905, server 250/processor 210 may generate warning feedback to the user (Step 6470). As shown above in FIG. 62B as feedback 6206 and in FIG. 62D as feedback 6212, a warning dialog may be generated to provide immediate, pertinent information to the user. In FIG. 62B, the user 100 was allergic to peanut 6202, and so the user was warned not to eat the peanut. In FIG. 62D, DRUG A had significant side effects, and so the user was warned about those effects. One of skill in the art may envision any relevant warning that may need to be given to a user based on a particular user, a particular object, and a particular context. Server 250 may provide the feedback to user 100 (Step 6480). The warning feedback may be transmitted by various means, such as electronically via network 240, by text message, by email, by an application executing on a user device (e.g., computing device 120), by print, by postal mail, etc., as described previously.

Another application of wearable technology and "life logging" is the ability to locate lost items that the user has encountered and interacted with previously. Since the user may "log" certain interactions, a detected object associated with a trigger, such as the user's hand, may have its time and/or position logged for later use, and when the user indicates that the item is misplaced, apparatus 110 may call up the stored information to assist the user in re-locating the object.

For this embodiment, apparatus 110 may contain the same processor 210, memory 550, and other components as described above and as illustrated in FIGS. 10-13. Thus, the descriptions of these same (or similar) modules and database are not repeated. Modules and databases associated with this embodiment may be identical to those of memory 550, or may be combined with them or used as alternatives.

Figure 65:
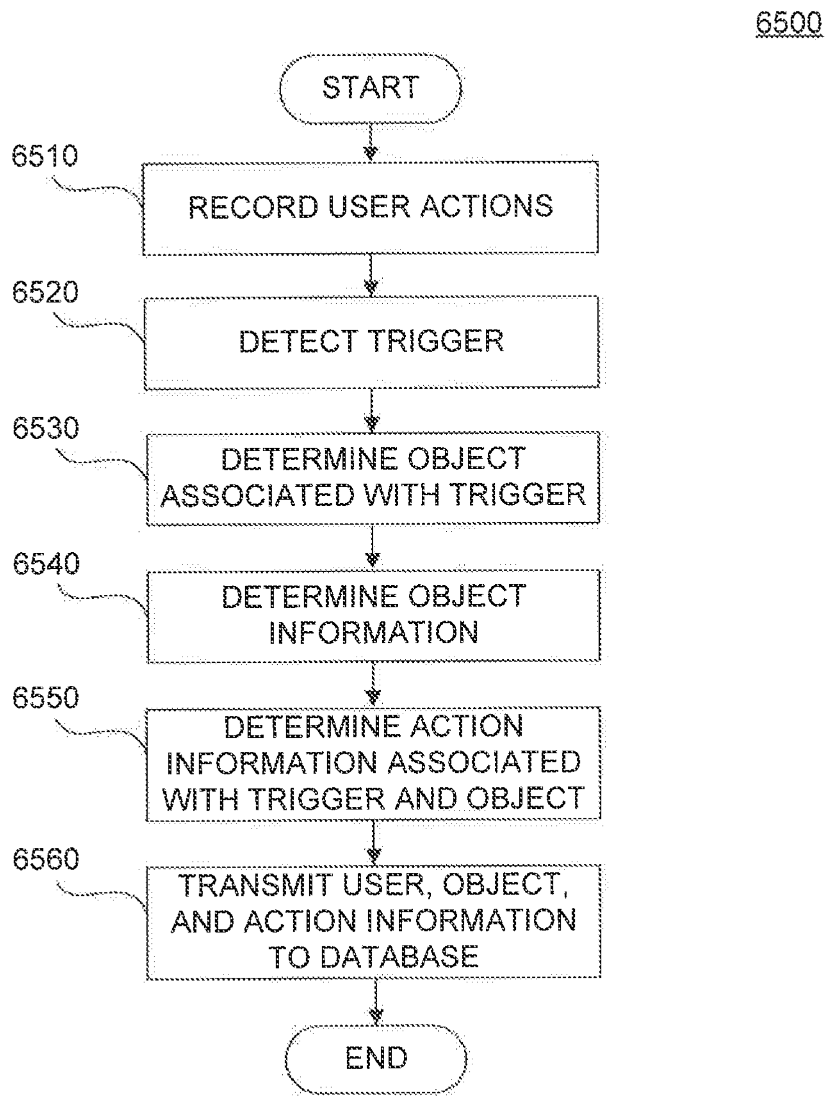
FIG. 65 is an example of a process for deriving and storing information relating to objects held by a user in image data from a wearable camera system, consistent with disclosed embodiments.

FIG. 65 illustrates a process 6500 for storing information relating to objects for later use when those objects are lost. Process 6500, as well as any or all of the individual steps therein, may be performed by various aspects of apparatus 110, such as processor 210, image sensor 220, action recording module 5901, trigger information module 5902, position information module 5903, time information module 5904, feedback generation module 5905, database access module 5906, or any subcomponents therein. In some embodiments, one or more steps of process 6600 may be performed by a remote computing system, such as computing device 120 or server 250. For exemplary purposes, FIG. 65 is described as being performed by processor 210, executing software instructions stored within memory 550.

Steps 6510-6540, relating to recording actions of the user, detecting a hand-related trigger, detecting an object of interest associated with the trigger, and determining information associated with that object, are all substantially identical to Steps 6110-6140 of process 6100 described above, and will not be repeated here.

In Step 6550, processor 210 may be programmed to process image data received from image sensor 220 and captured using action recording module 5901 to identify at least one action associated with the object. This identification may be performed with the assistance of trigger information module 5902. For purposes of this disclosure, an associated "action" refers to the action that user 100 was performing with their hand (the trigger) relative to the object when the images were recorded. Examples of actions that may be determined by trigger information module 5902 include holding, pointing to, touching, dropping, operating, manipulating, or grabbing, as discussed above. Of particular interest for later retrieval of lost items are the grabbing and dropping motions. Action recording module 5901 may record the user 100 either dropping or grabbing a trigger-associated object from user 100's hand, and trigger information module 5902 may extract and identify this action.

Along with the associated action, processor 210 may derive and store other information relating to the trigger-associated object of interest. For example, in these embodiments, the derived information may include a position of user 100 and/or apparatus 110 when the object was encountered. Processor 210 may execute position information module 5903 to determine this information. The derived information may further include a date and time when the object 6004 was encountered. Processor 210 may execute time information module 5904 to determine this information. Trigger information module 5902 may also derive, receive, or otherwise determine information about the object. This may include a name of the object, a category that the object belongs to, previous interactions with the object by the user, etc.

Processor 210, via associated communications interfaces, may transmit the derived user, object, and action information to an external computer system or database, such as server 250 and/or user object database 5907 (Step 6560). The transmission may be achieved via the communications interfaces of apparatus 110 described above (i.e. data port 570 or wireless transceivers 530). Server 250 may be operably connected to apparatus 110 and may have the capability to execute one or more of the modules stored on memory 550.

If the trigger-associated object should later become lost or misplaced, it would be helpful to user 100 to know the last place that the object was seen and the time when it was last seen. The described apparatuses and systems permit this information to be stored in the process described above. For example, the position of the object as determined by position information module 5903 in the image data when the object was grabbed or dropped by user 100 may be annotated in a database entry within user object database 5907 as the "last known location" of that object. Images of where the object was last grabbed or dropped may also be included in the database entry within user object database 5907, as captured by image sensor 220. Similarly, the time when the object was grabbed or dropped by user 100 as determined by time information module 5904 in the image data may be annotated in the database entry as the "last time seen" of that object. This information may be transmitted to database 5907 and/or to an external computing system such as computing device 120 or server 250 in order to provide a safeguard should the object later be lost.

Figure 66:
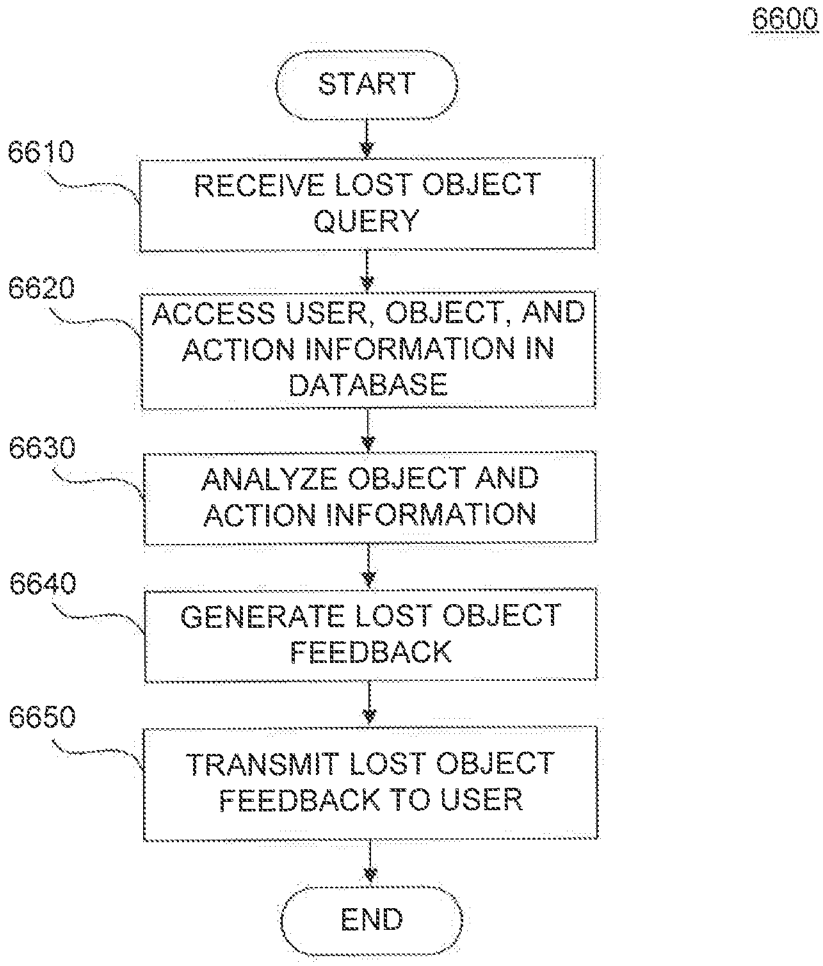
FIG. 66 is an example of a process for using stored object information to find lost objects, consistent with disclosed embodiments.

FIG. 66 illustrates a process 6600 for retrieving information previously stored for an object when that object is later lost. Process 6600, as well as any or all of the individual steps therein, may be performed by various aspects of apparatus 110, such as processor 210, image sensor 220, action recording module 5901, trigger information module 5902, position information module 5903, time information module 5904, feedback generation module 5905, database access module 5906, or any subcomponents therein. In some embodiments, one or more steps of process 6600 may be performed by a remote computing system, such as computing device 120 or server 250. For exemplary purposes, FIG. 66 is described as being performed by processor 210, executing software instructions stored within memory 550.

Processor 210 may receive a query from user 100 or from another computing system (such as device 120 or server 250) that an item has been lost (Step 6610). The query may be received by processor 210 by various means. For example, apparatus 110 may be equipped with a microphone, and user 100 may say into the microphone a command such as "FIND [OBJECT]." As described above, when processor 210 derives object information, it may include an audible name of the object, which may then be used as a search query for database access module 5906 to use for querying user object database 5907. The query may be received by other means; for example, user 100 may send a text message to an external system such as server 250 via computing device 120. Computing device 120 may also be configured to display a graphical user interface (GUI) that may be capable of displaying an inventory of objects that have related information stored within user object database 5907. In these embodiments, user 100 may simply be able to select the object that he/she wishes to find.

Via database access module 5906, processor 210 may access a previously-stored database entry containing user, object, and action information within user object database 5907 (Step 6620). Processor 210, via one or more of trigger information module 5902, position information module 5903, and time information module 5904, may analyze the accessed object and action information (Step 6630). The analyzed information may include, as non-limiting examples, the action that the user 100 was performing when the object was last seen. Processor 210 may determine, for example, that user 100 was either grabbing or dropping an object, such as a set of car keys, at a certain time and place as determined by position information module 5903 and time information module 5904. Any other information relevant to the last time and place that the missing object was last visualized by apparatus 110 and image sensor 220 may be analyzed by processor 210 and the modules stored within memory 550.

Via feedback generation module 5905, server 250/processor 210 may generate lost object feedback to the user (Step 6640). The lost object feedback may comprise, as non-limiting examples, the derived information described above relating to the last time and place that the missing trigger-associated object was seen, as well as what the user 100 was doing at that time and place. For example, if the user 100 is looking for a set of missing car keys, and processor 210 has determined that user 100 1) dropped the keys 2) in a dresser drawer, 3) last Thursday at 4:00 PM, feedback generation module 5905 may be executed to compile that information into an easy to digest form for user 100. For example, feedback generation module 5905 may generate a combination audio and visual presentation to user 100, presenting the captured image data of the last time and place the missing object was seen, along with an audible summary such as "YOUR KEYS WERE LAST SEEN IN THE DRESSER DRAWER LAST THURSDAY AT 4 PM." One of skill in the art may envision any relevant warning that may need to be given to a user based on a particular user, a particular object, and a particular context. Processor 210/server 250 may provide the feedback to user 100 (Step 6650). The lost item feedback may be transmitted by various means, such as electronically via network 240, by text message, by email, by an application executing on a user device (e.g., computing device 120), by print, by postal mail, etc. as described previously. In some embodiments, the feedback is generated and transmitted as quickly as possible after the lost object query is received, such as within seconds or minutes.

A wearable camera system (e.g., wearable apparatus 110) may provide social features to a user and/or other entities. For example, a wearable camera system may capture images from an environment of a corresponding user and produce image data from the captured images. The captured image data may be compared with image data captured by a user of another wearable camera system. The comparison of captured image data from two users may be used to produce a matching score between the users. The matching score may be used for a variety of purposes, such as identifying common interests, identifying common traits, and/or suggesting a possible match between the users. For example, captured image data that results in a high matching score may indicate that two users share recreational interests (e.g., both enjoy soccer).

Wearable camera systems may provide image data which may include images or video streams captured by an image sensor 220, 220*a*, and/or 220*b* included with and/or embedded in the wearable camera systems. The image data may also include information related to the images or video streams such as, for example, a location where the captured images were captured, a time when the captured images were captured, or information describing or identifying content in the captured images.

In some embodiments, a user may preset or preconfigure his or her own user information such as gender, age, weight, height, hair color, eye color, physical attributes of at least one of the at least two users, income level, education level, home address, work address, marital status, and/or postal code. Such information may be stored in, for example, a user profile. The user may configure the profile information using a wearable camera systems or a computing device in communication with the wearable camera systems via a wired or wireless communications connection. The profile information may be stored in a wearable camera system, a computing device, and/or a server. The profile information may be used for a variety of purposes. For example, this information may be used when determining a value of a matching score between users. The matching score may be used to suggest a possible match between at least two users, identify a common preference of at least two users, and/or build a social graph of at least two users. In some embodiments, the matching score may relate to a larger population of users (e.g., 3, 4, 5, 10, 50, 100, 500, 1,000 users, etc.)

Figure 67:
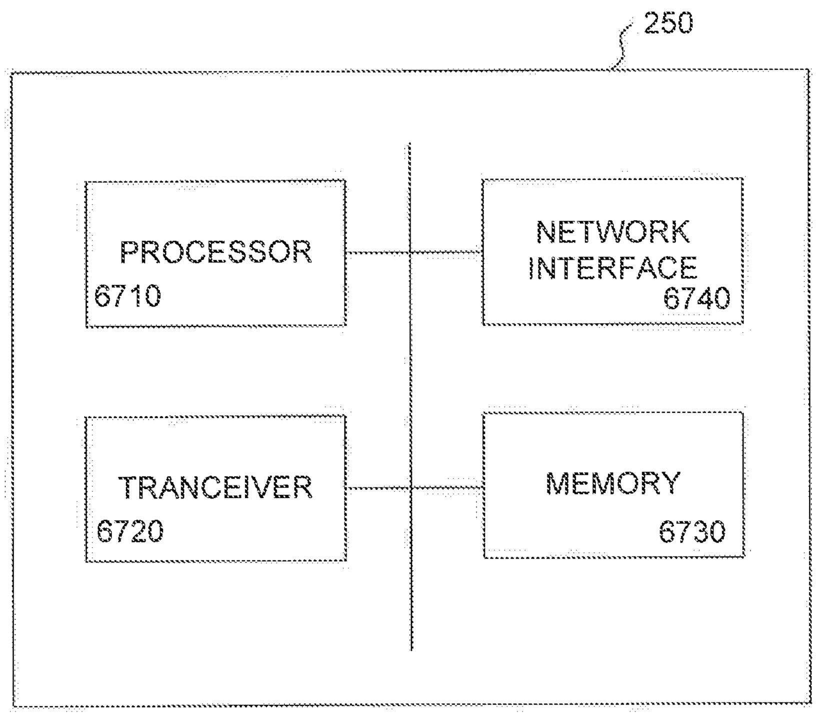
FIG. 67 is a block diagram illustrating an example of the components of a server.

FIG. 67 is a block diagram illustrating example components of server 250. Server 250 may include one or more processors 6710, at least one transceiver 6720, at least one memory 6730, and at least one network interface 6740. The one or more processors 6710 may comprise a CPU (central processing unit) and may include a single core or multiple core processor system with parallel processing capability. The one or more processors 6710 may use logical processors to simultaneously execute and control multiple processes. One of ordinary skill in the art will recognize that other types of processor arrangements could be implemented that provide for the capabilities disclosed herein.

Transceiver 6720 may transmit or receive signals containing any kind of information to/from wearable camera systems or computing device 120 over network 240 via any known wireless standard (e.g., Wi-Fi, Bluetooth®, etc.), as well as near-filed capacitive coupling, and other short range wireless techniques, or via a wired connection.

Memory 6730 may include one or more storage devices configured to store information used by the one or more processors 6710 to perform certain functions according to exemplary embodiments. Memory 6730 may include, for example, a hard drive, a flash drive, an optical drive, a random-access memory (RAM), a read-only memory (ROM), or any other computer-readable medium known in the art. Memory 6730 may store instructions to be executed by the one or more processors 6710. Memory 6730 may be volatile or non-volatile, magnetic, semiconductor, optical, removable, non-removable, or other type of storage device or tangible computer-readable medium.

The network interface 6740 may comprise wired links, such as an Ethernet cable or the like, and/or wireless links to access nodes and/or different networks. The network interface 6740 may allow the one or more processors 6710 to communicate with remote devices via, for example, network 240.

Figure 68:
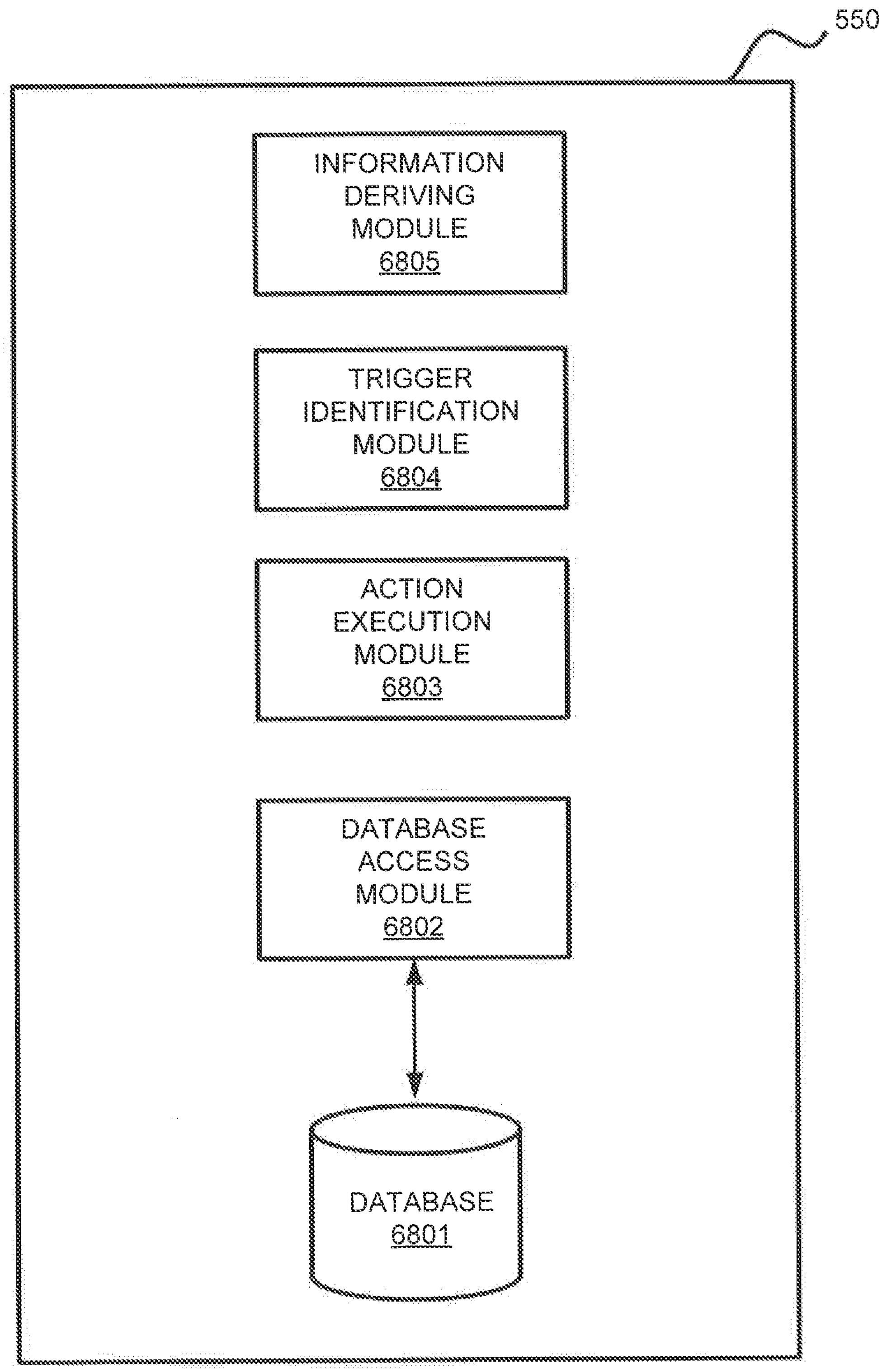
FIG. 68 is a block diagram illustrating an example memory of a wearable apparatus or a computing device storing a plurality of modules.

FIG. 68 is a block diagram illustrating an example memory (e.g., memory 550, 550*a*, and/or 550*b*) storing a plurality of modules according to the disclosed embodiments. Memory 550 may include, for example, a database 6801, a database access module 6802, an action execution module 6803, a trigger identification module 6804, and an information deriving module 6805. The modules and database shown in FIG. 68 are by example only, and a processing device in the disclosed embodiments may operate according to any suitable process. Further, although the modules and database of FIG. 68 are depicted as being stored in the memory of a wearable apparatus, in some embodiments, one or more of the modules and databases may be stored in a remote location, such as in a computing device (e.g., computing device 120) and/or a server (e.g., server 250).

Database 6801 may be configured to store various images, such as images or video streams captured by image sensor 220, 220*a*, and/or 220*b*. Database 6801 may also be configured to store images that are not captured by image sensor 220, 220*a*, and/or 220*b*. For example, previously acquired images and object types e.g., a face, a product, text, a logo, a public sign, etc., may be stored in database 6801. Database 6801 may also be configured to store information derived from images or video streams captured by image sensor 220, 220*a*, and/or 220*b*, such as an image identifier, a wearable apparatus identifier, a descriptor of identified content, a location of where the image was taken, a date when the image was taken, and a time when the image was taken. Database 6801 may also be configured to store user profile information, such as a gender, age, weight, height, hair color, eye color, physical attributes, income level, education level, a home address, a work address, marital status, and/or a postal code.

In some embodiments, the processing device may execute instructions associated with database access module 6802 to access database 6801, for example, to retrieve an image captured by image sensor 220, 220*a*, and/or 220*b* for analysis. In some embodiments, the processing device may execute instructions associated with database access module 6802 to retrieve a pre-stored object for comparison with an image captured in real time by image sensor 220, 220*a*, and/or 220*b*. The processing device may execute instructions associated with database access module 6802 to store images and related information in image database 6801.

In some embodiments, the processing device may execute instructions associated with action execution module 6803 to receive image data from wearable camera systems. The processing device may execute instructions associated with action execution module 6803 to perform certain actions associated with an identified trigger, as discussed below. An exemplary action may be to receive a feedback from a server 250. When receiving a feedback from a server 250, the processing device may execute instructions associated with action execution module 6803 to provide the feedback to user 100 via feedback-outputting unit 230 included in (or in communication with) the wearable camera systems and/or via feedback unit 545 included in computing device 120.

In some embodiments, the processing device may execute instructions associated with trigger identification module 6804 to identify a trigger, e.g., a visual trigger or a hand-related trigger present in image data. Visual triggers may include the identification of any type of object, person, location, and/or context within image data. The term "trigger" includes any information in the image data that may cause a wearable apparatus to execute an action. For example, apparatus 110 may detect as a trigger a finger or hand of user 100 holding a product, a predefined contextual situation in an environment, an appearance of a face of a person, etc.

In some embodiments, the processing device may execute instructions associated with information deriving module 6805 to derive information related to captured images or video streams, such as an image identifier, a wearable apparatus identifier, a descriptor of identified content, a location of where an image was taken, a date when an image was taken, and/or a time when an image was taken. An image identifier may be an identifier to uniquely identify an image captured by image sensor 220, 220*a*, and/or 220*b*. A wearable apparatus identifier may uniquely identify a wearable apparatus or a wearable camera system. Identified content may include a descriptor of identified content, e.g., a descriptor of identified objects, people, locations, context, etc., determined from a captured image. A location of a captured image may include information indicating that user 100 who wears wearable apparatus 110 is on a street, outside of a particular store, etc. In some embodiments, the location may also include geographical location information, such as a Global Positioning System (GPS) coordinates. Date information may include the date when an image was taken, and time information may include the time when an image was taken.

Figure 69:
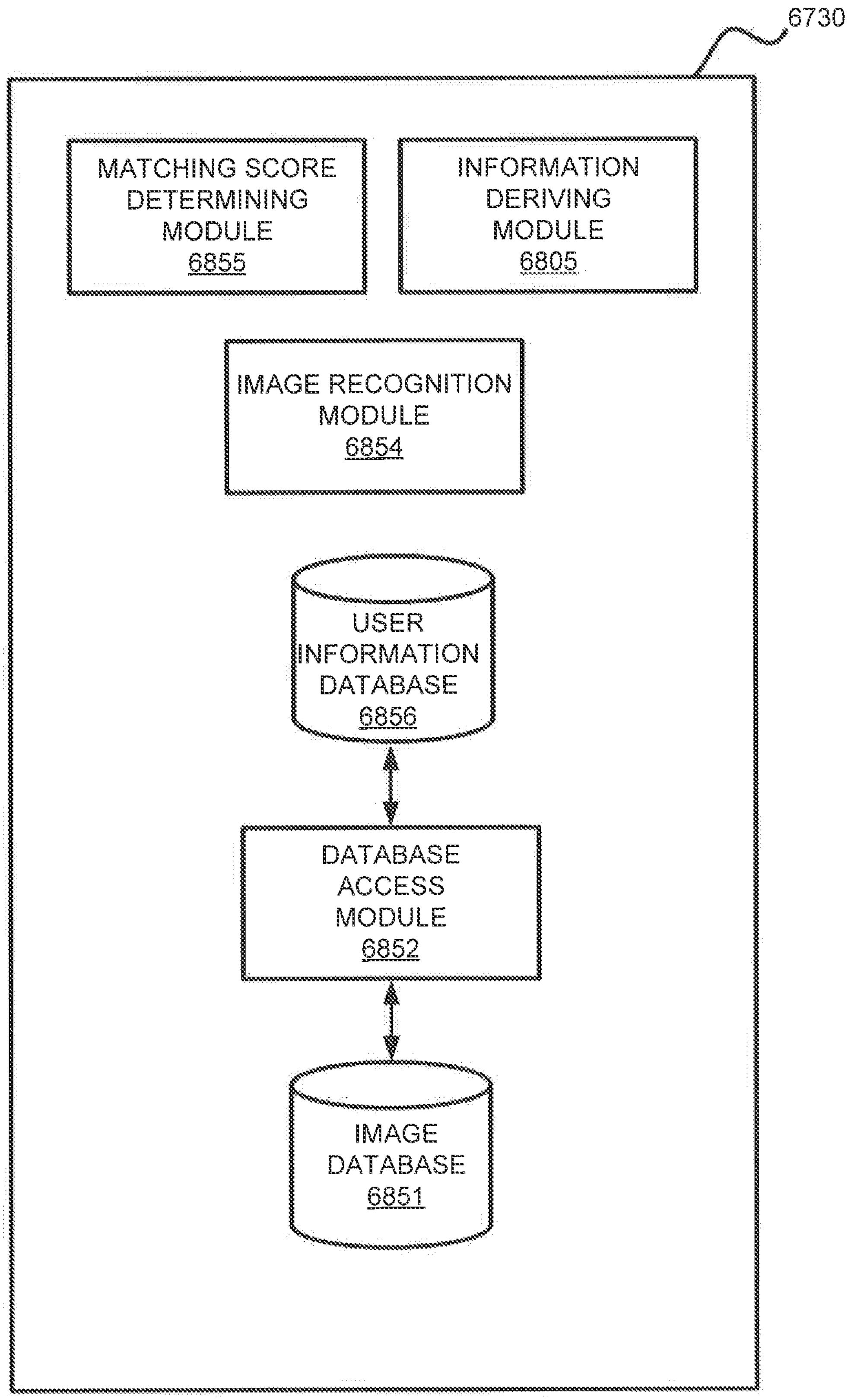
FIG. 69 is a block diagram illustrating an example memory of a server storing a plurality of modules.

FIG. 69 is a block diagram illustrating an example memory 6730 of server 250 storing a plurality of modules according to disclosed embodiments. Memory 6730 may include an image database 6851, an information deriving module 6805, a database access module 6852, an image recognition module 6854, a matching score determining module 6855, a user information database 6856. The modules and databases shown in FIG. 69 are by example only, and a processor in the disclosed embodiments may operate according to any suitable process. Further, although the modules and databases of FIG. 69 are depicted as being stored in the memory of a server, in some embodiments, one or more of the modules and databases may be stored in a wearable camera system (e.g., apparatus 110) and/or in a computing device (e.g., computing device 120).

As discussed above, the processing device may execute instructions associated with information deriving module 6805 to derive information related to captured images and/or video streams, such as an image identifier, a wearable apparatus identifier, identified content, a location of where an image was taken, a date when an image was taken, and/or a time when an image was taken.

Image database 6851 may be configured to store image data received from wearable camera systems. Image database 6851 may be configured to store various images, received from wearable captured by image sensor 220, 220*a*, and/or 220*b*. Image database 6851 may also be configured to store images that are not captured by image sensor 220, 220*a*, and/or 220*b*. For example, previously acquired images of object types e.g., a face, a product, text, a logo, a public sign, etc., may be stored in image database 6851. Image database 6851 may also be configured to receive and store information derived from images or video streams captured by image sensor 220, 220*a*, and/or 220*b*, such as an image identifier, a wearable apparatus identifier, identified content, a location of where the image was taken, a date when the image was taken, and/or a time when the image was taken.

In some embodiments, the processing device may execute instructions associated with database access module 6852 to access image database 6851 and/or user information database 6856, for example, to retrieve an image, image information, and/or user information for analysis. In some embodiments, the processing device may execute instructions associated with database access module 6852 to retrieve a pre-stored object for comparison with an image captured and received in real time from a wearable camera system. The processing device may execute instructions associated with database access module 6852 to store images and other data in image database 6851 and user information in user information database 6856.

In some embodiments, the processing device may execute instructions associated with image recognition module 6854 to analyze image data received from a wearable apparatus 110 for the purpose of identifying, for example, objects, faces, locations, people, context, activities, text, logos, and any other feature of a user's environment. Embodiments of the present disclosure may use various image recognition techniques, including, for example, object identification, facial recognition, and optical character recognition to identify triggers or other content within images. These techniques may be used singularly and in conjunction with one another.

In some embodiments, the processing device may execute instructions associated with image recognition module 6854 to initially categorize images by image type. For example, portions of images may be initially categorized as text, faces, objects, scenes, etc. Categorizations may be used by the processing device to select image recognition techniques to be used.

In some embodiments, the processing device may execute instructions associated with image recognition module 6854 to identify objects or items in an image or a portion of an image. For example, the processing device may execute instructions associated with image recognition module 6854 to compare one or more images and/or image portions stored in a database. Objects may be identified through, for example, a categorization process. For example, an object in an image portion may be categorized based on comparisons with one or more images of representative objects in a database. Based on the comparisons, an object may be assigned a category, e.g., vehicle, tree, building, consumer product, person, etc. The object may then be further categorized based on comparisons with sub-categories within a first assigned category (e.g., subcategories of person may include friend, co-worker, doctor, etc.). Thus, the identity of an object may be narrowed down through multiple image comparisons. Objects may also be identified, for example, through other types of comparisons with images stored in a remote and/or local database.

Scene and/or contextual situation recognition may be performed based on the recognition of multiple objects within an image and their relationship with one another. Object identification may be used to identify multiple objects within a scene via comparison with databases, and relationships between identified objects may be used to identify a scene. For example, the recognition of multiple chairs and a table may indicate a dining scene if the chairs are located around the table and dinnerware is identified in the image. The recognition of multiple chairs and a table may also indicate, for example, a press conference, if the chairs are aligned in rows facing the table.

Facial recognition may also be performed to identify portions of an image. Facial recognition techniques consistent with the present disclosure may be used to compare image content with images of faces stored in a database. As discussed, recognition of a particular individual's face within the database may constitute a trigger.

Optical character recognition (OCR) may also be used to analyze images. The term "optical character recognition" includes any method executable by a processor to retrieve machine-editable text from images of text, pictures, graphics, etc. Some OCR techniques and other document recognition technology use a pattern matching process to compare the parts of an image to sample characters on a pixel-by-pixel basis. This process, however, does not work well when encountering new fonts, and when the image is not sharp. Accordingly, apparatus 110 may use an OCR technique that compares a plurality of sets of image regions that are proximate to each other. Apparatus 110 may recognize characters in the image based on statistics related to the plurality of the sets of image regions. By using the statistics of the plurality of sets of image regions, apparatus 110 can recognize small font characters defined by more than four pixels e.g., six or more pixels. In addition, apparatus 110 may use several images from different perspectives to recognize text on a curved surface. In another embodiment, apparatus 110 can identify in image data an existence of printed information associated with a trigger stored in a database and execute the trigger command thereafter. Examples of a system command include: "enter training mode," "enter airplane mode," "backup content," "update operating system," etc.

Curved surface textual recognition may be particularly useful for identifying text on, for example, a consumer product. A curved surface may include any surface containing at least one bend, are, round, or any other non-straight structure. For example, the outer surfaces of a bottle, a can, a tin, and a cathode ray tube (CRT) screen are all examples of a curved surface. For simplicity, an object having a curved surface is herein referred to as a curved object. Curved objects may include a food product (e.g., a food product with a can or a tin package), a beverage (e.g., a bottle or a can), a pharmaceutical drug (e.g., a drug with a drug bottle), etc., and text may include text on a label associated with curved object.

In some embodiments, the processing device may perform a layout analysis in addition to optical character recognition. Apparatus 110 may capture an image that includes text. After capturing the image, to save resources and to process portions of the text that are relevant to the user and may include triggers, apparatus 110 may initially perform a layout analysis on the text. The term "layout analysis" refers to any process of identifying regions in an image that includes text. For example, layout analysis may detect paragraphs, blocks, zones, logos, titles, captions, footnotes, etc.

In some embodiments, the processing device may execute instructions associated with matching score determining module 6855 to determine a value of the matching score related to two or more users of wearable camera systems 110. The processing device may execute instructions associated with matching score determining module 6855 to use a myriad of factors in determining a matching score between two users. For example, the processing device may execute instructions associated with matching score determining module 6855 to determine a value of the matching score based on information related to image data, e.g., image identifier, a wearable apparatus identifier, identified content, a location of where an image was taken, a date when an image was taken, and a time when an image was taken. As another example, the processing device may execute instructions associated with matching score determining module 6855 to determine a value of the matching score of at least two users based on information related to the two users, e.g., gender, age, weight, height, hair color, eye color, physical attributes, income level, education level, home address, work address, marital status, postal code, and any other relevant user data. In some embodiments, the processing device may execute instructions associated with matching score determining module 6855 to determine a value of the matching score based on a combination of one or more items of information related to image data and/or one or more items of information related to at least two users.

The value of the matching score may be based on image data received from wearable camera systems of at least two users and may indicate a level of exposure of the two users to similar visual details in their environments. "Similar visual details" may include any commonality identified in image data captured from at least two wearable camera systems. For example, analysis of image data may reveal that two users enjoy similar food, similar restaurants, similar products, similar recreational activities, similar locations, etc., which may individually or collectively contribute to determining the value of a matching score.

In some embodiments, two users may have multiple matching scores, with each matching score pertaining to a particular category. For example, the processing device may execute instructions associated with matching score determining module 6855 to determine that two users have a high matching score related to a restaurant category, but a low matching score in another category, such as recreational activities. Matching scores of different categories may be used separately, or may be combined to create composite matching scores.

Based on a matching score, the processing device may execute instructions associated with matching score determining module 6855 to suggest a possible match between two or more users. For example, the processing device may execute instructions associated with matching score determining module 6855 to determine that two users have a high matching score, and suggest to the users that they may wish to meet. If the users agree to the possible match, contact information may be shared. In other embodiments, based on a matching score, the processing device may execute instructions associated with matching score determining module 6855 to identify a common preference of at least two users. For example, the processing device may execute instructions associated with matching score determining module 6855 to identify that two or more users enjoy something in common, and may generate data (e.g., a notification sent to computing device 240) that permits a user to search for and/or locate other users with the same common preference.

In other embodiments, based on a matching score, the processing device may execute instructions associated with matching score determining module 6855 to build a social graph of two or more users. A social graph may be a graph of interrelationships between individual users, and may include a series of nodes representing users and links representing commonalities between users. One type of commonality may be that the users know each other personally. Commonalities may also be based on a matching score between users. In some embodiments, the processing device may execute instructions associated with matching score determining module 6855 to build a social graph based on a threshold of matching scores between users. For example, users having a matching score that surpasses a threshold value may be linked in the social graph. Links in a social graph may be determined by one or more categorized matching scores, permitting a user to, for example, generate a social graph based on a single category (e.g., culinary preferences), or a combination of categories (e.g., culinary preferences and literary preferences).

In some embodiments, the processing device may execute instructions associated with matching score determining module 6855 to determine a recommendation based on the value of the matching score for a user. The recommendation may be based on a single category or multiple categories. The recommendation may be based, for example, on whether or not two users have a high matching score. For example, a recommendation may include a recommendation to try a product, watch a TV program or a motion picture, or try a restaurant, based on a number of users having high matching scores that have recently tried the product, program or movie, or restaurant. By using categorized matching scores, the processing device may execute instructions associated with matching score determining module 6855 to make recommendations based on those categories in which users have high matching scores. Thus, while a user has a high overall matching score with a second user, they may have a low matching score in a particular category. In some embodiments, the processing device may execute instructions associated with matching score determining module 6855 to recognize this low score, and not provide recommendations in such a category between these users. The reverse may also occur, with users receiving recommendations based on the actions of other users that have low overall matching scores but high scores in a category that a recommendation is based on.

User information database 6856 may be configured to store user profile information. User profile information may include gender, age, weight, height, hair color, eye color, physical attributes of a user, income level, education level, a home address, a work address, marital status, and/or a postal code. User profile information may be set by a user 100 via its wearable camera systems or its computing device connected to the wearable camera systems via wired or wireless communications connection. User information database 6856 may store user information received from a wearable camera systems or a computing device in communication with the wearable camera system.

FIG. 70 illustrates an exemplary database table 7000 for storing user information associated with at least one of users, 7061, 7062 of wearable camera systems 110. Although illustrated as a table, database 7000 may take any suitable form for the storage of data, including, for example, relational and operational databases. Database 7000 may be configured to store user profile information, such as a gender 7010, age 7011, weight 7012, height 7013, hair color 7014, eye color 7015, other physical attributes, income level, education level, a home address, a work address, marital status, a postal code 7022, and any other additional user information that may be useful for matching score purposes.

Figure 71:
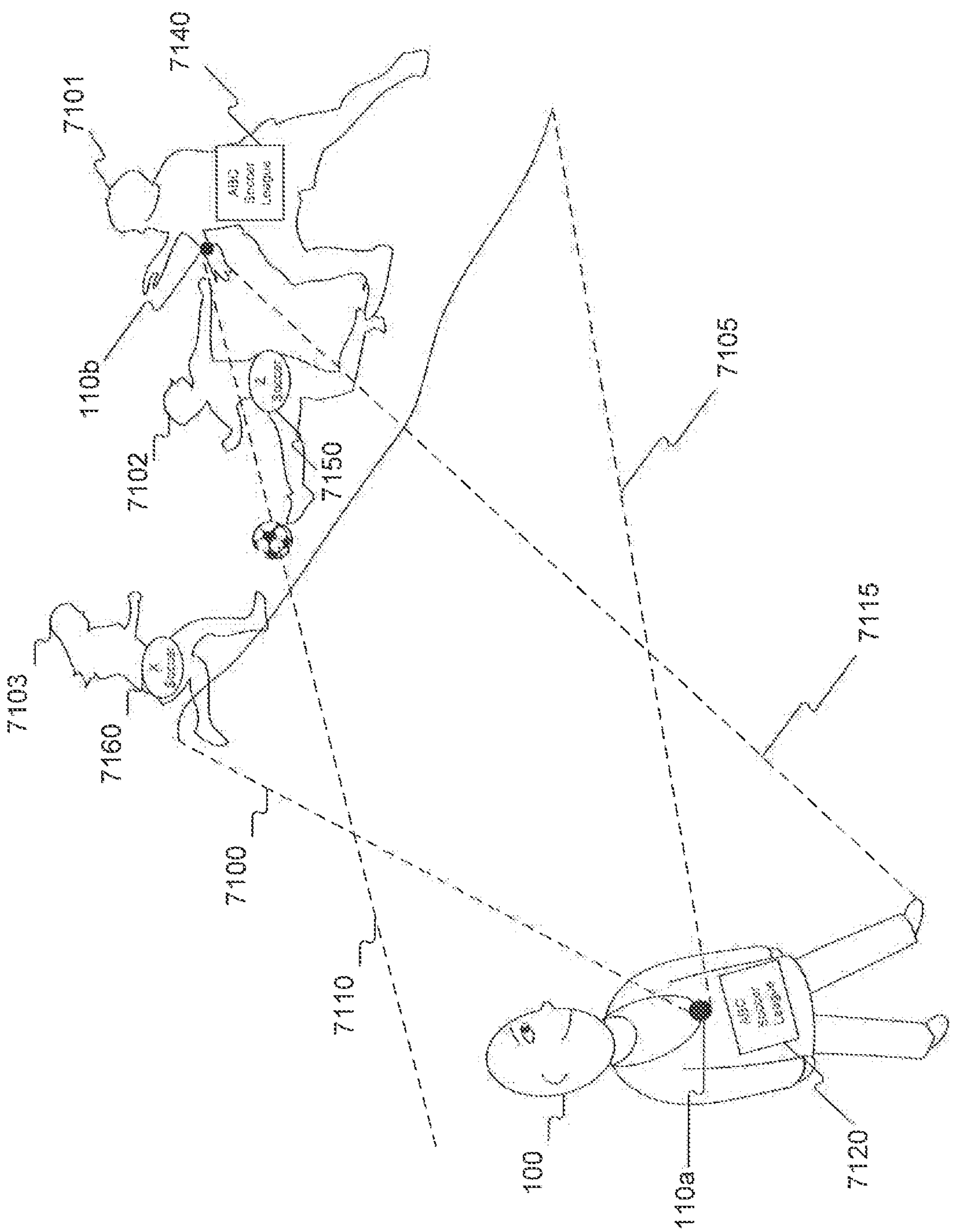
FIG. 71 shows an example environment including a plurality of wearable camera systems for capturing images.

FIG. 71 illustrates an exemplary environment including a plurality of wearable camera systems for capturing images, consistent with disclosed embodiments. As shown in FIG. 71, wearable apparatuses 110*a* and 110*b* may be carried on a necklace or a wrist worn by users 100 and 7101, respectively. It is understood that wearable apparatus 110*a* or 110*b* may be worn by user 100 or 7101 on any suitable part of user 100 or 7101. Wearable apparatus 110*a* and 110*b* may each include image sensors 220, 220*a*, and/or 220*b* (as shown in FIGS. 10 and 11). The field of view of the image sensor of wearable apparatus 110*a* is indicated by dashed lines 7100 and 7105. The field of view of the image sensor of wearable apparatus 110*b* is indicated by dashed lines 7110 and 7115.

The image sensors of the wearable apparatuses 110*a* and 110*b* may capture one or more images of the scene or environment in front of users 100 and 7101. In this example, user 100 may be walking or standing on an edge of a soccer field looking at a soccer game. One or more images captured by wearable apparatus 110*a* may include a first image including a soccer player 7101 wearing a shirt with text 7140 "ABC Soccer League," indicating that user 7101 plays for "ABC Soccer League." The images may include a second image including a soccer player 7102 kicking a soccer ball and wearing a shirt having text 7150 "Z Soccer," indicating that player 7102 plays for "Z Soccer." team. The images may include a third image including a soccer player 7103 wearing a shirt having text 7160 "X Soccer," indicating player 7103 plays for "X Soccer" team. One or more images captured by wearable apparatus 110*b* may include one or more images including user 100 wearing a shirt with text 7120 "ABC Soccer League" on it, and one or more images depicting the soccer game.

FIG. 72 illustrates an exemplary database table for storing information associated with captured images. Although illustrated as a table, database 7200 may take any suitable form for the storage of data, including, for example, relational and operational databases. Database 7200 may also be configured to store information derived from images or video streams captured by image sensor 220, 220*a*, and/or 220*b*, such as an image identifier 7210, a wearable apparatus identifier or wearable camera systems identifier 7211, identified content 7212, location 7213, date 7214, time 7215, and user 7205. An image identifier 7210 may be an identifier to uniquely identify an image or video data captured by image sensor 220, 220*a*, and/or 220*b*. A wearable apparatus identifier or wearable camera systems identifier 7211 may be an identifier to uniquely identify a specific wearable apparatus or wearable camera systems 110. Identified content 7212 may include information or a descriptor of content from a captured image, derived via image recognition techniques. Location 7213 of a captured image may include information indicating that user 100 who wears wearable apparatus 110 is on a street, outside of a particular store, and/or in a certain type of location, such as a park. In some embodiments, the location may also include geographical location information, such as a Global Positioning System (GPS) coordinates. Date information 7214 may include the date when an image was taken, and time information 7215 may include the time when an image was taken. Database 7200 may also store an association between information in the database and at least one user 100. Information associated with at least one of captured images may be used when determining a value of a matching score.

Data may be stored in association with information identifying a specific user, and/or may be stored in an aggregated database of many users. For example, storing data in an aggregate database may permit match score determining module 6855 to draw relationships and inferences between users. For example, match score determining module 6855 may identify all users associated with images captured at a certain time in a certain location, or all users associated with images of a certain product, etc.

Figure 73:
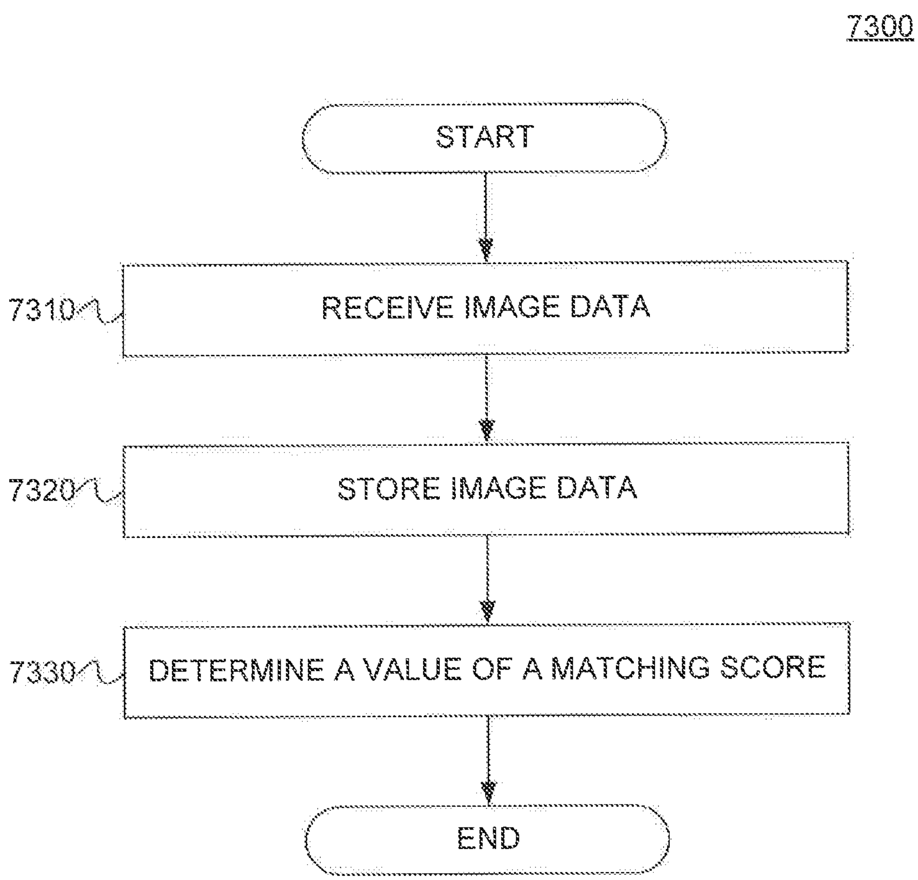
FIG. 73 is a flowchart of an exemplary process for determining a matching score related to users of wearable camera systems.

Although illustrated as separate database tables, information in database tables 7200 and 7000 may be combined in any way suitable. For example, a relational database may include all of the information discussed above with respect to database tables 7200 and 7000 and the relationships between the various data. Match score determining module 6855 may use data in database tables 7200 and 7000, and relationships between the data to determine a matching score between two users. FIG. 73 is a flowchart of an exemplary process 7300 for determining, by server 250, a matching score related to users of wearable camera systems. In some embodiments, one or more steps of process 7300 may be performed by a processing device including a wearable apparatus and/or other device (e.g., computing device 120). The flowchart of FIG. 73 is discussed below with respect to the example scene illustrated in FIG. 71.

When wearable camera systems 110 (including 110*a*, 110*b*) capture images from an environment of a corresponding user, and send image data to server 250, server 20M may be configured to receive the image data via network interface 6740 at step 7310. At least one processing device 6710 associated with the server 250 may be programmed to receive image data from a plurality of wearable camera systems 110 (e.g., 110*a*, 110*b*) at step 7310. At step 7320, processing device 6710 may also store, in image database 6851 of memory 6730, image data received from wearable camera systems 110.

At step 7330, processor 6710 associated with server 250 may further determine a value of a matching score related to at least two users of wearable camera systems 110. The value of the matching score may be based on the image data captured by the plurality of the wearable camera systems (e.g., 110*a*, 110*b*). The value of the matching score may indicate a level of exposure of at least two users to similar visual details in their environments. Matching score information may be used in a variety of purposes. For example, a value of a matching score between two or more users may be determined. That is, two users may have a matching score determined between them. In some embodiments, server 250 may compute matching scores between all users of the system. In alternative embodiments, server 250 may compute matching scores between users that meet certain designated criteria. User profile information such as age, gender, location, may be used as criteria to select users prior to computing a matching score. For example, users 100 and 7101 may be identified as persons who both enjoy soccer, based on the scene shown in FIG. 71, and this identification may contribute to a higher matching score.

In some embodiments, a matching score may be determined based on a plurality of image matching scenarios. Thus, for example, if users 100 and 7101 are different in other aspects, e.g., age, or other activities, than the high matching score for soccer may not generate a high total matching score. On the other hand, if users 100 and 7101 enjoy the same food, frequent the same stores, and enjoy soccer, as indicated by comparisons between image data, a higher matching score may be generated.

In some embodiments, there may be a temporal or locational aspect to a matching score. For example, user 100 and user 7101 may have a high matching score based on viewing a soccer game in the same location at the same time, creating a high score that may diminish over time as the user 100 and user 7101 move away from the soccer game either temporally or locationally.

The matching score may be used to suggest a possible match between at least two users. For example, two users having a high matching score may be notified of such and the system may suggest a possible match between the at least two users. If the users agree, user information, including, for example, contact information, of the matching users may be shared between the users. In the situation in FIG. 71, for example, wearable apparatuses 110*a* and 110*b* may notify their respective users, 100 and 7101, of the presence of another user with a high matching score, and suggest a possible match. In some embodiments, notifications may be sent to a device (e.g., computing device 120 or server 250) in communication with a wearable apparatus.

The matching score may be used to identify a common preference of at least two users. This may permit a user, for example, to identify users with a common preference and/or a high matching score. For example, processing device 6710 may general a notification, email, or other message suggesting a possible match between users, which may lead to the sharing of contact information as described above.

Figure 74:
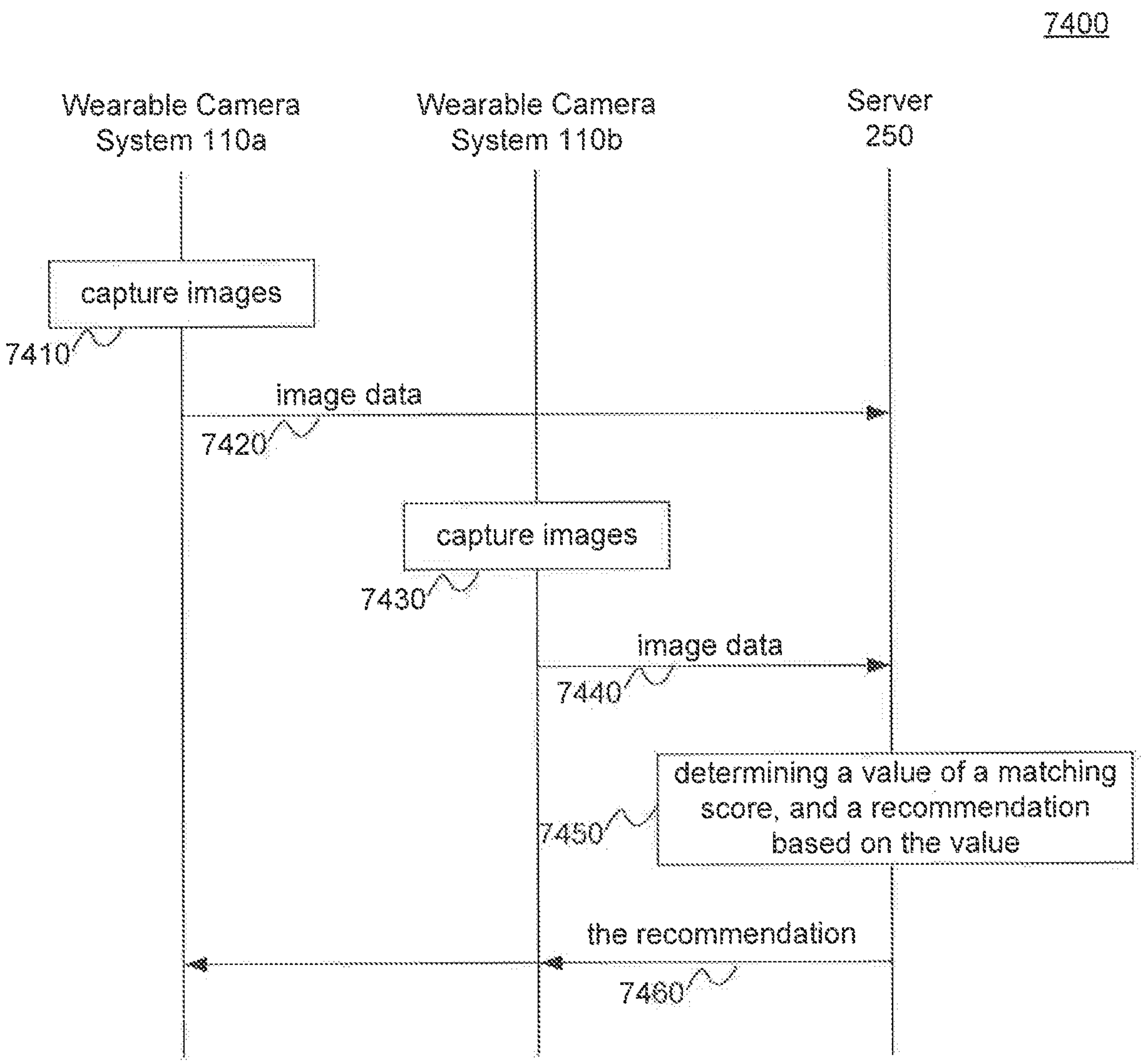
FIG. 74 is a diagram illustrating data communications for determining a matching score related to users of wearable camera systems.

FIG. 74 is schematic diagram 7400 illustrating data communications for determining a matching score related to users of wearable camera systems. Steps shown in diagram 7400 may be performed by various devices included in wearable apparatuses 110*a* and 110*b*, computing device 120, and/or server 250. Further, the steps may be performed in combination with or in place of steps included in method 7300.

As shown, at steps 7410 and 7430, wearable camera systems 110*a* and 110*b* may capture images and producing image data from the captured images. For example, a plurality of wearable camera systems 110 (e.g., 110*a* and 110*b*) may be configured to capture images via image sensors 220, 220*a*, and/or 220*b*. Image data may include images or video streams captured by the wearable camera systems. Image data may include information derived from images or video streams captured by the plurality of the wearable camera systems 110, for example, location information where the captured images were captured, time when the captured images were captured, and identified content in the captured images. The wearable camera systems may capture the images at different times and/or different locations, at similar times and/or locations, or at substantially the same times and/or locations.

Wearable camera system 110*a* and 110*b* may send captured image data to server 250 (and/or computing device 120) at steps 7420 and 7440. Server 250 (and/or computing device 120) may be configured to receive the image data. The image data may include images captured by image sensor 220, 220*a*, and/or 220*b* and/or information related to the images such as a location where the images were captured, a date when the images were captured, a time when the images were captured, and identified content in the captured images. Server 250 (and/or computing device 120) may be configured to receive image data from a plurality of wearable camera systems 110 (e.g., 110*a* and 110*b*). After receiving the image data, server 250 (and/or computing device 120) may be configured to store the image data.

At step 7450, server 250 (and/or computing device 250) may determine a value of a matching score related to at least two users of the wearable camera systems 10 (e.g., 110*a* and 110*b*), and determining, based on the value of the matching score, a recommendation for at least one user. For example, server 250 and/or computing device 120 may determine a value of a matching score related to at least two users of the wearable camera systems. When determining a value of a matching score between the at least two users, server 250 and/or computing device 120 may use information stored in, for example, memory 550, 550*a*, 550*b*, and/or 6730.

Information used to determine a value of a matching score may be related to the image data such as location information where the captured images were captured, time information when the captured images were captured, and identified content in the captured images. Information may be related to the at least two users such as gender, age, weight, height, hair color, eye color, physical attributes, income level, education level, a home address, a work address, marital status, and/or a postal code. Based on the value of the matching score, server 250 and/or computing device 120 may further determine a recommendation for at least one of the users at step 7450. For example, server 250 and/or computing device 120 may recommend transmitting a message, at step 7460, to notify one or more of the users that they share something in common (e.g., ABC Soccer League). As another example, server 250 and/or computing device 120 may recommend a product (e.g. a soccer ball) based on the captured images and the presence of one or more users at a soccer game.

Server 250 (and/or computing device 120) may provide the determined recommendation to at least one of the users at step 7460. For example, server 250 and/or computing device 120 may provide the recommendation by transmitting a message (e.g., indicating that another person has ABC Soccer League in common) to at least one of the users at step 7460. In some embodiments, server 250 and/or computing device 120 may recommend a product (e.g. a soccer ball) and may transmit a recommendation and/or coupon for the product to at least of the users. Recommendations may include recommendations to meet, recommendations to watch a certain television program or motion picture, recommendations to go to a certain store or restaurant, recommendations to visit a certain park, and any other suitable recommendation that may be determined based on a matching score. Server 250 may transmit messages, recommendations, and/or coupons to a device associated with a user, such as a wearable device and/or computing device 120 and/or to an account of a user (e.g., an email account, social networking account, etc.).

Wearable apparatus 110 may be configured to capture images including product descriptors from an environment of user 100 through a wearable image sensor, such as image sensor 220, 220*a*, and/or 220*b*. A product descriptor may include at least one of an advertisement, a logo, a product sign, a trademark of a product, an image of a product, a brand name, an image of a store, etc. At least one processing device, such as processor 210 or processor 540 may be programmed to perform various analyses on the captured images to determine information related to the product descriptors. For example, the at least one processing device may extract a name of a product from a product descriptor included in the captured image. The at least one processing device may be further programmed to determine or extract information related to a location of the product descriptor, such as at a subway station, on a street, outside of a restaurant, etc. In some embodiments, the location may include Global Positioning System (GPS) location data. In some embodiments, one or more processors included in server 250 may also be programmed to perform one or more methods or processes disclosed herein.

The at least one processing device may further determine or extract a context associated with the occurrence of the product descriptor from the captured images. The product descriptor may be associated with a product or service (collectively referred to as a "product"). The context may include any information about the environment or other objects included in the captured images in which the product descriptor occurs. For example, the context may include location and time information related to the occurrence of the product descriptor. The context may include information about a surrounding environment in which the product descriptor occurs, such as a street, a restaurant, a store, a building, sports field, etc. For example, a captured image may show a pizza may appear on a table in a restaurant. As another example, an energy drink may appear on a soccer field in a captured image.

The context may include one or more persons who appear in the same image as the product descriptor or in a different image captured in the same environment in which the product descriptor occurs. The persons may or may not be the consumer or buyer of a product related to the product descriptor. Information about the persons may include age, gender, size (e.g., weight and height), etc. The context may also include information regarding other objects appearing in the captured images. Other objects may include other products and/or product descriptors appearing in the captured images. For example, a bottle of water appearing in an image may be accompanied by a slice of pizza.

The at least one processing device (e.g., processor 210 or processor 540) may perform various actions based on the context associated with the occurrence of the product descriptor. For example, the at least one processing device may recommend a product to user 100 of wearable apparatus 110, inform user 100 of an ongoing or upcoming sales or promotion event for a product associated with the product descriptor. The processing device may compare the price of the product associated with the product descriptor with the price of similar products, or compare prices of the same product associated with the product descriptor offered for sale at different stores. The context information associated with the occurrence of the product descriptor may be used in various aspects of marketing research and business planning. For example, the context information may be used to determine a targeted population for an advertisement, a time and/or place for holding sales or promotions events, arrangement of store display of certain products together with other related products, and a bundle or package of two different products offered for sale together to promote sales of each product.

Figure 75:
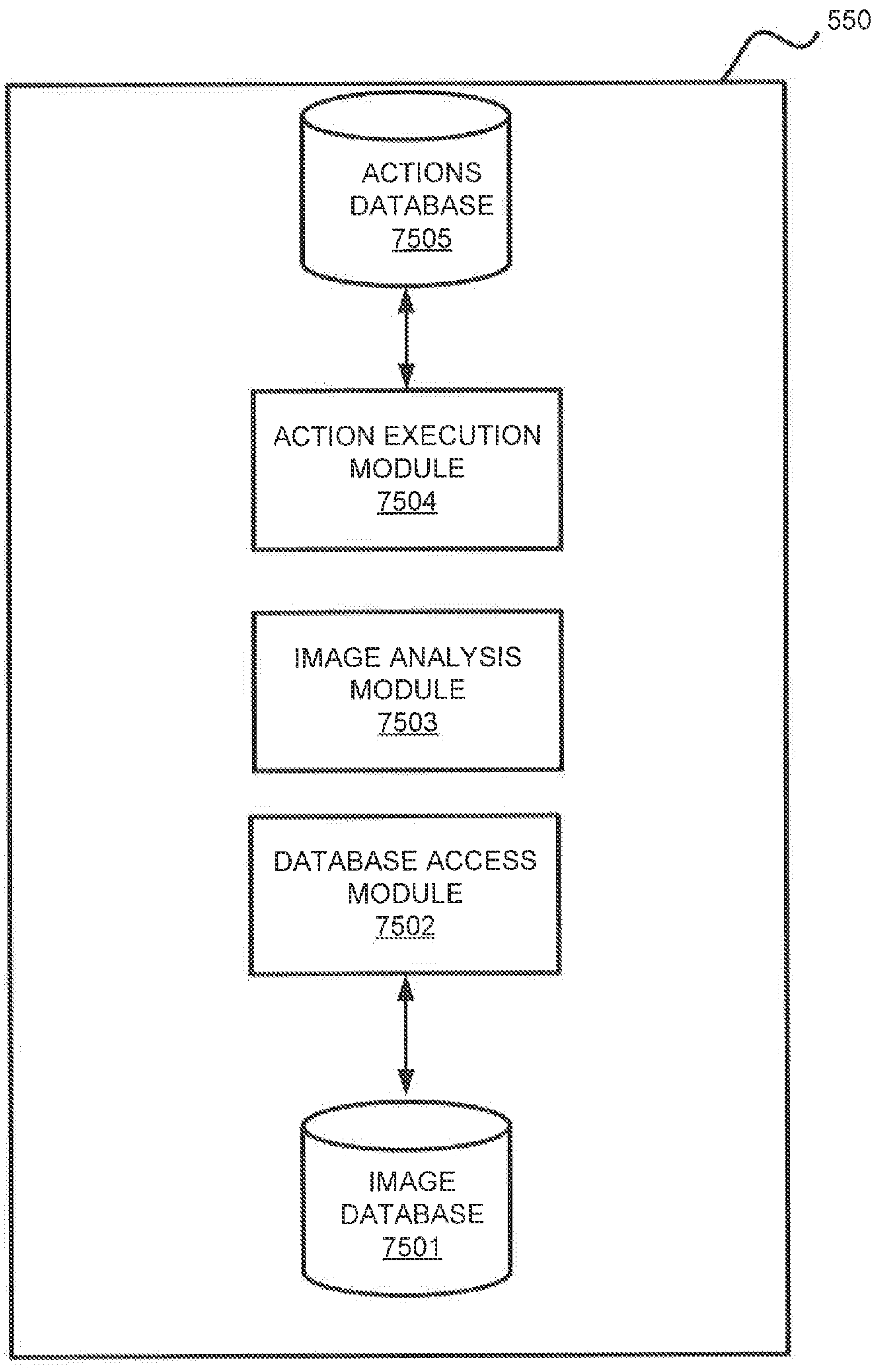
FIG. 75 is a diagram illustrating an example memory storing a plurality of modules.

FIG. 75 is a block diagram illustrating a memory (e.g., memory 550, 550*a*, and/or 550*b*) according to the disclosed embodiments. The memory may include one or more modules, or sets of instructions, for performing methods consistent with the disclosed embodiments. For example, the memory may include instructions for a processor to analyze product descriptors in captured image data. In the example shown in FIG. 75, memory 550 comprises an action execution module 7504, an image analysis module 7503, a database access module 7502, an image database 7501, and an actions database 7505 for performing the functionality of the disclosed methods. The modules and databases shown in FIG. 75 are by example only, and a processor in the disclosed embodiments may operate according to any suitable process.

In the embodiment shown in FIG. 75, memory 550 is configured to store an image database 7501. Image database 7501 may be configured to store various images, such as images captured by image sensor 220, 220*a*, and/or 220*b*. Image database 7501 may also be configured to store images that are not captured by image sensor 220, 220*a*, and/or 220*b*. For example, previously acquired graphics of products, logos, store images, etc., may be stored in image database 7501. Image database 7501 may also be configured to store data other than image data, such as textual data, audio data, video data, etc.

As shown in FIG. 75, memory 550 is also configured to store a database access module 7502. Database access module 7502 may be configured to access image database 7501, for example, to retrieve an image captured by image sensor 220, 220*a*, and/or 220*b* for analysis. In some embodiments, database access module 7502 may be configured to retrieve a pre-stored graphic of a product for comparison with an image captured in real time by image sensor 220, 220*a*, and/or 220*b*. Database access module 7502 may also be configured to store images into image database 7501.

In the embodiment shown in FIG. 75, memory 550 is configured to store an image analysis module 7503. Image analysis module 7503 may be configured to perform various analyses of images captured by image sensor 220, 220*a*, and/or 220*b* to identify an occurrence of a product descriptor. For example, image analysis module 7503 may determine information related to the occurrence of the product descriptor. The information related to the occurrence of the product descriptor may include the location, time, environment, other related objects including people and products, shown in the same or related images as the product descriptor. Image analysis module 7503 may also determine an identifier of the product descriptor. The identifier may include at least one of a number, an alphabet, a symbol, etc. The identifier may uniquely identify the product descriptor. In some embodiments, each product descriptor may be assigned or associated with a unique identifier. Image analysis module 7503 may cause the identifier and the information related to the occurrence of the product descriptor to be saved in memory 550, such as in image database 7501.

Referring to the embodiment shown in FIG. 75, memory 550 is configured to store an action execution module 7504. Action execution module 7504 may execute an action based on analysis results from image analysis module 7503. For example, image analysis module 7503 may identify a graphic of a product from captured images, compare the identified graphic with graphics stored in image database 7501, and determine whether there is a match between the identified graphic and the stored graphics. When a match is found, action execution module 7504 may trigger execution of an action, such as providing a visual and/or audio alert regarding a sales or promotion event of a product associated with the identified graphic. The action may also be storing the identified graphic in image database 7501, requesting for additional information from server 250, etc. A plurality of predefined actions or feedbacks may be stored in actions database 7505. Action execution module 7504 may select one or more predefined actions or feedbacks from the actions database 7505. The term "action" includes any action executable by wearable apparatus 110, computing device 120, and/or server 250. The term "feedback" includes execution of a computer program by wearable apparatus 110 and/or computing device 120 to provide information to user 100. In some embodiments, actions may be different from feedback. In some embodiments, actions may also include feedback, or feedback may include actions. In some embodiments, the terms "action" and "feedback" may be interchangeable.

Figure 76:
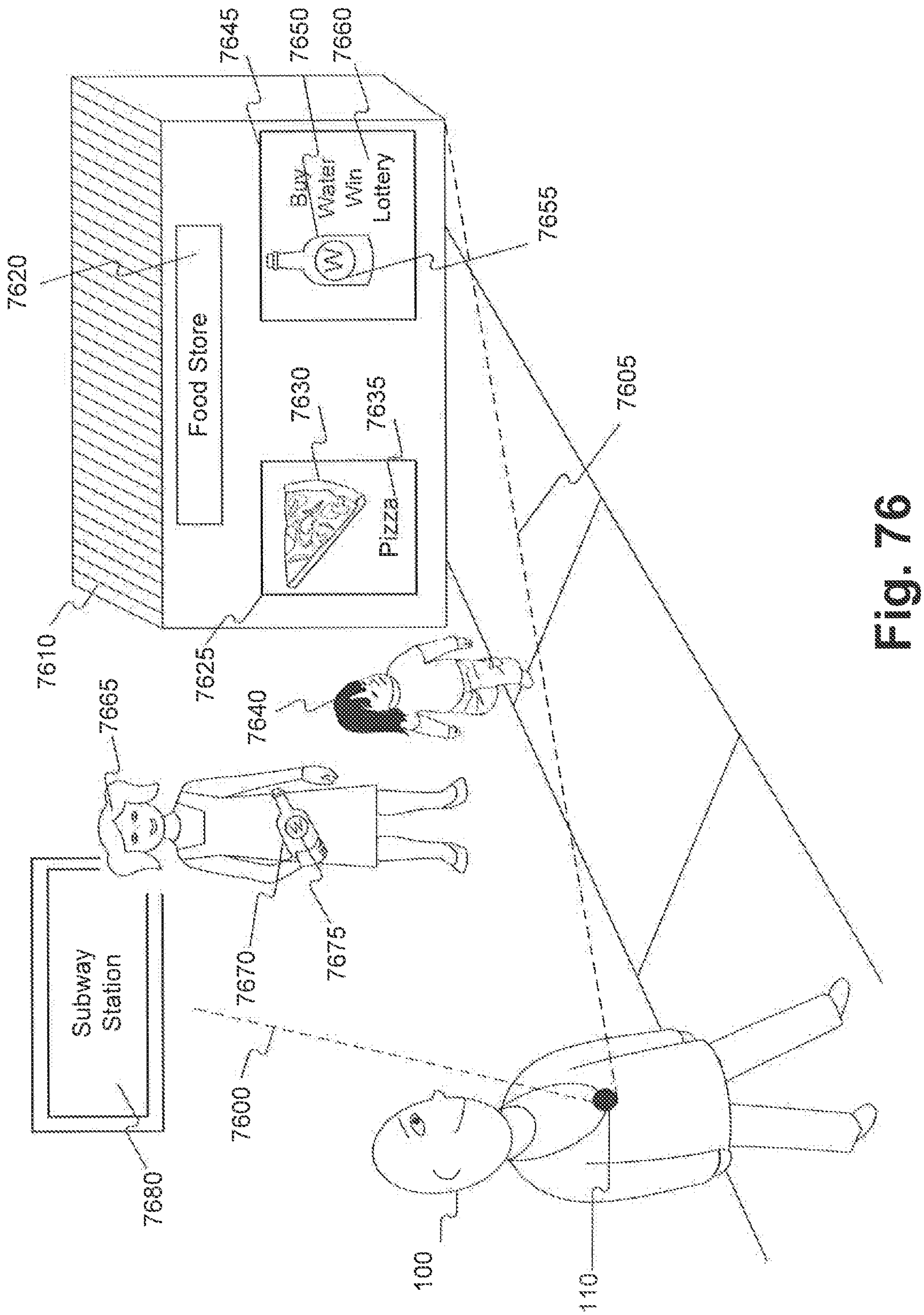
FIG. 76 shows an example environment including a wearable apparatus for capturing and processing images including a product descriptor.

FIG. 76 shows an example environment including wearable apparatus 110 for capturing and processing images including a product descriptor, consistent with the disclosed embodiments. As shown, wearable apparatus 110 may be carried on a necklace worn by user 100. It is understood that wearable apparatus 110 may be worn by user 100 on any suitable part of user 100. For example, wearable apparatus 110 may be attached to a belt or shirt of user 100 using clip 420 shown in FIG. 4B. As another example, wearable apparatus 110 may be attached to an arm band secured to an arm of user 100. As a further example, wearable apparatus 110 may be attached to a helmet, cap, or hat worn by user 100. Wearable apparatus 110 may include image sensor 220, 220*a*, and/or 220*b* (as shown in FIGS. 10 and 11), which has a field of view indicated by dashed lines 7600 and 7605. Image sensor 220, 220*a*, and/or 220*b* may capture one or more images of the scene or environment in front of user 100. In this example, user 100 may be walking or standing on a street facing a building 7610. One or more images captured by image sensor 220, 220*a*, and/or 220*b* may include building 7610. Building 7610 may be a food store, and may include a sign 7620 with a name of the store, e.g., "Food Store," on the front side of the building 7610 (hence building 7610 may also be referred to as the food store building 7610).

The images captured by image sensor 220, 220*a*, and/or 220*b* may include an advertisement 7625 posted at the front side of building 7610, such as a front wall or window of building 7610. Advertisement 7625 may show an image or graphic 7630 of a pizza, and may show text 7635 ("Pizza") below the graphic 7630 of the pizza (hence advertisement 7625 may be referred to as the pizza advertisement 7625). Building 7610 may include another advertisement 7645 displayed at the front side, such as the front wall or window of building 7610. Advertisement 7645 may include a graphic 7650 of bottled water (hence advertisement 7645 may be referred to as the water advertisement 7645). The bottled water may include a logo 7655, which includes the text "W" within a circle. Logo 7655 may represent a brand for bottled water and logo 7655 may also be a trademark. Advertisement 7645 may also include texts 7660, which states "Buy Water, Win Lottery."

Referring to FIG. 76, one or more images captured by image sensor 220, 220*a*, and/or 220*b* may also include a first person 7640 and a second person 7665. The first person 7640 may be a child, who may be looking at pizza advertisement 7625. The second person 7665 may be a young woman who has just stepped out of a subway station, as indicated by a subway station sign 7680. The young woman may hold bottled water 7670 in her hand. As shown in FIG. 76, bottled water 7670 may include a logo "W" 7675 similar to logo 7655 shown in water advertisement 7645.

In some embodiments, an image captured by image sensor 220, 220*a*, and/or 220*b* may include all objects within the field of view (as indicated by dashed lines 7600 and 7605) of the camera included in image sensor 220, 220*a*, and/or 220*b*. In some embodiments, image sensor 220, 220*a*, and/or 220*b* may capture more than one image of the environment in front of user 100 in different field of views. For example, image sensor 220, 220*a*, and/or 220*b* may capture a first image including the front side of building 7610 in a first field of view. Image sensor 220, 220*a*, and/or 220*b* may capture a second image focusing on water advertisement 7645 in a second field of view. Image sensor 220, 220*a*, and/or 220*b* may capture a third image focusing on pizza advertisement 7625 in a third field of view. To capture different images in different field of views, user 100 may move his/her body such that wearable apparatus 110 (and hence the camera or cameras included therein) is oriented in different directions.

At least one processing device (e.g., processor 210 and/or processor 540) may be configured or programmed to process one or more captured images. The processing device may analyze the captured images to identify one or more images including an occurrence of a product descriptor. The product descriptor may be a logo (e.g., logo 7655) or an advertisement (e.g., advertisements 7625 and 7645). The processing device may determine information related to the occurrence of the product descriptor based on analysis of the captured images. The information may include a location of the product descriptor. In the example shown in FIG. 76, the location of the product descriptor (e.g., the logo 7655) may include information indicating that user 100 who wears wearable apparatus 110 is on a street, outside of a food store, etc. In some embodiments, the location may also include geographical location information, such as a Global Positioning System (GPS) coordinates.

The information related to the occurrence of the product descriptor (e.g., logo 7655) may include a context associated with the occurrence of the product descriptor. The processing device may obtain the context associated with the occurrence of the product descriptor from analysis of the captured images. For example, the context related to logo 7655 may include information related to the environment in which logo 7655 is displayed. For example, the environment may include a restaurant, a food store (e.g., food store 7610), a subway station (e.g., a subway station sign 7680), a sports field, etc. The context related to logo 7655 may also include information relating to other objects, including persons and/or products that are also included in the captured images. For example, the context may include information indicating that logo 7655 appears on a water bottle 7650, which is displayed at food store 7610 along with pizza advertisement 7625. The processing device may correlate the display of water advertisement 7645 with the display of pizza advertisement 7625. The correlation between displaying water advertisement 7645 that includes logo 7655 and displaying pizza advertisement 7625 may reflect a purchasing habit or food preference, such as, people tend to buy water when they buy pizza. The purchasing habit or food preference may also be associated with a particular location (e.g., food store 7620).

The processing device (e.g., processor 210 and/or processor 540) may be programmed or configured to determine a date and/or time of the occurrence of the product descriptor. For example, images captured by image sensor 220, 220*a*, and/or 220*b* may be stored in image database 7501 together with the date and/or time when the images were captured. In some embodiments, the processing device may determine the time of a day from the image. For example, when the image includes a graphic of a clock, the processing device may determine the time of a day from the clock included in the image. The processing device may determine the time of a day based on the sun and/or the moon that appear in the captured image. In some embodiments, the processing device may determine the time of a day based on a shadow of a building, a tree, a person appearing in the image, when the sun is not included in the image.

The context may include information regarding a person appearing in the same image as a product descriptor. For example, wearable apparatus 110 may capture an image including a product descriptor represented by pizza advertisement 7625 and person 7640. The processing device may analyze the captured image to determine that person 7640 is a child who is looking at pizza advertisement 7625. The processing device may determine the age and/or gender of person 7640 based on the size, appearance, hair style, cloths, posture, and facial characteristics of person 7640. The processing device may analyze other characteristics of person 7640 to recognize that person 7640 is a child of a certain age or within a range of age. The processing device may determine that person 7640 is looking at or has in his or her possession pizza or a particular kind of pizza (e.g., pepperoni pizza) displayed in pizza advertisement 7625. The at least one processing device may further determine, based on the captured image and statistical analyses of other previously captured and analyzed images, that children of similar ages as person 7640 may tend to like pizza or this particular type of pizza.

As another example, wearable apparatus 110 may capture an image including person 7665 who is holding a bottled water 7670 that has a product descriptor represented by logo 7675 (text "W" within a circle). Logo 7675 may be the same as logo 7655. The at least one processing device may determine the age and/or gender of person 7665 based on the size, appearance, hair style, cloths, shoes, posture, and facial characteristics of person 7665. The processing device may analyze other characteristics of person 7665 to recognize that person 7665 is a young woman of a certain age or within an age range. The at least one processing device may determine, based on the captured image and statistical analyses of other previously captured and analyzed images, that young women of similar ages as person 7665 may like drinking bottled water or the particular type or brand of bottled water (e.g., the "W" brand shown in FIG. 76). In some embodiments, the processing device may further determine another characteristic of person 7665. For example, based on the dresses, hair style, and/or facial characteristics of person 7665, the processing device may determine that person 7665 is a student. The processing device may determine, based on the captured image and statistical analyses of other previously captured and analyzed images that, for example, female students of similar ages as person 7665 may like bottled water or the particular brand of bottled water.

In some embodiments, the information determined based on the analysis of one or more identified images may include one or more of: a continuous duration in which occurrences of the product descriptor are identified in the plurality of images, a total time in which occurrences of the product descriptor are identified in the plurality of images, a total number of images in which occurrences of the product descriptor are identified, and a frequency of images in which occurrences of the product descriptor are identified.

For example, the processing device may analyze a plurality of images to identify occurrences of a product descriptor (e.g., logo 7675), and determine a continuous duration of time in which the occurrences are identified. The occurrences may be identified, e.g., in a continuous duration of two minutes. This information may be used to determine whether the product descriptor is static or is moving. As another example, the processing device may analyze the plurality of images to determine the total time in which the product descriptor appeared in one or more images. The total time may or may not be a continuous time duration. The total time may be a factor evaluated by the processing device to determine whether additional information regarding the product descriptor or the associated product should be requested from, e.g., server 250.

In some embodiments, the processing device may determine, from analysis of the plurality of images, a total number of images in which occurrences of the product descriptor ware identified. For example, when the product descriptor repeatedly occurs in the captured images, the processing device may analyze the product descriptor in more detail, or request a server (e.g., server 250) to provide additional information regarding the product descriptor or the associated product. In some embodiments, the processing device may determine, based on analysis of the plurality of images, a frequency of images in which occurrences of the product descriptor are identified. The frequency of images may be used to determine, for example, how often user 100 encounters a particular product descriptor.

In some embodiments, image sensor 220, 220*a*, and/or 220*b* may capture an image of a certain area based on a hand gesture of user 100. For example, user 100 may point a hand to water advertisement 7645. Image sensor 220, 220*a*, and/or 220*b* may capture an image including the hand of user 100 pointing to water advertisement 7645. The at least one processing device may analyze the captured image and detect the hand gesture from the captured image. Based on the hand gesture (which may be an example of a hand-related trigger discussed above), wearable apparatus 110 may provide additional information to user 100. For example, wearable apparatus 110 may provide a video, audio, and/or text message or alert to user 100 regarding a discount, coupon, sales promotion related to bottled water 7650, available in food store 7620 or another store. As another example, wearable apparatus 110 may provide additional information to user 100 regarding the "Buy Water, Win Lottery" sales event, such as the price of the "W" brand bottled water, the winning rate of the lottery, etc. Wearable apparatus 110 may obtain such additional information from server 250, with which wearable apparatus 110 may be wirelessly connected, as shown in FIG. 2. The additional information may be provided in a video, audio, and/or text message, for example, through feedback outputting unit 230 included in wearable apparatus 110, or through computing device 120, which may also be carried or used by user 100.

Figure 77:
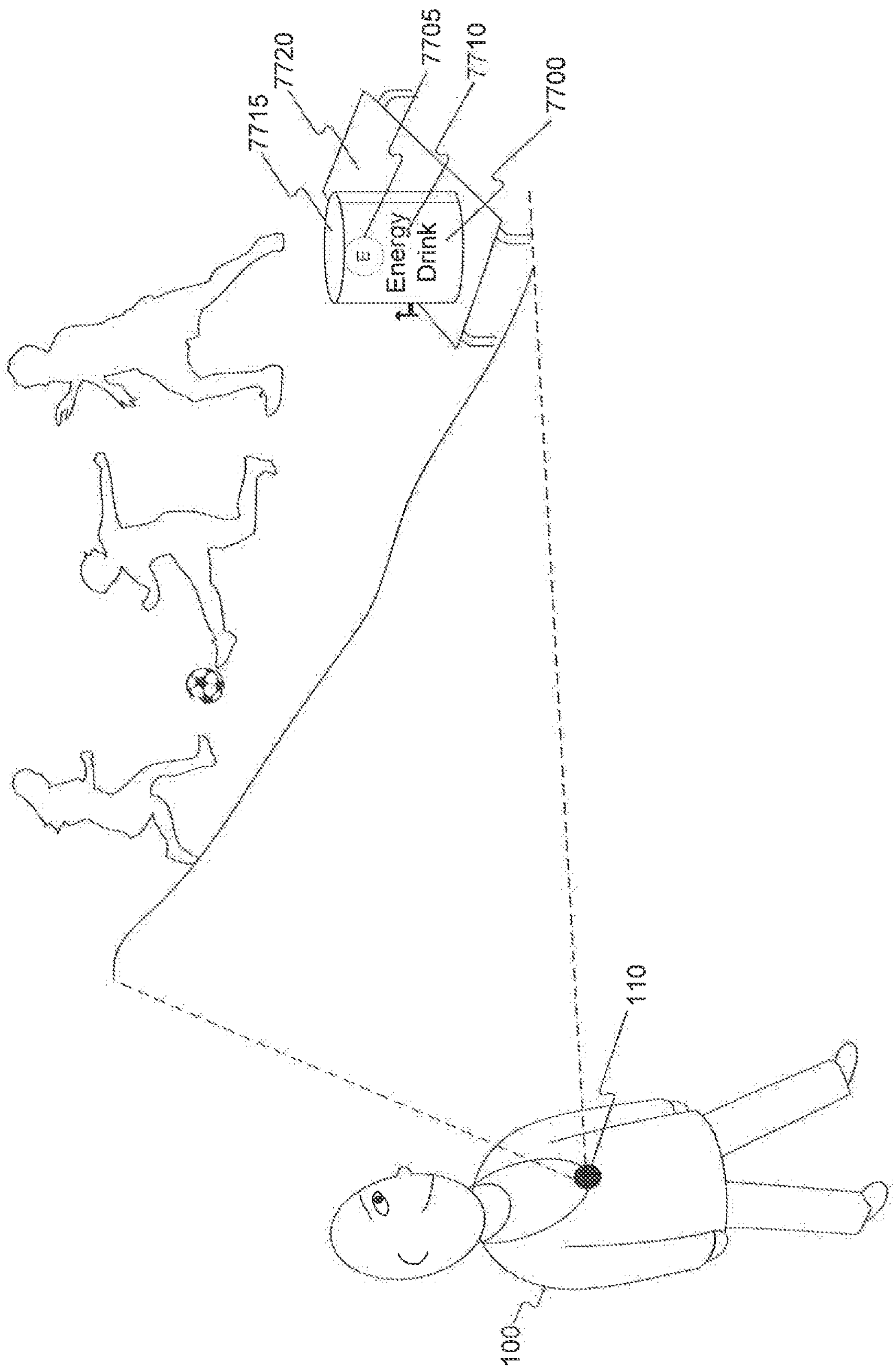
FIG. 77 shows another example environment including a wearable apparatus for capturing and processing images including a product descriptor.

FIG. 77 shows another example environment including wearable apparatus 110 for capturing and processing images including a product descriptor, consistent with the disclosed embodiments. Wearable apparatus 110 may capture, via image sensor 220, 220*a*, and/or 220*b*, one or more images including a product descriptor 7700. Product descriptor 7700 may include a logo 7705 and a text description 7710. Logo 7705 may include a circle surrounding a letter "E." Text description 7710 may include text such as "Energy Drink." Logo 7705 and text description 7710 may be shown on a surface of a barrel 7715. Barrel 7715 may be located on a table 7720. The one or more images may also include a scene showing a soccer field, where a plurality of soccer players are playing a soccer game. The table 7720 may be placed on the side of the soccer field. The processing device (e.g., processor 210 and/or processor 540) may analyze the one or more images and correlate the product descriptor 7700 with the scene showing the soccer game. The correlation may be used for marketing research to find that sports players, such as soccer players, like this brand of energy drink.

Wearable apparatus 110 may provide additional information about the energy drink to user 100. Wearable apparatus 110 may obtain such additional information from server 250, with which wearable apparatus 110 may be wirelessly connected, as shown in FIG. 2. For example, wearable apparatus 110 may inform user 100 of ongoing sales or promotion events associated with the brand "E" energy drink, through a video, audio, and/or text message. The video, audio, and/or text message may be presented to user 100 through feedback outputting unit 230 included in wearable apparatus 110 or through computing device 120, which may also be carried or used by user 100.

Figure 78:
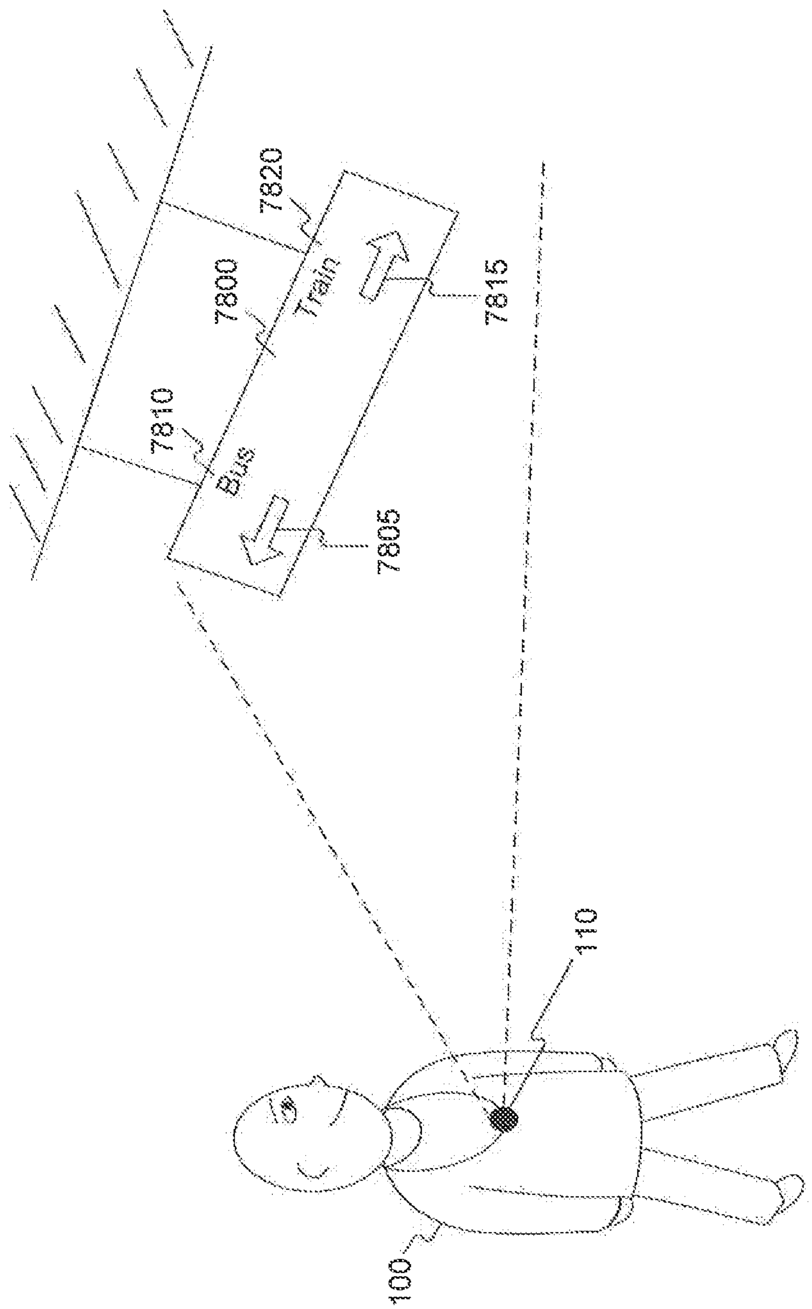
FIG. 78 shows another example environment including a wearable apparatus for capturing and processing images including a product descriptor.

FIG. 78 shows another example environment including wearable apparatus 110 for capturing and processing images including a product descriptor, consistent with the disclosed embodiments. Wearable apparatus 110 may capture, via image sensor 220, 220*a*, and/or 220*b*, an image of a product descriptor 7800 at an airport, for example. The at least one processing device (e.g., processor 210 and/or processor 540) may identify a graphic from the image. The at least one processing device may also identify from the graphic a first directional symbol 7805 and a second directional symbol 7815. The at least one processing device may further identify that the graphic includes a text description 7810 ("Bus") and a text description 7820 ("Train"). Text description 7810 may be associated with first directional symbol 7805 and text description 7820 may be associated with second directional symbol 7815. Wearable apparatus 110 may play a video, audio, and/or text message through feedback output unit 230 and/or computing device 120 to direct user 100 to a bus terminal in accordance with first directional symbol 7805, or to a train terminal in accordance with second directional symbol 7815.

Wearable apparatus 110 may provide additional information to user 100 regarding the directions to the bus terminal and/or the directions to the train terminal. In some embodiments, the additional information may include schedules of buses and/or trains. The schedule information may enable user 100 to plan his or her trip. Wearable apparatus 110 may obtain such additional information from server 250, with which wearable apparatus 110 may be wirelessly connected, as shown in FIG. 2.

Figure 79:
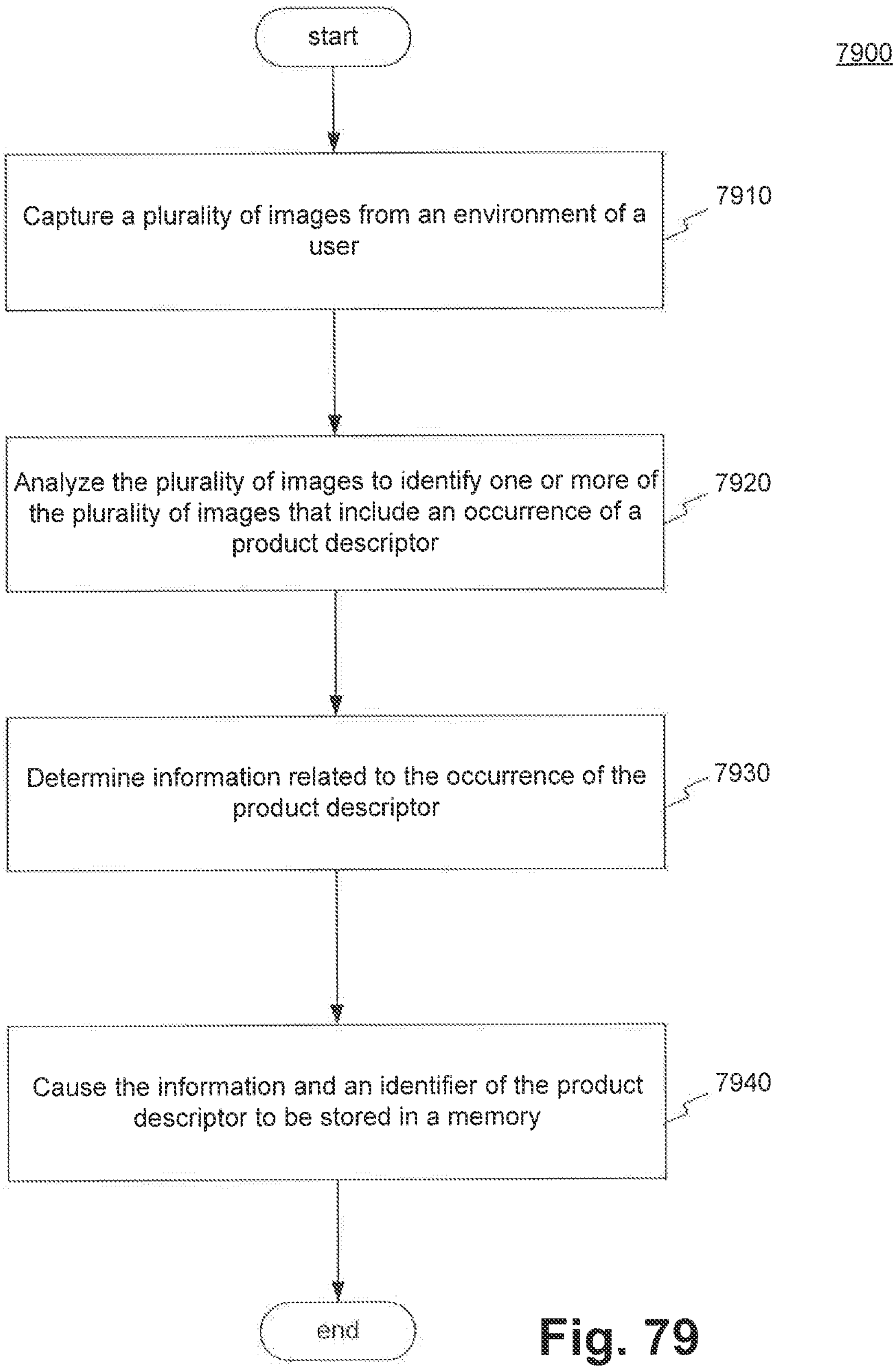
FIG. 79 is a flowchart showing an example method for processing images including a product descriptor.

FIG. 79 is a flowchart showing an example method 7900 for processing images including a product descriptor, consistent with the disclosed embodiments. Method 7900 may be executed by various devices included in wearable apparatus 110, such as image sensor 220, 220*a*, and/or 220*b* and at least one processing device (e.g., processor 210 and/or processor 540). Method 7900 may include capturing a plurality of images from an environment of user 100 of wearable apparatus 110 (step 7910). For example, image sensor 220, 220*a*, and/or 220*b* may capture a plurality of images from an environment of user 100 who wears the wearable apparatus 110. In the example shown in FIG. 76, image sensor 220, 220*a*, and/or 220*b* may capture one or more images of the street environment in front of user 100, which includes the food store building 7610 having advertisements 7625 and 7645 on the front side, people 7640 and 7665, and subway station sign 7680. In the example shown in FIG. 77, image sensor 220, 220*a*, and/or 220*b* may capture one or more images of the soccer field environment in front of user 100, which includes the soccer players, table 7720 on which barrel 7715 containing the "E" energy drink is located.

As shown in FIG. 79, method 7900 may also include analyzing the plurality of images to identify one or more of the plurality of images that include an occurrence of a product descriptor (step 7920). For example, referring to FIG. 76, the processing device (e.g., processor 210 and/or processor 540) may analyze a plurality of images of the street environment in front of user 100. The processing device may identify an image that includes an occurrence of a product descriptor. The product descriptor may include a logo (e.g., logo 7655), an advertisement (e.g., water advertisement 7645), an image of a product (e.g., an graphic 7630 of a slice of a pizza), and an image of a store (e.g., food store building 7610 having sign 7620 that reads "food store"). The product descriptor may include other signs, images, such as "Subway Station" sign 7680.

Referring to FIG. 79, method 7900 may include determining, based on the analysis of the one or more identified images, information related to the occurrence of the product descriptor (step 7930). The information determined or extracted by the processing device based on the analysis of the identified images may include one or more of a location of the product descriptor, a context associated with the occurrence of the product descriptor, and a time of day of the occurrence of the product descriptor. In some embodiments, the location of the product descriptor (e.g., pizza advertisement 7625) may include information indicating the place the product descriptor occurs, such as at a restaurant, at a food store, outside a subway station, in a street, etc. In some embodiments, the location may also include specific Global Positioning System (GPS) coordinates. The processing device may obtain or determine the location information based on signals or data received from a GPS unit included in wearable apparatus 110, or a GPS unit included in computing device 120, which user 100 may also carry. In some embodiments, the location may include a detailed street address, including zip code, city, state, and/or country. The processing device may obtain or determine the location information based on street signs that show the street number and the street name.

The context associated with the occurrence of the product descriptor may include various types of information associated with objects and/or products appearing in the images along with the product descriptor. For example, for the product descriptor of pizza advertisement 7625 shown in FIG. 76, the context may include that pizza advertisement 7625 is displayed together with water advertisement 7645, and/or person 7640 looked at graphic 7630 of pizza included in pizza advertisement 7625. For the product descriptor 7700 of "E" brand energy drink shown in FIG. 77, the context may be the "E" brand energy drink being consumed on a sports (e.g., soccer) field.

The processing device may determine the time of day of the occurrence of the product descriptor based on the brightness of sunshine, the direction of shadows of buildings, trees, and people under the sunshine, as identified in the captured images. For example, in the example shown in FIG. 77, the processing device may determine from the image of the soccer field that it is around 12:00 p.m. because the length of the shadow of a player is short. As another example, the processing device may determine the time to be morning or afternoon based on the brightness of the sunshine.

Referring to FIG. 79, method 7900 may include causing the information and an identifier of the product descriptor to be stored in a memory, such as memory 550, 550*a*, 550*b* (step 8240). For example, the processing device (e.g., processor 210 and/or processor 540) may cause the information and the identifier related to the occurrence of the product descriptor to be stored in image database 7501. In some embodiments, the processing device may cause the information and the identifier related to the occurrence of the product descriptor to be stored in server 250, which may include at least one storage device, such as a hard disk, a memory, and/or a tape configured to store data and information.

FIG. 80 shows an example database table 8000 for storing the information and the identifier related to the occurrence of the product descriptor, consistent with the disclosed embodiments. Database table 8000 may be stored in memory 550 (e.g., image database 7501), memory 550*a*, memory 550*b*, and storage devices included in server 250. Database table 8000 may include a plurality of rows and columns. The header row showing "Identifier," "Product Descriptor," "Location," "Context," and "Date & Time," may or may not be part of the actual database table 8000. FIG. 80 shows 50 example rows for storing information and data under the categories of"Identifier," "Product Descriptor," "Location," "Context," and "Date & Time." Three example rows are referenced as 8001, 8002, and 8050. Each row from 8001 to 8050 may store information and an identifier related to an occurrence of a product descriptor. For each row of data corresponding to each product descriptor, each column of database table 1110 may store different information or data. FIG. 80 shows five columns 8061-8065. Column 8061 may store an "Identifier" for a product descriptor. Column 8062 may store a description of the product descriptor. Column 8063 may store "Location" information related to the occurrence of the product descriptor. Column 8064 may store "Context" information related to the occurrence of the product descriptor. Column 8065 may store "Date & Time" information related to the occurrence of the product descriptor.

As shown in column 8061, each product descriptor may be associated with a unique identifier stored in database table 8000. The identifier may include a number uniquely assigned to the product descriptor in database table 8000. In some embodiments, the identifier may also include an alphabet (e.g., "ABC," "BCD," etc.). In some embodiments, the identifier may include a symbol (e.g., "#," "$," etc.). In some embodiment, the identifier may include any combination of a number, an alphabet, and a symbol. The processing device (e.g., processor 210 and/or processor 540) may read or retrieve data related to the occurrence of a product descriptor from database table 8000 by pointing or referring to an identifier.

Three example database rows are shown in FIG. 80 for three product descriptors. The first product descriptor is the pizza advertisement 7625 shown in FIG. 76, which may be associated with an identifier "1001." The location related to the occurrence of the pizza advertisement 7625 may be "15 K Street, Washington, D.C." The context associated with the occurrence of the pizza advertisement 7625 may be "child looking at pizza advertisement posted in the window of food store." The date and time associated with the occurrence of the pizza advertisement 7625 may be "6/7/2015, 3:00 p.m."

Referring to the example database table 8000 shown in FIG. 80, the second product descriptor is the logo 7675 of "W" bottled water shown in FIG. 76, which may be associated with an identifier of "1002." The location associated with the occurrence of the logo 7675 of "W" bottled water may be "15 K Street, Washington, D.C." The context associated with the occurrence of the logo 7675 of "W" bottled water may be "Young woman holding bottled water (brand "W") outside subway station." The date and time associated with the occurrence of the logo 7675 may be "6/7/2015, 3:00 p.m."

Referring to the example database table 8000 shown in FIG. 80, the third product descriptor shown in database table 8000 is the "E Energy Drink" (e.g., logo 7705 and text description 7710), as shown in FIG. 77. The third product descriptor may be associated with an identifier "1050," which indicates that the E Energy Drink product descriptor may be the fifth entry in database table 8000. The location associated with the occurrence of the E Energy Drink product descriptor may be a GPS location of "GPS 38.9047° N, 77.01640 W." The context associated with the occurrence of the E Energy Drink may be "E Energy Drink placed on table in soccer field," as shown in FIG. 77. The date and time associated with the occurrence of the E Energy Drink product descriptor may be "6/15/2015, 1:00 p.m."

Figure 81:
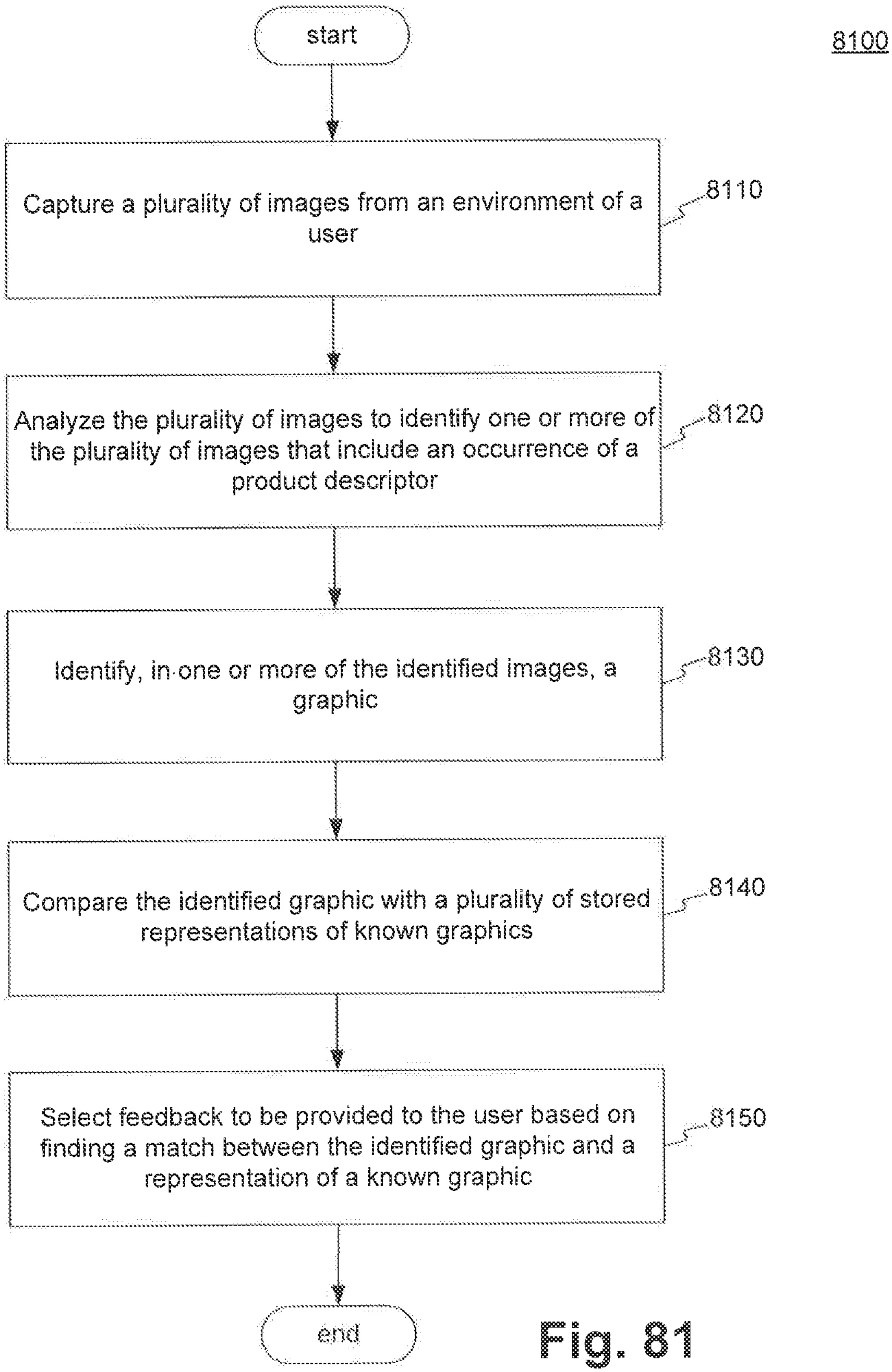
FIG. 81 is a flowchart illustrating an example method for processing images including a product descriptor.

FIG. 81 is a flowchart illustrating an example method 8100 for processing images including a product descriptor, consistent with the disclosed embodiments. Method 8100 may be performed by various devices included in wearable apparatus 110, such as, image sensor 220, 220*a*, and/or 220*b* and a processing device (e.g., processor 210 and/or processor 540). Steps included in method 8100 may be performed in combination with or in place of steps included in method 7900. For example, some steps included in method 8100 may be included in method 7900 as additional steps or as alternatives for replacing some steps included in method 7900. Some steps included in method 7900 may be included in method 8100 as additional steps or as alternatives for replacing some steps included in method 8100.

Method 8100 may include capturing a plurality of images from an environment of user 100 of wearable apparatus 110 (step 8110). For example, image sensor 220, 220*a*, and/or 220*b* may capture one or more images of an environment in front of user 100, including the food store building 7610, the persons 7640 and 7665, and the subway station sign 7680 as shown in FIG. 76, or an environment including the soccer game field as shown in FIG. 77. Method 8100 may include analyzing the plurality of images to identify one or more of the plurality of images that include an occurrence of a product descriptor (step 8120). The analysis may be similar to that discussed above in connection with step 7920 of method 7900. Method 8100 may also include identifying, in one or more of the identified images, a graphic (step 8130). For example, the processing device may identify an image of water advertisement 7645 shown in FIG. 76 from a plurality of images of the environment captured by wearable apparatus 110. From the image of water advertisement 7645, the processing device may further identify a graphic. The graphic may be a graphic of logo 7655.

Method 8100 may also include comparing the identified graphic with a plurality of stored representations of known graphics (step 8140). For example, a plurality of known graphics of different brands of bottled water may be stored in memory 550 (e.g., in image database 7501). The processing device may access image database 7501 to retrieve the plurality of known graphics of different brands of bottled water. The processing device may compare the graphic of logo 7655 with the stored representations of known graphics to find a match.

Method 8100 may further include selecting feedback to be provided to user 100 based on finding a match between the identified graphic and a representation of a known graphic (step 8150). For example, one or more known graphics of the "W" brand bottled water may be previously stored in image database 7501. The processing device may match the graphic of logo 7655 with one or more of the stored representation of the known graphics of the "W" brand bottled water. The processing device may select one or more feedbacks from action database 7505 that stores a plurality of predefined actions or feedbacks to be provided to user 100. For example, the at least one processing device may select a feedback of providing to user 100 a sales promotion of the "W" brand bottled water. The processing device may cause the feedback to be provided to user 100 in a video, audio, and/or text message. In some embodiments, the feedback may include at least one of an audible feedback and a visual feedback. In some embodiments, the at least one processing device may cause feedback outputting unit 230 included in wearable apparatus 110 or computing device 120 to present the selected feedback to user 100. In some embodiments, the feedback may be providing prices of competitors of "W" brand bottled water, product recalls of "W" brand, etc.

Figure 82:
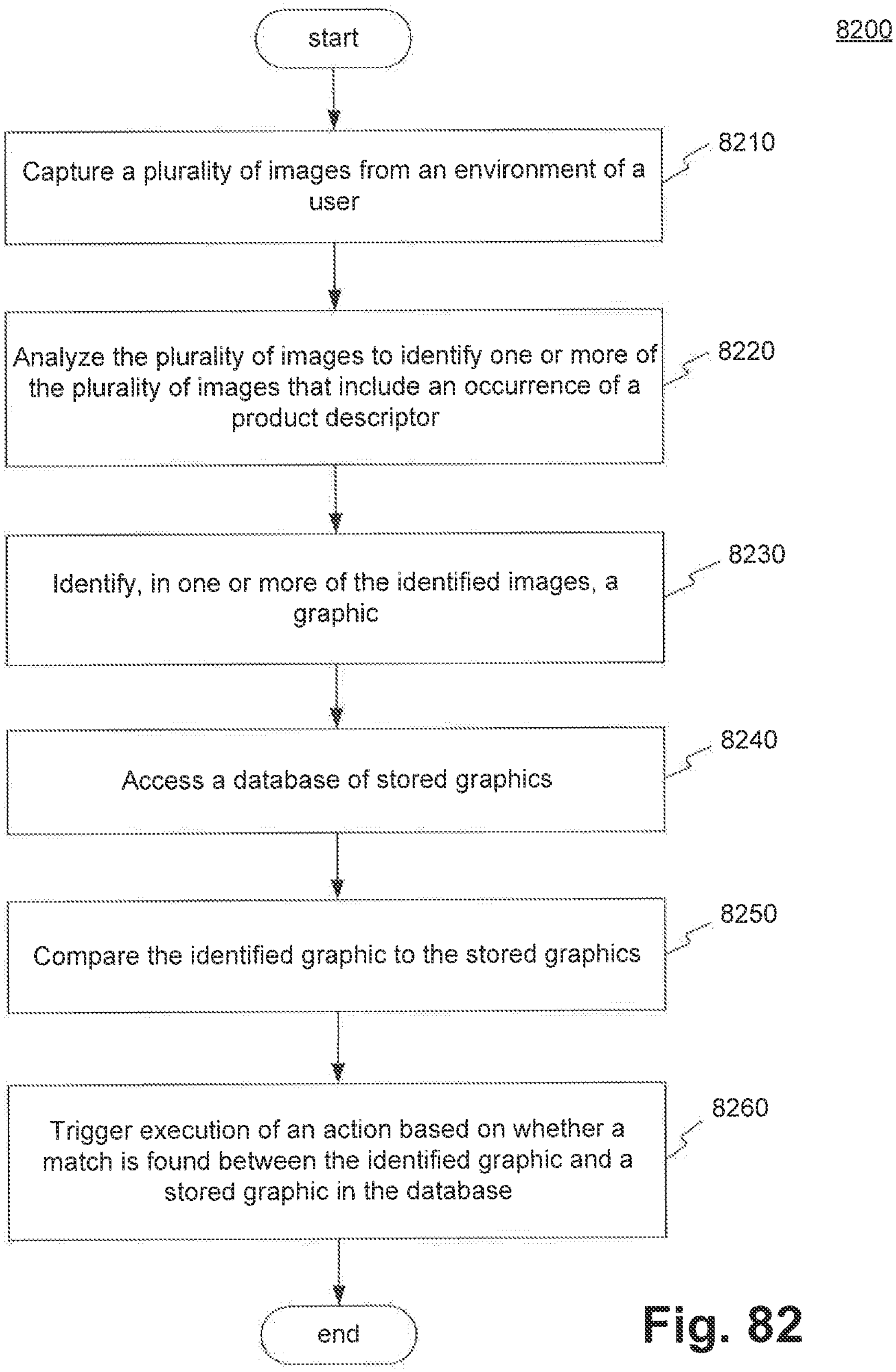
FIG. 82 is a flowchart illustrating another example method for processing images including a product descriptor.

FIG. 82 is a flowchart illustrating another example method 8200 for processing images including a product descriptor, consistent with the disclosed embodiments. Method 8200 may be performed by various devices included in wearable apparatus 110, such as, image sensor 220, 220*a*, and/or 220*b* and a processing device (e.g., processor 210 and/or processor 540). Steps included in method 8200 may be performed in combination with or in place of steps included in method 7900 and/or method 8100. For example, some steps included in method 7900 and/or 8100 may be included in method 8200 as additional steps or as alternatives for replacing some steps included in method 8200. Some steps included in method 8200 may be included in method 7900 and/or method 8100 as additional steps or as alternatives for replacing some steps included in method 7900 and/or method 8100. Methods 7900, 8100, and 8200 are not mutually exclusive.

As shown in FIG. 82, method 8200 may include capturing a plurality of images from an environment of user 100 of wearable apparatus 110 (step 8210). Steps 8210 may be similarly performed as steps 7910 and 8110. Method 8200 may also include analyzing the plurality of images to identify one or more of the plurality of images that include an occurrence of a product descriptor (step 8220). Step 8220 may be similarly performed as steps 7920 and 8120. Method 8200 may include identifying, in one or more of the identified images, a graphic (step 8230). Step 8230 may be similarly performed as steps 7930 and 8130. The identified graphic may include at least one of a printed image (e.g., a printed image 7650 of the "W" brand bottled water, as shown in FIG. 76) and a text (e.g., texts 7660 of "Buy Water, Win Lottery" as shown in FIG. 76). The identified graphic may include a logo associated with a brand of a product (e.g., logo 7655 of the "W" brand of bottled water).

Referring to FIG. 82, method 8200 may also include accessing a database of stored graphics (step 8240). For example, the at least one processing device may access image database 7501, which may store a plurality of graphics. Method 8200 may also include comparing the identified graphic to the stored graphics (step 8250). Step 8250 may be similarly performed as step 8140.

Method 8200 may further include triggering execution of an action based on whether a match is found between the identified graphic and a stored graphic in the database (step 8260). For example, when a match between logo 7655 of the "W" brand bottled water and stored logos of "W" brand bottled water is found, the at least one processing device may cause information related to the identified graphic (e.g., logo 7655) to be stored in a database, such as image database 7501. For example, the processing device may cause the location information at which the graphic was identified, the time of day when the graphic was identified, etc., to be stored in image database 7501. In some embodiments, the processing device may cause a communications interface of wearable apparatus 110, such as data port 570 (shown in FIG. 5A), wireless transceivers 530 (shown in FIG. 5A) and 530*a* (shown in FIG. 5C) to transmit information indicating that the graphic (e.g., logo 7655) was identified to computing device 120 and/or server 250 when the action is executed. In some embodiments, the action may include requesting computing device 120 and/or server 250 to provide additional information regarding the identified graphic (e.g., logo 7655 of "W" brand bottled water). For example, the processing device may request server 250 to search the Internet or databases for stock prices of the "W" brand, prices and/or discounts offered by competitors of the "W" brand, product recalls of the "W" brand, etc. The action may further include receiving, by the processing device through the communications interface, the requested information from the server 250, and presenting the requested information to user 100.

In some embodiments, the action may include identifying objects near the identified graphic. For example, in the example shown in FIG. 77, wearable apparatus 110 may capture a plurality of images of the soccer field. The processing device may analyze the images to identify an image including product descriptor 7700 that includes logo 7705 (letter "E" within a circle) and text description 7710 ("Energy Drink"). The processing device may identify a graphic containing logo 7705. The processing device may access image database 7501 to retrieve stored graphics, and compare the identified graphic including logo 7705 with the stored graphics. When a match is found between the identified graphic including logo 7705 and one or more of the stored graphics related to "E" brand energy drinks, the processing device may trigger an action to analyze the captured images to identify objects near the identified graphic including logo 7705. For example, the at least one processing device may identify barrel 7715, table 7720, and soccer players on the soccer field. The identified objects near the identified graphic including logo 7705 may provide context information regarding the occurrence of the logo 7705.

In some embodiments, the graphic as identified in step 8230 may include a directional symbol, such as first directional symbol 7805 and second directional symbol 7815 shown in FIG. 78. The action triggered by identifying the graphic may include providing a feedback to user 100 that includes directing user 100 in accordance with the directional symbol. For example, the at least one processing device may cause a video, audio, and/or text message to be presented to user 100 through feedback outputting unit 230 and/or computing device 120 to direct user 100 to turn left for the bus terminal in accordance with first directional symbol 7805.

In some embodiments, the action triggered by identifying the graphic may include providing a feedback including presenting to user 100 stored information associated with the identified graphic. For example, the feedback may include the price of the "W" brand bottled water, the prices and/or discounts offered by the competitors of the "W" brand, the product recall information, etc.

Method 8200 may further include additional steps not shown in FIG. 82. For example, method 8200 may include determining, based on the one or more identified images, information related to the occurrence of the product descriptor, as similarly discussed above in connection with step 7930 of method 7900. Method 8200 may also include causing the information and an identifier of the product descriptor to be stored in a memory, as similarly discussed above in connection with step 7940 of method 7900.

In some embodiments, the image data captured by apparatus 110 may be analyzed and processed to identify objects of interest for user 100. The image data may be analyzed and processed by any processing device, for example, processor 540*a*, processor 540*b*, or a processor associated with server 250. One way to determine that an object of interest is to identify that user 100 has had repetitive exposures to that object. Apparatus 110 may determine whether an object of interest to user 100 by measuring how long user 100 looks at a specific object. For example, if user 100 looks at an object for a predetermined time period (e.g., 5 seconds or more, 10, seconds or more, 30 seconds or more, etc.), the object may be classified as an object of interest.

In some embodiments, user 100 may receive feedback associated with the identified object of interest. For example, if a user looks at a Ferrari for a predetermined time period, the user may receive ads for Ferrari. Therefore, apparatus 110 can provide advertising triggers based on exposure to a particular image and that reflect the user's interest level for that image. Once the predetermined time period meets or exceeds a certain threshold, the processing device may trigger advertising that is related to or based on the image that the user has looked at. Accordingly, the processing device may determine, based on analysis of the plurality of images and a predetermined viewing threshold, that user 100 is interested in an object in his/her environment. If the analysis indicates that the predetermined viewing threshold has been met, the processing device may cause performance of an action.

In some cases, the predetermined viewing threshold may be a predetermined amount of time, and the action is performed after the analysis indicates that the object has remained relatively stationary in the plurality of images for more than the predetermined amount of time. Alternatively, the action may be performed after the analysis indicates that the object has remained in a field of view of the user for more than the predetermined amount of time. In other cases, the predetermined viewing threshold includes a predetermined number of image frames, and the action may be performed after the analysis indicates that the object has remained in a central portion of the plurality of images for more than the predetermined number of image frames.

The action may include providing feedback associated with the identified object. For example, the feedback may include at least one of the following: audibly identifying the object, audibly reading text associated with the object, and audibly providing information about the object (e.g., price, ads, warnings, etc.). In addition, the action may include storing information associated with and/or related to the identified object in a memory. For example, the information may include information about an identity of the object, information about a location of identify of the object, information about a time of identifying the object, and/or at least one image of the object.

In one embodiment, a wearable apparatus for processing images comprises a wearable image sensor configured to capture a plurality of images from an environment of the user and at least one processing device. The at least one processing device is configured to determine, based on analysis of the plurality of images and a predetermined viewing threshold, that the user is viewing an object in the environment and cause performance of a predefined action after the analysis of the plurality of images indicates that the predetermined viewing threshold has been met.

In some embodiments, the image data captured by apparatus 110 may be analyzed and processed to discern information about user's environment and to send advertising information to the user based on the image analysis. The processing device may identify an exposure of user 100 to an object (e.g., a product) by analyzing image data captured apparatus 110, and thereafter the processing device may determine if the object is of interest to a third party. If the processing device determines that the identified object is of interest to the third party, the processing device may push a multimedia content file to user 100 related to the identified object.

For example, the third party may be an advertiser and the multimedia content file being pushed to user 100 may be an ad associated with the identified object. In some cases, the multimedia content file may be pushed in real-time to the user's smartphone via an application. Alternatively, the multimedia content file may be pushed after identifying a repeated exposure to an object. The multimedia content file may be associated with a product competing with the object. Also, the multimedia content file may be associated with an identified trait in common with at least two objects held by the user.

In some embodiments, the image data captured by apparatus 110 may be analyzed and processed to trigger an immediate action (e.g., advertising) while the user remains in the situation where the action might have the most impact. The image data may be processed in real-time using any processing device in the environment of user 100, for example, processor 540*a*, or processor 540*b*. The processing device may identify a predefined visual trigger in image data and provide a multimedia content file in real-time related to the predefined visual trigger. The predefined visual trigger may be a location (e.g., a CVS store), an object (e.g., beverage vending machine), or an activity (e.g., entering a shopping mall).

In some cases, the visual trigger may be defined by user 100, who can also define that the multimedia content file is to be provided in real-time. For example, assuming user 100 starts a diet (or has some food allergy); the user can define different types of food as visual triggers. In this example, when apparatus 110 identifies that user 100 is about to eat the predefined food, the processing device may provide in real-time a reminder to the user that this food should be avoided. In other cases, the visual trigger may be defined by a third party, which can also define the multimedia content file to be provided to him in real-time. For example, the predefined visual trigger may be a beverage vending machine, and when user 100 goes to any beverage vending machine the processing device may provide in real-time an ad to user 100 via an associated device (e.g., a smartphone).

In some embodiments, the predefined visual trigger may be offered to various companies and the ads belonging to the highest bidder may be provided to user 100. Similar to the way ad-words are being sold based on key words in Internet searches, ad-images may be sold based on real-life exposure of the user to predefined visual triggers. Advertisers will have the ability to bid on visual triggers recognizable by apparatus 110, and have the ads pushed to specific users that are exposed to the predefined visual trigger. In some cases, the bidding process may be used to select an ad after identifying a visual condition in the image data collected by apparatus 110. For example, the advertisers will have the option to provide an ad for milk when the processing device identifies a visual trigger that indicates that the user entered a grocery shop, and after previously identifying a visual condition that indicates that the user does not have milk in his or her refrigerator.

The processing device may also provide to the bidders user demographic information (e.g., the user's age group, gender, etc.). To preserve user privacy, the processing device may not provide user-identifiable data. For example, different companies may bid on an image of a vending machine and an ad related to certain products that are available from the vending machine may be provided to a use after identifying that the user is near the vending machine. The bidders may select different ads for different user demographic groups. In the example above, the bidders may bid on a visual trigger of a vending machine for females between ages 21-26, and/or bid on a visual trigger of the same vending machine, but for males between ages 30-35.

In addition, advertisers might bid on traits or combinations of traits derived from image data captured by apparatus 110. Similar to the discussion above regarding ad-images, a predefined trait may be offered to various companies and the ads belonging to the highest bidder may be provided to users who share the trait. For example, the processing device may collect information from a plurality of users, identify from the captured image data traits or behaviors across each user's images, and provide advertisers with the ability to bid on specific traits or behaviors. In one example, the traits may include hobbies, favorite foods, etc.

In some cases, the traits may be derived from repetitive exposure to certain objects in a user's environment. For example, the fact that a user is exposed to hamburgers every other day, may indicate that the user likes to eat hamburgers or that he works at McDonalds. Additionally or alternatively, the traits may be derived from exposure to a combination of objects in a user's environment. For example, the fact that a user is exposed to running shoes, a pedometer, and sport clothing, may indicate that the user likes to jog. Additionally or alternatively, the traits may be derived from engagement in a particular activity or from a plurality of predefined factors. For example, the fact that a user goes to a comic book store, may indicate that the user likes superhero stories.

In some embodiments, server 250 may be programmed to provide advertisements to a user of a wearable camera system based on objects, products, people, and locations identified within captured images. A wearable camera system may include a wearable imaging apparatus 110 and a computing device 120, which may or may not be integral with wearable imaging apparatus. For example, a user spending time on a beach may receive advertisements for bathing suits or sunscreen, a user spending time in a particular area of a city may receive advertisements for local businesses, a user that interacts with certain consumer products may receive advertisements for similar or complementary products. Selected advertisements may be delivered to a device of a user of the wearable camera system, and may be displayed to the user in several ways. A device to which advertisements are delivered may or may not be part of the wearable camera system. For example, advertisements may be delivered to a device such as a smartphone, tablet, pc, laptop, etc., of the user that is not part of or in direct communication with the wearable camera system. In other embodiments, advertisements may be delivered to the wearable camera system itself, for example to a computing device integral with or in direct communication with wearable apparatus 110. Where a wearable camera system includes a device with a display screen, advertisements may be delivered to the screen in audio, visual, or textual form. In embodiments where no screen is included, advertisements may be delivered to the user in an audio form. In embodiments including glasses 130, which may include an integral display screen, advertisements may be delivered directly to a lens display screen of the glasses 130. In other embodiments, advertisements may be delivered for display to a device (e.g., a smartphone, tablet, etc.) in communication with the user's wearable system.

In some embodiments, server 250 may be programmed to provide advertisements to a user of a wearable camera system based on bids received from advertisers. Server 250 may analyze images captured by the wearable camera system to detect characteristics of the images and then transmit these images to advertisers. Server 250 may then receive bids from the advertisers representing amounts of money to be paid for transmitting selected advertisements to the user of the wearable camera system. For example, when a user spends time in a particular area of a city, local businesses may provide competing bids to transmit an advertisement of their selection to the user. When a user interacts with specific consumer products, manufacturers of similar products may provide competing bids to transmit advertisements to the user's wearable system. The following description provides additional details regarding methods and systems for providing advertisements based on captured images.

In some embodiments, providing advertisements based on captured images may be implemented using one or more appropriate processing devices in conjunction with one or more memories storing executable instructions. The processing devices and memories may be collocated or may be distributed. The following description relates to the provision of advertisements using server 250. It will be recognized that, in some embodiments, the functions of server 250 described herein may be carried out by appropriate hardware included in apparatus 110 or computing device 120 of a wearable computing system. Executable software instructions, when executed by a processor of server 250, may perform various functions related to the provision of advertisements.

Figure 83:
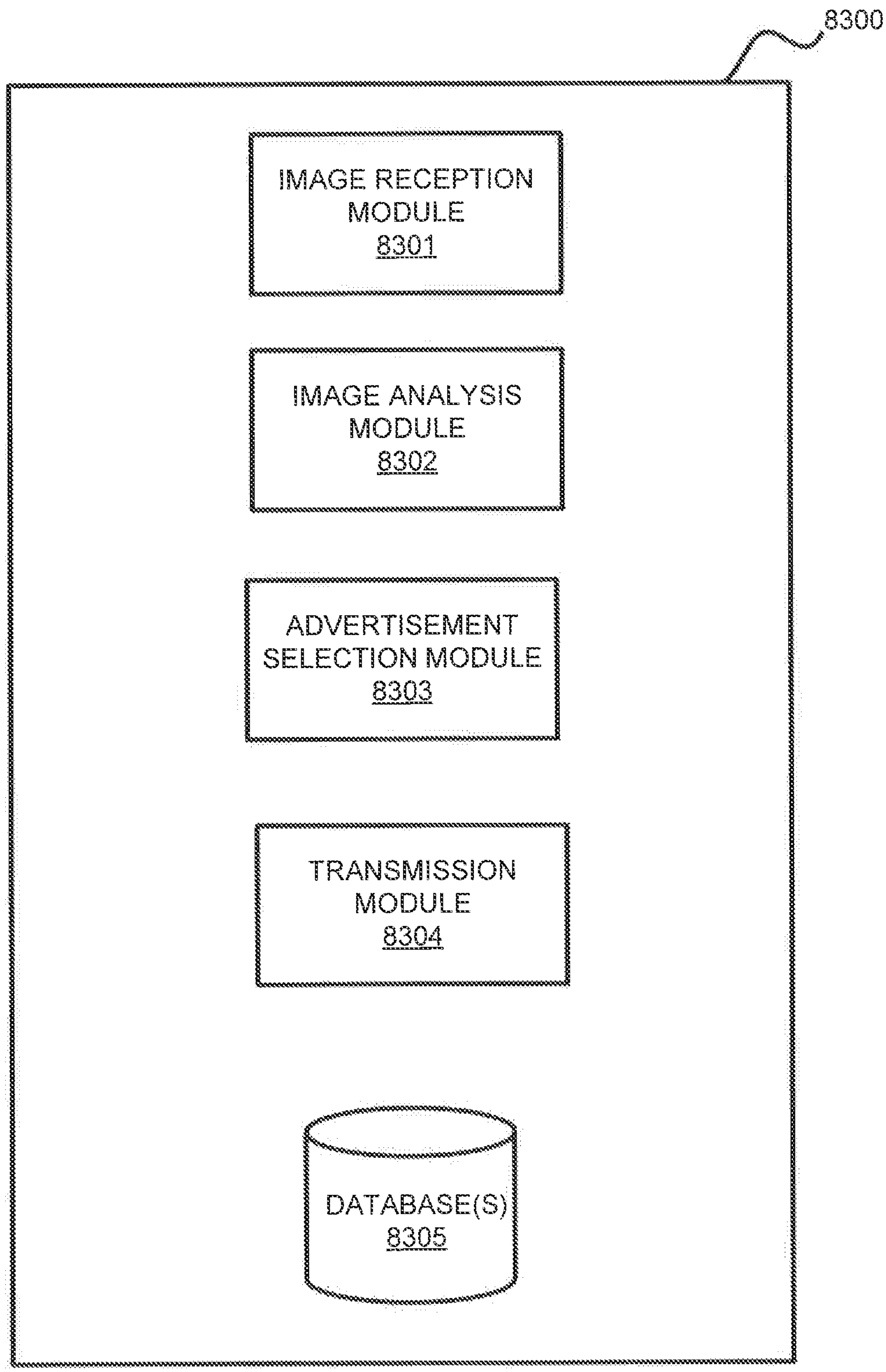
FIG. 83 is a block diagram illustrating an example of a memory storing modules providing instructions for selecting advertisements, consistent with disclosed embodiments.

FIG. 83 is a block diagram illustrating a memory 8300 according to the disclosed embodiments. The memory may include one or more modules, or sets of instructions, for performing methods consistent with the disclosed embodiments. For example, a memory may include instructions for a processor to provide advertisements. In the example shown in FIG. 83, memory 8300 comprises an image reception module 8301, an image analysis module 8302, an advertisement selection module 8303, a transmission module 8304, and one or more databases 8305 for performing the functionality of the disclosed methods. The modules shown in FIG. 83 are by example only, and a processor in the disclosed embodiments may operate according to any suitable process.

Image reception module 8301 may include software instructions for receiving data from a wearable camera system. Data received from a wearable camera system may include raw images and may include image data that has been processed. Raw images may be provided, for example, in the form of still images and video data. In some embodiments, received data may include data related to at least one characteristic identified in image data captured by a wearable camera system from an environment of a user. In some embodiments, images may be processed by the camera system to identify characteristics.

Image analysis module 8302 may include software instructions for analyzing image data received from a wearable camera system. Analyzing image data may include identifying at least one characteristic in the environment of a user from image data captured by a wearable camera system. Characteristics in a user's environment that may be identified by image analysis module 8302 may include, for example, objects in the environment of the user, persons in the environment of the user, products in the environment of the user, and a location of the user. Identified characteristics are discussed in greater detail below with respect to FIG. 9.

Advertisement selection module 8303 may be configured to execute software instructions to select an advertisement based on at least one characteristic extracted from image data received from a wearable camera system. In further embodiments, advertisement selection module 8303 may be configured to execute software instructions to select an advertisement based on one from among a plurality of bids received from a plurality of advertisers. Advertisers may, for example, provide bids to advertisement selection module based on data related to characteristics identified in the image data. For example, where a particular type of consumer product is identified as an image characteristic, e.g., sneakers, advertisers may submit competing bids for sneaker advertisements.

Transmission module 8304 may include software instructions for transmitting an advertisement to a device of the user of the wearable camera system. An advertisement may be transmitted to a user's device or to the wearable camera system itself, for example, via a wireless transceiver. When an advertisement has been selected, it may be transmitted to a user's device viewing by the user. The advertisement may be transmitted to a device including a display screen that is separate from the wearable camera system or to a device that is a part of the wearable camera system. For example, a wearable camera system may include a necklace unit including a camera and a computing device such as a smartphone or tablet that communicates with the necklace. The smartphone and/or tablet may receive and display the advertisement.

Database 8305 may contain data related to image analysis and characteristic identification, advertisements, and/or any other data that may be used by modules 8301-8304. For example, database 8305 may store data of images or frames captured by a wearable camera system to be analyzed by image analysis module 8302. Database 8305 may store recognized characteristics of images generated by image analysis module 8302. Database 8305 may store advertisement data to be presented to the user through transmission module 8304. Database 8305 may store bid data related to the advertisement data. Other forms of data related to the functions performed by modules 8301, 8302, 8303, and 8304, including transitional or temporary data, may also be stored in database 8305.

In some embodiments, database 8305 may be located remotely from memory 8300, and be accessible via one or more wireless or wired connections. While one database is shown, it should be understood that several separate and/or interconnected databases may make up database 8305, for example, where cloud architecture is used for storage.

Database 8305 may include computing components (e.g., database management system, database server, etc.) configured to receive and process requests for data stored in memory devices associated with database 8305 and to provide data from database 8305.

Image reception module 8301, image analysis module 8302, advertisement selection module 8303, and transmission module 8304 may be implemented in software, hardware, firmware, a mix of any of those, or the like. For example, if the modules are implemented in software, they may be stored in memory 8300, as shown in FIG. 83. Memory 8300 may, for example, be located on server 250, which may include one or more processing devices. Processing devices of server 250 may be configured to execute the instructions of modules 8301-8304. In some embodiments, aspects of image reception module 8301, image analysis module 8302, advertisement selection module 8303, and transmission module 8304 may include software, hardware, or firmware instructions (or a combination thereof) executable by one or more processors, alone or in various combinations with each other. For example, image reception module 8301, image analysis module 8302, advertisement selection module 8303, and transmission module 8304 may be configured to interact with each other and/or other modules of server 250 and/or a wearable camera system to perform functions consistent with disclosed embodiments. In some embodiments, any of the disclosed modules (e.g., image reception module 8301, image analysis module 8302, advertisement selection module 8303, and transmission module 8304) may each include dedicated sensors (e.g., IR, image sensors, etc.) and/or dedicated application processing devices to perform the functionality associated with each module.

Figure 84:
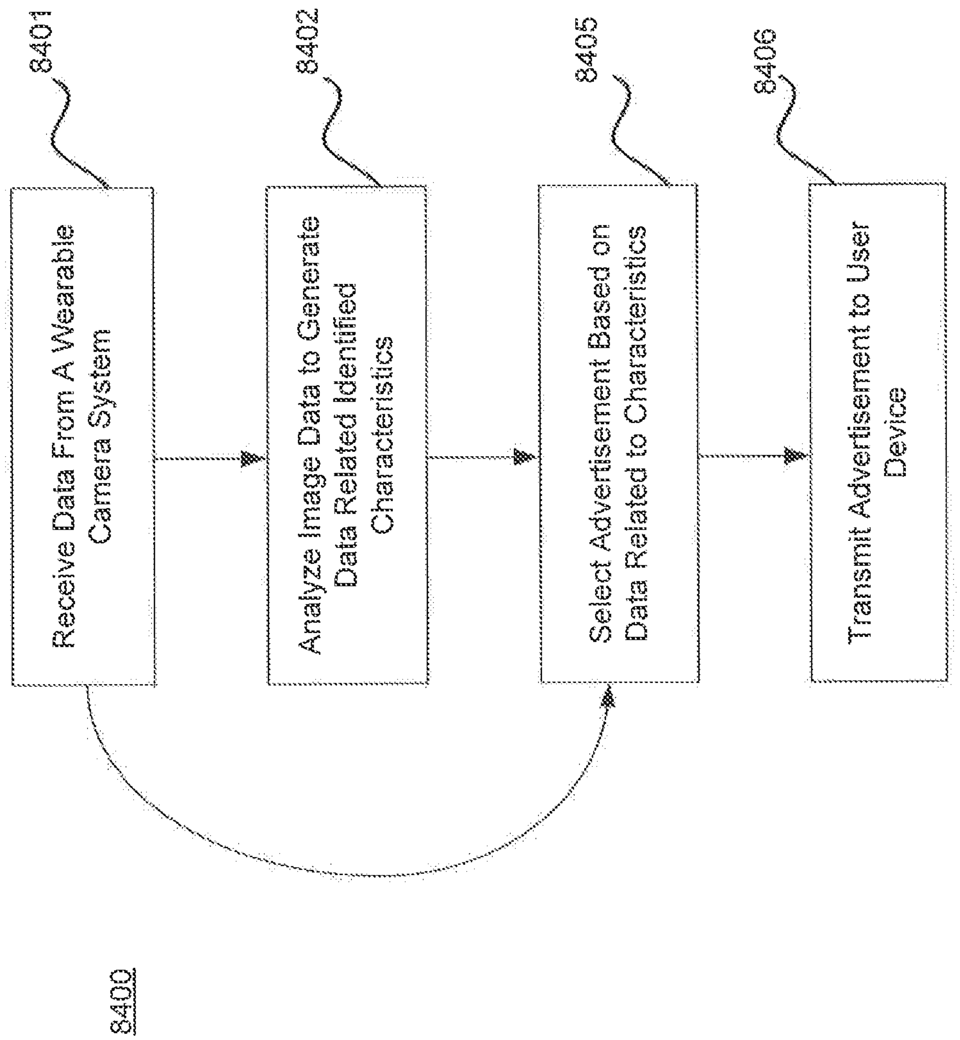
FIG. 84 illustrates an exemplary flowchart of a method for providing advertisements, consistent with a disclosed embodiment.
Figure 85:
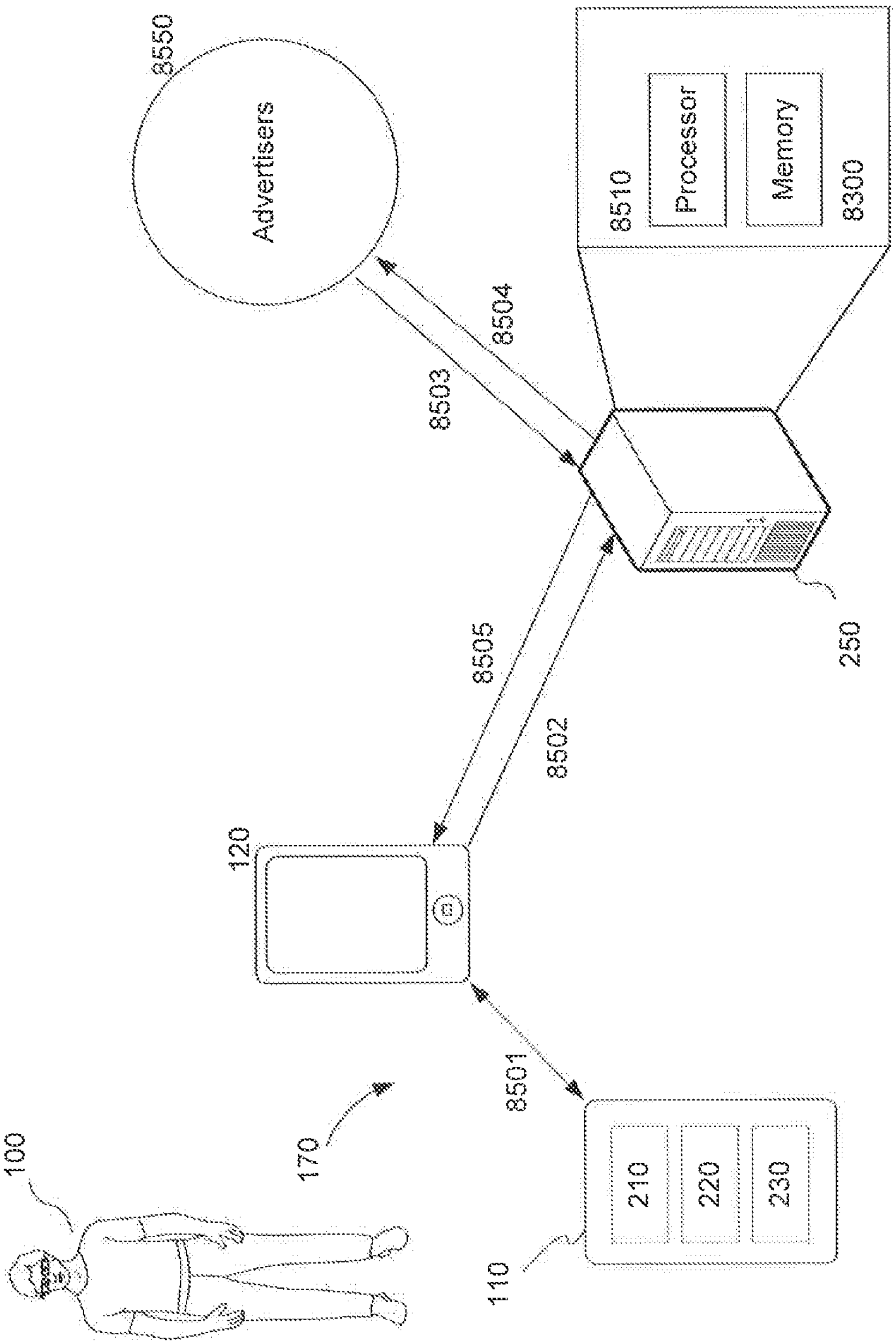
FIG. 85 illustrates an exemplary embodiment of a system consistent with the present disclosure.

FIG. 84 illustrates an exemplary flowchart of a method for providing advertisements, consistent with the disclosure. The method of FIG. 84 may, for example, be carried out by various aspects of the system illustrated in FIG. 8. FIG. 85 illustrates one exemplary embodiment of a system consistent with the present disclosure. The following description makes use of FIG. 85 for exemplary purposes only, as systems consistent with the present disclosure may use different devices and/or different communication pathways.

As illustrated, e.g., in FIG. 8, apparatus 110 and computing device 120 may be included in a wearable camera system 170. Apparatus 110 and computing device 120 may be in communication via data link 8501, which may be a wireless or wired connection. Apparatus 110 may include a wearable camera or image sensor configured to be worn on an exterior of clothing of user 100. Server 250 may be in communication with wearable camera system 170 in direct fashion or through a network 240 such as the Internet. Various aspects of the system and methods described herein may be performed on any of apparatus 110, computing device 120, or server 250 without departing from this disclosure. The following description provides non-limiting examples of how and with which aspect of the system various processes and steps of this disclosure may be performed. It is contemplated that a person of skill in the art will recognize ways in which the various processes and steps described herein may be performed on or with different devices disclosed herein, and/or performed on or with additional or alternative suitable devices.

In the exemplary embodiment illustrated in FIG. 8, the steps of advertisement selection method 8400 may be executed by at least one processing device 8510 included in server 250, executing software modules 8301-8304 stored on a non-transient, non-volatile, memory unit, such as memory 8300. In some embodiments, the at least one processing device and the memory may also be associated with, for example, computing device 120 and/or apparatus 110. In even further embodiments, the at least one processing device and memory may be associated with a computing system exercising a distributed cloud based architecture.

In step 8401, at least one processing device 8510, configured with software instructions to execute image reception module 8301, may receive data from a wearable camera system (e.g., wearable camera system 170). This data transfer is illustrated in FIG. 85 by data transfer 8502. Data received at step 8401 may include image data such as, for example, an image or series of images captured by a wearable camera system 170. A user may configure wearable camera system 170 to continuously capture images at various rates, for example, at multiple frames per second (e.g., 24, 60, 120, etc.) to capture video, and/or at lower rates, for example one frame every few seconds. Image reception module 8301 may receive images at any frame rate captured by wearable camera system 170, whether in the form of low frame rate still images or high frame rate video images. Data received at step 8401 may also include, in some embodiments, data or information related to at least one characteristic identified in image data captured by the wearable camera system.

Figure 86:
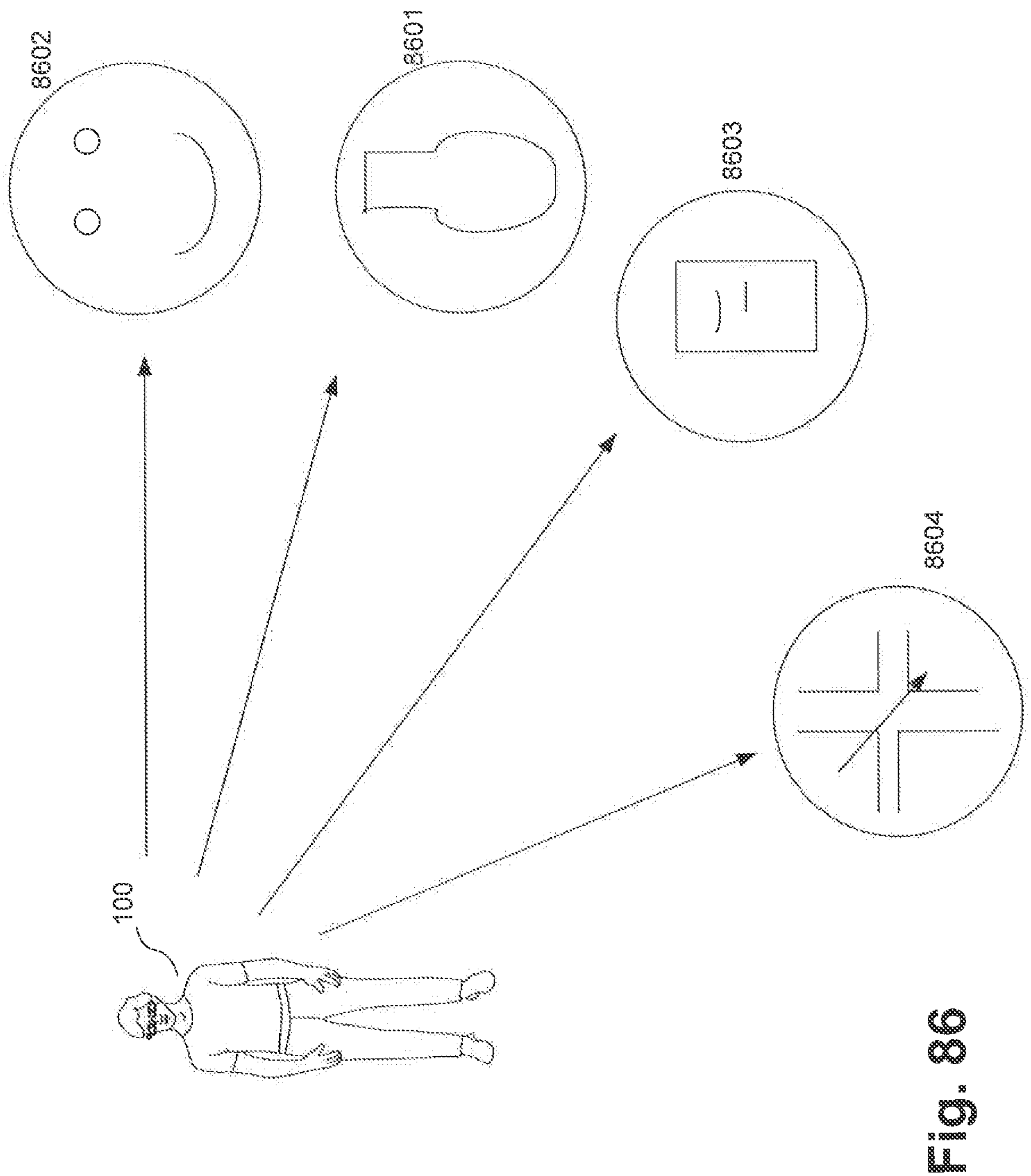
FIG. 86 illustrates exemplary characteristics of a user environment that may be identified from image data, consistent with a disclosed embodiment.

In step 8402, image analysis module 8302 may analyze the image or images received by image reception module 8301 to identify at least one characteristic in the image data. Image analysis module 8302 may be implemented by at least one processing device 8510. After one or more characteristics are identified from the image data, data or information related to the characteristics may be generated. FIG. 86 illustrates exemplary characteristics of a user environment that may be identified from image data. For example, as illustrated in FIG. 9, characteristics in a user's environment that may be identified by image analysis module 8302 may include, for example, objects 8601 in the environment of the user, persons 8602 in the environment of the user, products 8603 in the environment of the user, and a location 8604 of the user. Image analysis module 8302 may generate data or information related to these characteristics, such as the identity of the objects, products, and people in the environment of the user, or data related to a location of the user.

For example, image analysis module 8302 may identify objects 8601 in the environment of the user. Identified objects may include aspects of a user's environment such as landscape features (trees, bushes, etc.), buildings, furniture, vehicles, signs, and other items that a user may encounter. Image analysis module may 8302 may determine the identity of one or more persons 8602 in the environment of the user. Identified persons 8602 may be identified generically, e.g., a police officer, or specifically, e.g. by name. Image analysis module 8302 may identify products 8603, such as consumer products in the environment of the user. Identified products 8603 may be identified generically, for example, a camera, a book, or a pair of sneakers. Identified products 8603 may also be identified by particular brands, for example, a specific brand of camera or a specific brand of sneaker. Image analysis module may identify a location of a user based on image data. Identified locations 8604 may be generic, e.g., a kitchen, a park, or a beach, or specific, e.g., a specific address or place of business. Location identities may be determined based on cues within the image data and/or based on location data, such as GPS data, that an image may be tagged with. Thus, image analysis module 8302 may analyze image data to identify certain products 8603 or objects 8601, certain people, and certain locations 8604 for a user. For example, image analysis module may identify within the environment of a user particular cooking implements, such as appliances in a kitchen. Determined identities of objects 8601, persons 8602, and objects 8603 may be included in data or information related to the identified characteristics. Determined locations 8604 of a user may be included in data or information related to the identified characteristics.

Image analysis module 8302 may be further programmed to determine a frequency at which various characteristics appear within the environment of the user. Thus, image analysis module may determine how frequently a user is in a kitchen or a bedroom, and/or may determine how frequently various products 8603, objects 8601, and people, both generic and specific, appear in a user's environment. The determined frequency may be included in data or information related to the identified characteristics.

In some embodiments, image analysis module 8302 may analyze image data to obtain life log characteristics. Life log characteristics may include, for example, image recordings of a user's daily recreational and business activities and/or social interactions. Thus, data related to at least one characteristic identified in the image data may include data obtained from a life log of the user.

In some embodiments consistent with the present disclosure, all or some of the above described analysis processes of image analysis module 8302 may be carried out via hardware, software, and/or firmware associated with wearable camera system 170. For example, computing device 120 may perform the above described image analysis and transmit data related to identified characteristics via image transfer 8502. Thus, image reception module 8301, in addition to receiving image data from wearable camera system 170, may also receive, at step 8401 data related to at least one characteristic identified in image data captured by wearable camera system 170 from an environment of a user. In such embodiments, it may be possible to skip from data reception step 8401 directly to advertisement selection step 8405.

Returning now to FIG. 84, after image analysis is performed at step 8402, advertisement selection module 8303 may perform step 8405 to select an advertisement an advertisement based on at least one characteristic or data related to at least one characteristic identified by image analysis module 8302. Advertisement selection may be performed as follows.

Advertisements may be selected based on at least one characteristic identified in the environment of the user. For example, image analysis module 8302 may identify a location characteristic of the user, such as identifying that a user is in a certain neighborhood of a city. Advertisements related to that neighborhood, for example, an advertisement for a local eatery or shop may then be provided to the user. In another example, image analysis module 8302 may identify a product characteristic in the environment of the user. Advertisements for similar or complementary products may then be selected for transmission to the user.

In some embodiments, advertisements may be selected and transmitted in direct response to characteristics identified in a user's environment. For example, when image analysis module 8302 identifies a certain characteristic in an environment of the user, advertisement selection module 8303 may be triggered to select an advertisement based on the data or information related to the identified characteristic. Thus, a certain characteristic may trigger the selection of advertisements. For example, identifying a soft drink in a user's environment may trigger an advertisement for soft drinks. In another example, a complementary product may be advertised, e.g., identifying cookies in a user's environment may trigger an advertisement for milk. In alternative embodiments, advertisements may be selected on a periodic basis, and advertisement selection module 8303 may select the advertisement based on a recent or aggregate history of characteristics identified in image data.

In some embodiments, advertisement content may be stored locally and transmitted to a user. For example, memory 8300 may store a plurality of advertisements to be transmitted to a user when and if advertisement selection module 8303 selects them. In such an embodiment, server 250 may communicate with advertisers 8550 to periodically update the local database of advertisements and to provide information about which advertisements have been selected. In alternative embodiments, local storage may include only basic information about an advertisement to enable advertisement selection module 8303 to make a selection. After a selection is made, advertisement selection module 8303 may then notify advertisers 8550 of the selection and receive advertisement content from advertisers 8550.

In some embodiments, advertisement selection module 8303 may further execute instructions to select an advertisement based on demographic information of the user. Factors such as age, sex, income, residential information, career information, etc., may be included in demographic information of the user. Demographic information of the user may further include any and all factors used in traditional advertisements to target specific audiences.

Advertisements may include at least one of text, image or images, audio, and video. Advertisements may include, for example, product descriptions, discount offers, coupons, free samples, and any other form of advertisement.

Returning now to FIG. 84, advertisements may be transmitted to a device of the user of wearable camera system 170 at step 8406, using transmission module 8304. Transmission of advertisements to a user device is illustrated in FIG. 85 by data transfer 8505. The selected advertisement may include at least one of text, image or images, audio, and video. The user device may include a smartphone, tablet, laptop, PC, on-board vehicle computer, and any other device capable of receiving advertisements and providing them to a user. In embodiments including a device with a display screen, any or all of these advertisement formats may be selected and transmitted. In some embodiments, a user may designate a particular device for receiving advertisements. For example, in some embodiments, a user may associate a smartphone or tablet device with the wearable camera system 170, and this device may receive and display the selected advertisements. Advertisements may be received, for example, via text message and/or via push notifications through an application installed on the tablet or smartphone. In other embodiments, a display screen may be incorporated directly into the wearable camera system 170 such as, for example, in the lens of glasses or in a screen on a watch or necklace device. In still other embodiments, no display screen may be associated with the wearable camera system 170. In such embodiments, advertisements may be delivered to a user via a speaker in audio format. In still other embodiments, advertisements may be transmitted in any other medium receivable by the user, for example, via e-mail or voice-mail, for later acquisition by the user.

Figure 87:
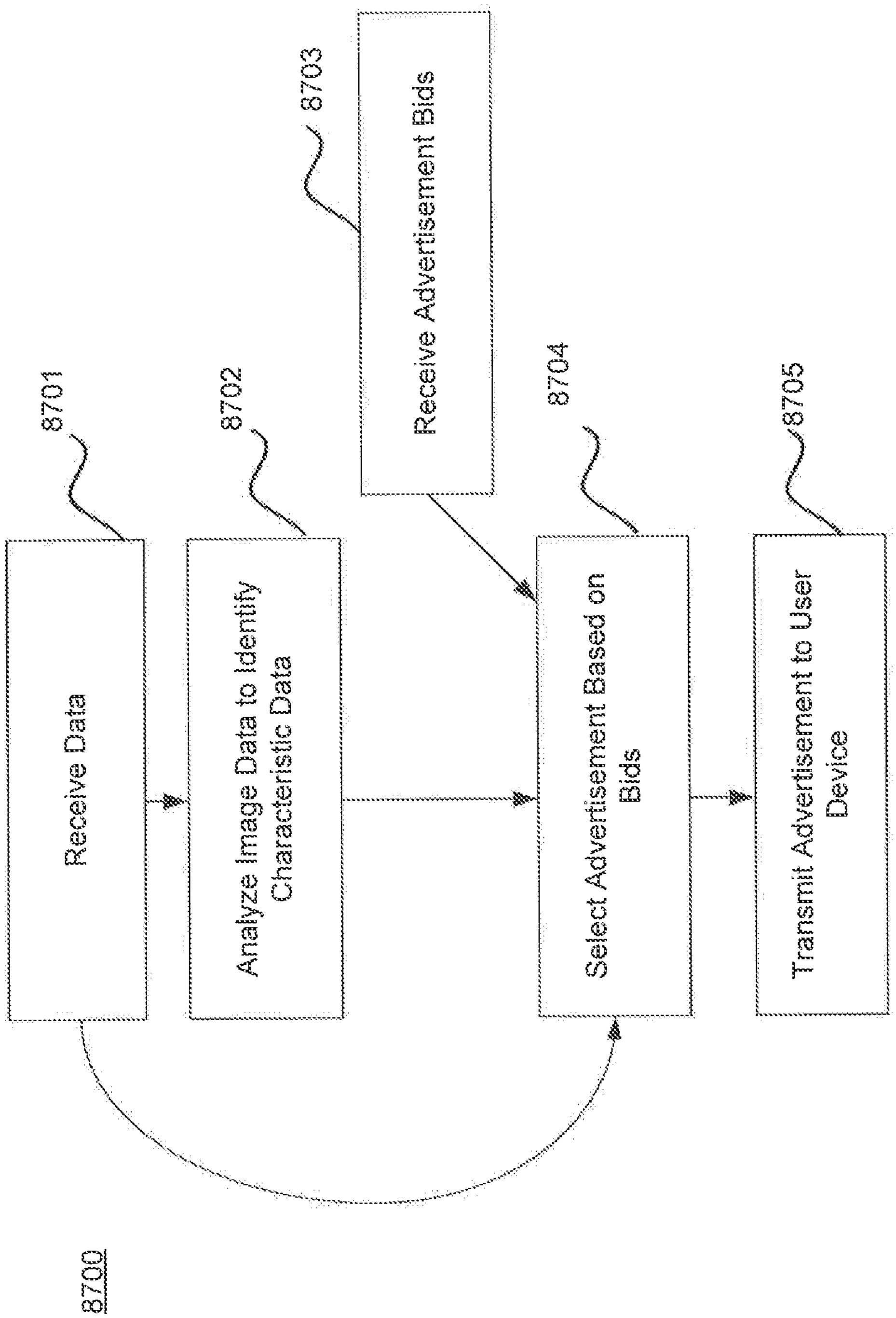
FIG. 87 illustrates an exemplary flowchart of a method for providing advertisements, consistent with a disclosed embodiment.

In another embodiment consistent with the present disclosure, advertisements may be selected based on bidding by advertisers. An exemplary method of selecting advertisements according to advertisers' bids is illustrated in FIG. 10. The method of FIG. 87 may, for example, be carried out by various aspects of the system illustrated in FIG. 8. The following description makes use of FIG. 85 for exemplary purposes only, as systems consistent with the present disclosure may use different devices and/or different communication pathways. In the exemplary embodiment illustrated in FIG. 8, the steps of advertisement bidding method 8700 may be executed by at least one processing device 8510 included in server 250, executing software modules 8301-8304 stored on a non-transient, non-volatile, memory unit, such as memory 8300.

Data reception step 8701 may proceed similarly to step 8401 of advertisement selection method 8400. In step 8701, at least one processing device 8510, configured with software instructions to execute image reception module 8301, may receive, from wearable camera system 1100, data. Data received at step 8701 may include an image or series of images captured by a wearable camera system 1100. This data transfer is illustrated in FIG. 85 by image transfer 8502. A user may configure wearable camera system 1100 to continuously capture images at various rates, for example, at multiple frames per second (e.g., 24, 60, 120, etc.) to capture video, and/or at lower rates, for example one frame every few seconds. Image reception module 8301 may receive images at any frame rate captured by wearable camera system 1100, whether in the form of low frame rate still images or high frame rate video images.

In some embodiments, data received at step 8701 may include data or information related to characteristics identified in image data. This may occur, for example, in embodiments where image data is analyzed by systems of wearable camera system 170. In such embodiments, advertisement bidding method 8700 may bypass image analysis step 8702 and skip directly to data transmission step 8703.

In image analysis step 8702, similarly to step 8402 of advertisement selection method 8400, image analysis module 8302 may analyze the image or images received by image reception module 8301 to identify at least one characteristic in the image data. Image analysis module 8302 may be implemented by at least one image reception module 8510. After one or more characteristics are identified from the image data, data or information related to the characteristics may be generated. At step 8702, image analysis module 8302 may be configured to recognize the same types of image characteristics as discussed above with respect to image analysis step 8402.

After image analysis is performed at step 8702, advertisement selection module 8303 may perform steps 8703, 8704 and 8705 to select an advertisement based on a plurality of advertisement bids received from advertisers. Advertisement bid selection may be performed as follows.

Based on data or information indicative of characteristics identified in an image, the plurality of advertisers may provide advertisement bids. At step 8703, bids for providing one or more advertisements to wearable camera system 1100 may be received from the plurality of advertisers 8550. Transfer of bid data is illustrated in FIG. 85 by bid data transfer 8504. In some embodiments, bid data may include advertisement content. In alternate embodiments, advertisement content may be pre-stored in database 8305 of server 250, or may be retrieved by server 250 from remote storage, such as a server located database or cloud storage. For example, bid data may include a pointer to a location where advertisement data is stored rather than the advertisement data itself. In this fashion, it is not necessary to transfer data related to advertisements that may not be selected. In some embodiments, advertisers may receive data from the at least one processing device. At least a portion of the data or information related to the at least one characteristic may be transmitted to a plurality of advertisers by advertisement selection module 8303. In some embodiments, all of the data or information related to the at least one characteristic may be transmitted. This data transfer is illustrated in FIG. 85 by image characteristic data transfer 8503.

In some embodiments, step 8703 may not occur in direct sequence between steps 8702 and 8704. For example, advertisement and bid data may be received from advertisers and stored in database 8305 in advance of any user action that may trigger the selection of advertisements. For example, advertisers may periodically send information for updating database 8305 with new advertisement and bid data, for example, once a day, once a month, or more or less frequently. Advertisers may base their bids on characteristic data received from an individual user. For example, server 250 may transmit aggregate characteristic data to advertisers on a periodic basis, for example once a day, once a week, or once a month. Such characteristic data may include information about objects 8601, people 8602, products 8603, and locations 8604 with which the user has interacted over the course of the week. Advertisers 8550 may use the aggregate data to determine bids and advertisement to transfer to server 250 at any time. Thus, server 250 may store a database of bids and advertisements that may be periodically updated by advertisers based on the periodic transmissions of characteristic data. In other embodiments, advertisers may base their bids on aggregate data obtained from many users. In some embodiments, advertisers may base bids on other factors, such as internal market research.

In further embodiments, the transfer of bid data to server 250 in step 8704 may occur in direct response to identified image characteristic data that has been transferred to advertisers. Advertisers 8550 may receive image characteristic data and, in response, generate a bid and transfer the bid to server 250.

At step 8704, advertisement selection module 8303 may select one or more advertisements based on one or more received bids. Bids received from the advertisers may include offers to pay specified amounts for serving advertisements to the user. In some embodiments, advertisers may base their bids on data related to characteristics identified in the environment of the user. For example, image analysis module 8302 may identify a location characteristic of the user, identifying that a user is in a certain neighborhood of a city. Advertisers of local businesses may bid in competition with one another to provide an advertisement to the user, for example, an advertisement or a discount coupon for a local eatery. In another example, image analysis module 8302 may identify a product characteristic in the environment of the user. Advertisers may bid in competition with one another to provide advertisements for similar or complementary products to the user.

In some embodiments, bids may be received from advertisers in response to characteristics identified in a user's environment. For example, when image analysis module 8302 identifies a certain characteristic in an environment of the user, advertisement selection module may receive bids from advertisers in response to data or information related to the identified characteristic. Thus, a certain characteristic may trigger the receipt of bids from advertisers.

In some embodiments, bids may be received from advertisers in advance of characteristic identification. Such bids may be stored in a local memory, e.g., memory 8300, and acted upon when image analysis module 8302 provides data or information related to the characteristic to the advertisement selection module 8303. For example, an advertiser may provide a bid offering to pay a specified amount when a triggering characteristic is identified in an environment of the user. The bid, and advertisement material related to the bid, may be stored on a local memory. When a user makes encounters or interacts with the triggering characteristic, it may trigger the stored bid and lead the advertisement selection module to select the associate advertisement.

In some embodiments, advertisement selection module may receive bids including offers to pay an amount for serving an advertisement to a user after a user purchases a specific product. Such bids may, for example, be received by advertisement selection module 8303 from advertisers soon after the purchase. Such bids may also be stored in a local memory, as described above. For example, an advertiser may provide a bid offering to pay a specified amount when a user makes a specific purchase in the future. The bid, and advertisement material related to the bid, may be stored on a local memory. When a user makes a specific purchase, it may trigger the stored bid.

In some embodiments, advertisement selection module 8303 may be further programmed to select the advertisement based on a highest one of the bids received. Additional factors may also be used by advertisement selection module 8303 to select the advertisement. Such additional factors may include, for example, selection based on a total number of advertisements an advertiser has bid for. For example, an advertiser that agrees to pay a lower price for a larger number of advertisements may win the bidding to transmit an ad to a user. In some embodiments, bids may be complex, representing more than just an amount of money to be paid for transmitting a single advertisement. For example, an advertiser's bid may include multiple levels of compensation, depending on whether a user follows the advertisement or purchases a product. Advertisement selection module 8303 may select an advertisement based on any feature of a bid.

In some embodiments, advertisement selection module 8303 advertisement bids may be based on demographic information of the user. Factors such as age, sex, income, residential information, career information, etc., may be included in demographic information of the user. Demographic information of the user may further include any and all factors used in traditional advertisements to target specific audiences. Demographic user information may be gathered based on identified image characteristics, user input, and any other available means to identify demographic user information.

After advertisement selection at step 8704, advertisement transmission step 8705 may be carried out by transmission module 8304. A selected advertisement may be transmitted to the device of a user of wearable camera system 170. Transmission of advertisements to a user device is illustrated in FIG. 85 by data transfer 8505. The selected advertisement may include at least one of text, image or images, audio, and video. The user device may include a smartphone, tablet, laptop, PC, on-board vehicle computer, and any other device capable of receiving advertisements and providing them to a user. In embodiments including a device with a display screen, any or all of these advertisement formats may be selected and transmitted. In some embodiments, a user may designate a particular device for receiving advertisements. For example, in some embodiments, a user may associate a smartphone or tablet device with the wearable camera system 170, and this device may receive and display the selected advertisements. Advertisements may be received, for example, via text message and/or via push notifications through an application installed on the tablet or smartphone.

In other embodiments, a display screen may be incorporated directly into the wearable camera system 170 such as, for example, in the lens of glasses or in a screen on a watch or necklace device. In still other embodiments, no display screen may be associated with the wearable camera system 170. In such embodiments, advertisements may be delivered to a user via a speaker in audio format. In still other embodiments, advertisements may be transmitted in any other medium receivable by the user, for example, via e-mail or voice-mail, for later acquisition by the user.

One application of wearable technology and "life logging" is the ability to cater advertising to a particular user's daily experience (as reflected, for example, by their "life log") and to gauge the effectiveness of advertising campaigns by crowdsourcing and linking together information related to advertising, purchasing behaviors, and demographics. As one example, an individual user 100 may use a wearable camera system to record information in a life log, and the camera system may detect that a particular advertisement has appeared in the environment of the user. The wearable camera system, may, in some embodiments, detect that the user later purchases a product that appeared in the advertisement that appeared in their environment. Information about the user and the purchase may be derived from image data captured by the wearable camera system, and this data may be aggregated across multiple users who perceived the advertisement to determine how much return the advertiser received on their investment.

Figure 88:
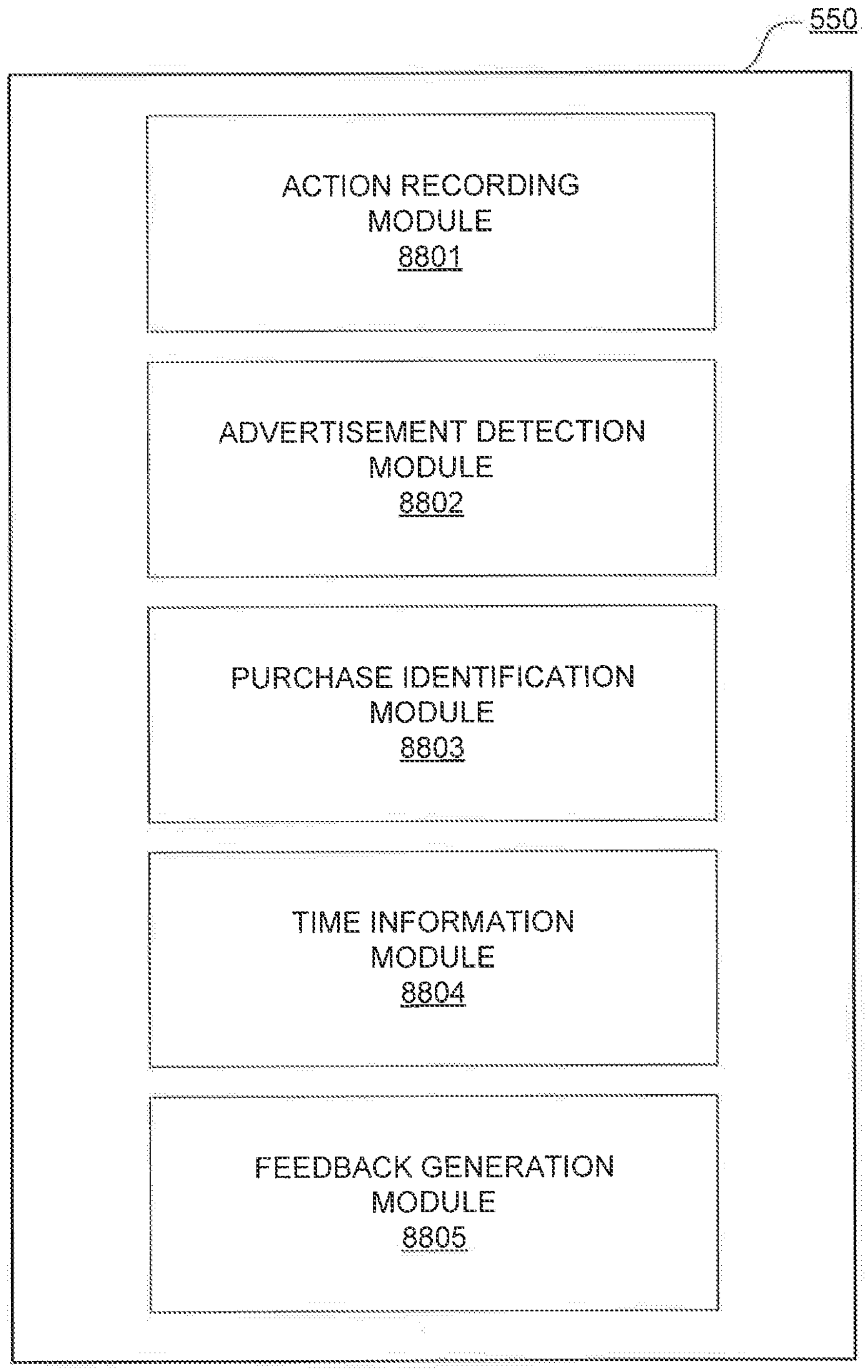
FIG. 88 is a block diagram illustrating an example of a memory contained within a system for analyzing advertisement effectiveness, consistent with disclosed embodiments.

FIG. 88 is a block diagram illustrating memory 550 associated with apparatus 110 according to one embodiment. In the example shown in FIG. 88, memory 550 comprises an action recording module 8801, an advertisement detection module 8802, a purchase identification module 8803, a time information module 8804, and a feedback generation module 8805.

Action recording module 8801 may provide functionality for apparatus 110 to capture and/or store image data. In some embodiments, this image data may include or depict actions performed by user 100 via image sensor 220. For example, as part of "life logging," image sensor 220 may capture anything that appears in the field of view of user 100. Processor 210 may execute action recording module 8801 to cause image sensor 220 to acquire the images, and may additionally use action recording module 8801 to adjust one or more parameters associated with image sensor 220. In some embodiments, user 100 may be able to start and stop the collection of image data by action recording module 8801 and apparatus 110 using function button 430. In other embodiments, apparatus 110 may be configured to capture image data via action recording module 8801. In one embodiment, processor 210 and image sensor 220 may be operatively connected via wires or other such mechanical couplings. In other embodiments, processor 210 and image sensor 220 may be operatively connected via wireless transceiver(s) 530.

Advertisement detection module 8802 may provide functionality for apparatus 110 to analyze real-time image data captured by image sensor 220 and action recording module 8801, and more specifically, to detect that user 100 watched, was in the vicinity of, or was otherwise exposed to one or more advertisements. In some embodiments, the advertisement may be audio or video, such as those on television, radio, video billboards, or Internet websites. In other embodiments, the advertisement may be in print form, such as in a newspaper, in a magazine, or on a print billboard. Processor 210 may be configured to execute advertisement detection module 8802, for example, to determine which, if any, advertisements were viewed or within the vicinity of user 100 during a particular time period.

Advertisement detection module 8802 may also be configured to determine from the captured image data particular information about one or more of an advertisement or about user 100. For example, advertisement detection module 8802 may determine a location of the advertisement, an identifier of the advertisement, and a source of the advertisement. Advertisement detection module 8802 may also be configured to determine information about the user 100 of apparatus 110, such as demographic information of the user, past behavior of the user, or past purchases made by the user.

Purchase identification module 8803 may be configured to detect purchase transactions made by user 100 in the course of their daily activities. Purchase identification module 8803 may do so by analyzing image data stored by action recording module 8801. As will be described in further detail below, purchase identification module may be configured to detect purchases in a number of ways, such as by identifying a purchased product, identifying an indicia of a completed purchase transaction, such as a receipt, or through other means, such as connecting externally to financial account information associated with user 100.

Time information module 8804 may provide functionality for apparatus 110 and processor 210 to determine the elapsed time between events and activities captured by image sensor 220 and action recording module 8801. In some embodiments, time information module 8804 may generate time information associated with this image data, and may store it within memory 550 for later access and analysis. This time information may take the form of a "timestamp," metadata, or any other such information. In alternative embodiments, time information module 8804 may be configured to generate a visual display of the time on images from the captured image data.

Feedback generation module 8805 may provide functionality for apparatus 110 to generate and transmit information to user 100, or to a third party or a remote computing system. Processor 210 may execute feedback generation module 8805 to generate and process feedback in a given context, then transmit the generated feedback to feedback-outputting unit 320 for output. In one embodiment, processor 210 and feedback-outputting unit 320 may be operatively connected via a wire or other such direct connection. In other embodiments, processor 210 and feedback-outputting unit 320 may be operatively connected via wireless transceiver(s) 530. In some embodiments, feedback generation module 8805 may generate audible feedback to user 100 or a third party. In other embodiments, feedback generation module 8805 may generate textual or graphical feedback, such as statistics, data, or information.

Action recording module 8801, advertisement detection module 8802, purchase identification module 8803, time information module 8804, and feedback generation module 8805 may be implemented in software, hardware, firmware, a mix of any of those, or the like. For example, if the modules are implemented in software, they may be stored in memory 550, as shown in FIG. 88. Other components of processor 210 may be configured to perform processes to implement and facilitate operations of the modules. Thus, action recording module 8801, advertisement detection module 8802, purchase identification module 8803, time information module 8804, and feedback generation module 8805 may include software, hardware, or firmware instructions (or a combination thereof) executable by one or more processors (e.g., processor 210), alone or in various combinations with each other. For example, the modules may be configured to interact with each other and/or other modules of apparatus 110 to perform functions consistent with disclosed embodiments. In some embodiments, any of the disclosed modules (e.g., action recording module 8801, advertisement detection module 8802, purchase identification module 8803, time information module 8804, and feedback generation module 8805) may each include dedicated sensors (e.g., image sensors, etc.) and/or dedicated application processing devices to perform the functionality associated with each module.

As used herein, real-time image data may refer to image data captured in real-time or near real-time. For example, action recording module 8801 may monitor the field-of-view of apparatus 110 to detect inputs. Accordingly, action recording module 8801 and any of the other disclosed modules may operate in parallel to process captured image data. That is, apparatus 110 may capture and analyze image data in parallel, or may institute a queue-like implementation whereby image data is captured and then analyzed in a continuous fashion (i.e., a first image is captured and analyzed while a subsequent image is captured and then subsequently analyzed).

Figure 89A:
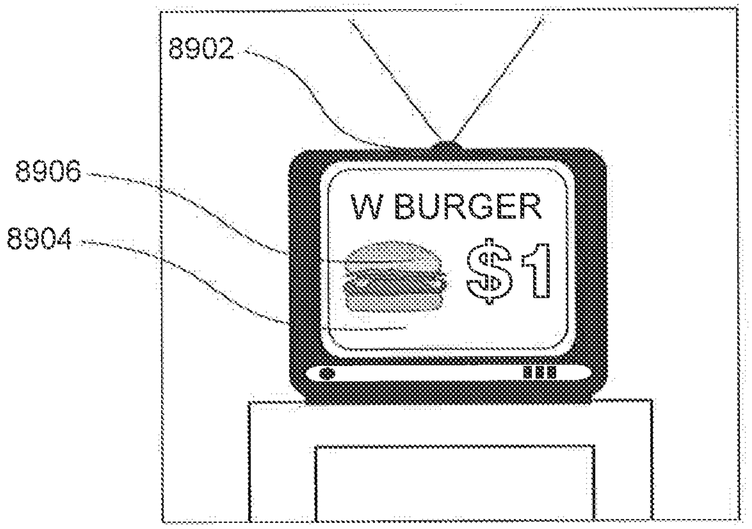
FIGS. 89A-89C are example illustrations of image data captured by a wearable camera system as part of a system for analyzing advertisement effectiveness, consistent with disclosed embodiments.
Figure 89B:
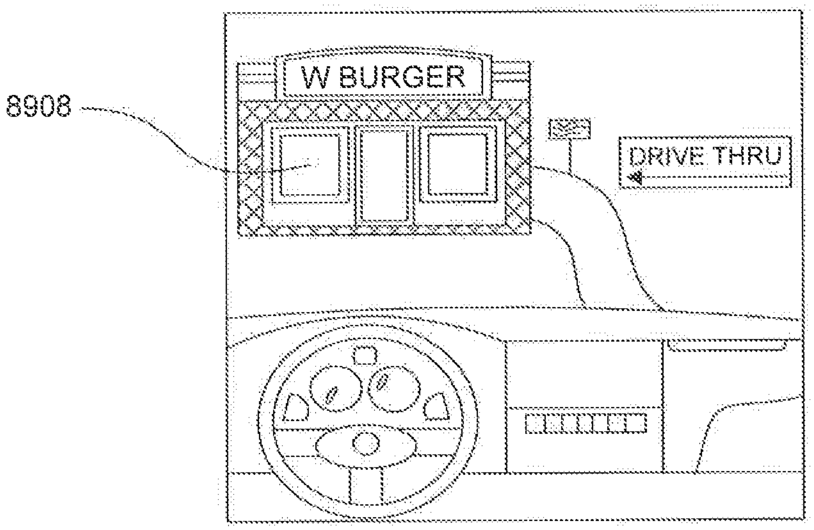
Figure 89C:
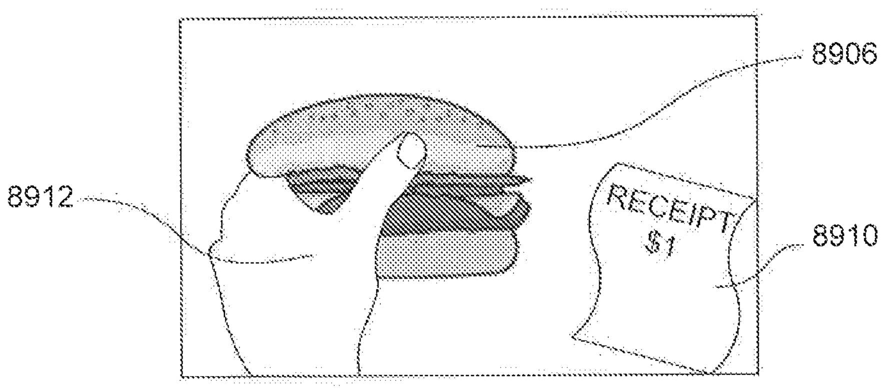

FIGS. 89A-89C illustrate examples of image data captured by apparatus 110 representing fields of view of image sensor 220, consistent with certain disclosed embodiments. In some embodiments, the field of view of image sensor 220 may correspond to or be similar to the field of view of user 100. In the example of FIG. 89A, image data captured by image sensor 220 indicates that user 100 may be watching television 8902. In FIG. 89A, television 8902 is broadcasting an advertisement 8904. In this example, the product 8906 featured in the advertisement 8904 is a hamburger from "W BURGER," advertised at an apparent sale price of one dollar. Product 8906 may include, but not be limited to, food, a service, or any other tangible object.

Consistent with disclosed embodiments, apparatus 110, via action recording module 8801, may record that the W BURGER advertisement 8904 was presented to user 100. Via advertisement detection module 8802, apparatus 110 may detect that advertisement 8904 was recorded in the image data captured by image sensor 220, and may execute software instructions to derive information about one or more of user 110 or advertisement 8904. In some embodiments, advertisement detection module 8802 may derive information from the captured image data related to one or more occurrences of advertisement 8904. In these embodiments, the derived information may include one or more of a location of advertisement 8904, an identifier of the advertisement (such as a mark, a logo, a jingle, or the appearance of product 8906), and a source of the advertisement (such as television 8902). Advertisement detection module 8802 may further determine information about user 100 at the time when advertisement 8904 was displayed. In these embodiments, the user information may include demographic information such as age, income, marital status, gender, geographic location, etc. Processor 210 may be configured to store the user and/or advertisement information derived from the image data, for example, in memory 550. In these embodiments, the information may be stored in a profile or other file associated with user 100. The stored profile information may be used by one or more of action recording module 8801 or advertisement detection module 8802 to identify user 100 in the future within image data captured by image sensor 220.

FIG. 89B illustrates another example of image data capable of being captured by image sensor 220 and action recording module 8801. In the example of FIG. 89B, user 100 can be seen to be driving in an automobile to location 8908. Here, location 8908 is shown to be a location of W BURGER, which was the fast food restaurant shown in FIG. 89A as the source of advertisement 8904 and product 8906. Consistent with disclosed embodiments, one or more of action recording module 8801, advertisement detection module 8802, or purchase identification module 8803 may execute software instructions to detect a location, such as location 8908, which may be associated with previously-viewed advertisement 8904.

FIG. 89C illustrates still another example of image data capable of being captured by image sensor 220 and stored by action recording module 8801. In the example of FIG. 89C, user 100 can be seen to have purchased the product 8906 (here, a hamburger) from location 8908, as evidenced by receipt 8910. The hand 8912 of user 100 can be seen to be holding the hamburger 8906. In some embodiments, apparatus 110 (via one or more of action recording module 8801 or purchase identification module 8803) may be configured to identify, based on previously derived information about user 100 or advertisement 8904, a product 8906 associated with advertisement 8904 that has been acquired by user 100. In these embodiments, processor 210 of apparatus 110 (via time information module 8804) may be configured to determine, based on captured image data, an amount of time from when advertisement 8904 was viewed by user 100 to when user 100 acquired product 8906.

Figure 90:
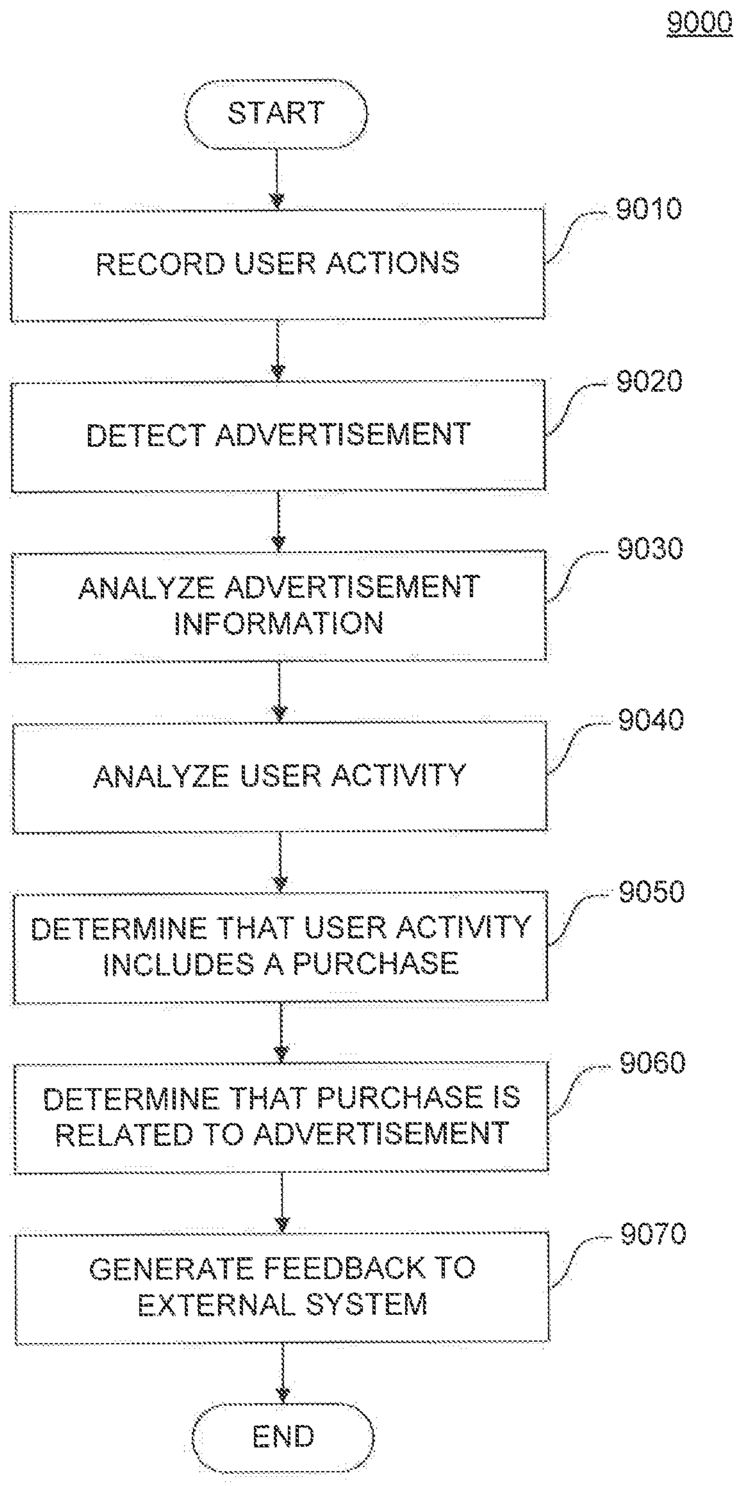
FIG. 90 is an example of a process for analyzing advertisement effectiveness, consistent with disclosed embodiments.

FIG. 90 illustrates an example of a process 9000 for analyzing advertisement effectiveness consistent with certain disclosed embodiments. Process 9000, as well as any or all of the individual steps therein, may be performed by various aspects of apparatus 110, such as processor 210, image sensor 220, action recording module 8801, advertisement detection module 8802, purchase identification module 8803, time information module 8804, or any subcomponents therein. In some embodiments, one or more steps of process 9000 may be performed by a remote computing system, such as server 250. For exemplary purposes, FIG. 90 is described as being performed by processor 210, executing software instructions stored within memory 550.

Processor 210 may execute software instructions via action recording module 8801 that enable apparatus 110 to capture real-time image data representing actions of a user 100 using a camera associated with an image sensor, such as image sensor 220 (Step 9010). In some embodiments, the captured first set of real-time image data may be received as a single streaming video file. In other embodiments, the real-time image data may be received as a series of still images. When the captured image data is received, processor 210 may store the data in memory 550. In some embodiments, processor 210 may be configured to begin recording image data via action recording module 8801 after identifying one or more triggers in image data captured by image sensor 220 of apparatus 110. The term "trigger" includes any information in the image data that may cause apparatus 110 to execute an action. For example, apparatus 110 may detect as a trigger a finger or hand of user 100 holding a product 8906 associated with an advertisement 8904, and may record data at that point. In FIG. 89C, hand 8912 may be an example of such a trigger. In these embodiments, processor 210 may be configured to transmit image data (either stored data or in real time) to a remote system such as server 250 for purposes of analyzing the image data to determine whether a trigger is present in the image data.

In alternative embodiments, action recording module 8801 may not record any data; instead, advertisement detection module 8802 and purchase information module 8803 may simply analyze images viewed through image sensor 220. In these embodiments, information relating to an advertisement 8904, to a product 8906, or to user 100 may be extracted by advertisement detection module 8802 and purchase information module 8803, and the information may be transmitted to an external system, such as server 250.

Processor 210 may execute software instructions via one or more of action recording module 8801 or advertisement detection module 8802 that enable apparatus 110 to detect that user 100 has perceived the presence of an advertisement, such as advertisement 8904 described above (Step 9020). In some embodiments, Step 9020 may be performed by a remote computing system, such as server 250. These modules may further be executed to analyze information related to advertisement 8904 (Step 9030), such as one or more products 8906 being advertised, a source of the advertisements, such as restaurant chain 8908 described above, an identifier of the advertisement, or a geographic location where the advertisement was perceived. In some embodiments, Step 9030 may be performed by a remote computing system, such as server 250. In some embodiments, processor 210 (via advertisement detection module 8802 and time information module 8804) may determine that user 100 has, over time, perceived multiple occurrences of advertisement 8904.

Via one or more of action recording module 8801, purchase identification module 8803, and time information module 8804, processor 210 may analyze the activity of user 100 over a period of time after user 100 has perceived advertisement 8904 (Step 9040). In some embodiments, Step 9040 may be performed by a remote computing system, such as server 250. Time information module 8804 may be configured to assist processor 210 in analyzing the activity of user 100 via image data captured by image sensor 220 over a pre-determined time period, such as hours, days, weeks, months, or years. Processor 210 may, via time information module 8804, also determine set periods of time at which image data or related information may be compiled. In these embodiments, the data may be sent to a remote system, such as server 250 for further analysis. Time information module 8804 may determine that the data be compiled and transmitted on an hourly, daily, weekly, monthly, or yearly basis. Additionally or alternatively, processor 210 and time information module 8804 may send the data to server 250 in real-time for analysis.

Through this analysis, processor 210 (via purchase identification module 8803) may determine that the activity of user 100 over the predetermined period of time set by time information module 8804 includes a purchase (Step 9050). In some embodiments, Step 9050 may be performed by a remote computing system, such as server 250. Purchase identification module 8803 may determine a purchase has taken place by any method. For example, in the illustration of FIG. 89C, the presence of a purchased product 8906 and a receipt 8910 may indicate that a purchase has taken place. In other embodiments, apparatus 110 may include a microphone, and purchase identification module 8803 may be configured to access the microphone and analyze audio data that may be captured along with the image data. In the illustration of FIGS. 89B-89C, for example, apparatus 110 and an associated microphone may detect dialog indicating that a purchase transaction is taking place. In some embodiments, apparatus 110 may be additionally or alternatively configured to access external data and sources of information to determine that one or more purchases have been made by user 100. For example, apparatus 110 may be configured to access personal financial software associated with user 100, and may be further configured to determine by analyzing transactions associated with a financial or credit account of user 100 that one or more purchases were made at a particular location 8908. In other embodiments, apparatus 110 (via purchase identification module 8803) may access banking sites and/or accounts associated with user 100, social media accounts associated with user 100, email accounts, the user's life log information, stored shopping lists, other user devices (e.g., smartphones, tablets) and/or accounts, etc. to identify that a purchase is planned, is in progress, or has already occurred.

Processor 210 (via purchase identification module 8803) may determine that one or more purchases made by user 100 are related to the previously-perceived advertisement 8904 (Step 9060), and may determine relevant information related to that purchase. In some embodiments, Step 9060 may be performed by a remote computing system, such as server 250. In some embodiments, purchase identification module 8803 may determine, via analysis of image data such as the example of FIGS. 89A-89C, that the identical product 8906 depicted in advertisement 8904 was later purchased by user 100. In other embodiments, purchase identification module 8803 may determine that a related, competing product was purchased instead of product 8906. In still other embodiments, purchase identification module 8803 may determine whether the product(s) were purchased from the location 8908 sponsoring the advertisement 8904. In yet other embodiments, purchase identification module 8803 may determine that no product related to advertisement 8904 was purchased by user 100. Alternatively, purchase identification module 8803 may determine that a particular user 100 did purchase a product 8906 featured in an advertisement 8904, but that that user 100 did not actually perceive the advertisement 8904. In these embodiments, user 100 may have heard about product 8906 through word of mouth, may have intended to buy the product regardless of advertisement 8904, may have heard about product 8906 through alternative means (such as social media), etc.

Processor 210 may further determine additional information and/or statistics associated with user 100 relating to the purchase. This information may include, but not be limited to, demographic information (as described above), past behavior of the user 100 (as indicated by action recording module 8801), information relating to advertisements perceived by the user 100 (as indicated by one or more of action recording module 8801, advertisement detection module 8802, and/or time information module 8804), and information related to past purchases made by the user 100 (as indicated by action recording module 8801 and/or purchase identification module 8803).

Via feedback generation module 8805, processor 210 may be configured to generate feedback relating to one or more of advertisement 8904 or user 100 to one or more external apparatuses or systems (Step 9070). In some embodiments, Step 9070 may be performed by a remote computing system, such as server 250. The feedback may contain the information about the advertisement 8904 and user 100 above, or various other statistics, metrics, or information that may be relevant to determining the effectiveness of an advertising campaign. The feedback may contain information about various activities and behaviors performed by user 100 that may be valuable information for the sponsor of the original advertisement 8904. The feedback may be sent to an external computing system associated with the sponsor of the advertisement or to other such retailers. Additionally or alternatively, feedback generation module 8805 may store the feedback in the user's life log, or may make posts on social media associated with the user. In some embodiments, the feedback may be used by an advertiser or retailer to craft additional advertisements for user 100, or to provide user 100 with an incentive offer such as a coupon.

Figure 91:
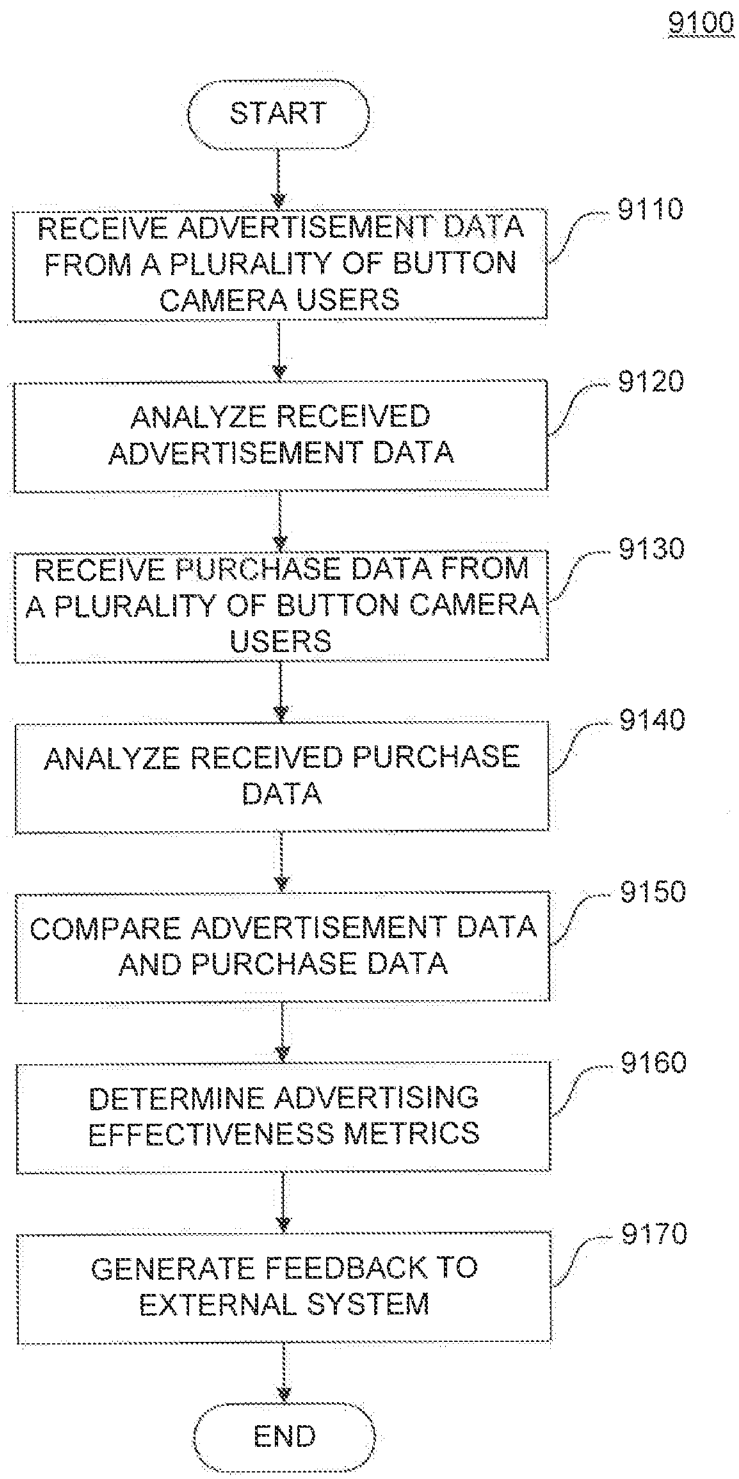
FIG. 91 is an example of a process for analyzing advertisement effectiveness, consistent with disclosed embodiments.

FIG. 91 illustrates an example of a process 9100 for analyzing advertisement effectiveness consistent with certain disclosed embodiments. Process 9100, as well as any or all of the individual steps therein, may be performed by various aspects of apparatus 110, such as processor 210, image sensor 220, action recording module 8801, advertisement detection module 8802, purchase identification module 8803, time information module 8804, or any subcomponents therein. Process 9100 may also be performed by a remote computing system (e.g., server 250) that includes a processing device and a memory 550 containing the same modules as those illustrated in FIG. 88. The remote system (such as server 250) may, in some embodiments, be configured to share a physical casing with apparatus 110 or to share other components of the apparatus. Server 250 may also be capable of executing software instructions to perform actions consistent with disclosed embodiments that are located on non-transitory computer readable media. For exemplary purposes, FIG. 91 is described as being performed by server 250.

A processor associated with server 250 may receive advertisement data from a plurality of wearable camera systems (Step 9110). For example, this may correspond to aggregated feedback (i.e., the assembled purchase information and user information from multiple users 100 generated by feedback generation module 8805 received from multiple individual apparatuses 110 in Step 9070 of process 9000 described previously. Via advertisement detection module 8802, the processor may analyze this aggregated received data (Step 9120), to extract relevant information such as the determined statistics, data and information as described above in association with FIGS. 89A-90.

The processor of server 250 may receive purchase data from a plurality of wearable camera systems (Step 9130). For example, this may correspond to aggregated feedback generated by multiple individual apparatuses 110 in Step 9070 of process 9000 described previously. Via a purchase identification module 8803 and/or a time identification module 8804, the processor may analyze this aggregated received data (Step 9140), to extract relevant information such as the determined statistics, data and information as described above in association with FIGS. 89A-90.

The processor, using any or all of advertisement detection module 8802, purchase identification module 8803, time information module 8804, or any subcomponents therein, or software products on non-transitory computer readable media, may compare the received aggregated, analyzed advertisement data and purchase data from the plurality of wearable camera systems (Step 9150) and may, in the course of the comparison, use the aggregated, analyzed data to determine one or more relevant metrics to determine the effectiveness of a related advertising campaign (Step 9160). Metrics of interest may include, but not be limited to, the number of wearable camera system users that viewed a particular advertisement, the number of products featured in the advertisement that were purchased by wearable camera system users who viewed the advertisement, the amount of time elapsed between the viewing (or recording) of the advertisement by users of a wearable camera system and the purchasing of a featured product, or any other such statistic that may be of interest to an advertiser or a retailer in assessing the effectiveness of an advertising campaign. An advertising campaign may be considered "effective" based on predetermined criteria. For example, the criteria may include, but not be limited to, a particular number of times that the advertisement was viewed, a particular number of products purchased by one or more users who viewed the advertisement, or a particular average time between viewing of the advertisement and purchase of an associated product.

For example, the processor may identify one or more subgroups among the users 100 of the wearable camera systems. The subgroups may be delineated in some embodiments based, at least in part, on the user data derived from captured image data described above in association with FIGS. 89A-90. The subgroups may be based on at least one of demographic information, past behavior of the users 100 or information related to past purchases made by the users 100. Purchase data associated with the users 100 comprising the various subgroups may then be analyzed and compared. For example, via a purchase identification module 8803, the processor may determine how many occurrences of a particular advertisement 8904 were perceived by the users 100 within a particular subgroup. This determined information may provide insight to a location 8908 or a related advertising entity on how much penetration a particular advertisement 8904 may have achieved in a given market of users 100. Purchase identification module 8803 may further determine statistics or other data relating to individual users 100 from within one or more subgroups. In some embodiments, statistics may be determined for users 100 who viewed one or more occurrences of an advertisement 8904 and then went on to purchase a product 8906 associated with the advertisement. In other embodiments, statistics may be determined for users 100 who did not view an advertisement 8904, but who later purchased a related product 8906 regardless. In still other embodiments, statistics may be determined for users 100 who did not view an advertisement 8904 and did not purchase a related product 8906. In yet other embodiments, statistics may be determined for users 100 who viewed an advertisement 8904, but did not purchase a related product 8906.

These determined statistics may be analyzed by the processor, and used to assess the effectiveness (or lack thereof) of a particular advertisement 8904 with respect to subsequent purchases of related product 8906. The processor may be configured to generate feedback via a feedback generation module 8805 to include these analyzed, compiled statistics, data, and information into reports, publications, etc. (Step 9170). The feedback may be provided to location 8908 or other third parties, and may assist in designing future advertisements 8904 or in developing future products 8906. The feedback may contain information about various activities and behaviors performed by user 100 that may be valuable information for the sponsor of the original advertisement 8904. The feedback may be sent to an external computing system associated with the sponsor of the advertisement or to other such retailers. Additionally or alternatively, feedback generation module 8805 may store the feedback in the user's life log, or may make posts on social media associated with the user. In some embodiments, the feedback may be used by an advertiser or retailer to craft additional advertisements for user 100, or to provide user 100 with an incentive offer such as a coupon.

An embodiment consistent with the present disclosure provides a system and a method for providing user 100 with information based on one or more objects and triggers or situations detected within the field of view of apparatus 110. For example, apparatus 110 may be configured to identify a hand-related trigger in real-time image data. Apparatus 100 may further identify in the image data one or more objects associated with the hand-related trigger, as well as a context associated with the object(s) and the hand-related trigger. Based on the hand-related trigger and/or identified context, apparatus 110 may select one of a plurality of alternative actions to execute or feedback to provide. The capability of apparatus 110 to automatically select and execute actions based on an identified trigger may provide user 100 with the opportunity to more efficiently perform certain actions (such as determining the value of currency, selecting a product for purchase, etc.) and fully interact with their surrounding environment.

Figure 92:
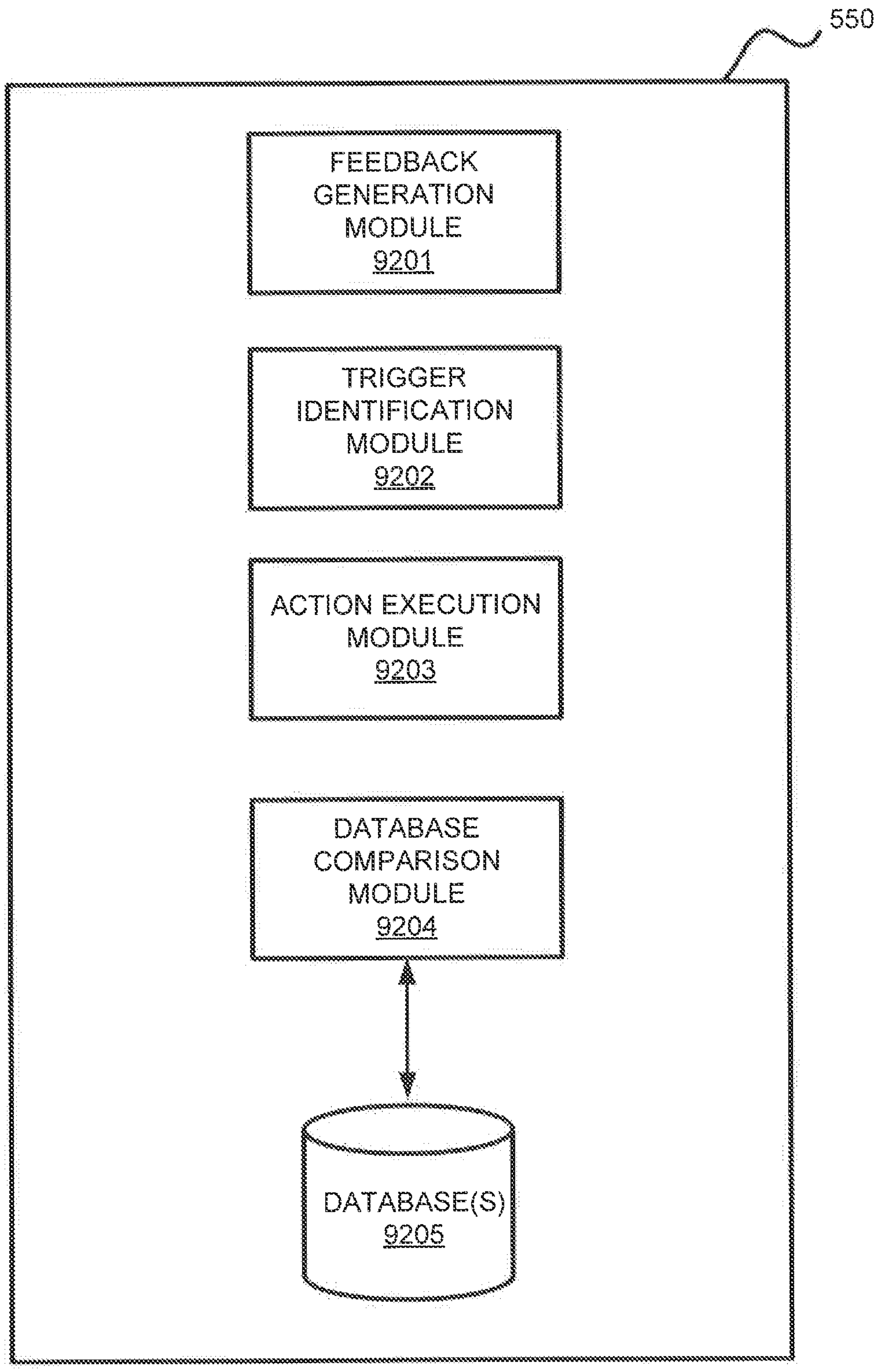
FIG. 92 is a block diagram illustrating an example of a memory contained within an apparatus for providing feedback to a person based on a trigger.

FIG. 92 is a block diagram illustrating a memory (e.g., 550, 550*a*, or 550*b*) associated with apparatus 110 or computing device 120 according to the disclosed embodiments. The memory may include one or more modules, or sets of instructions, for performing a method consistent with the disclosed embodiments. For example, a memory may include instructions for a processor to capture images from an environment of a user via an image sensor, analyze the captured images, identify a hand-related trigger in the analyzed image data, and output feedback of information via one or more available output devices. In the example shown in FIG. 92, memory 550 comprises a feedback generation module 9201, a trigger identification module 9202, an action execution module 9203, a database comparison module 9204, and one or more databases 9205 for performing the functionality of the disclosed methods. The modules shown in FIG. 92 are by example only, and a processor in the disclosed embodiments may operate according to any suitable image analysis and feedback process.

Feedback generation module 9201 may provide functionality for apparatus 110 (or computing device 120) to generate and transmit feedback or information to user 100 in response to an identified hand-related or environmental trigger or some other query. Processor 210 or 540 may execute feedback generation module 9201 to generate and process feedback in a given context, then transmit the generated feedback to feedback-outputting unit 230 or 545 for output to user 100. In some embodiments, processor 210 or 540 and feedback-outputting unit 230 or 545 may be operatively connected via an electrical connection. In other embodiments, processor 210 or 540 and feedback-outputting unit 230 or 545 may be operatively connected via wireless transceiver(s) 530. As discussed above, in some embodiments, feedback generation module 9201 may generate audible or visible feedback to user 100. In other embodiments, the feedback may be tactile in nature, such as a vibration.

Trigger identification module 9202 may provide functionality for apparatus 110 to identify, in real-time, audible or visual triggers that may precipitate a change in an operational status of apparatus 110. As used in this disclosure, a "trigger" may include, for example, the appearance of user 100's hand within the field of view of apparatus 110 in a certain position or while making a pre-defined gesture. Any external stimulus may constitute a trigger, including gestures performed by persons other than the user, and/or auditory signals. In some embodiments, for example, user 100 may be able to audibly say words that serve as triggers, such as "Show," "When," "What," etc. It is understood that these are non-limiting examples. Trigger identification module 9202 may be configured to detect the presence of triggers and cause processor 210 or 540 to execute software instructions that operate apparatus 110 or computing device 120 in a manner associated with the trigger. For example, in the disclosed embodiments, trigger identification module 9202 may be configured to detect a hand-related trigger and cause processor 210 or 540 to output feedback to a user of information related to an object or other condition associated with the hand-related trigger, as described in further detail below.

Action execution module 9203 may provide functionality for apparatus 110 to execute various functions in response to stimuli, be they triggers managed by user 100, the appearance of objects within the field of view of apparatus 110, or other events occurring while apparatus 110 is in operation. Action execution module 9203 may, for example, coordinate the configuration and execution of one or more alternative actions that may be available to apparatus 110 upon positive identification of a hand-related trigger, other triggers, an object, or a particular situation, etc.

Database comparison module 9204 may provide functionality for apparatus 110 to compare objects detected in the user environment to objects and/or categories of said objects in a database, such as database(s) 9205, to be described in detail below. In some embodiments, database comparison module 9204 may derive information from real-time image data received from image sensor 220. In other embodiments, other software elements or processors may derive the information and provide it to database comparison module 9204. For example, processor 210 or 540 may execute database comparison module 9204 to access one or more of the described databases, and compare the information derived from the received real-time image data with information in the databases. If the derived information corresponds to information found in one or more of the databases, database comparison module 9204 may provide an indication to feedback generation module 9201 to that effect, as discussed in further detail below in association with FIGS. 96-98.

Database(s) 9205 may comprise one or more databases that store information and are accessed and/or managed through memory 550 (and/or 550*a*, 550*b*). By way of example, databases 9205 may include document management systems, Microsoft™ SQL databases, SharePoint™ databases, Oracle™ databases, Sybase™ databases, or other relational databases or non-relational databases, such as Hadoop sequence files, HBase, or Cassandra. The databases or other files may include, for example, data and information related to the source and destination of a network request, the data contained in the request, etc. Systems and methods of disclosed embodiments, however, are not limited to separate databases. Databases 9205 may contain software code or macros that facilitate rapid searching and comparison by database comparison module 9204.

Feedback generation module 9201, trigger identification module 9202, action execution module 9203, and database comparison module 9204 may be implemented in software, hardware, firmware, a mix of any of those, or the like. For example, if the modules are implemented in software, they may be stored in memory 550, as shown in FIG. 92. Other components of processing unit 210 or 540 may be configured to perform processes to implement and facilitate operations of the modules. Thus, feedback generation module 9201, trigger identification module 9202, action execution module 9203, and database comparison module 9204 may include software, hardware, or firmware instructions (or a combination thereof) executable by one or more processors (e.g., processor 210 or 540), alone or in various combinations with each other. For example, the modules may be configured to interact with each other and/or other modules of apparatus 110 to perform functions consistent with disclosed embodiments. In some embodiments, any of the disclosed modules (e.g., feedback generation module 9201, trigger identification module 9202, action execution module 9203, and database comparison module 9204) may each include dedicated sensors (e.g., IR, image sensors, etc.) and/or dedicated application processing devices to perform the functionality associated with each module.

As used herein, real-time image data may refer to image data captured in real-time or near real-time. For example, trigger identification module 9202 may monitor the field-of-view of apparatus 110 to detect triggers, such as a hand-related trigger, or other inputs, while action execution module 9203 may determine whether to execute a particular action based on a detected trigger. Accordingly, trigger identification module 9202 and action execution module 9203 may operate in parallel to process captured image data. That is, apparatus 110 may capture and analyze image data in parallel, or may institute a queue-like implementation whereby image data is captured and then analyzed in a continuous fashion (i.e., a first image is captured and analyzed while a subsequent image is captured and then subsequently analyzed).

Figure 93:
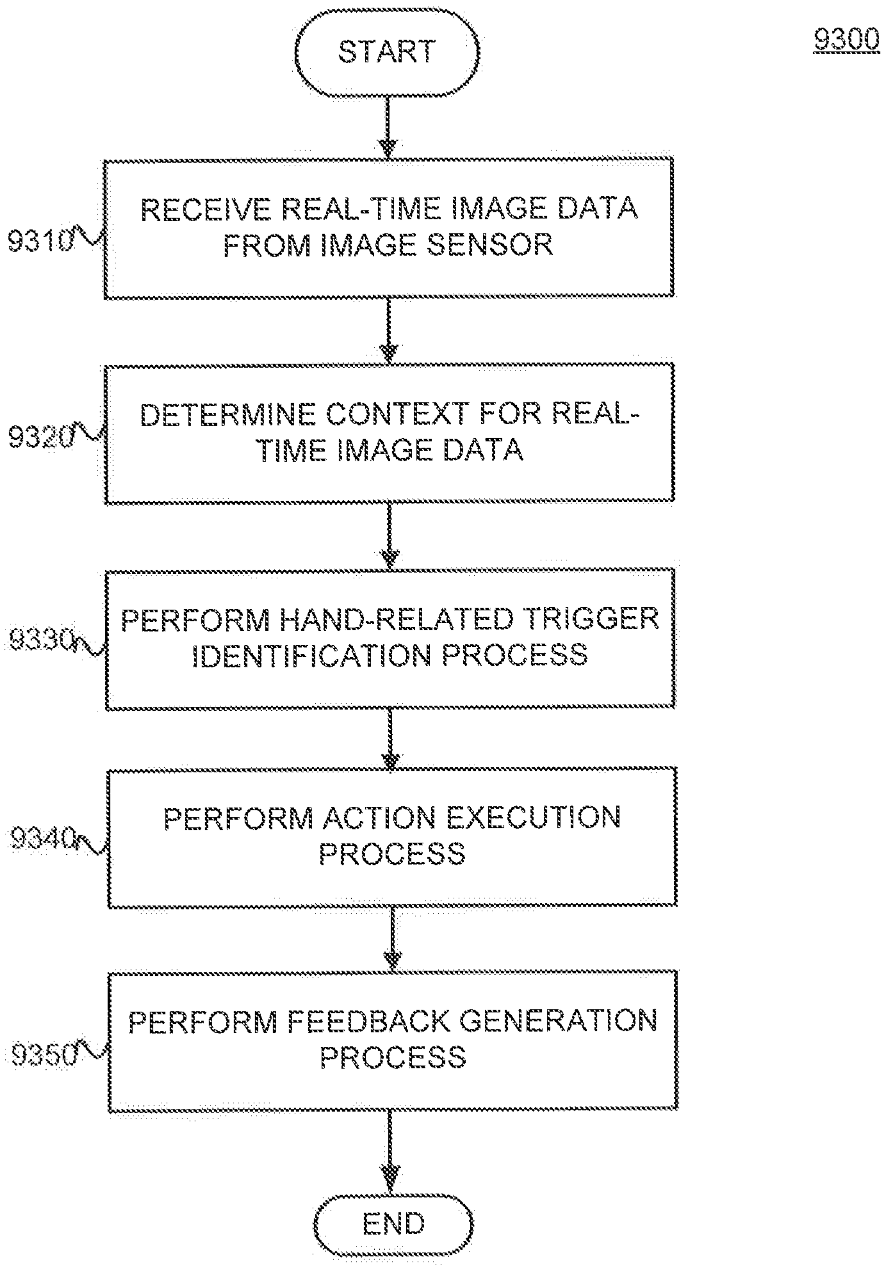
FIG. 93 is an example of a process for providing feedback to a person based on a trigger, consistent with disclosed embodiments.

FIG. 93 illustrates an example of a process 9300 for providing feedback to a person based on captured image data consistent with certain disclosed embodiments. Process 9300, as well as any or all of the individual steps therein, may be performed by various aspects of apparatus 110 and/or computing device 120, and any subcomponents therein. For exemplary purposes, FIG. 93 is described as being performed by processor 210 or 540, executing software instructions stored within memory 550.

Processor 210 or 540 may receive real-time image data from an image sensor, such as image sensor 220 (Step 9310). In other embodiments, processor 210 or 540 may receive the image data from an intermediate component associated with image sensor 220. The intermediate component may, for example, perform image processing operations on the real-time image data before transmitting it to processor 210 or 540. In some embodiments, the real-time image data may be received as a single streaming video file. In other embodiments, the real-time image data may be received as a series of still images. When the image data is received, processor 210 or 540 may store the data in memory 550 or database(s) 9205.

Processor 210 or 540 may determine a context for the received real-time image data based on stored information that facilitates the execution of one or more actions (Step 9320). In some embodiments, processor 210 or 540 may execute software instructions to process the representations of one or more objects or gestures detected in the real-time image data. In some embodiments, the processing may comprise image processing, such as image rotation, a change in the size of the image, image sharpening, cropping the image, enhancing the focus, etc. It is understood that these are non-limiting examples and that any manner of image processing may be applied to the real-time image data. In other embodiments, the processing may comprise optical character recognition (OCR), when the real-time image data comprises numerals or text. In some embodiments, the optical character recognition may facilitate recognition of the visualized text by processor 210 or 540, and facilitate formation of a search query for a database containing object information. Processor 210 or 540 may further derive or determine any other information contained in the received real-time image data relating to the context of the image, such as date, time, geographical location, etc. In some embodiments, processor 210 or 540 may derive information based on a plurality of images, so as to determine whether a motion or gesture is captured in the image data.

In Step 9330 of process 9300, processor 210 or 540 may perform a hand-related trigger identification process (via trigger identification module 9202, for example), similar to the process described below in connection with FIG. 96. In brief, according to some embodiments, trigger identification module 9202 may configure components of apparatus 110, such as image sensor 220 and/or other components of apparatus 110, to operate in a "ready mode" for trigger detection. Trigger identification module 9202 may determine if any external trigger, visible or auditory, is received. In some embodiments, trigger identification module 9202 may determine if a hand is present in the real-time image data and whether the hand is associated with user 100. In some embodiments, trigger identification module 9202 may determine if a motion of a user's hand corresponds to a hand-related trigger. Additionally, trigger identification module 9202 may determine whether other features of a hand-related trigger are present in the image data, such as a pointing finger, a fist, outstretched fingers or other particular manipulations of the fingers or hand, etc. If the user's hand (or other hand-related trigger or gesture) is present, trigger identification module 9202 may determine the hand-related trigger, if any, that is represented in the real-time image data, as well as any objects associated with the hand-related trigger. Trigger identification module 9202 may further determine one or more data categories associated with the determined hand trigger.

Processor 210 or 540, via action execution module 9203, may perform an action execution process, such as is described below in connection with FIG. 97 (Step 9340). In brief, according to some embodiments, action execution module 9203 may determine an object associated with a hand-related trigger identified in received real-time image data. Action execution module 9203 may also determine a context associated with the object. Based on the identified hand-related trigger and context, action execution module 9203, in conjunction with database comparison module 9204, may determine context-based alternative actions associated with the trigger and the identified object. Action execution module 9203 may select one or more of the determined context-based alternative actions, and then execute the selected action(s).

In some embodiments, one or more actions associated with the identified hand-related trigger may be performed if a determined time-component meets or exceeds a pre-defined or programmable threshold. For example, when the image data includes a video stream, one or more actions may be performed when the hand-related trigger appears in the image data for at least two or three seconds, or more. In another example, when the image data includes a still image, one or more actions may be performed when the hand-related trigger appears in three or more consecutive images. The threshold number of consecutive images may be determined based on a capture rate of image data, and thus may be many more than three images in some embodiments. For example, the threshold number of images may correspond to the number of images that may be captured in a two or three second duration similar to the above video stream example. When it is determined that a threshold associated with the determined time component has not been met, process 9340 may withhold performing an action until a future hand-related trigger satisfies the threshold.

Processor 210 or 540, via feedback generation module 9201, may perform a feedback generation process, such as is described below in connection with FIG. 98 (Step 9350). According to some embodiments, feedback generation module 9201 may receive information associated with one or more hand-related triggers identified in the real-time image data. Feedback generation module 9201 may determine visible and/or audible or other feedback for output to user 100. Feedback generation module 9201 may configure the feedback, and then provide the feedback to feedback-outputting unit 230 or 545 for output to user 100.

Figure 94A:
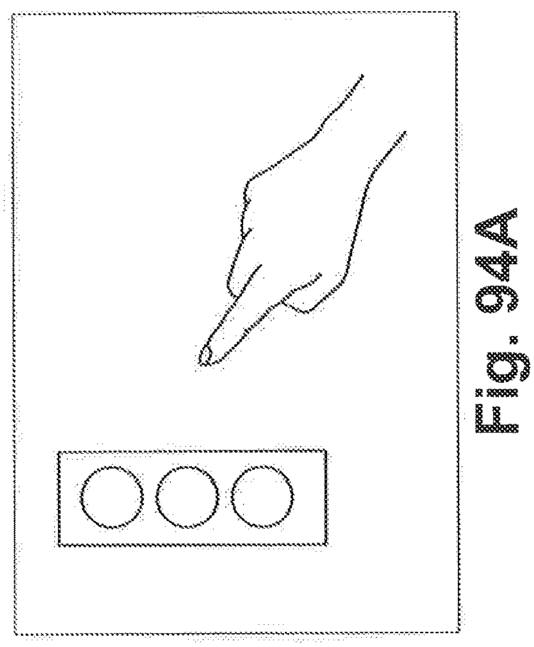
FIG. 94A is an example illustration of a hand-related trigger for an apparatus for providing feedback to a person based on a trigger, consistent with disclosed embodiments.

FIGS. 94A-94D illustrate examples of hand-related triggers, consistent with certain disclosed embodiments. FIG. 94A illustrates an example field of view of image sensor 220. In the example of FIG. 94A, a hand of a user, such as user 100, is present within the field of view, and is pointing at an object. In this example, the object is a stoplight, but the object can be any object that may be present in the environment surrounding user 100 while using apparatus 110. In some embodiments, a "pointing" hand trigger as illustrated in FIG. 94A may result in execution of one or more actions relating to the object being pointed at. For example, when user 100 points at a stoplight, as in FIG. 94A, apparatus 110 may detect the action (as will be described below), and audibly announce the status of the stoplight (i.e., "GREEN," "RED," etc.).

In other embodiments, a pointing hand trigger may permit apparatus 110 to perform numerous other actions and/or provide numerous types of information related to an object associated with the pointing hand trigger. Some of those actions include, but are not limited to, announcing the name of a familiar landscape or a familiar object, outputting other information regarding the landscape or object, announcing route information for a public transportation vehicle, audibly reading text, or audibly recognizing a food item or a pharmaceutical. A pointing hand trigger may be used in disclosed embodiments for any action that provides more information about an object within the field of view of apparatus 110. Additionally, in some embodiments, other actions and information may be provided based on an identified object and a hand-related trigger. Some actions may include identifying the value of currency held by a user, determining the difference in the currency and a price of an object, determining time information associated with an object such as the number of minutes remaining until the next bus arrives, as well as numerous other actions contemplated by the present disclosure.

Figure 94B:
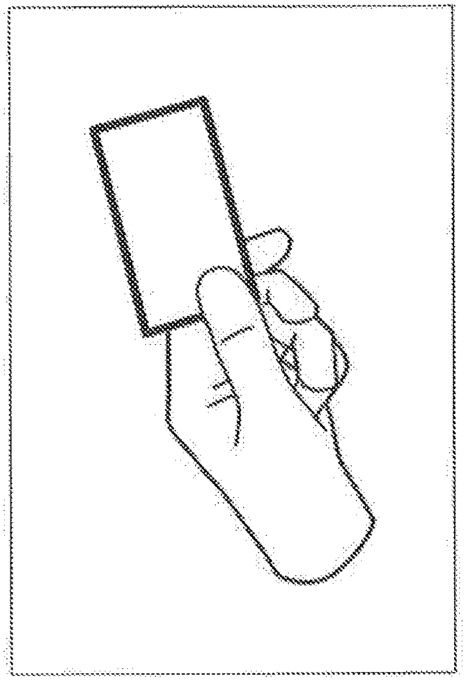
FIG. 94B is an example illustration of a hand-related trigger for an apparatus for providing feedback to a person based on a trigger, consistent with disclosed embodiments.

FIG. 94B illustrates another example field of view of image sensor 220. In the example of FIG. 94B, a hand of a user, such as user 100, is present within the field of view, and is holding an object. In this example, the object is a piece of paper containing text, but the object can be any object that may be present in the environment surrounding user 100 while utilizing apparatus 110. In some embodiments, a "holding" hand trigger as illustrated in FIG. 94B may result in execution of one or more actions relating to the object being held. For example, when user 100 holds a document or any other item containing text, as in FIG. 94B, apparatus 110 may detect the action (as will be described below), and audibly read the text on the document. In other embodiments, a holding hand trigger may permit apparatus 110 to perform other actions, including, but not limited to, announcing the name of a familiar object that is being held, managing database entries for objects (i.e. removing an item as being recognized, editing audible feedback for an item, etc.), or prompting the user to name an item if the held item is an unfamiliar item. A holding hand trigger may be used in disclosed embodiments for any action that provides more information about an object within the field of view of apparatus 110.

Figure 94C:
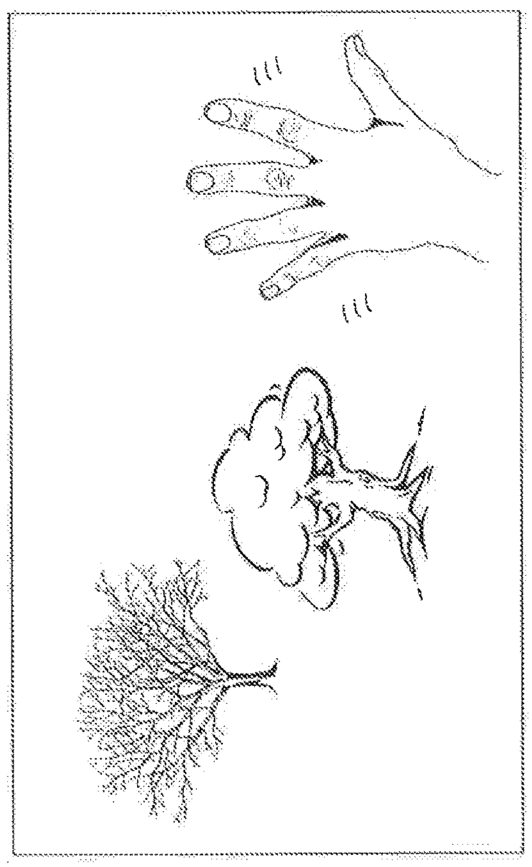
FIG. 94C is an example illustration of a hand-related trigger for an apparatus for providing feedback to a person based on a trigger, consistent with disclosed embodiments.

FIG. 94C illustrates another example field of view of image sensor 220 of apparatus 110. In the example of FIG. 94C, a hand of a user, such as user 100, is present within the field of view, and is waving. In this example, the hand of user 100 is waving in a landscape. In embodiments such as these, a "waving" hand trigger as illustrated in FIG. 94C may result in execution of one or more actions relating to an object or landscape in the field of view when user 100 waves. For example, when user 100 waves at a landscape that is familiar, apparatus 110 may detect elements of the familiar landscape (as will be described below), and audibly identify the location. In other embodiments, a waving hand trigger may permit apparatus 110 to perform other actions, such as prompting the user to identify an unfamiliar landscape when the user waves in an area that apparatus 110 is not familiar with. In some embodiments, waving hand triggers may be associated with pre-programmed landscapes, and landmarks from the landscapes may be stored in memory 550 or database(s) 9205. In these embodiments, for example, user 100 may be able to participate in a guided tour of a tourist attraction. In other embodiments, apparatus 110 may be configured to learn landscapes over time by prompting user 100 for information. A waving hand trigger may be used in disclosed embodiments for any action that provides more information about an object within the field of view of apparatus 110.

Figure 94D:
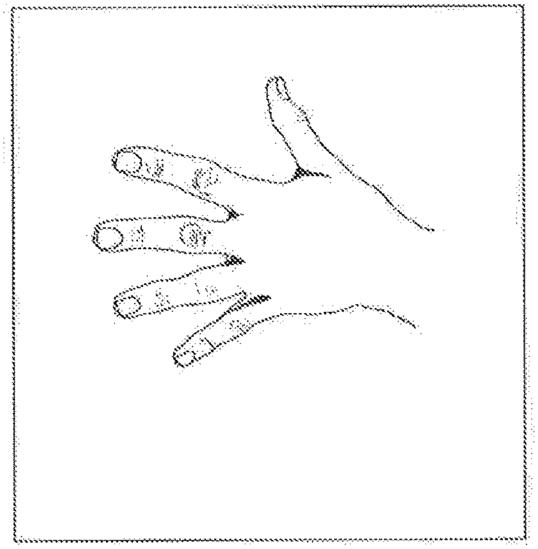
FIG. 94D is an example illustration of a hand-related trigger for an apparatus for providing feedback to a person based on a trigger, consistent with disclosed embodiments.

FIG. 94D illustrates another example field of view of image sensor 220 of apparatus 110. In the example of FIG. 94D, a hand of a user, such as user 100, is present within the field of view, and is outstretched in a "stop sign" position. In embodiments such as these, a "stop" hand trigger as illustrated in FIG. 941) may result in execution of one or more actions relating to an object or landscape in the field of view when user 100 presents their hand in this manner. For example, when user 100 presents a stop sign hand trigger during any ongoing operation or action associated with apparatus 110, the apparatus may be configured to immediately terminate the ongoing operation. In other embodiments, the stop sign hand trigger may serve as a "reset" for apparatus 110, or may be configured to help present user 100 with information about the status of the apparatus. In some embodiments, the stop sign hand trigger may serve to lock the user's home and/or turn on an alarm system, or perform any other of numerous actions based on a desired configuration.

The above described hand-related triggers and the associated actions are provided by way of example only. In some embodiments, the identified hand-related triggers may be pre-defined or programmed based on a user's particular preference and/or to perform any number of beneficial actions in addition to or alternative to the above. Additionally, the actions associated with any one or more recognizable hand-related triggers may also be pre-defined or programmed based on a user's particular preference.

Other possible hand-related triggers and variations or combinations of the above-described hand-related triggers are also contemplated by the present disclosure. For example, any configuration of a hand or manipulation of the fingers of a hand or other hand gestures may serve as a hand-related trigger. For example, any recognizable configuration of a hand may serve as a trigger, including a fist, one or more splayed fingers, or any other repeatable and recognizable positioning or manipulation of the fingers to form a gesture may also serve as a trigger. In some embodiments, both hands may be controlled or manipulated to function as a hand-related trigger. Additionally, any recognizable configuration of a hand and/or determined movement of the hand may also serve as a hand-related trigger. For example, in some embodiments, a hand-related trigger may comprise an erratic or atypical movement of the wrist or hand or of an object associated with the hand. Other recognizable hand movements, such as motion in a circular pattern, or movement or swiping in an up and down or sideways pattern or any other recognizable pattern may serve as a hand-related trigger.

Additionally, in some embodiments, a hand-related trigger may be defined by a dwell time, such as a predefined duration (e.g. 0.5, 1, 2, 3 seconds, etc.) for which a hand-related trigger is identified in the image data. In some embodiments, one or more of the above-described hand-related triggers may be combined to form a hand-related trigger. Other analysis of a hand-related trigger may also be performed. For example, in some embodiments, processor 210 or 540 may identify a particular orientation of a user's hand such as recognition of a palm or the backside of a hand, as well whether the hand is a left or right hand.

In some embodiments, a determination as to whether to perform an action based on an identified hand-related trigger may be made based on a confidence score applied to one or more of the identified hand-related triggers. For example, in some embodiments, an action may be executed and/or feedback of information to a user 100 may be performed if a confidence score meets or exceeds some predetermined threshold. In some embodiments, the confidence score may be based on a degree of certainty that the hand that is detected in the analyzed image data corresponds to a hand-related trigger. Certain of the above described hand-related triggers may correspond to a greater confidence score based on the nature of the hand-related trigger. For example, in the embodiments shown in FIG. 94A the presence of a hand manipulated with a pointing finger and an associated object may correspond to a greater confidence score than detection of a hand portion by itself. Additionally, hand triggers that include a configuration of the hand and a particular movement may also correspond to a higher confidence score than a trigger associated with a hand configuration and no movement. A confidence score for one or more of the above described hand-related triggers may be combined when the triggers are identified within a set period of time, for example. Other contextual information analyzed in the image data or other external information such as an audible trigger may also be taken into consideration when determining a confidence score for a detected hand-related trigger.

In the disclosed embodiments, the detection of any of a variety of hand-related triggers of a user 100 of apparatus 110 may result in an associated action or set of actions. In some embodiments, apparatus 110 may include additional capability to distinguish between a hand-related trigger of a user 100 of apparatus 110 and a hand-related trigger associated with a person other than the user 100 so as to provide feedback to a user based on triggers associated with the user 100. In some environmental situations, it may be beneficial to distinguish between a hand-related trigger associated with a user 100 and a person other than the user. For example, in some situations where user 100 is interacting closely with another person in a meeting or in conversation, or other situations, such as on public transportation or in a grocery store where user 100 is closely positioned near one or more other persons, systems without the ability to distinguish between a hand-related trigger of user 100 and a person other than the user may provide unintended or unwanted feedback to a user based on triggers not associated with the user. Thus, in some embodiments, processor 210 or 540 may perform an action or provide feedback that is determined to be intended by user 100 based on a determination that the hand-related trigger is associated with user 100.

In some embodiments, additional processing to identify whether the hand-related trigger is associated with user 100 may be performed in particular situations in which other persons are present. Processor 210 or 540 may determine whether a current situation involves one or more persons other than a user based on analyzed image data or other external data. For example, when one or more other persons are detected in analyzed image data, processor 210 or 540 may perform additional analysis to determine whether a hand-related trigger is associated with a user 100. In these situations, when a detected hand-related trigger is determined to be associated with a person other than the user 100 of apparatus 110, it may be beneficial to selectively withhold or forgo performing any action that may otherwise result from the detected hand-related trigger.

Figure 95A:
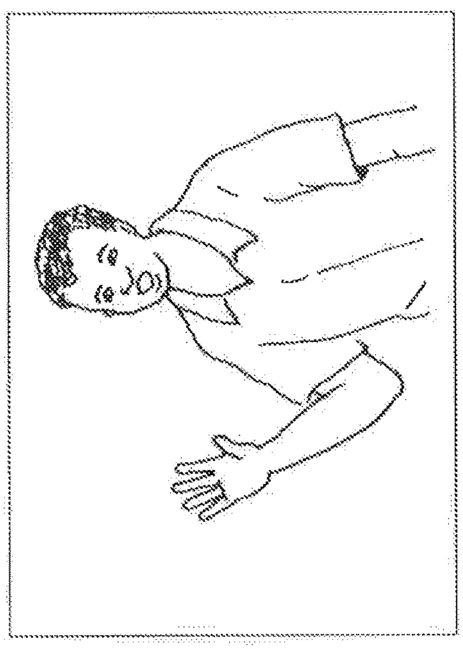
FIG. 95A is an example illustration of a hand-related trigger associated with a person other than the user of an apparatus for providing feedback to a person based on a trigger, consistent with disclosed embodiments.
Figure 95B:
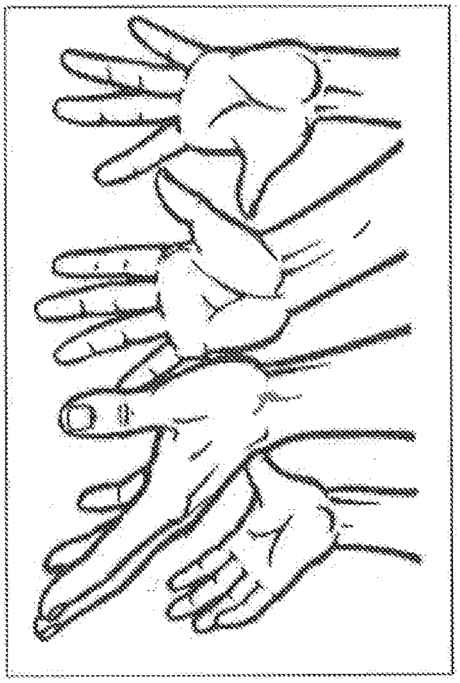
FIG. 95B is an example illustration of a hand-related trigger associated with a person other than the user of an apparatus for providing feedback to a person based on a trigger, consistent with disclosed embodiments.
Figure 95C:
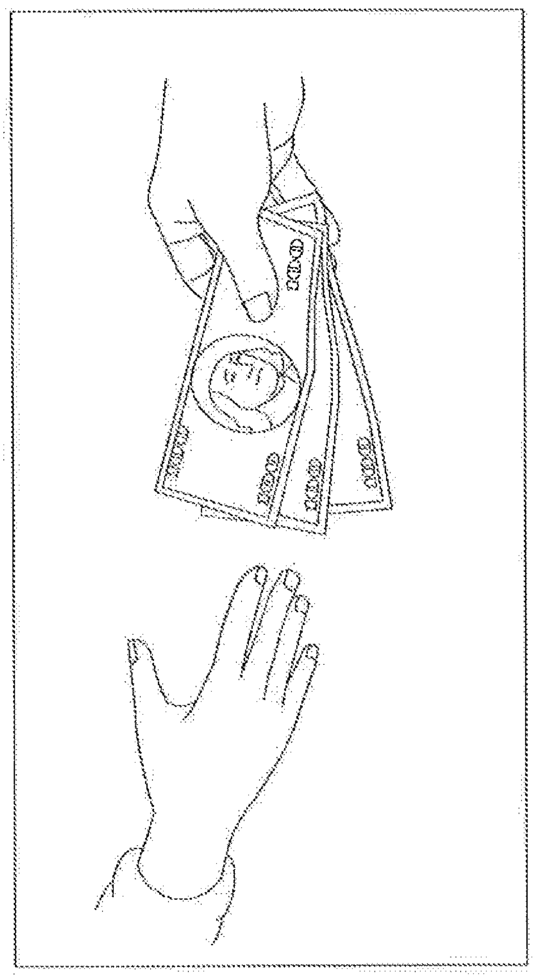
FIG. 95C is an example illustration of a hand-related trigger associated with a person other than the user of an apparatus for providing feedback to a person based on a trigger, consistent with disclosed embodiments.

FIGS. 95A-95C illustrate examples of identified hand portions related to a hand-related trigger associated with persons other than a user of apparatus 110, consistent with certain disclosed embodiments. For example, as shown in FIG. 95A, one such hand-related trigger may include a raised hand of one or more persons in an environment for hailing a cab on the street, waving to another person or getting someone's attention. In many environmental situations, a user 100 of apparatus 110 may be closely positioned near or in the vicinity of other individuals such that another person's hand (i.e. not the user's hand) may be in the field of view of user 100 and may be motioned similar to a known hand-related trigger.

Other hand-related triggers associated with another person are shown in FIG. 95B. As shown in FIG. 95B, a hand of one or more persons other than the user 100 of apparatus 110 may be detected in the field of view of user 100. In some embodiments, a hand of the other person may be in close proximity to user 100, as shown. For example, one or more hand portions in close proximity may be detected at a concert or sporting event or other event when user 100 is part of a crowd of people. Many other situations are contemplated in which one or more hand-related triggers associated with a person other than the user 100 may be detected in the field of view of user 100. For example, any situation where user 100 is interacting with another person in a meeting or in conversation, or other situations, such as on public transportation or in a grocery store, where user 100 is closely positioned near one or more other persons could provide a situation in which it is beneficial to forgo an unintended action based on an identified hand-related trigger of a person other than user 100.

In some situations, such as one shown in FIG. 95C, a hand of user 100 may be identified in the field of view of image sensor 220 along with the hand of a person other than user 100. In these situations, it may also be beneficial to determine whether one or more of the identified hands is associated with a hand-related trigger performed by user 100 and determine whether to forgo an action based on the identified hand portions. For example, in the situation shown in FIG. 95C, user 100 associated with apparatus 110 may be holding currency with his right hand and offering the currency to another person whose hand is shown on the left side of the figure. Similar to the embodiments described above with respect to FIGS. 94A and 94B, in some situations, user 100 may intend to perform an action or receive feedback regarding the value of the held currency, based on a hand-related trigger. The hand-related trigger may be associated with holding the currency in the field of view of image sensor 220 as shown (similar to FIG. 94B) or may also include a pointing hand trigger pointing to the currency. In the situation shown in FIGS. 94A-95C, however, user 100 may not intend for apparatus 110 to perform an action associated with a hand-related trigger. Thus, in some embodiments, apparatus 110 may recognize the presence of a hand belonging to a person other than user 100 and determine whether to forgo action based on the identified hand and/or a determined context. In some embodiments, the hand of a person other than user 100 may be positioned or configured as a known hand-related trigger, but because the hand is determined to belong to a person other than user 100, no hand-related trigger action is to be performed. In some embodiments, an action may be withheld based on the identification of a hand other than that of a user 100, whereas in other embodiments, the identification of a hand other than user 100 may affect a confidence score used to determine whether to perform an action associated with the identified hand-related trigger.

In some embodiments, as discussed below with respect to FIG. 96, it may thus be beneficial to determine whether a hand-related trigger is associated with a user 100 before determining whether to perform a particular action.

Figure 96:
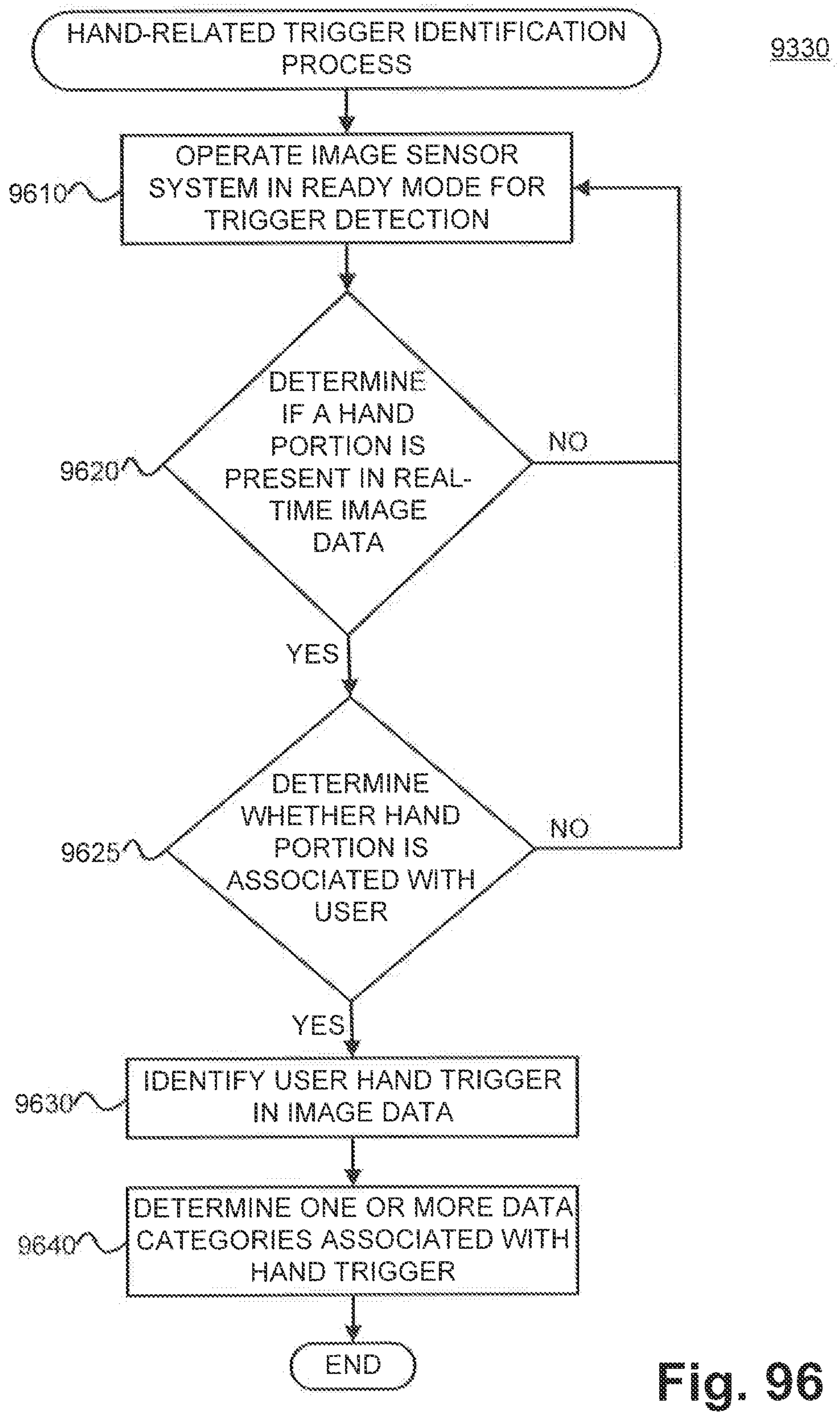
FIG. 96 is an example of a hand-related trigger identification process, consistent with disclosed embodiments.

FIG. 96 illustrates an example hand-related trigger identification process such as that described above in association with Step 9330 of process 9300 consistent with certain disclosed embodiments. Process 9330, as well as any or all of the individual steps therein, may be performed by various aspects of device 110, computing device 120, or any subcomponents therein. For exemplary purposes, FIG. 96 is described as being performed by processor 210 or 540, executing software instructions stored within memory 550.

Processor 210 or 540, via trigger identification module 9202, may operate image sensor 220 in a normal manner, or "ready mode," while awaiting trigger detection (Step 9610). In some embodiments, apparatus 110 may be configured to always operate in a ready mode when no operations are active. In other embodiments, user 100 may be able to place apparatus 110 into a ready mode such that a hand trigger (or any external trigger, visible or auditory) may be detected.

While in ready mode, trigger identification module 9202 may determine if at least a portion of a hand is present in the real-time image data (Step 9620). The hand may correspond to the hand of user 100 or the hand of another person. In some embodiments, trigger identification module 9202 may be configured to recognize the particular hand of the user 100 that is operating apparatus 110. In these embodiments, apparatus 110 may initially prompt user 100 to mime various hand triggers. Trigger identification module 9202 may capture images of the user's hand and various hand triggers and store them in one or both of memory 550 or database(s) 9205 for ready recognition in the future. In alternative embodiments, trigger identification module 9202 may not be configured to recognize a particular hand, and may be preconfigured to recognize any hand, similar appendage, or equivalent substitute. In some embodiments, trigger identification module 9202 may be configured to recognize the shape of a hand when it is covered in a glove, mitten, or other covering.

If no hand is detected as present in the real-time image data (Step 9620: NO), trigger identification module 9202 may configure image sensor 220 to continue to operate in ready mode, waiting for a future trigger. If a hand is determined to be present (Step 9620: YES), then trigger identification module 9202 may determine if the hand is associated with the user 100 of apparatus 110 (Step 9625). In some embodiments, Step 9625 may be include determining, from the analyzed image data, whether one or more other persons may be present. For example, in some situations where it may be determined that the user 100 is alone, additional image processing in Step 9625 may be selectively bypassed.

In some embodiments, as part of step 9625, trigger identification module 9202 may analyze the captured image data to determine whether the identified hand is associated with user 100. Trigger identification module 9202 may consider a number of image data aspects and features for the determination consistent with the disclosed embodiments, including identifying whether the hand matches that of stored images of a user's hand, identifying a context or orientation of the detected hand, assessing the environment for the presence of others, determining whether the hand is associated with a body in the field of view, determining an amount of space that the detected hand portion occupies in an image, and determining a distance of the detected hand from the apparatus 110. A determination may also be made based on one or more other criteria, including, for example, a confirmation or rejection signal from user 100, or other external information such as an auditory signal, as well as historical information regarding the environmental situation or other learned and/or programmed assessments of the situation. In some embodiments, a determination as to whether the identified hand is associated with user 100 may be a multiple step process beginning with a threshold determination, for example, and then additional image analysis if necessary.

In some embodiments, trigger identification module 9202 may determine whether a detected hand region is associated with user 100 based on whether the detected hand region occupies a threshold amount of space in at least one image of the analyzed image data. The threshold amount of space may be predefined or learned and programmed based on a number of test images of a hand of user 100, for example. In some embodiments, the predefined threshold of space that a user's hand occupies in an image to be associated with user 100 may be defined as at least ten percent or twenty percent (or more) of the image. Other thresholds may be used based on various characteristics of user 100, such as size or age. In some embodiments, a threshold amount of space may be based on a predefined or learned hand-related trigger.

Additionally, a size of the detected hand may also be determined to identify whether the hand is associated with user 100. A size of the hand may be based on the relative size of the detected hand portion in comparison to an anticipated size. In some embodiments, a size of the detected hand portion may be based on the relative size of the detected hand in comparison with a known size of one or more other detected objects identified in the field of view, such as a car, a sign, a product, a tree, a landmark, or the figure of a person, etc. In some embodiments, the comparison may be based on information known regarding the identified objects stored in database 9205, for example. In another embodiment, the determination may be based on a distance of the detected hand from user 100. Trigger identification module 9202 may determine an approximate distance of the detected hand from apparatus 110 based on the comparison with known sizes of other objects. Numerous other ways of determining a distance of a hand region away from a user are contemplated by the present disclosure.

Other image processing techniques based on known parameters of image sensor 220 may also be used to determine the size and distance of the detected hand from the image sensor 220. Additionally, in some embodiments in which a first image sensor 220*a* and a second image sensor 220*b* (such as shown in FIG. 5B) are implemented, the image data from the two image sensors may be analyzed using known techniques to determine the distance of the detected hand from the image sensor. Other known techniques based on an infrared proximity sensor or other optical distance sensors, and/or an ultrasonic distance sensor, for example, may also be used to determine the distance of a detected object from the sensor. For example, any known sensor technology for determining distance based on a reflected or received signal may be implemented in apparatus 110.

When the amount of space occupied by the hand portion or the size of a hand portion is less than a predetermined threshold or an approximate distance of the hand portion meets or exceeds a predetermined threshold, trigger identification module 9202 may determine that the detected hand is associated with a person other than user 100 (Step 9625: NO). As a result, trigger identification module 9202 may withhold or forgo any action based on the detected trigger and return to Step 9610 such that image sensor 220 continues to operate in ready mode, waiting for a future trigger. Thus, in some embodiments, trigger identification module may selectively execute certain actions based on a determination that a detected hand trigger is associated with a user 100.

In some embodiments, trigger identification module 9202 may perform additional image analysis to determine whether a detected hand is associated with user 100 when the detected hand corresponds to or exceeds a threshold percentage (e.g., ten percent, twenty percent, thirty percent, forty percent, fifty percent, or more, etc.) of the entire field of view, or a size of the hand portion exceeds a size threshold, or a determined distance is less than a threshold. For example, with respect to FIG. 95A, trigger identification module 9202 may initially determine that identified hand portion does not meet a required threshold percentage to be associated with user 100 and no further analysis may be performed. With respect to FIGS. 95B and 95C, however, the identified hand portions may meet or exceed a threshold for being associated with user 100, based on a size of a hand portion or the percent of entire field of view occupied by a hand portion. In these situations, trigger identification module 9202 may perform additional image analysis to determine whether the identified hand portions are associated with user 100.

In some embodiments, trigger identification module 9202 may determine whether a detected hand portion is associated with a body in the field of view of image sensor 220. For example, trigger identification module 9202 may determine that the detected hand portion is associated with a person other than user 100 if it is determined that the hand is associated with a body other than the user's. In some embodiments, even though the detected hand is associated with a person other than user 100, trigger identification module 9202 may proceed under the "YES" determination of Step 9625 based on an identified identity and/or familiarity of the detected person or based on other learned situations.

Trigger identification module 9202 may also determine whether the detected hand portion matches that of stored images of a user's hand. In some embodiments, the determination may be based on identifying various features of a user's hand as may be determined based on a comparison with stored images of the user's hand. The stored images of the user's hand may include a plurality of images of the user's hand from various angles or in different positions, including positions or manipulations associated with one or more hand-related triggers. Some identifying features may include the general appearance of the user's hand, as well as the presence of a ring on a particular finger, a tattoo, or a bracelet or wristwatch or other object typically associated with user 100 or characteristic identifying user 100. Other image analysis may be performed to identify a context or orientation of the detected hand portion to determine whether such a context or orientation may be consistent with a user 100. For example, with respect to FIG. 95C, trigger identification module 9202 may determine that the hand portion shown in the left side of the FIG. 95C is not positioned at an orientation that would be natural for user 100. As such, based on the image analysis, trigger identification module 9202 may determine that the hand portion shown in the left side of FIG. 95C is not associated with user 100.

The above techniques for determining whether a user's hand is identified in analyzed image data are exemplary only. Other similar techniques for identifying a user's hand are contemplated by the present disclosure. In some embodiments, one or more of the above techniques may be combined to determine whether an identified hand portion is associated with user 100. In some embodiments, trigger identification module 9202 may apply a weighting or confidence score to a particular analysis to aid in the determination. For example, any one or more image analysis techniques as described above (or similar to those described) may be performed to determine whether a hand portion is associated with user 100. The result of an analysis may be associated with a weight or confidence score corresponding to the likelihood that the outcome of the analysis may be determinative. In some embodiments, a confidence score may be based on the results of one or more determinations. If a confidence score is met or exceeded, trigger identification module 9202 may determine that the identified hand portion belongs to a person other than user 100.

If trigger identification module 9202 determines that the detected hand portion is associated with the user 100 of apparatus 110 (Step 9625: YES) then trigger identification module 9202 may determine if the hand is performing a recognized hand-related trigger gesture (Step 9630). For example, a hand-related trigger gesture may be defined by a position of the hand in the field of view, as well as a formation of or manipulation of the fingers of the hand. In some embodiments, a hand-related trigger gesture may include a pointing trigger pointing to an object. Examples of possible hand-related triggers are discussed above in association with FIGS. 94A-94D, but additional hand actions may be recognized by trigger identification module 9202. In some embodiments, as discussed above, a hand-related trigger may comprise an erratic or atypical movement of an object associated with the hand. For example, the hand of user 100 may point and track an erratic or atypically moving object, or may be holding an object, and waving it in an erratic or atypical manner. Trigger identification module 9202 may interact with database comparison module 9204 to search a database, such as database 9205, for recognized hand triggers and objects associated with a hand-related trigger. As similarly discussed above, trigger identification module 9202 may determine whether a hand-related trigger is present based on a confidence score associated with the identified hand-related image data.

The identified user hand-related trigger may then be used to determine one or more data categories associated with the determined hand-related trigger (Step 9640). For example, processor 210 or 540 may determine context information associated with the environment surrounding user 100, and may, along with the determined hand-related trigger, use the information to determine particular categories to search. For example, user 100 may be standing at an intersection desiring to cross the street. Apparatus 110 may detect this scenario as the current setting. Processor 210 or 540 may perform a variety of different alternative actions (via action execution module 9203) based on a particular hand-related trigger recognized by trigger identification module 9202. For example, one type of hand-related trigger may signal to trigger identification module 9202 that the category to search for is "warning of risks." As will be discussed further below, apparatus 110 may then scan the field of view for objects and then scan the database for matching objects that may represent risks to user 100. In some embodiments, multiple categories may be associated with a given hand trigger in a given context. For example, in the scenario just described, warning of risks may comprise a first category, and a second category may be "scene identification." Numerous combinations of categories are contemplated for various triggers and contexts. For example, in an alternative embodiment, "spatial guidance" may be the first category, and "warning of risks" may be the second category. Categories may be fluid based on current configuration of apparatus 110 at any given time. In some embodiments, the category may be based on the determination that the detected hand-related trigger is associated with another person familiar to user 100. One skilled in the art may contemplate many possible categories of data and contexts in which they could be invoked or sorted.

While process 9330 of FIG. 96 illustrates determination of whether a hand portion is associated with user 100 (Step 9625) prior to identifying the user hand-related trigger (Step 9630), in some embodiments, the steps may be arranged in a different order. For example, a determination whether a hand-related trigger is present may be made prior to analyzing whether a detected hand portion is associated with user 100. In some embodiments, the steps may be combined such that determination as to whether a detected hand portion is associated with a user 100 may be used to calculate a confidence score to determine whether a hand-related trigger is present in the image data. For example, where one or more other persons are identified in the image data, a confidence score for any hand-related trigger may be adjusted (or the threshold may be adjusted), such that a greater confidence is needed to perform an action associated with an identified hand-related trigger.

Figure 97:
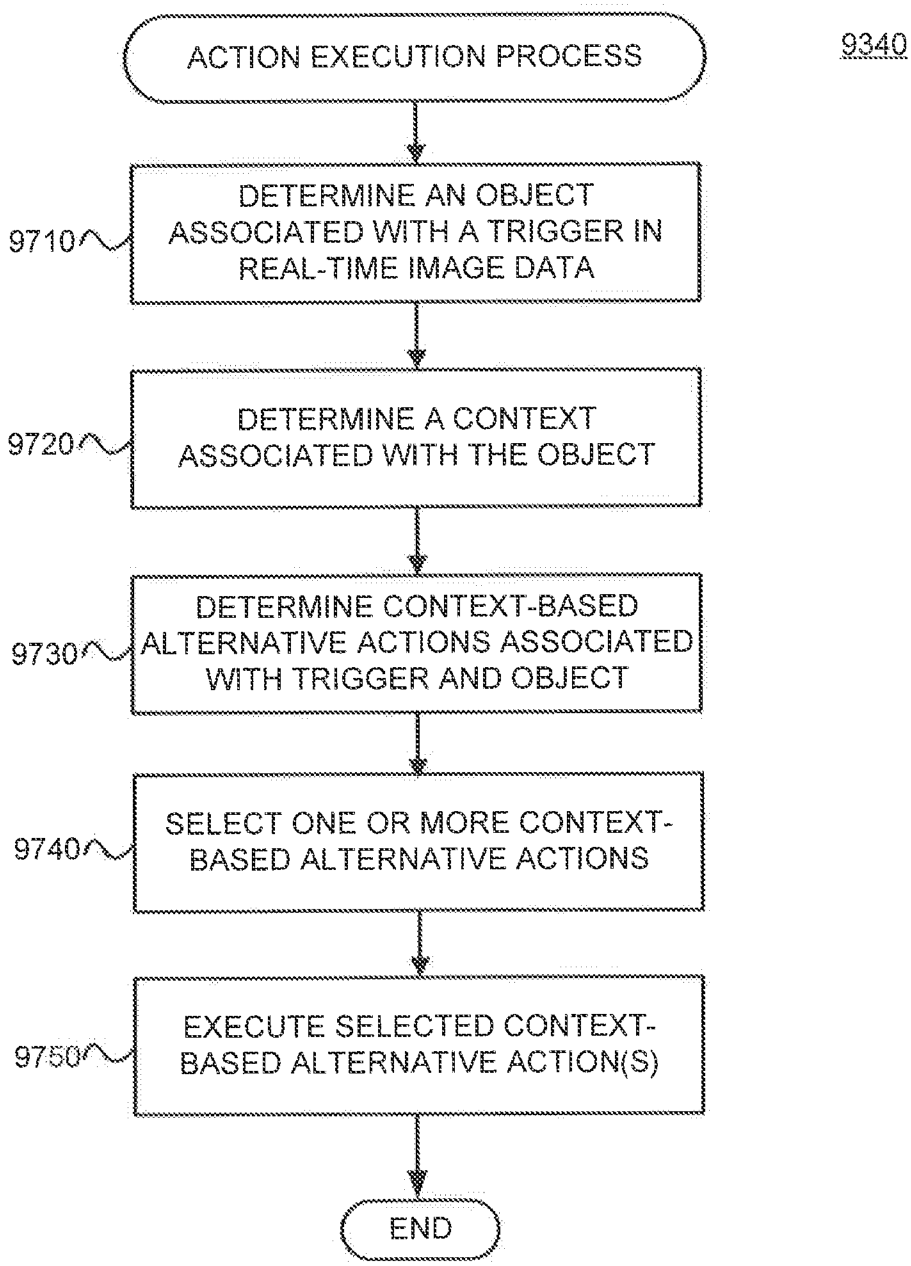
FIG. 97 is an example of an action execution process, consistent with disclosed embodiments.

FIG. 97 illustrates an example action execution process such as that described above in association with Step 9340 of process 9300 consistent with certain disclosed embodiments. Process 9340, as well as any or all of the individual steps therein, may be performed by various aspects of device 110, computing device 120, or any subcomponents therein. For exemplary purposes, FIG. 97 is described as being performed by processor 210 or 540, executing software instructions stored within memory 550.

Processor 210 or 540, via trigger identification module 9202 and action execution module 9203, may determine an object associated with a trigger in real-time image data received from image sensor 220 (Step 9710). In some embodiments, the trigger may be a hand-related trigger that may be identified and processed using hand-related trigger identification process 9330 described above. In other embodiments, other triggers may be identified and processed by trigger identification module 9202, such as the appearance of a particular object into the field of view of apparatus 110, including the figure of a person known to user 100. In these embodiments, trigger identification module 9202 may be configured to automatically identify and process the trigger when it appears. Alternatively, trigger identification module 9202 may be configured to identify and process the trigger when user 100 focuses on the object using apparatus 110. In some embodiments, trigger identification module 9202 may be configured to identify and process multiple triggers substantially simultaneously within the same field of view.

Once trigger identification module 9202 has identified and processed the relevant triggers present in the real-time image data, trigger identification module 9202 and database comparison module 9204 may determine one or more objects associated with the triggers. In some embodiments, database(s) 9205 may contain database entries linking particular objects to triggers, and database comparison module 9204 may be configured to search database(s) 9205 given the input of a particular trigger to find associated objects that are present in the received real-time image data. In other embodiments, database comparison module 9204 may take the reverse approach, and may identify one or more objects present in the received real-time image data, then search database(s) 9205 for matching triggers. Database comparison module 9204 may identify one or more trigger-object matches within database(s) 9205, and may extract data relating to those pairings for further analysis and processing consistent with disclosed embodiments.

Processor 210 or 540, via trigger identification module 9202, action execution module 9203, and database comparison module 9204, may determine a context associated with the identified objects (Step 9720). In some embodiments, processor 210 or 540 may determine an object context based on real-time image data received from image sensor 220. In other embodiments, processor 210 or 540 may determine an object context based on real-time audio data received from image sensor 220. In some embodiments, apparatus 110 may recognize a familiar context associated with the object based on prior experience, or based, for example, on context information pre-programmed into memory 550 or database(s) 9205. In these embodiments, database comparison module 9204 may identify known and familiar contexts associated with objects and triggers within database(s) 9205. Alternatively, the context determined from the image sensor data may not be recognized or familiar, and processor 210 or 540 may prompt user 100 to provide information relating to the context via an audio prompt or via a user interface visible to user 100 within the field of view of apparatus 110. Apparatus 110 may receive the context information in these embodiments from user 100, and then database comparison module 9204 may use the received information to search database(s) 9205 or other sources for relevant entries.

Additionally, processor 210 or 540 may call action execution module 9203 to determine one or more context-based alternative actions associated with the chosen category or categories, and their associated triggers and contexts (Step 9730). In some embodiments, action execution module 9203 performs such alternative actions in addition to any feedback generated by feedback generation module 9201. In other embodiments, the alternative actions are performed instead of the feedback generation.

One skilled in the art may contemplate a multitude of alternative actions that may be associated with a given object or objects and an identified hand-related trigger for a given context. Alternative actions may include, but not be limited to, audibly reading text, sending an electronic message or instant message over the Internet; configuring settings for apparatus 110 or image sensor 220; activating a user interface, which may appear on the lens of a glasses unit 130 within the vision of user 100 and provide additional interactivity options, announcing an identity of an inanimate object, announcing an identity of an individual, identifying a scene perceived within the field of view, summing money, monitoring a status of a traffic light (as illustrated, for example, in FIG. 94A), saving an individual's name, audibly reading a summary of text, monitoring an object expected to change, identifying a bus number, identifying currency, identifying a credit card, or identifying a pharmaceutical product, such as a pill. Numerous other beneficial actions may also be performed alternative to or in addition to the above.

Various alternative actions available for execution by action execution module 9203 may be stored in database entries within database(s) 9205 associated with various objects, contexts and triggers. In these embodiments, processor 210 or 540 may call database comparison module 9204 to access and extract possible alternative actions, then transmit the possible actions to action execution module 9203 for execution. When more than one object or trigger are visible, processor 210 or 540 may determine their relative locations to determine one or more possible alternative actions to execute.

Action execution module 9203 may select one or more of the context-based alternative actions presented for execution (Step 9740). In some embodiments, action execution module 9203 may select a single alternative action for execution based on the context or lack of context. In other embodiments, action execution module 9203 may select multiple alternative actions. In these embodiments, one or more of the alternative actions may be sequential; for example, an alternative action may only be executed if another particular action is executed beforehand. Upon selecting one or more of the alternative actions, action execution module 9203 may execute various software instructions to perform the action (Step 9750).

For example, if the action involves an audible output to user 100, action execution unit 9203 may employ feedback generation module 9201 and feedback-outputting unit 230 or 545 to generate, configure, and output the audible information, as will be discussed in further detail below. In some embodiments, processor 210 or 540 may be configured to rapidly adjust the alternative actions available to action execution module 9203 based on changes that may be identified in one or more of a trigger, an identified object, or a context related to the object. In these embodiments, as these elements change, processor 210 or 540 may call database comparison module 9204 to search database(s) 9205 for new alternative actions associated with the newly-changed trigger, object, or context.

As a non-limiting example of an automatic action selection process, such as that described above in association with FIG. 93, apparatus 110 may determine that a hand-related trigger is present and that the hand-related trigger is associated with user 100, such as a portion of user 100's hand holding an object. After identifying the trigger, trigger identification module 9202 may further identify the object that user 100 is holding as a stack of currency, such as is shown in FIG. 95C. Database comparison module 9204 may then search database(s) 9205 or other information sources for possible contexts involved with the particular trigger (hand-related; holding) and the object (currency). Database comparison module 9204 may determine possible contexts, such as needing to identify the type or amount of the currency to pay for a purchase. Database comparison module 9204 may then determine one or more alternative actions associated with the trigger, the object, and the context. Here, database comparison module 9204 may determine that alternative actions may include audibly announcing the face value of the currency, audibly announcing the type or national origin of the currency, or audibly summing the amount of the currency. The alternative actions may optionally be performed sequentially; for example, the currency might not be summed until apparatus 110 determines the type of currency first. Upon determining the possible alternative actions, database comparison module 9204 may pass the possible actions to action execution module 9203, which may select and execute one or more of the actions. Action execution module 9203 may execute software instructions to determine the type of currency, sum the currency, then generate, configure, and output audible or visible announcements of the currency type and amount via feedback generation module 9201 and feedback-outputting unit 230 or 545. This process will now be described in further detail.

Figure 98:
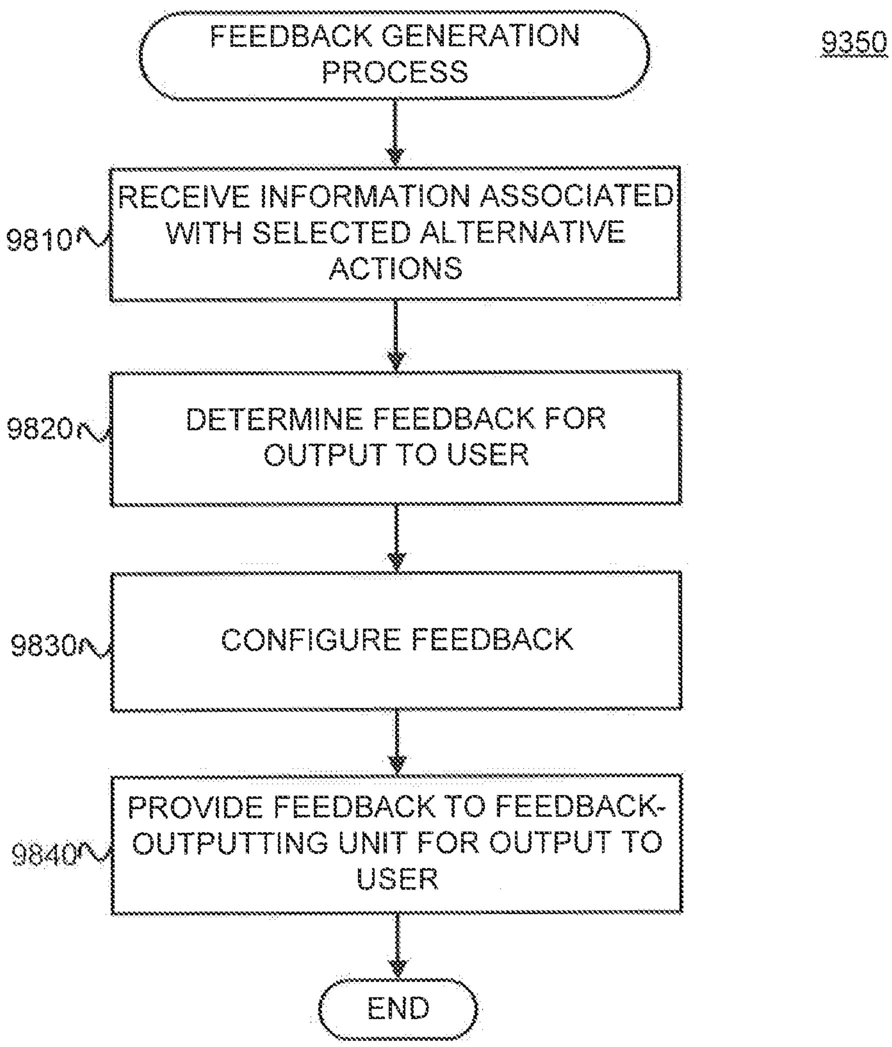
FIG. 98 is an example of a feedback generation process, consistent with disclosed embodiments.

FIG. 98 illustrates an example feedback generation process such as that described above in association with Step 9350 of process 9300 consistent with certain disclosed embodiments. Process 9350, as well as any or all of the individual steps therein, may be performed by various aspects of device 110, computing device 120, or any subcomponents therein. For exemplary purposes, FIG. 98 is described as being performed by processor 210 or 540, executing software instructions stored within memory 550.

As discussed above, processor 210 or 540, via feedback generation module 9201, may receive information associated with one or more identified objects that have been determined to be present in the environment surrounding user 100 (Step 9810). The received information may further comprise information relating to a result of one or more executed alternative actions, as discussed above. Based on the received information, feedback generation module 9201 may determine a desired feedback for output to user 100 (Step 9820). The feedback may include any one or more of audible, visible, tactile, or other type of feedback consistent with the disclosed embodiments. In some embodiments, the identified object or executed alternative action may each already be associated with an audible or visible feedback file stored in memory 550 or database(s) 9205. In these embodiments, feedback generation module 9201 may simply access the existing associated audible feedback file and prepare it for transmission. In other embodiments, there may be multiple audible feedback files associated with the identified object(s) or selected alternative actions, and feedback generation module may review the determined trigger and/or context information to determine the correct associated audible feedback to output to user 100. In still other embodiments, there may be no existing audible feedback file associated with the identified object(s) or selected actions. In these embodiments, feedback generation module 9201 may determine content for audible or visible feedback by prompting user 100 for the feedback, or may infer proper audible feedback, based on context and based on other objects within the category.

After determining the proper feedback to use, feedback generation module 9201 may configure the feedback into a readable format, if necessary (Step 9830), then provide the feedback to feedback-outputting unit 230 or 545 for output to user 100 (Step 9840). Feedback generation module 9201 may provide the feedback to feedback-outputting unit 230 or 545 via an electrical connection, or alternatively, via wireless transceiver(s) 530. In some embodiments, feedback-outputting unit 230 or 545 may be associated with a display (such as 260 shown in FIG. 5C) and configured to provide instructions to output visible feedback on the display.

Some embodiments of the present disclosure include acquiring environmental information or taking other actions based on trigger recognition. In some embodiments, triggers may include objects, actions, and contextual situations identified in image data acquired by wearable apparatus 110. Triggers may also be identified in audio data acquired by wearable apparatus 110. As discussed above, triggers may also include hand-related triggers. When a trigger is identified by a processing device associated with wearable apparatus 110, the processing device may initiate an action in response to the trigger. In some embodiments, an action in response to the trigger may include the acquisition and/or storage of environmental data, images, and/or audio. In some embodiments, an action in response to the trigger may include the execution of commands by a processing device in communication with wearable apparatus 110.

In an exemplary embodiment consistent with the present disclosure, wearable apparatus 110 may identify a trigger to update a shopping a list. For example, a processing device associated with wearable apparatus 110 may identify an object entering a receptacle, such as a trash or recycling bin or a shopping cart. The associated processing device may then identify that the object is a specific product, and update a shopping list or provide a reminder based on the identification. For example, if wearable apparatus 110 captures images of a box of cereal being placed in a recycling bin, a processing device may create a reminder to buy cereal and/or update a shopping list by including cereal in the list. In a further example, if wearable apparatus 110 captures images of a box of cereal being placed in a shopping cart, the processing device may update a shopping list by removing cereal from the list.

In another exemplary embodiment consistent with the disclosure, wearable apparatus 110 may store audio and/or image data in response to an audio trigger. For example, at least one processing device may buffer audio received from a microphone associated with wearable apparatus 110. The buffered audio may be analyzed for triggers in the audio data. After identifying a trigger in the audio data, for example, the phrase "record," the processing device may cause the storage of data, either audio, image, or both, received before and after the audio trigger was received. A user may alter a predetermined length of time that data before and after the trigger is recorded, may use a second trigger to signal an end of a recording period, and/or may include a length of time for recording in the trigger itself, e.g. "record audio for thirty seconds."

In yet another exemplary embodiment consistent with the present disclosure, a trigger based on a context associated with a room in which a user is located may cause a processing device to transmit instructions to a remote device (e.g., a smartphone) to enter a silent mode. For example, if a user walks into a theater, the processing device may interpret that as a trigger and cause a remote device to switch to a silent mode.

Embodiments of the present disclosure may use various image recognition techniques, including, for example, object identification, facial recognition, and optical character recognition to identify triggers or other content within images. These techniques may be used singularly and in conjunction with one another.

Images to be recognized may initially be categorized by image type. For example, portions of images may be initially categorized as text, faces, objects, scenes, etc. Categorizations may assist wearable apparatus 110 in determining image recognition techniques to be used.

Object identification may be used to identify objects or items in an image portion. Object identification may include comparisons between image portions and database contents. Databases for comparisons may be locally stored, e.g., in a memory associated with wearable apparatus 110 and remotely stored, e.g., in a remote server configured for data storage and communication with wearable apparatus 110. Objects may be identified through, for example, categorization. An object in an image portion may be categorized based on comparisons with one or more images of representative objects in a database. Based on the comparisons, an object may be assigned a category, e.g., vehicle, tree, building, consumer product, etc. The object may then be further categorized based on comparisons with sub-categories within a first assigned category. Thus, the identity of an object may be narrowed down through multiple image comparisons. Objects may also be identified, for example, through other types of comparisons with images stored in a remote or local database.

Scene, or contextual situation, recognition may be performed based on the recognition of multiple objects within an image, and their relationship with one another. Object identification may be used to identify multiple objects within a scene via comparison with databases, and relationships between identified objects may be used to identify a scene. For example, the recognition of multiple chairs and a table may indicate a dining scene if the chairs are located around the table and dinnerware is identified in the image. The recognition of multiple chairs and a table may also indicate, for example, a press conference, if the chairs are aligned in rows facing the table.

Facial recognition may also be performed by apparatus 110 to identify portions of an image. Facial recognition techniques consistent with the present disclosure may be used to compare image content with images of faces stored in a database. Recognition of a particular individual's face within the database may constitute a trigger.

Optical character recognition may also be used for trigger identification. The term "optical character recognition" includes any method executable by a processor to retrieve machine-editable text from images of text, pictures, graphics, etc. Some OCR techniques and other document recognition technology use a pattern matching process to compare the parts of an image to sample characters on a pixel-by-pixel basis. This process, however, does not work well when encountering new fonts, and when the image is not sharp. Accordingly, apparatus 110 may use an OCR technique that compares a plurality of sets of image regions that are proximate to each other. Apparatus 110 may recognize characters in the image based on statistics related to the plurality of the sets of image regions. By using the statistics of the plurality of sets of image regions, apparatus 110 can recognize small font characters defined by more than four pixels e.g., six or more pixels. In addition, apparatus 110 may use several images from different perspectives to recognize text on a curved surface. In another embodiment, apparatus 110 can identify in image data an existence of printed information associated with a trigger stored in a database and execute the trigger command thereafter. Examples of a system command include: "enter training mode," "enter airplane mode," "backup content," "update operating system," etc.

Curved surface textual recognition may be particularly useful for identifying text on, for example, a consumer product. A curved surface may include any surface containing at least one bend, arc, round, or any other non-straight structure. For example, the outer surfaces of a bottle, a can, a tin, and a cathode ray tube (CRT) screen are all examples of a curved surface. For simplicity, an object having a curved surface is herein referred to as a curved object. Curved objects may include a food product (e.g., a food product with a can or a tin package), a beverage (e.g., a bottle or a can), a pharmaceutical drug (e.g., a drug with a drug bottle), etc., and text may include text on a label associated with curved object.

In some embodiments, layout analysis may be performed to assist with optical character recognition. Apparatus 110 may capture an image that includes text. After capturing the image, to save resources and to process portions of the text that are relevant to the user and may include triggers, apparatus 110 may initially perform a layout analysis on the text. The term "layout analysis" refers to any process of identifying regions in an image that includes text. For example, layout analysis may detect paragraphs, blocks, zones, logos, titles, captions, footnotes, etc.

Figure 99:
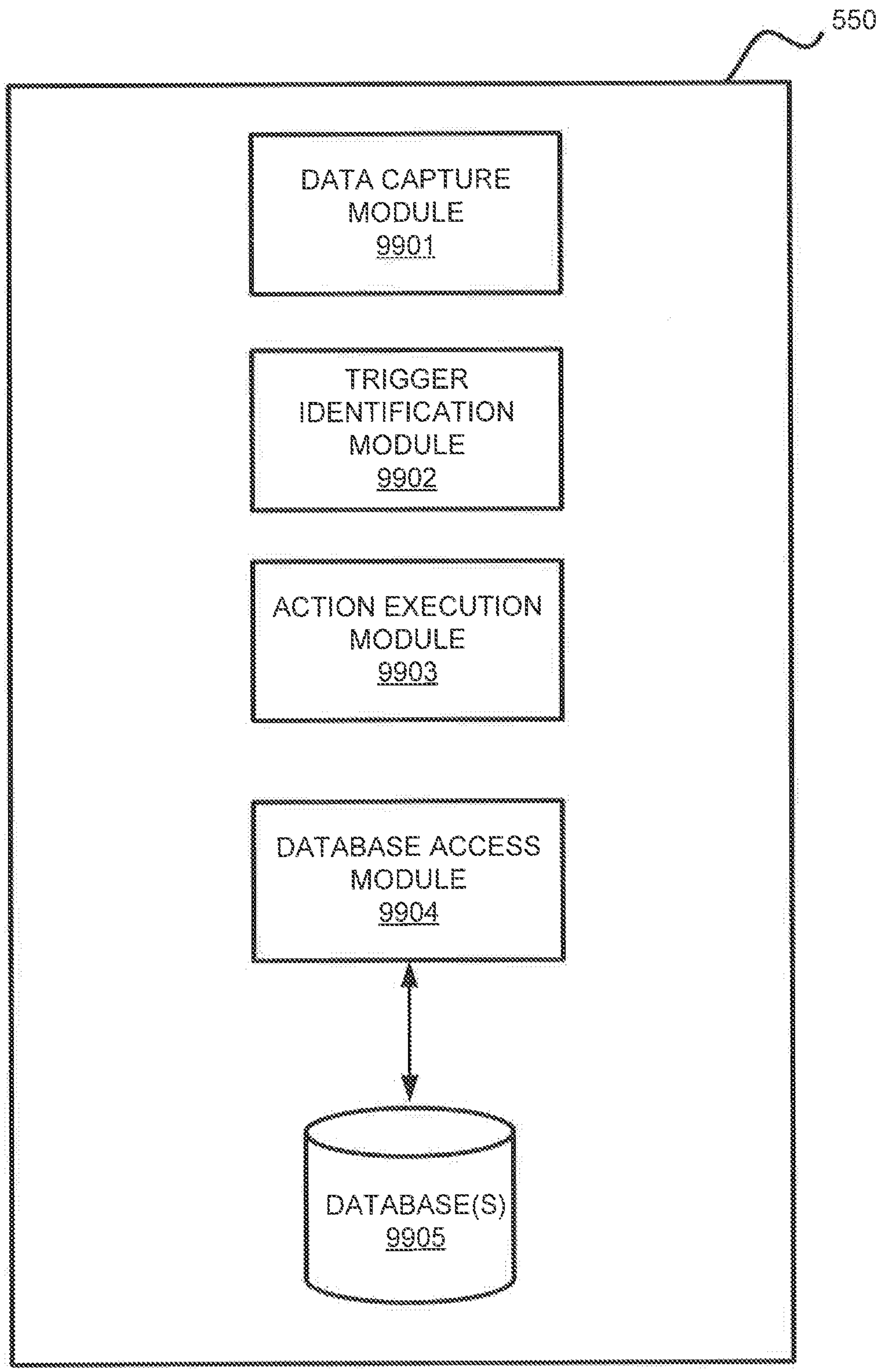
FIG. 99 illustrates an exemplary embodiment of a memory containing software modules consistent with the present disclosure.

FIG. 99 is a diagram illustrating an example of memory 550 storing a plurality of modules, consistent with the disclosed embodiments. The modules may be executable by at least one processing device to perform various methods and processes disclosed herein. Memory 550 may store more or fewer modules than those shown in FIG. 99.

As illustrated in FIG. 99, memory 550 may store software instructions to execute a data capture module 9901, a trigger identification module 9902, an action execution module 9903, a database access module 9904, and database(s) 9905. Data capture module 9901 may include software instructions for receiving data from wearable apparatus 110. Trigger identification module 9902 may include software instructions for analyzing data obtained by wearable apparatus 110 to identify triggers in the data. Action execution module 9903 may include software instructions to cause the occurrence of an action based on a trigger identified in acquired data. Database module 9904 may include software instructions executable to interact with database or databases 9905, to store and/or retrieve information.

Data capture module 9901 may include software instructions for receiving data from a wearable apparatus, such as a wearable camera system. Data received from a wearable camera system may include audio and image data, captured, by, for example, an image sensor or microphone associated with the wearable camera system. Image data may include raw images and may include image data that has been processed. Raw images may be provided, for example, in the form of still images and video data. In some embodiments, image data and audio data may be preprocessed prior to capture by data capture module 9901. Preprocessing may include, for example, noise reduction, artifact removal, compression, and other image pre-processing techniques.

Trigger identification module 9902 may be configured to analyze data captured by data capture module 9901 to detect or identify triggers. Image related triggers may include, for example, the detection of objects, contexts, situations, people, products, words, text, pictures, actions, and any other identifiable feature in an image or series of images. Triggers may be detected in still images or in video images. Triggers may also be detected based on the relationship of identifiable features with respect to one another in an image or video. For example, a person holding a specific product may constitute a trigger. A person approaching or departing may constitute a trigger. Audio related triggers may also include the detection of certain sounds, speech, and/or speech patterns in audio data. For example, a fire alarm may be a trigger, the pattern of a specific person's speech may be a trigger, a specific sequence of words may be a trigger. Some triggers may include combinations of audio, image, and hand-related triggers. For example, a specific image identified in conjunction with a specific sequence of words may be a trigger. Specific examples of triggers provided herein are exemplary only, and a person of skill in the art will recognize other triggers that remain consistent with the present disclosure.

Triggers consistent with the disclosed embodiments may also include images of pre-determined physical objects, individuals disposed within the captured image data, and text recognized within the captured image data. For example, apparatus 110 may be configured to perform one or more actions automatically upon detection of an image of an individual wearing a specific uniform (e.g., a firefighter, emergency medical technician (EMT), a police officer, a member of the military, or a flight attendant) within the captured image data. Trigger identification module 9902 may use various image recognition techniques to identify triggers, such as those described herein and others known in the art.

Action execution module 9903 may be configured to perform a specific action in response to a detected trigger. In some embodiments, actions may include the acquiring and storing data from an environment of a user. For example, a user may trigger a wearable apparatus to record data related to their environment by saying "record image and audio for 30 seconds." Actions may also include creating and updating task lists, such as shopping lists, reminder lists, and to-do lists. For example, data capture module 9901 may capture an image of a car's gas tank gauge, trigger identification module 9902 may analyze the image to determine that the car is low on fuel, and action execution module 9903, in response, may create a task for the user to fill the car with fuel. In further embodiments, actions may adjust the settings of a device, such as a smartphone or tablet, controlled by a wearable camera system. For example, ambient noise may trigger a controlled device to increase volume.

Database access module 9904 may be configured to access database(s) 9905, for example, to retrieve or store images and/or audio data captured via data capture module 9901. In some embodiments, database 9905 may be configured to store trigger detection related information, such as images, audio, and/or video with which trigger identification module 9902 may compare data for trigger detection. Database 9905 may be configured to store any type of information of use to modules 9901-9904.

Figure 100:
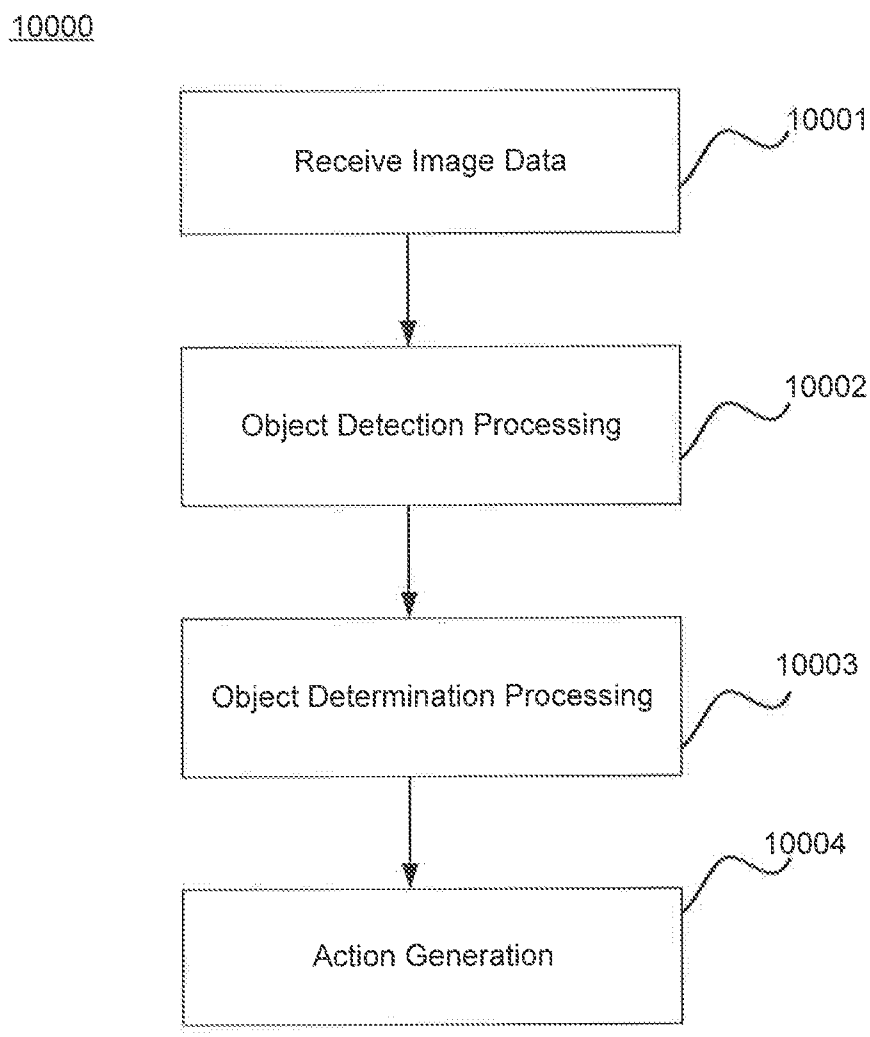
FIG. 100 is a flowchart illustrating an exemplary method consistent with the present disclosure.

FIG. 100 illustrates a flowchart of an exemplary method for updating shopping lists consistent with the present disclosure. Shopping list update method 10000 may be carried out, for example, by a processing device integrated with and/or associated with wearable apparatus 110. In such an embodiment, wearable apparatus 110 may include a wearable image sensor, e.g. image sensor 220, configured to capture a plurality of images from the environment of the user. For exemplary purposes only, shopping list update method 10000 is described herein with respect to processing device 210 cooperating with memory 550 to execute modules 9901-9904.

At data reception step 10001, processing device 210 may receive image data captured by a wearable image sensor. Step 10001 may be facilitated by software instructions of data capture module 9901. Data capture module 9901 may be configured to execute instructions to receive image data from a wearable image sensor, and may also be configured to execute instructions to control the wearable image sensor. Controlling the wearable image sensor may include issuing commands to record images and videos, and may also include issuing commands to control an orientation or direction of viewing of the image sensor.

Received image data may be processed via software steps executed by trigger identification module 9902 during objection detection step 10002. Trigger identification module, as described above, may analyze image data to detect triggers within the images. In the embodiment of shopping list update method 10000, triggers may include images or video of objects entering receptacles. Thus, trigger identification module 9902 may process the plurality of images received from the wearable image sensor to detect an object entering a receptacle, such as a trash receptacle, a recycling receptacle, a shopping cart, and a shopping bag. The trigger identification module 9902 may be further configured to process the plurality of images to detect the object leaving the hand of the user prior to entering the receptacle.

In addition to identifying that an object is being placed in a receptacle, the system may also determine what type of object is being placed in the receptacle by processing one or more images. Trigger identification module 9902 may process at least one of the plurality of images that include the object to determine at least a type of the object, at step 10003. The type of object may include, for example, at least one of a type of product, a brand of product, and a product name. A type of product may include, for example, shampoo or cereal. A brand of product may include, for example, a specific brand or manufacturer of a product, i.e., the manufacturer of the shampoo or cereal, and a product name may include, for example, the specific name of the manufacturer's shampoo or cereal. The identification of an object being placed in a receptacle may constitute an image related trigger.

After a type of object has been identified, action execution module 9903 may perform an action in response to the image related trigger, at action generation step 10004. Action execution module may generate information related to an action to be taken related to the object, based on the determination of the type of object. Information related to an action to be taken may include a reminder to purchase a replacement object, for example on a shopping list or task list. Such information may also include removing the object from a shopping list or task list, where, for example, the receptacle the object is placed in is a shopping cart or shopping bag.

In one example of a shopping list updating method, a wearable apparatus of a user may generate a reminder list or shopping list over the course of several days as the apparatus identifies one or several products that are thrown away or recycled by the user. As the user finishes a product (e.g., finishes a bottle of milk and recycles it, finishes a box of cereal and recycles it, etc.) the system may identify that the product has been consumed and generate a shopping list or reminder list including the item. When the user then enters a grocery store and purchases the item, the system may again identify the purchase as a trigger, and remove the item from the shopping list or reminder list.

Figure 101:
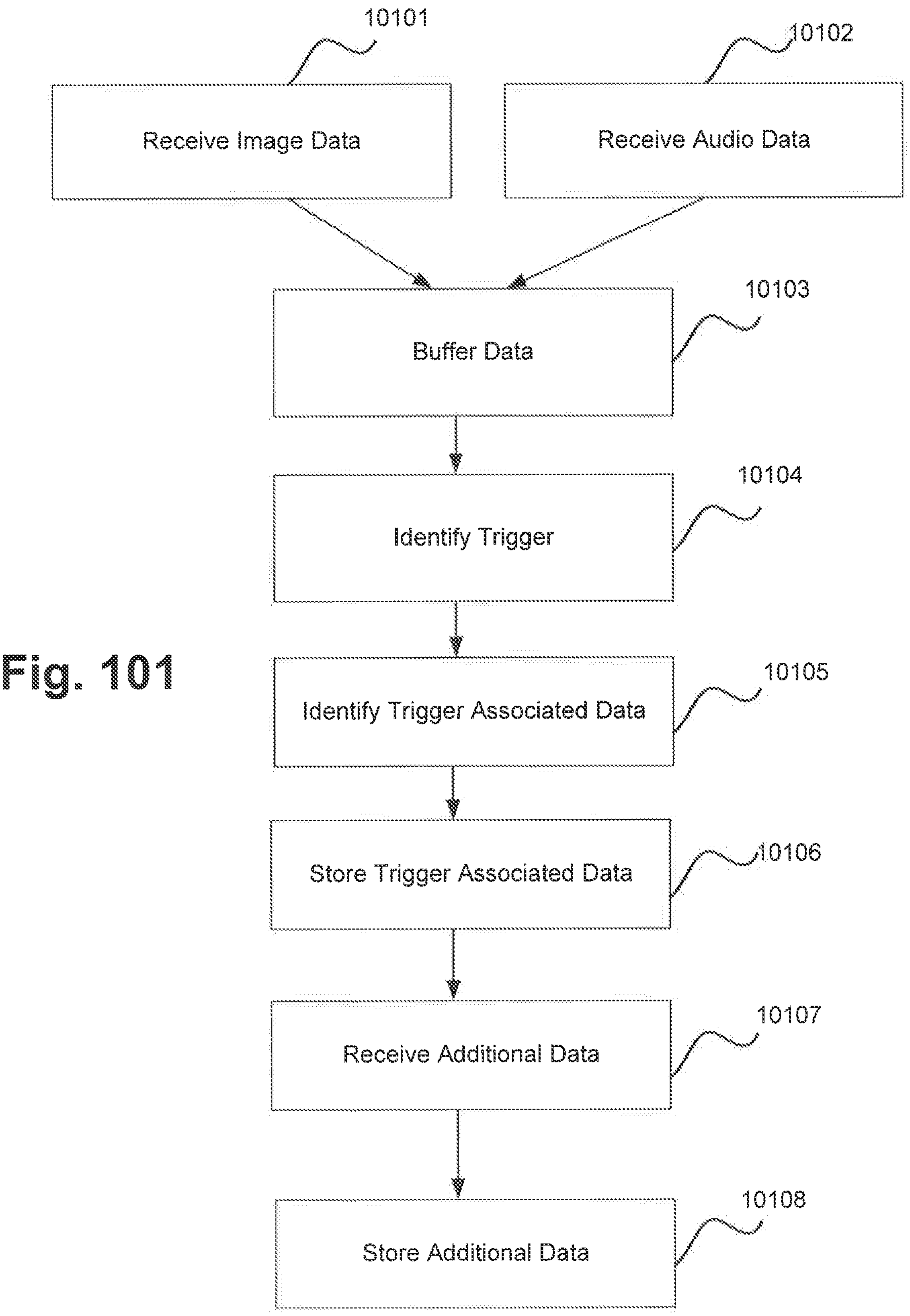
FIG. 101 illustrates a flowchart of an exemplary method for selectively storing data captured by a wearable apparatus.
Figure 102:
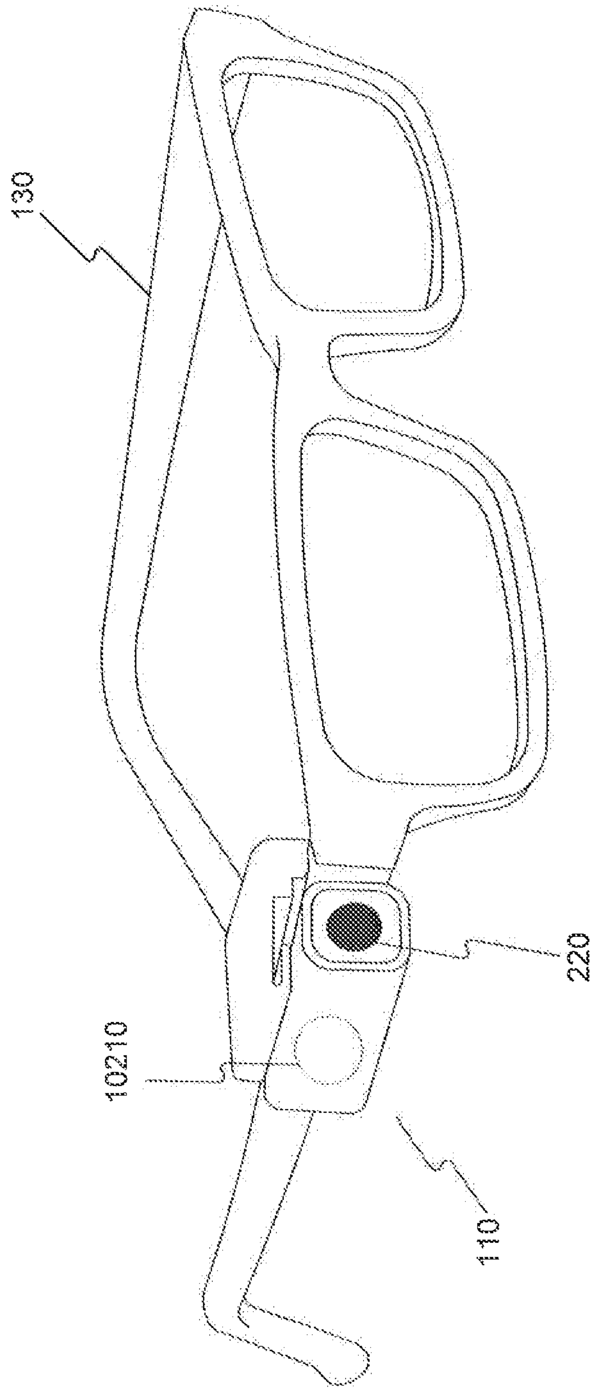
FIG. 102 illustrates an embodiment of a wearable apparatus including a microphone.

FIG. 101 illustrates a flowchart of an exemplary method for selectively storing data captured by a wearable apparatus. FIG. 102 illustrates a wearable apparatus 110 consistent with data storage method 800. Wearable apparatus 110, as illustrated in FIG. 102, includes a wearable image sensor 220 configured to capture a plurality of images from the environment of the user and a microphone 10210 configured to capture audio data from the environment of the user. Wearable apparatus 110 may further include a buffer device for temporarily storing data, a memory device for storing data, and at least one processing device programmed to carry out instructions. A buffer device may be a memory storage device, and may include a small amount of easily accessible memory for temporary data storage. A memory device for storing data may permit the storage of more data than a buffer device. In some embodiments, the buffer device and the memory device may be accommodated on the same physical memory device. In some embodiments, they may be separate memory devices. As discussed above, aspects of the wearable apparatus may be included in a single unit, e.g., integrally with the glasses 130 as illustrated in FIG. 102. In other embodiments, the wearable apparatus may include multiple associated components, for example, a smart phone or tablet that communicates with other aspects of the wearable apparatus.

Selective data storage method 800 may proceed as follows. Data capture module 9901 may receive data via wearable apparatus 110. Captured data may include at least one of image data captured via an image sensor of wearable apparatus 110 at step 10101 and audio data received by a microphone of wearable apparatus 110 at step 10102. Data capture module 9901 may further store at least a portion of the audio and/or image data in a buffer device of wearable apparatus 110 at step 10103.

Trigger identification module 9902 may analyze the buffered data at step 10104 to identify a trigger. A trigger may be included in the received audio data, and the trigger identification module 9902 may be configured to process at least a portion of the audio data received by the microphone to identify the trigger. Such an audio trigger may include, for example, a word or series of words, a pattern of speech, and/or an external sound, such as a fire alarm. A pattern of speech may include, for example, voice recognition to identify a specific speaker. Thus, a user may speak a specific word or phrase to cause a trigger, or, for example, all speech by certain person may constitute a trigger. A trigger may be included in image data received from a wearable image sensor, and trigger identification module 9902 may be configured to process a plurality of images to identify the trigger. Such image related triggers may include, for example, a hand gesture, the appearance of one or more specific objects in the plurality of images, a visual event, the appearance of one or more specific persons in the plurality of images, and the appearance of one or more specific faces in the plurality of images.

Trigger identification module 9902 may identify at least a portion of the data stored in the buffer device that preceded the trigger at step 10105. Microphone 10210 and/or image sensor 220 may continuously capture data, which may be continuously stored in the buffer device. The storage capability of the buffer device may determine how much data is stored—for example, 1 minute, 5 minutes, or one hour of data. When trigger identification module 9902 identifies a trigger during image analysis, it may next identify at least a portion of the data that is stored in a buffer device that preceded the trigger. Action execution module 9903 may then take action based on the trigger by storing, in the memory device, the identified, or preceding, portion of data at step 10106. It is not necessary that the portion of preceding data that is stored in step 10106 be in the same format as the trigger. For example, preceding image data may be stored when the trigger is an audio trigger, and vice versa. In some embodiments, both preceding audio and preceding image data may be stored.

Action execution module 9903 may also execute instructions to receive a second portion of additional data received after or during the trigger, at step 10107, and store the additional data in a memory device, at step 10108. The second portion of additional data may be associated in the memory device with the identified portion of preceding data.

In some embodiments, additional data captured by in the form of images by image sensor 220 or audio by microphone 10210 captured after the receipt of the trigger may be stored in a storage device as additional data.

In one example of a selective data storage method, a user may initiate data storage through a specific set of words that constitute a trigger. In some embodiments, the nature of the data recording and storage may be based on the trigger that is identified. For example, a user may say "record image data now." When this trigger is identified by the system, a portion of image data received prior to the triggering audio may be stored in a memory device along with additional image data received after the trigger. Data storage may be halted by the identification of another trigger, e.g. "stop recording," or by a predetermined length of recording. Instead of a voice command, a trigger may be a certain image or images identified in the image data, for example a specific person or face, a specific vehicle or sign, or a hand gesture executed by the user. A user may predefine the type of image or audio that constitutes a trigger.

In some embodiments, the size of the data portion preceding the trigger that is identified as well as the amount of data taking place after the trigger that is recorded may depend on the trigger that is received. A user may employ several different audio triggers to induce different behaviors. For example, a user may say "begin recording" to initiate recording and the system may record only a small portion of data received prior to the trigger. In another example, a user may say "store the last minute," which may trigger the system to transfer all data received in the previous minute from the buffer device to the memory storage device. In some embodiments, a user may execute hand gestures to be captured by the image sensor to serve as triggers.

Figure 103:
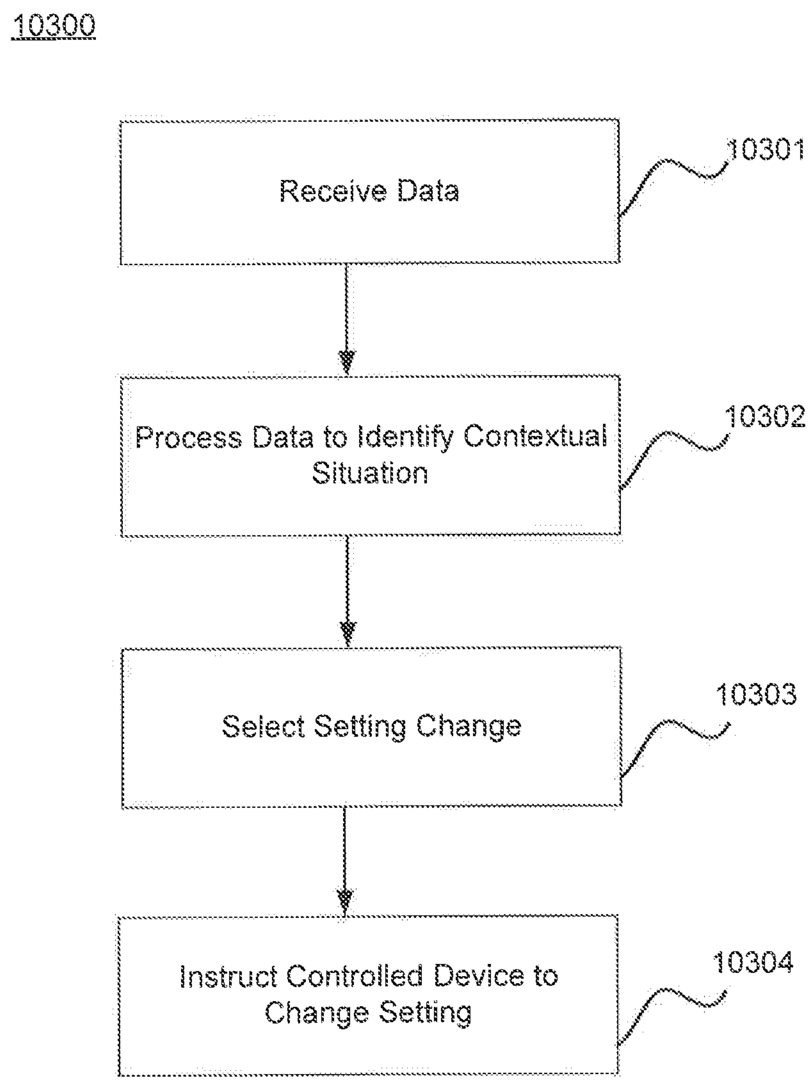
FIG. 103 is a flowchart illustrating an exemplary method consistent with the present disclosure.

In another embodiment consistent with the present disclosure, actions taken in response to a trigger identified from captured environmental data may include changes to settings of a user device. For example, certain contextual situations in an environment of a user may cause a device to enter a silent or quiet mode. FIG. 103 illustrates a flowchart of an exemplary device setting change method 10300. Embodiments of a wearable apparatus for causing a controlled device to change settings may include wearable image sensor 220 configured to capture a plurality of images from an environment of the user, a communications interface, and at least one processing device 210. A communications interface may include, for example, wireless transceiver 230. In some embodiments, a wearable apparatus consistent with method 10300 may further include a microphone.

An exemplary device setting change method 10300 may proceed as follows.

Method 10300 may be executed by software instructions stored on memory 550 and executed by processor 210. Data capture module 9901 may capture or received data at step 10301. Such data may be in the form of one or more images or video captured by a wearable image sensor. In some embodiments, captured data may be in the form of audio data. In some embodiments, captured data may include both audio and image/video data.

Trigger identification module 9902 may then process the captured data at step 10302 to identify a contextual situation within the data. For example, trigger identification module 9902 may process a plurality of images and/or audio data to identify a context associated with a location (e.g., a room) where the user is located. The context of the room may include what type of room it is or what type of behavior is expected in the room. Various features of image or audio data identified during step 10302 may assist to determine the context of a room. Although the following disclosure discusses identifying the context of a room, other locations are within the scope of the disclosure. For example, trigger identification module 9902 may identify a context associated with other locations, including, for example, outdoor locations (e.g., a park, a street, a building exterior, etc.) and locations inside a vehicle.

The context of the room may be identified, for example, based on a number of chairs in the room. For example, a large number of chairs may assist to identify a room as a conference room or as an auditorium. The context of the room may be identified, for example, based on a size and/or shape of a table in the room. A large table, for instance, may identify a room as a conference or meeting room. The context of a room may be identified based on an identification of one or more items on the table in the room. For example, the presence of dishware and silverware may assist to identify a room as part of a restaurant or a dining room. In some embodiments, processing device 210 may be further configured to use a level of noise and/or light detected in the room to facilitate the identification of the context of the room. For example, the identification of a noisy or quiet room may indicate that quiet or noisy behavior is appropriate in the room. The identification of a very dark room may indicate a movie theater, for example. The context of a room may be identified based on a number of people in the room, the arrangement of the people, and/or the posture of the people. For example, a large number of seated people may indicate the context of a conference room. The context of a room may be identified based on the identification of a person speaking in the room. A user, for example, may identify a particular person's speech or image to trigger a device setting change. The context of a room may be identified based on one or more specific objects within the room, for example, a projector, water pitcher, lectern, and/or food tray may be indicators of a conference or meeting room. The foregoing list of potential context indicators is non-exclusive, and a person of skill in the art will recognize that the context of a room may be recognized or identified by additional or alternative characteristics identified within audio and/or image data captured by a wearable apparatus.

Further, the context of a room may be recognized or identified by considering multiple characteristics identified within audio and/or image data captured by a wearable apparatus. For example, in some embodiments, the context of a room may be determined based on the presence of a predetermined number (e.g., two, three, four, five, etc.) of characteristics in a room (e.g., the context of a room is a conference room if it includes three or more characteristics, such as a large number of people, a large table, and a projector). Room contexts may be predefined and/or user defined. Predefined room contexts may include common room situations, such as conference rooms, auditoriums, etc. In some embodiments, a user may define room contexts by capturing environmental image and/or audio data in a specific situation and tagging that data with a context identified. Processing device 210 may store such information in database 9905 for later use in identifying a contextual situation within a room. For example, a user may capture data about the environment of a specific room in a workplace, such as a supervisor's office, and tag that data as such. Although the supervisor's office may not correspond to a predefined context, the user may define it as a specific context in order to permit the wearable apparatus to automatically take action upon detecting that the user has entered the supervisor's office.

Action execution module 9903, may select, at step 10303, a setting change for a controlled device.

Controlled devices may include devices of the user of the wearable apparatus as well as other compatible devices. Processing device 210 may be configured to receive, via the communications interface, a signal from a controlled device, and to identify a person associated with the controlled device based on the signal. The associated person may be identified based on a device identifier in the signal. The associated person may include the user of the wearable apparatus or another person. Thus, a controlled device may include a device of the user that is associated with the wearable apparatus of the user. For example, the controlled device may be a smartphone or tablet identified by the wearable apparatus of the user via a wireless Bluetooth connection. As described above, processing device may identify the device based on a wireless signal of the device. This may allow, for example, a wearable apparatus 110 to control any device of a particular user, without requiring the user to specifically designate a device as the controlled device.

Device compatibility may also be determined via a received wireless signal. For example, processing device 210 may be configured to receive, via the communications interface, a signal from a controlled device, and to identify that the controlled device is compatible with the wearable apparatus via the signal. For example, the system may identify that the controlled device is wearable based on the signal. Identification may be accomplished, for example, based on a device identifier included in the signal. Thus, a controlled device may be determined to be compatible with the wearable apparatus based on the device identifier.

Returning now to FIG. 103, action execution module 9903 may select a setting change for a controlled device at step 10303. The setting change may be based on the context associated with the room of the user. For example, upon entering a conference room or auditorium, the setting change may include switching the device to a silent mode or a vibrate mode. Upon identifying that a user has left a conference room, the device may be switched away from a silent mode. Upon entering a noisy room, the device ringer volume may be increased. Additional device setting changes may be apparent to a person of skill in the art.

Action execution module 9903, at step 10304, may further cause transmission of an instruction to the controlled device, via the communications interface, to adopt the device setting change selected at step 10303. Thus, for example, processing device 210 may, based on the context associated with the room, cause transmission of an instruction to a controlled device via the communications interface, wherein the instruction includes instructing the controlled device to enter a silent mode.

An example of device setting change method 10300 may include the following scenarios. A user of a wearable apparatus may pick up a mobile device, such as a smartphone or tablet. Based on an identifier in a wireless signal of the device, the wearable apparatus may determine that it is a compatible device, owned by the user, and thus may treat it as a controlled device. As the wearable apparatus user goes about their day, the wearable apparatus may continually detect the context of rooms and locations that the user enters and exits, and may continually perform device setting adjustments based on the room contexts. When entering a meeting room at his or her office, the user's device may be switched to a silent mode. When exiting the meeting, the silent mode may be switched off. After the work day, the user's device volume may be increased and vibration may be enabled when the user enters a noisy restaurant after work.

The foregoing presents several exemplary embodiments of a wearable apparatus capable of performing actions based on triggers detected in an environment of the user. The details provided are non-exclusive and exemplary only, and additional actions and triggers may be apparent to those of skill in the art.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A wearable apparatus for processing images including a product descriptor, the wearable apparatus comprising:

a wearable image sensor configured to capture a plurality of images from an environment of a user of the wearable apparatus; and at least one processor programmed to:

analyze the plurality of images to identify one or more of the plurality of images that include an occurrence of the product descriptor;

based on analysis of the one or more identified images, determine information related to the occurrence of the product descriptor, the information including at least one of a location of the product descriptor and a time of day of the occurrence of the product descriptor;

identify, from at least one of the plurality of images, a visual trigger distinct from the product descriptor;

correlate the product descriptor with a second product descriptor or a person appearing in the one or more of the plurality of images; and based on the information, the second product descriptor or the person, and the visual trigger, cause a content file to be provided to the user of the wearable apparatus.

2. The wearable apparatus of claim 1, wherein the information further includes a context associated with the occurrence of the product descriptor.

3. The wearable apparatus of claim 1, wherein the product descriptor includes one or more of: a logo, an advertisement, an image of a product, and an image of a store.

4. The wearable apparatus of claim 1, wherein the at least one processor is further programmed to:

identify, in one or more of the identified images, a graphic; and compare the identified graphic with a plurality of stored representations of known graphics; and wherein causing the content file to be provided to the user is further based on the comparison.

5. The wearable apparatus of claim 1, wherein the content file includes a multimedia file.

6. The wearable apparatus of claim 1, wherein the at least one processor is further programmed to:

identify, in one or more of the identified images, a graphic;

access a database of stored graphics; and compare the identified graphic to the stored graphics; and wherein causing the content file to be provided to the user is further based on the comparison.

7. The wearable apparatus of claim 4, wherein the identified graphic includes at least one of a printed image and text.

8. The wearable apparatus of claim 4, wherein the identified graphic includes a logo associated with a brand of a product.

9. The wearable apparatus of claim 6, wherein the at least one processor is further programmed to, in response to the visual trigger, further analyze the plurality of image to determine at least one detail in an environment associated with the visual trigger, and causing the content file to be provided to the user is further based on the at least one detail.

10. The wearable apparatus of claim 1, wherein causing the content file to be provided to the user of the wearable apparatus further includes sending an instruction to an external device associated with the user.

11. The wearable apparatus of claim 10, wherein the instruction is configured to cause the external device to initial playback of the content file.

12. The wearable apparatus of claim 1, wherein the at least one processor is further programmed to correlate the product descriptor with the second product descriptor to determine a habit or a preference, and wherein causing the content file to be provided to the user of the wearable apparatus is further based on the habit or the preference.

13. The wearable apparatus of claim 12, wherein the at least one processor is further programmed to correlate the product descriptor with a location associated with the one or more of the plurality of images, and wherein causing the content file to be provided to the user of the wearable apparatus is further based on the location.

14. The wearable apparatus of claim 1, wherein the at least one processor is further programmed to determine at least one characteristic of the person appearing in the one or more of the plurality of images, and wherein causing the content file to be provided to the user of the wearable apparatus is further based on the at least one characteristic.

15. A wearable apparatus for processing images including a product descriptor, the wearable apparatus comprising:

a wearable image sensor configured to capture a plurality of images from an environment of a user of the wearable apparatus; and at least one processor programmed to:

analyze the plurality of images to identify one or more of the plurality of images that include an occurrence of the product descriptor;

identify, in one or more of the identified images, a graphic included in the product descriptor;

access a database of stored graphics;

compare the identified graphic to the stored graphics;

based on analysis of the plurality of images, determine information related to the occurrence of the product descriptor, the information including at least one of a location of the product descriptor and a time of day of the occurrence of the product descriptor;

identify, from at least one of the plurality of images, a visual trigger distinct from the graphic;

correlate the product descriptor with a second product descriptor or a person appearing in the one or more of the plurality of images; and based on the comparison, the information, the second product descriptor or the person, and the visual trigger, cause a content file to be provided to the user of the wearable apparatus.

16. The wearable apparatus of claim 15, wherein the identified graphic includes a logo associated with a brand of a product.

17. The wearable apparatus of claim 15, further comprising a communications interface, wherein the communications interface is configured to transmit information indicating that the graphic was identified to a computing device when the content file is provided.

18. The wearable apparatus of claim 15, wherein the identified graphic includes a directional symbol and the content file includes directing the user in accordance with the directional symbol.

19. The wearable apparatus of claim 15, wherein the content file includes an advertisement associated with the identified graphic.

20. A method for processing images including a product descriptor, the method comprising:

capturing, via a wearable image sensor, a plurality of images from an environment of a user of a wearable device including the wearable image sensor;

analyzing the plurality of images to identify one or more of the plurality of images that include an occurrence of the product descriptor;

based on the one or more identified images, determining information related to the occurrence of the product descriptor, the information including at least one of a location of the product descriptor and a time of day of the occurrence of the product descriptor;

identifying, from at least one of the plurality of images, a visual trigger distinct from the graphic;

correlate the product descriptor with a second product descriptor or a person appearing in the one or more of the plurality of images; and based on the comparison, the second product descriptor or the person, and the visual trigger, causing a content file to be provided to the user of the wearable apparatus.

21. A non-transitory computer readable medium storing data and computer implemented instructions for carrying out the method of claim 20.

* * * * *